United States Patent [19]

Higashiyama et al.

[11] Patent Number: 5,532,887
[45] Date of Patent: * Jul. 2, 1996

[54] MAGNETIC RECORDING AND REPRODUCTION APPARATUS

[75] Inventors: Yasushi Higashiyama, Yokohama; Takanori Furusawa, Tokyo, both of Japan

[73] Assignee: Kabushiki Kaisha Toshiba, Kawasaki, Japan

[*] Notice: The portion of the term of this patent subsequent to Jan. 4, 2004, has been disclaimed.

[21] Appl. No.: 29,303

[22] Filed: Mar. 8, 1993

Related U.S. Application Data

[63] Continuation-in-part of Ser. No. 617,081, Nov. 21, 1990, abandoned, which is a continuation-in-part of Ser. No. 525,831, May 18, 1990, Pat. No. 5,276,565.

[30] Foreign Application Priority Data

| May 23, 1989 | [JP] | Japan | 1-127906 |
| May 23, 1989 | [JP] | Japan | 1-127911 |
| Nov. 8, 1989 | [JP] | Japan | 1-288754 |

[51] Int. Cl.⁶ .................................................. G11B 15/12
[52] U.S. Cl. .......................... 360/64; 360/63; 360/66
[58] Field of Search .......................... 360/64, 65–66, 360/108, 84, 85, 123, 124; 336/120; 29/603

[56] References Cited

U.S. PATENT DOCUMENTS

| 4,005,481 | 1/1977 | Lackner | 360/66 |
| 4,435,734 | 3/1984 | Hedberg et al. | 360/20 X |
| 4,609,960 | 9/1986 | Fujioka | 360/108 |
| 4,740,847 | 4/1988 | Watanabe et al. | 360/66 |
| 4,760,471 | 7/1988 | Brush et al. | 360/10.2 |
| 4,827,360 | 5/1989 | Kawasaki | 360/64 |
| 4,851,935 | 7/1989 | Okyama et al. | 360/64 |
| 4,928,190 | 5/1990 | Yunoki | 360/63 |
| 5,019,926 | 5/1991 | Van Thuijl et al. | 360/10 X |
| 5,276,565 | 1/1994 | Higashiyama et al. | 360/64 |
| 5,392,163 | 2/1995 | Fuguchi et al. | 360/10.1 |

FOREIGN PATENT DOCUMENTS

| 344371 | 5/1957 | Japan . | |
| 0163204 | 8/1985 | Japan | 360/108 |
| 61-34753 | 2/1986 | Japan . | |
| 2173341 | 1/1986 | United Kingdom | 360/64 |

*Primary Examiner*—A. Psitos
*Assistant Examiner*—Varsha A. Kapadia
*Attorney, Agent, or Firm*—Oblon, Spivak, McClelland, Maier & Neustadt

[57] ABSTRACT

A magnetic recording/reproduction apparatus comprises a magnetic tape running apparatus to rotate a rotary drum and run a magnetic tape with the magnetic tape being in contact with, at least, part of the circumferential surface of the rotary drum, a plurality of erasing magnetic heads installed on the rotary drum so that the magnetic tape are in contact with the heads and used to erase recording signal, a plurality of recording magnetic heads used for recording, a plurality of erasing circuits installed on the rotary drum to output erasing signal to each of the erasing magnetic heads, a plurality of recording circuits connected to the recording magnetic heads respectively and installed on the rotary drum so that the recording circuits are selectively be gone to active state and non-active state, one or more rotary transformers connected to erasing circuits in common, and a driving circuit to record information signal in the magnetic tape through recording magnetic heads, recording circuits, and rotary transformers.

36 Claims, 97 Drawing Sheets

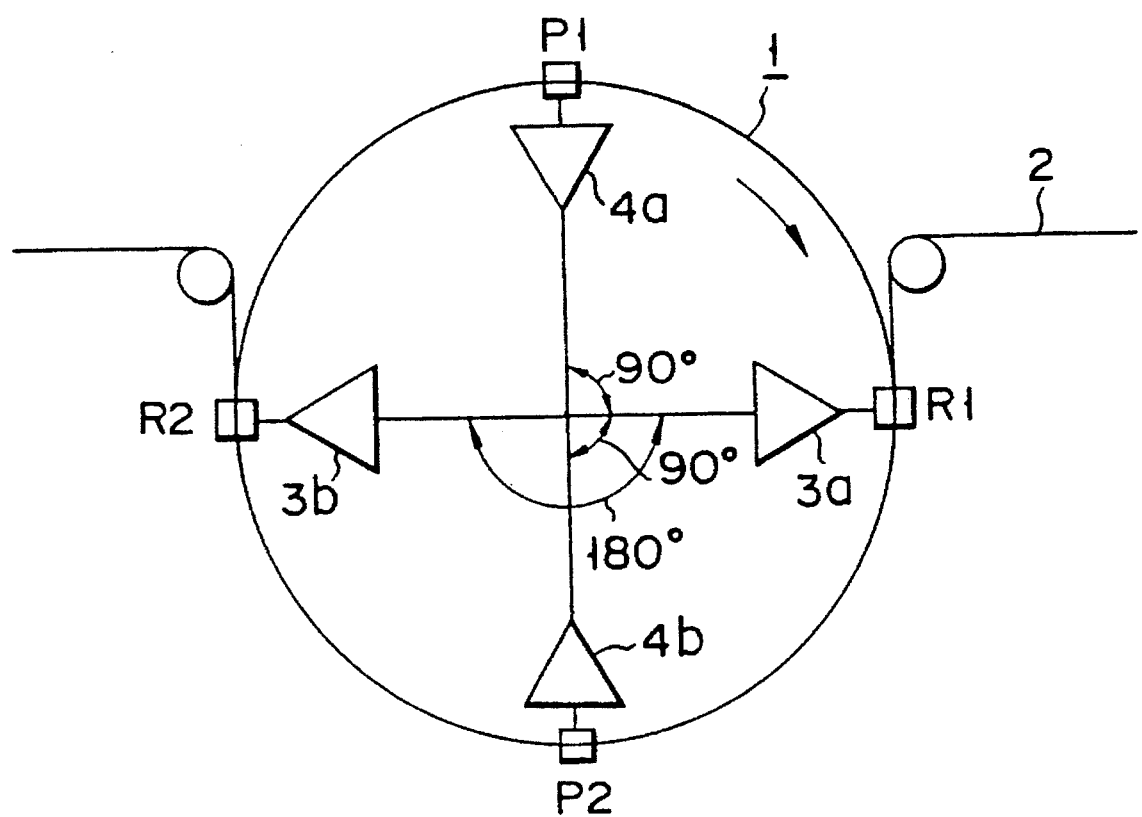
F I G. 1

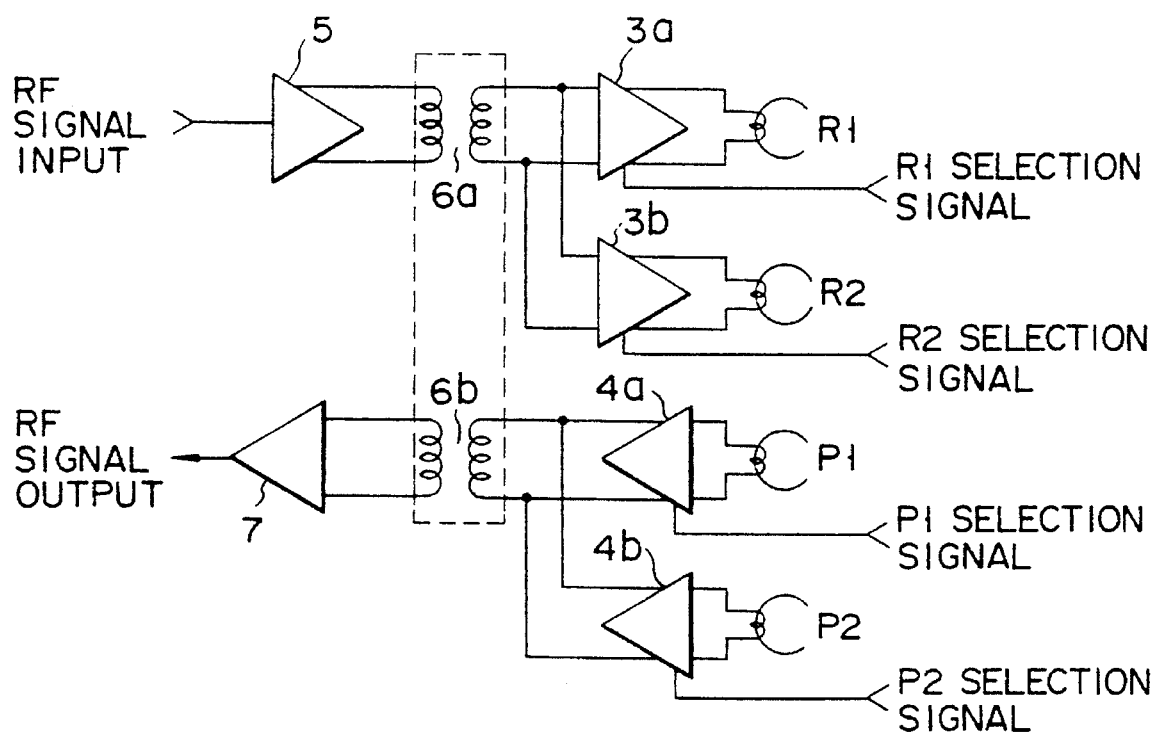
F I G. 2
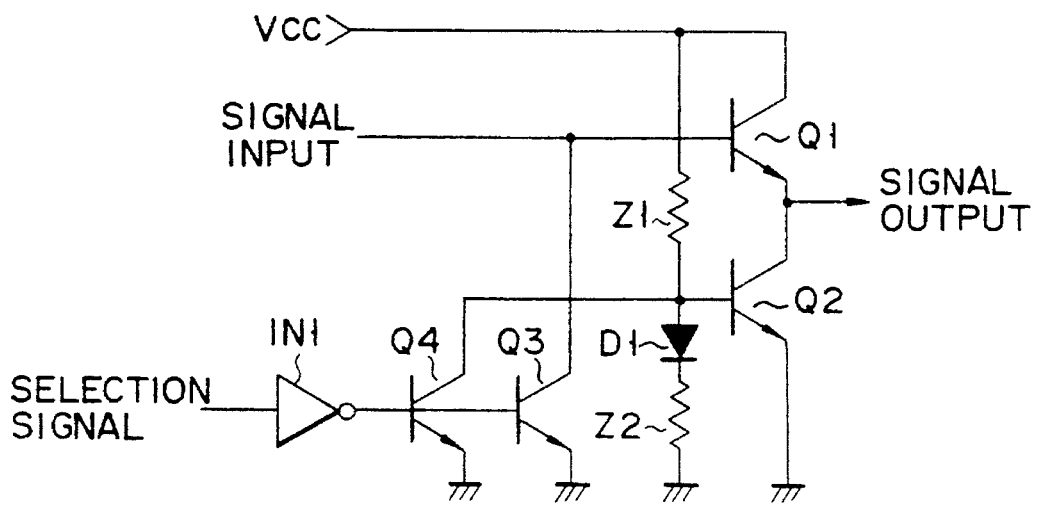
F I G. 4

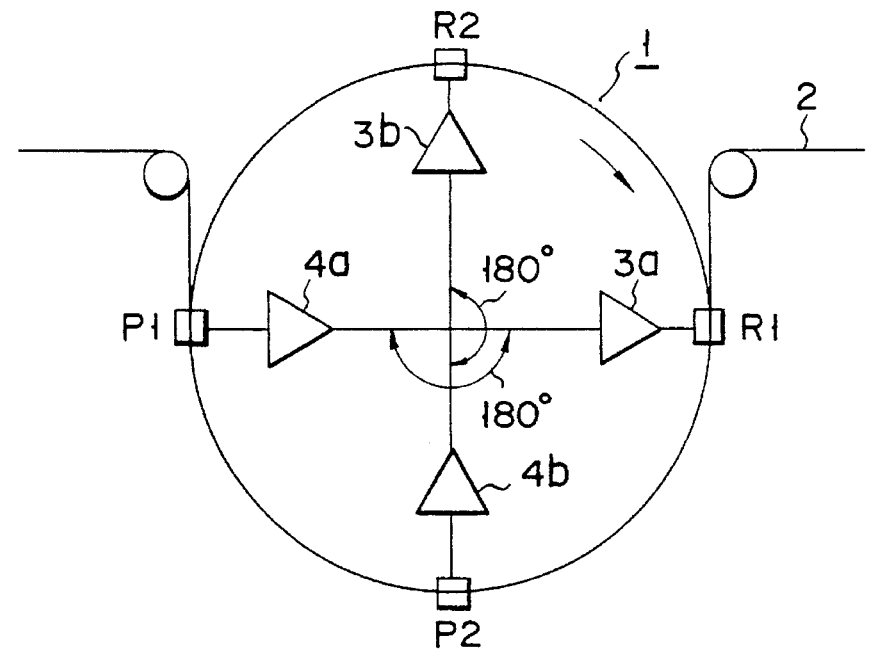
F I G. 6
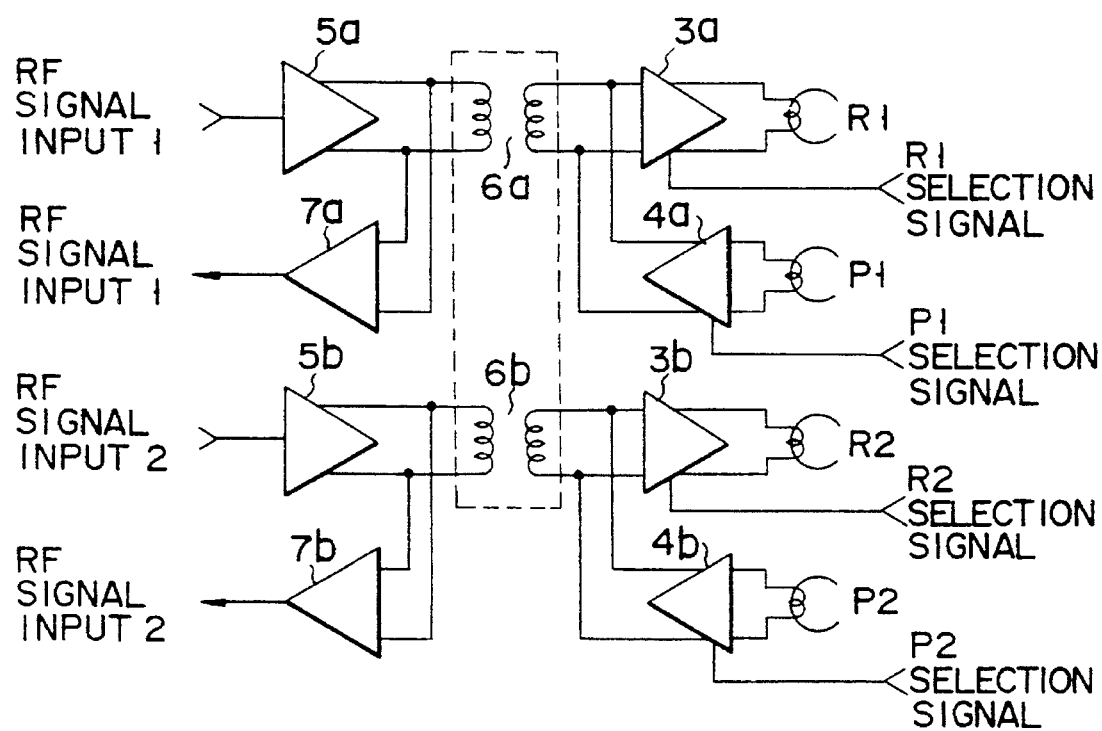
F I G. 7

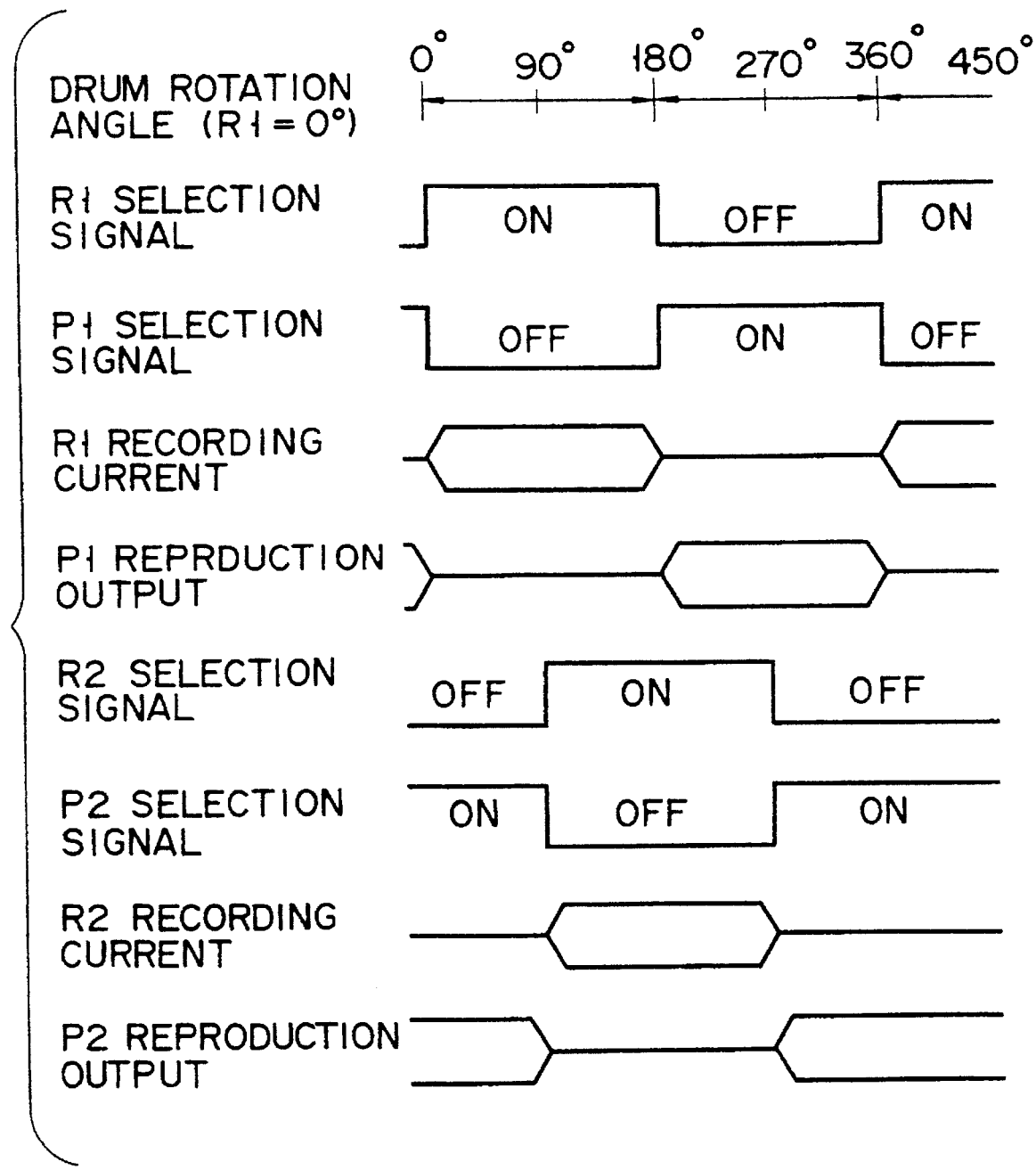
F I G. 8

F I G. 13
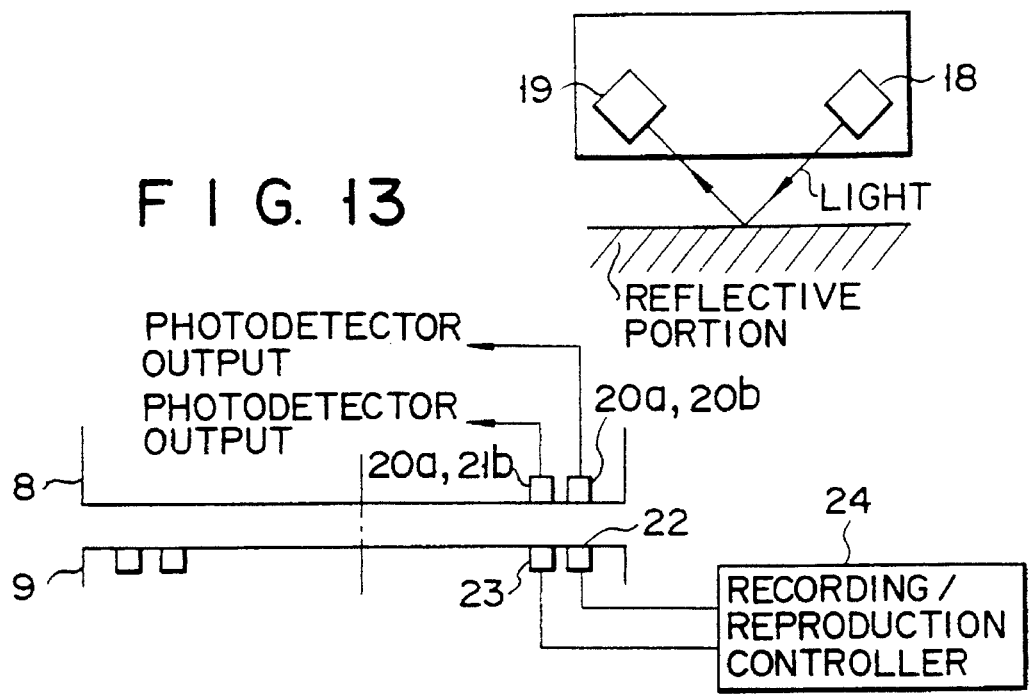
F I G. 14A
F I G. 14B
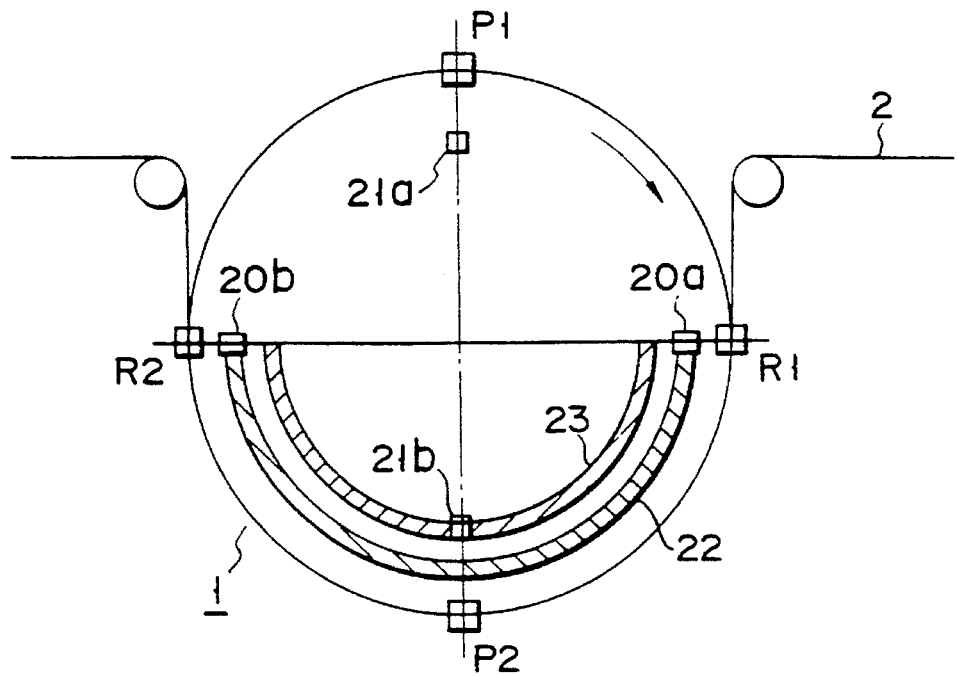

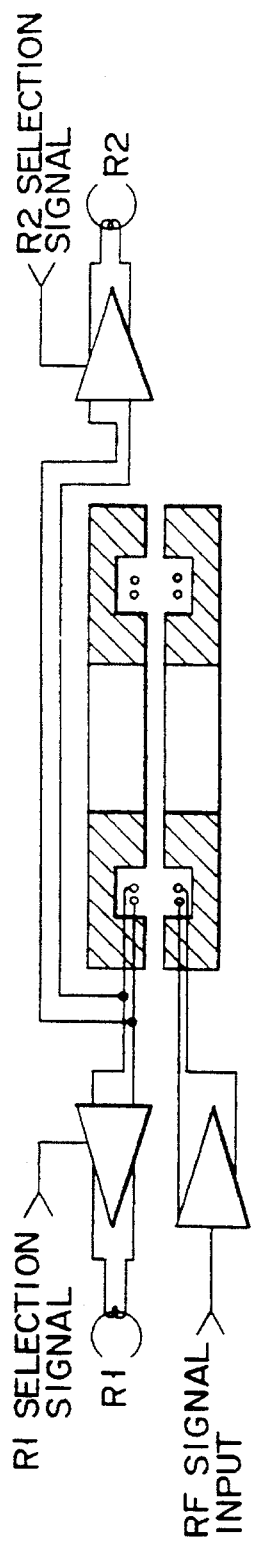
F I G. 15
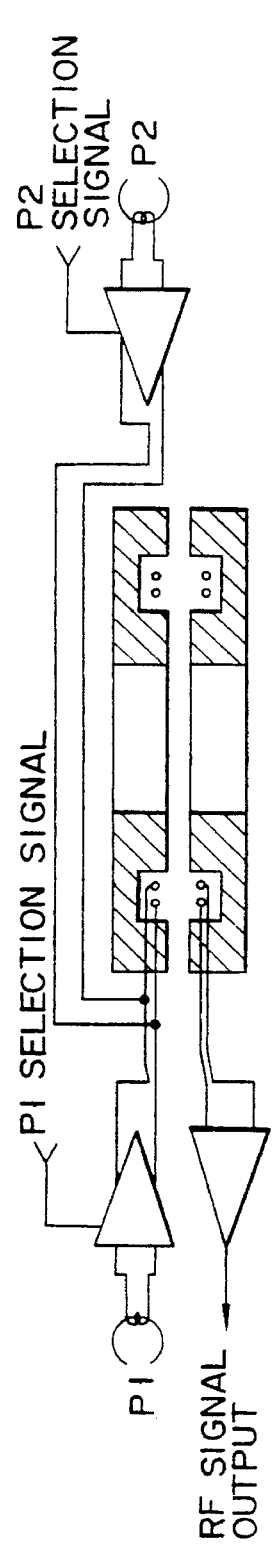
F I G. 16
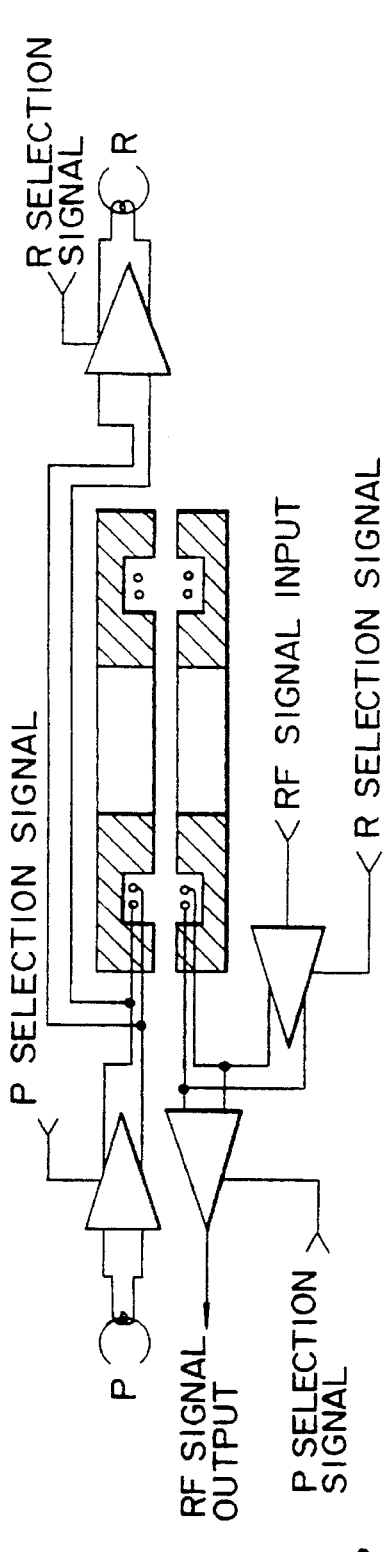
F I G. 17

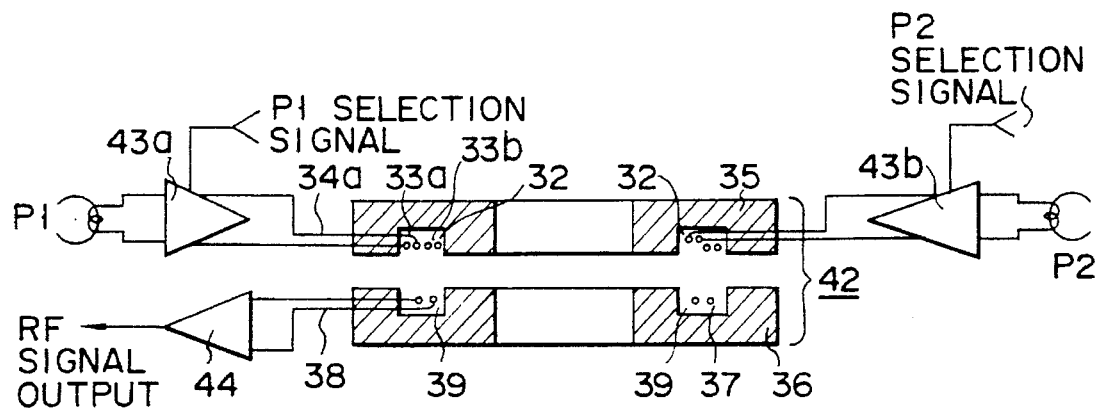
F I G. 21
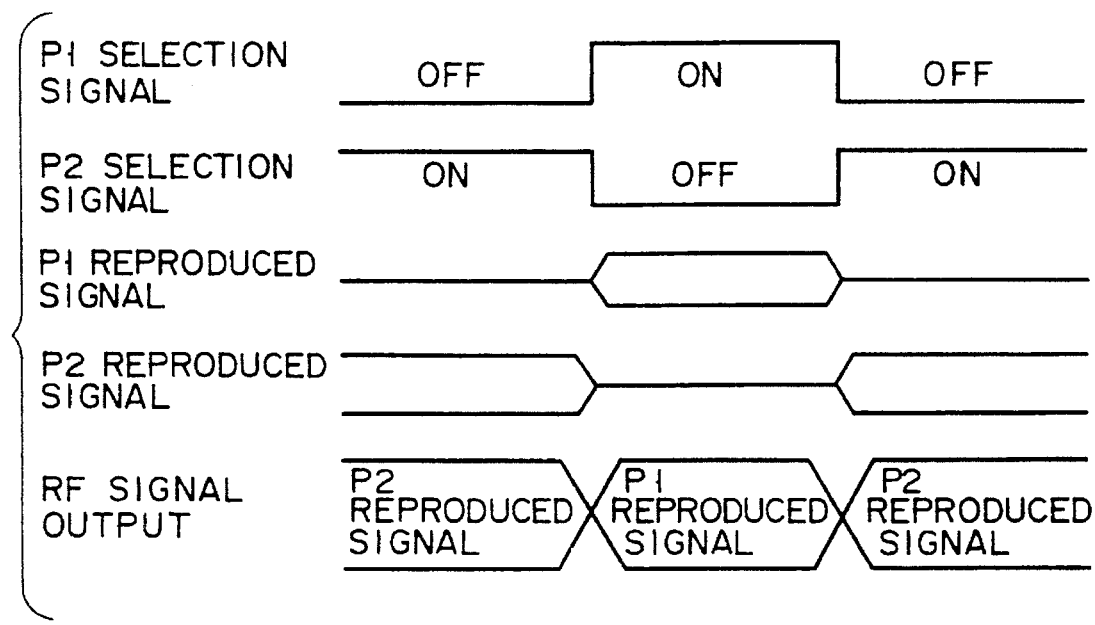
F I G. 22

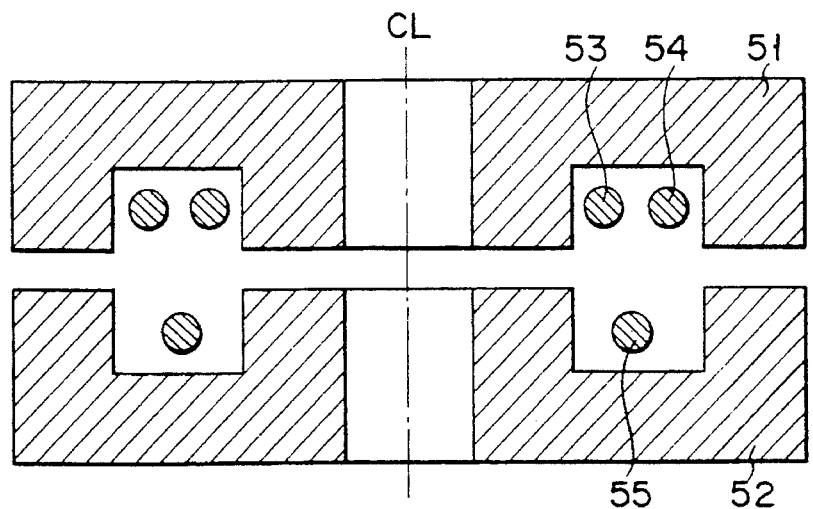
F I G. 25
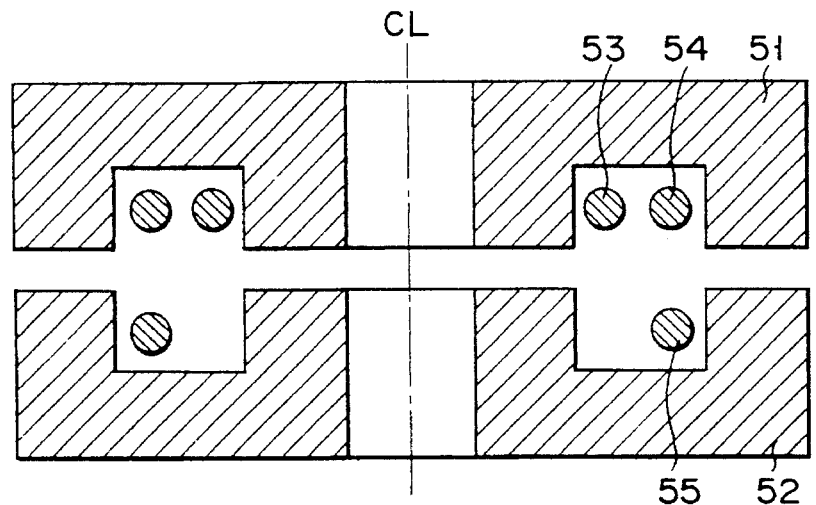
F I G. 26
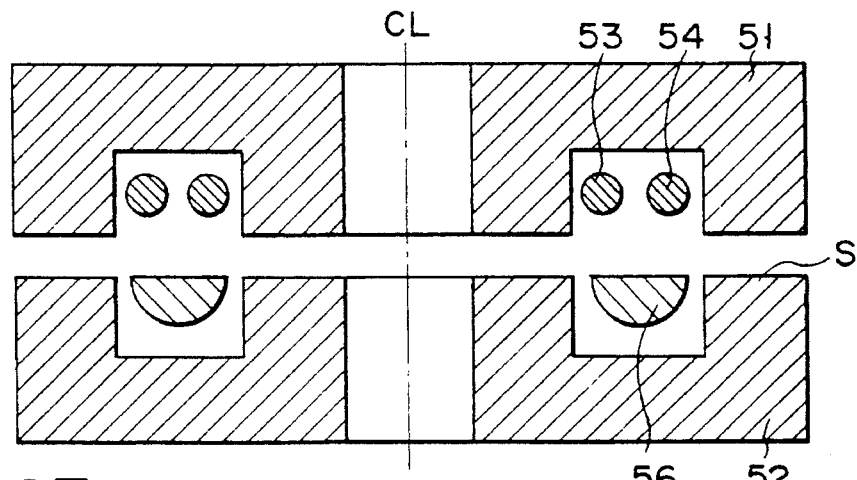
F I G. 27

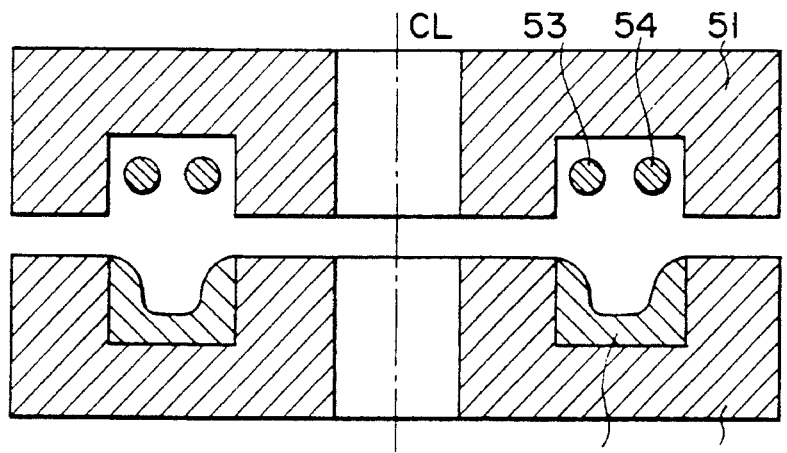
F I G. 31
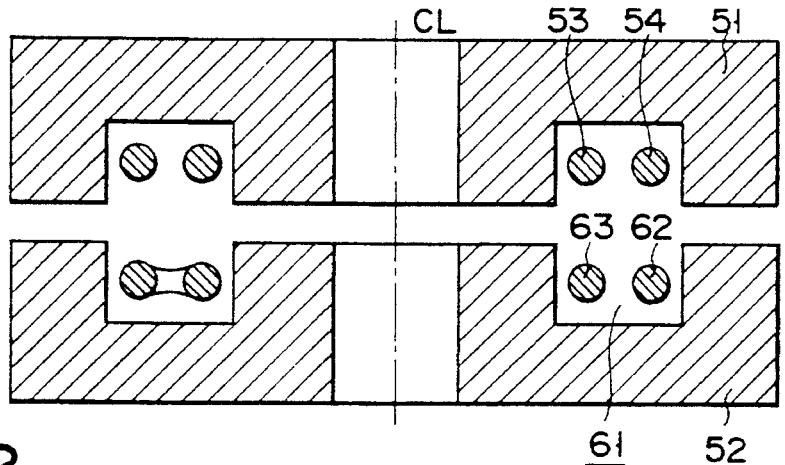
F I G. 32
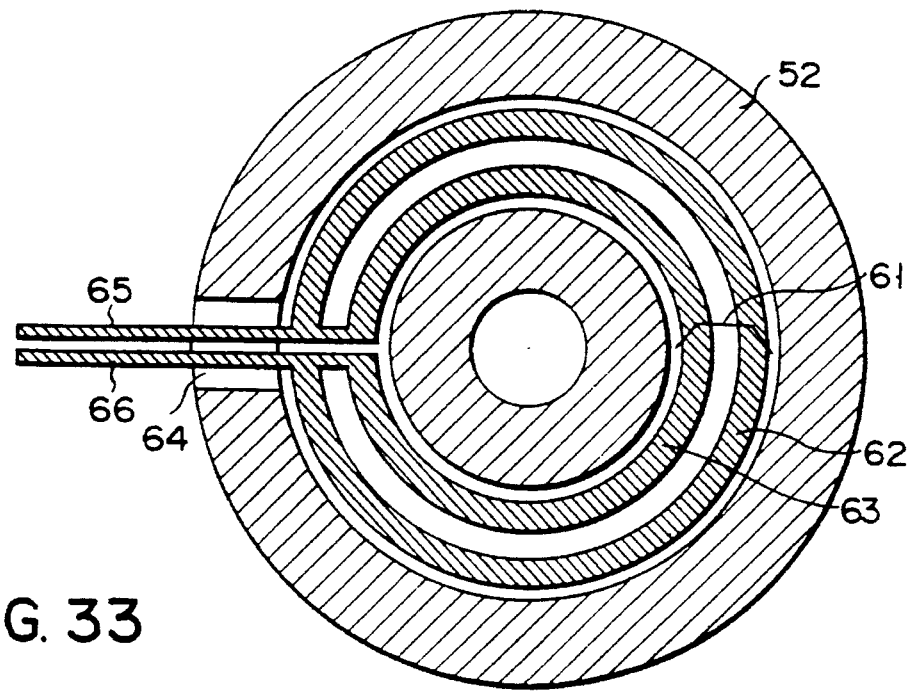
F I G. 33

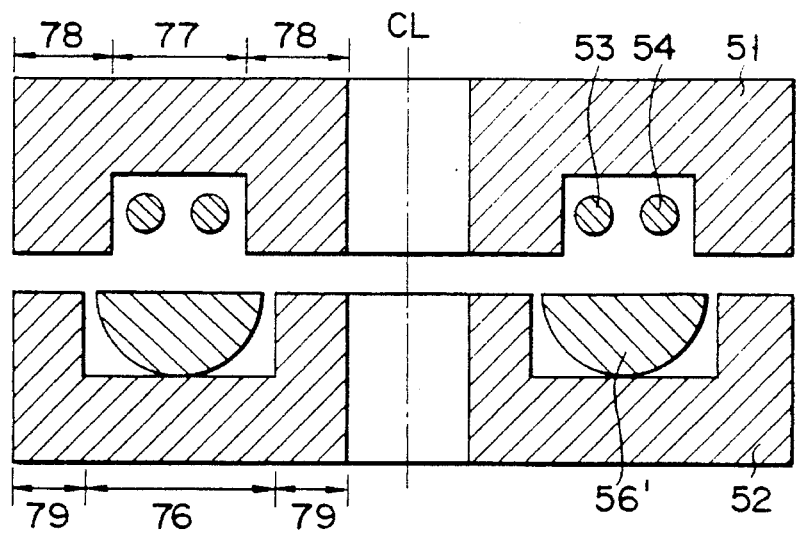
F I G. 34
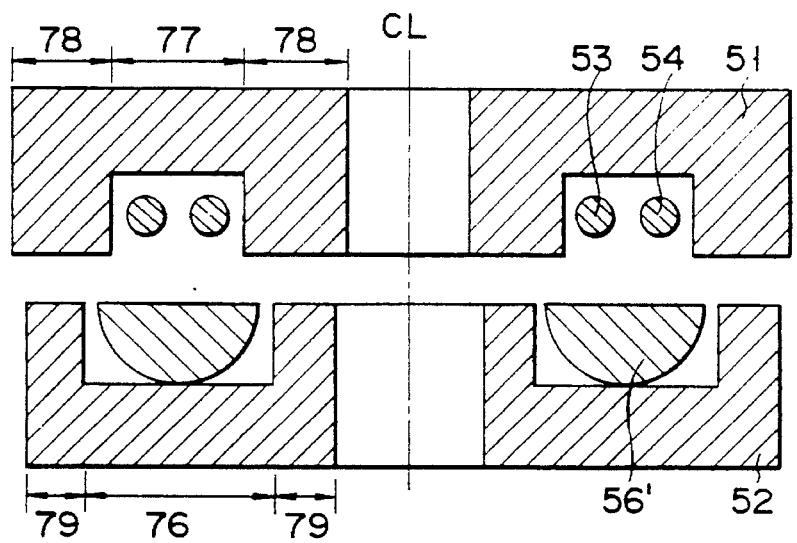
F I G. 35
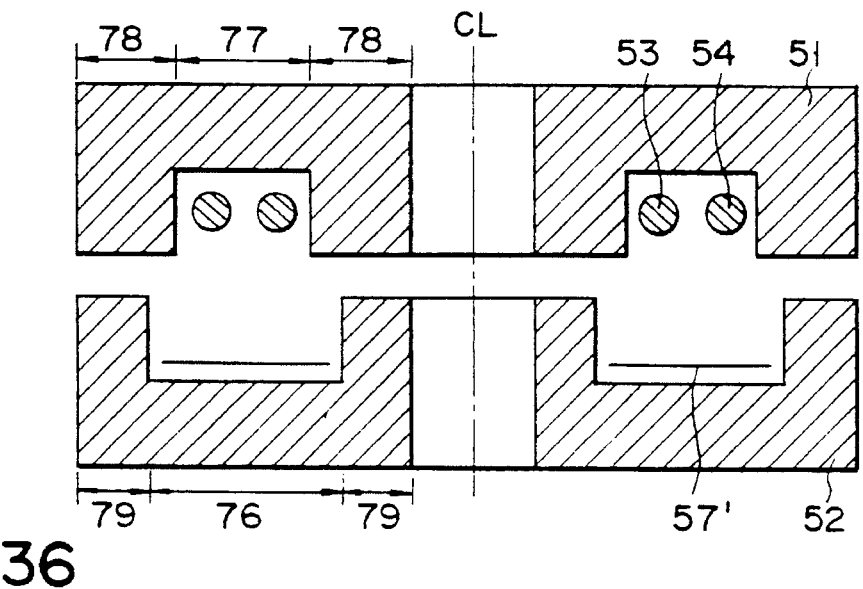
F I G. 36

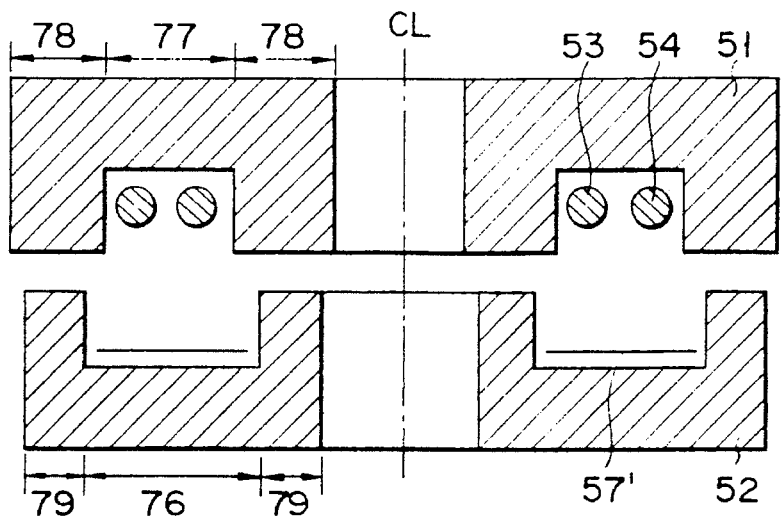
F I G. 37
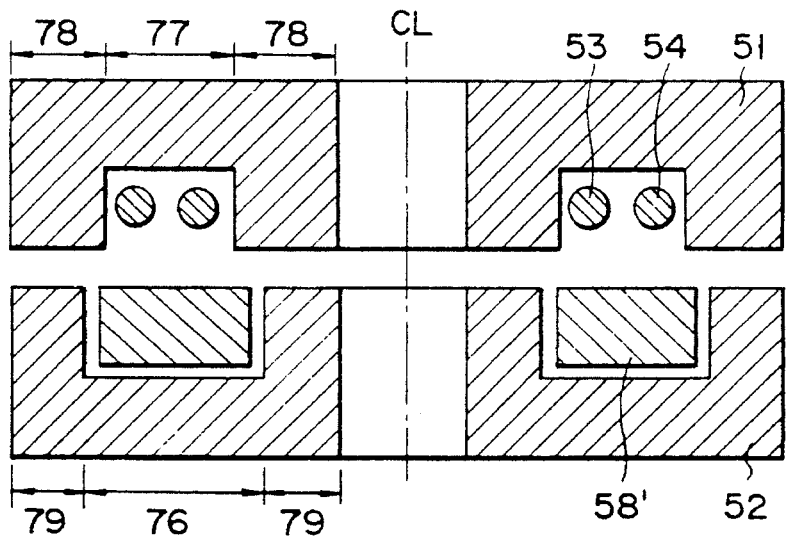
F I G. 38
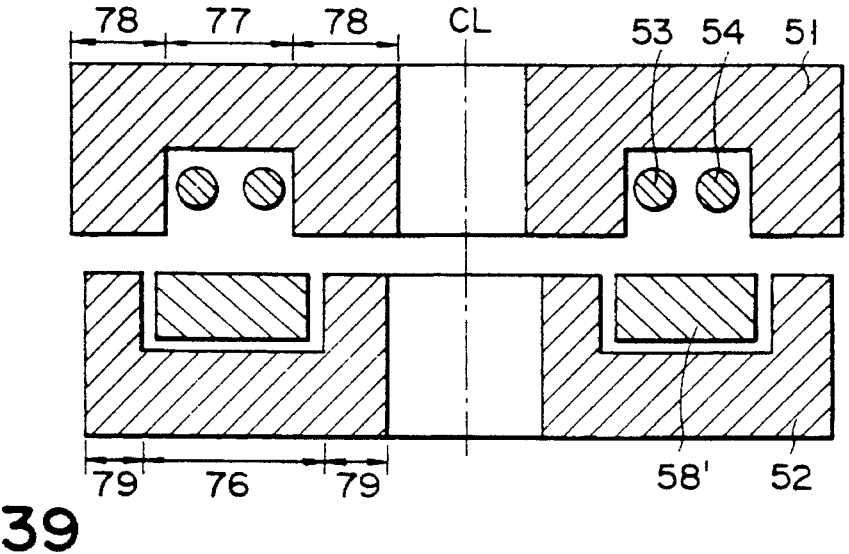
F I G. 39

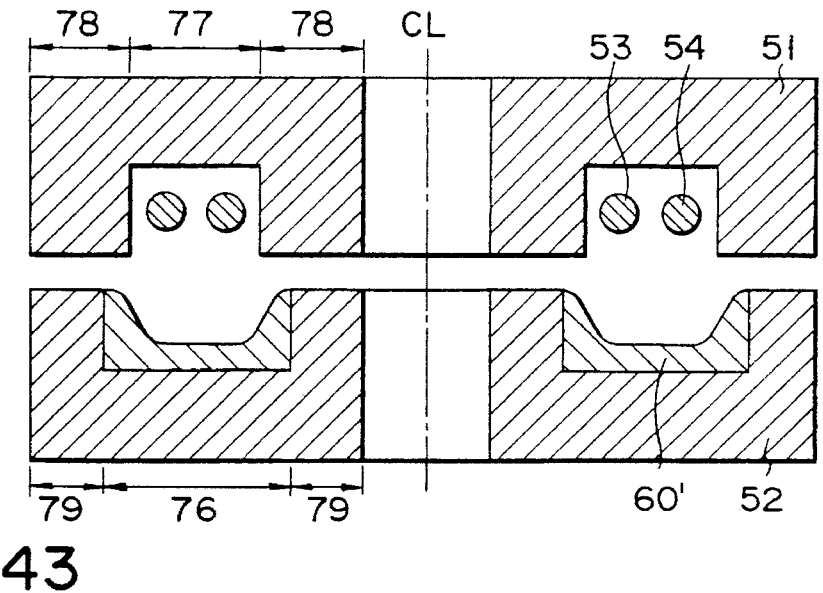
F I G. 43
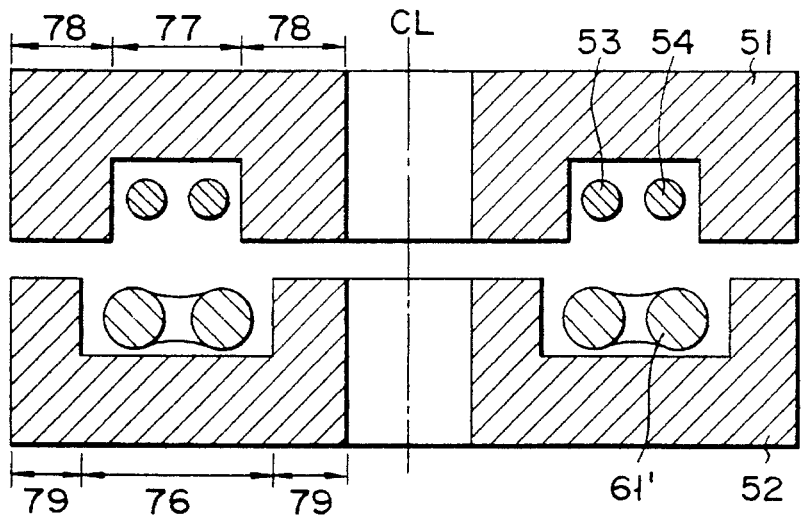
F I G. 44
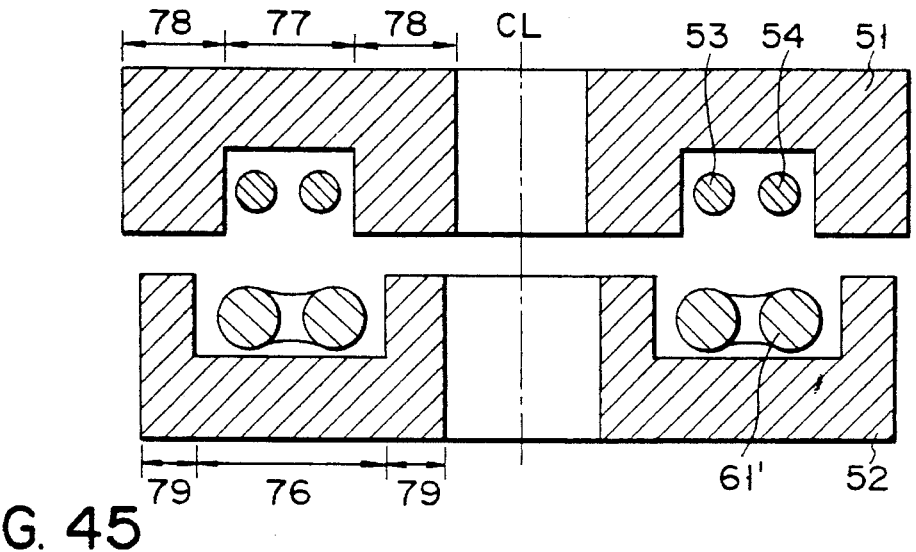
F I G. 45

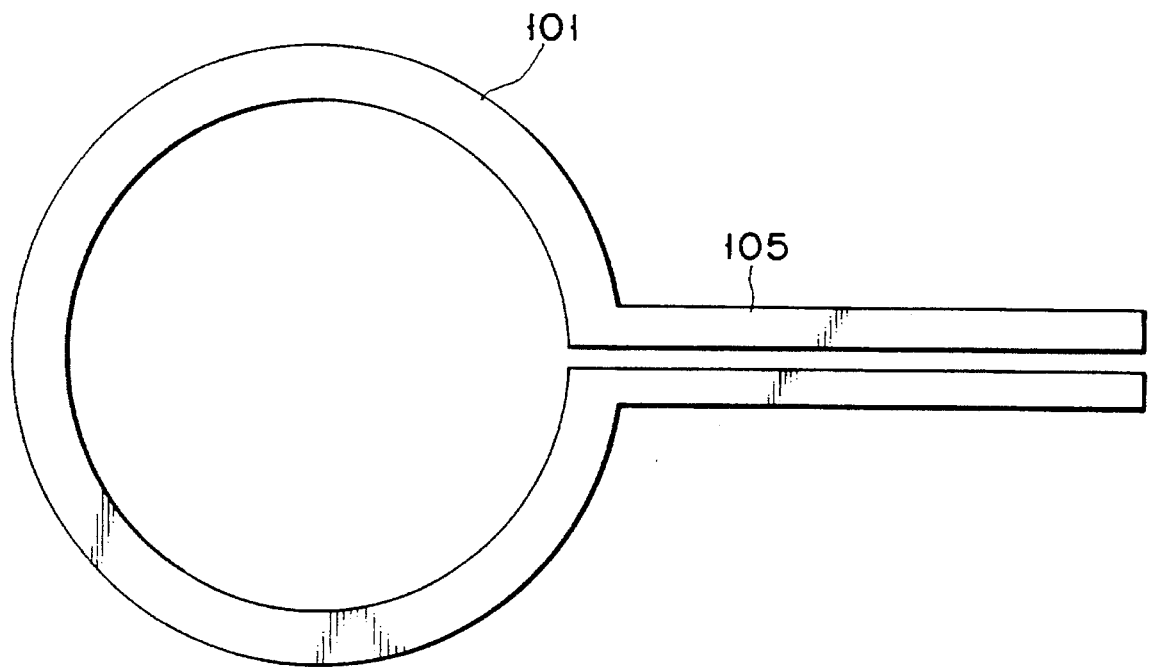
F I G. 51
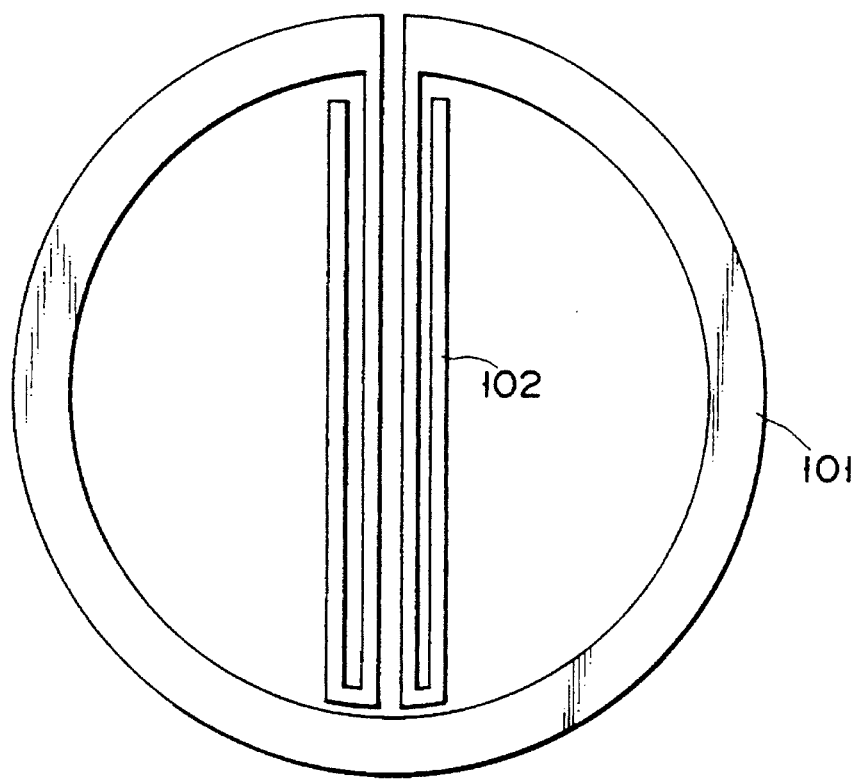
F I G. 52

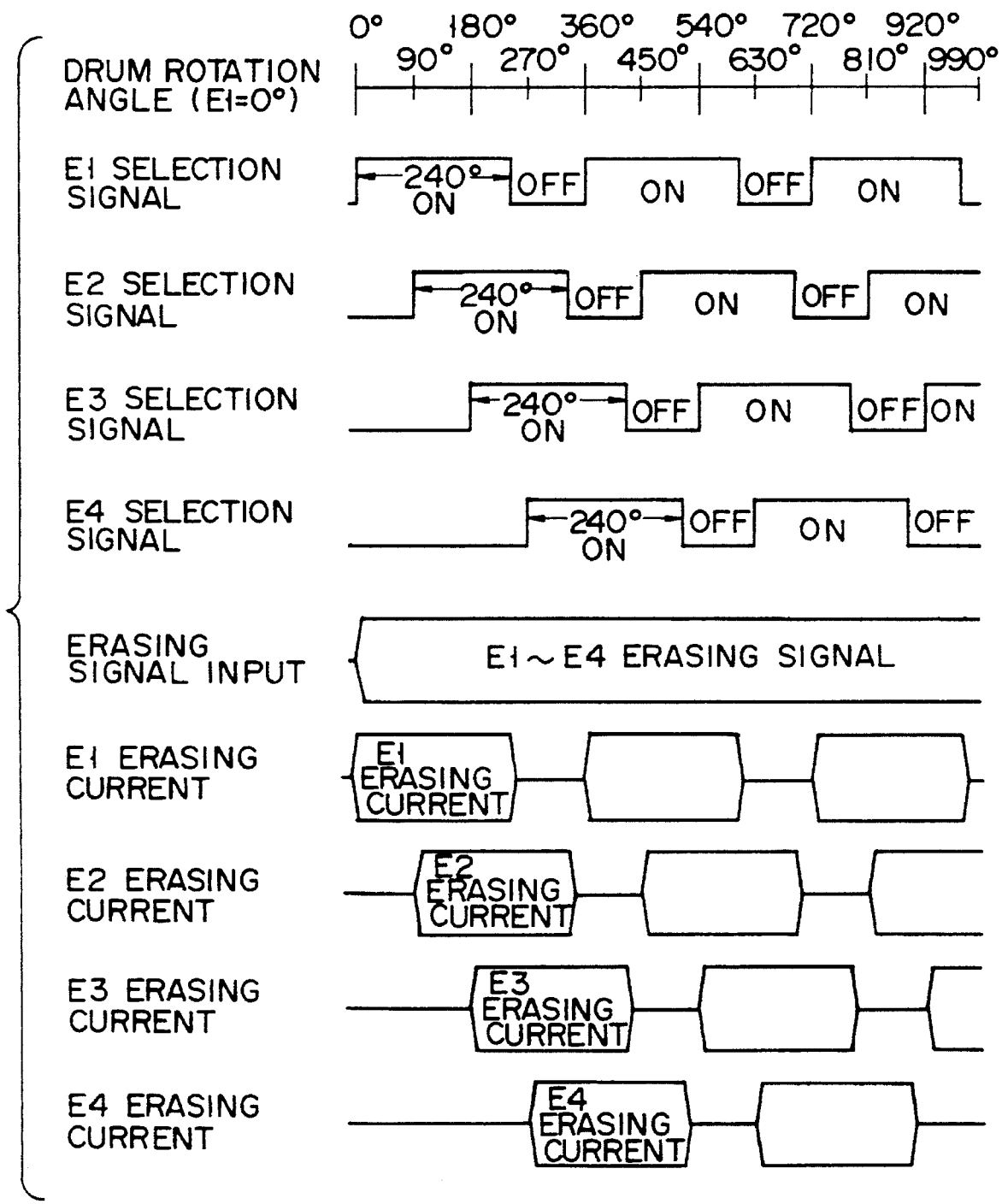
F I G. 59

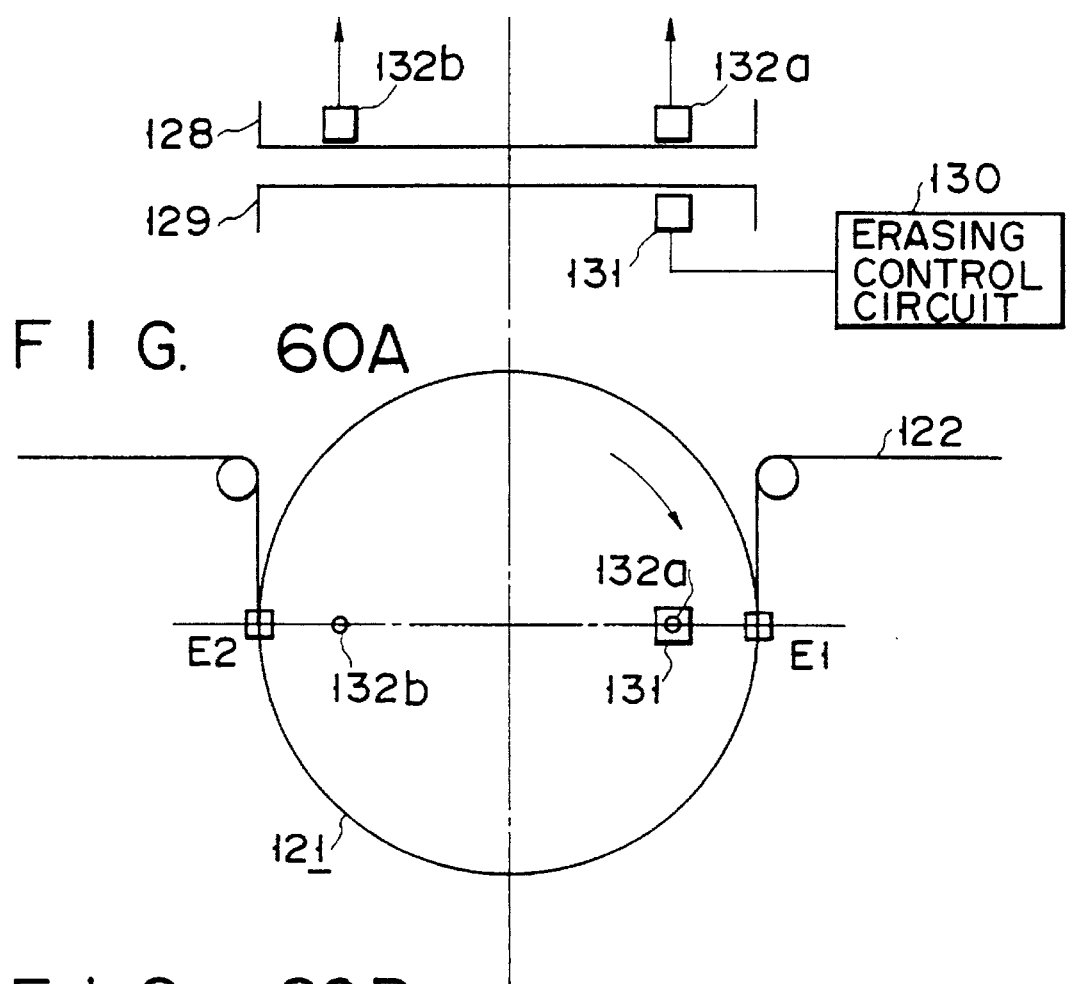
FIG. 60A
FIG. 60B
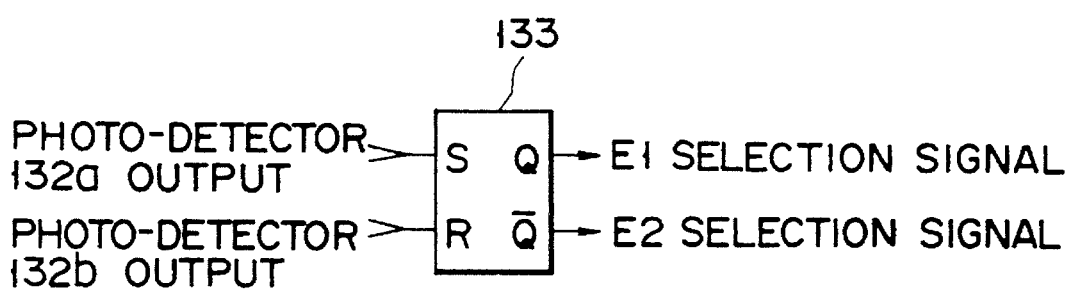
FIG. 61

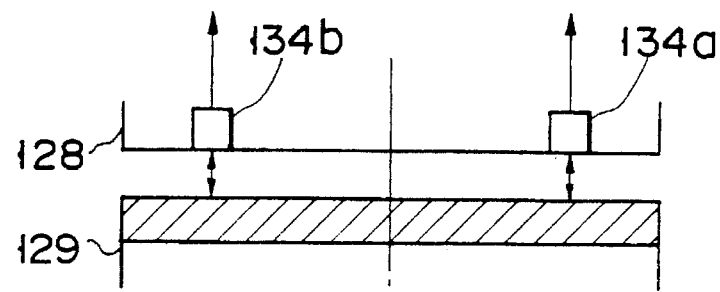
F I G. 63A
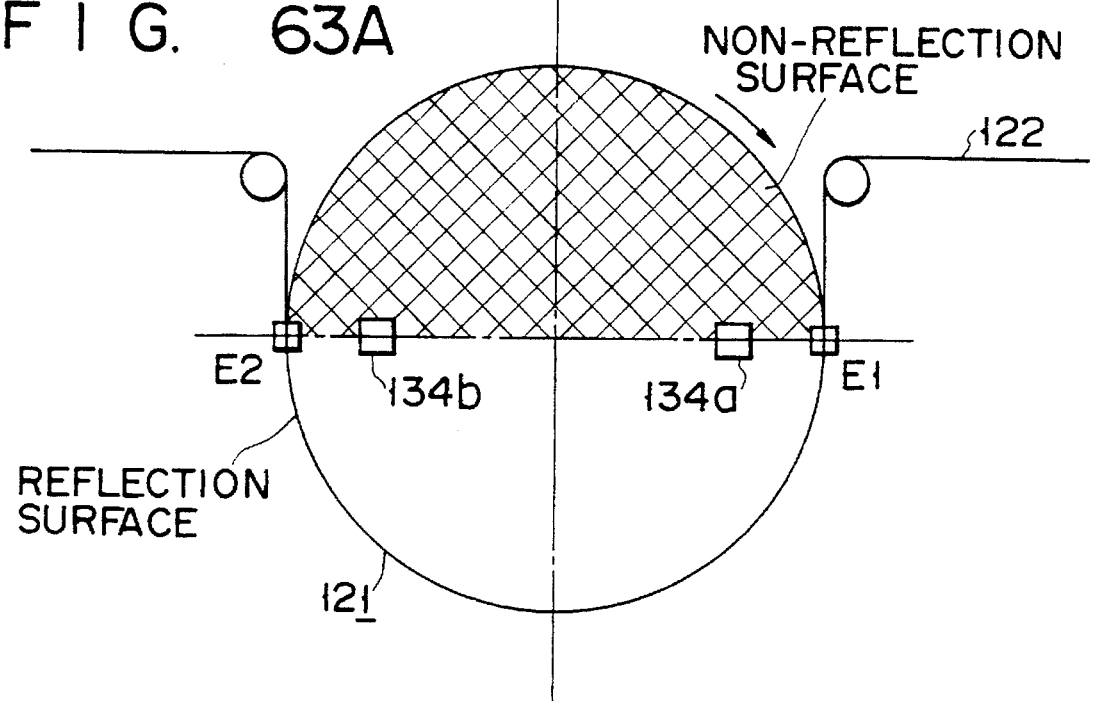
F I G. 63B
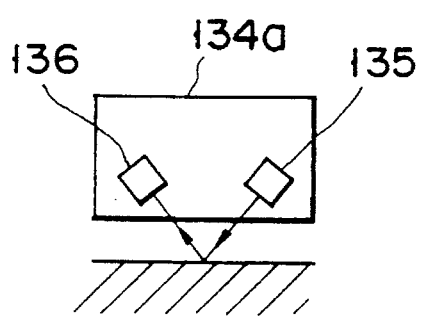
F I G. 64

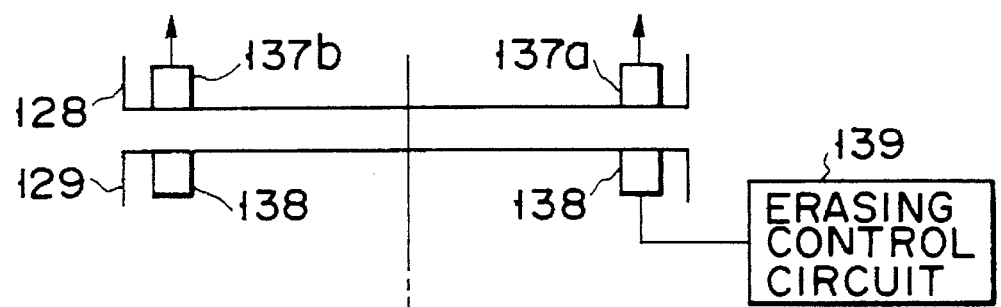
F I G. 65A
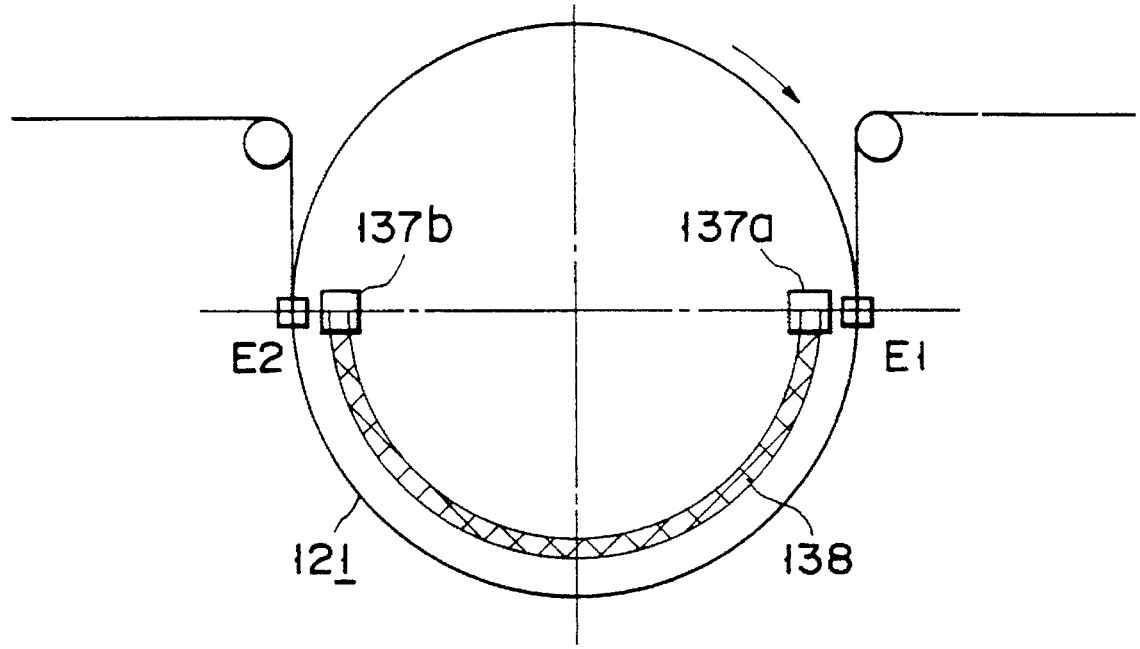
F I G. 65B

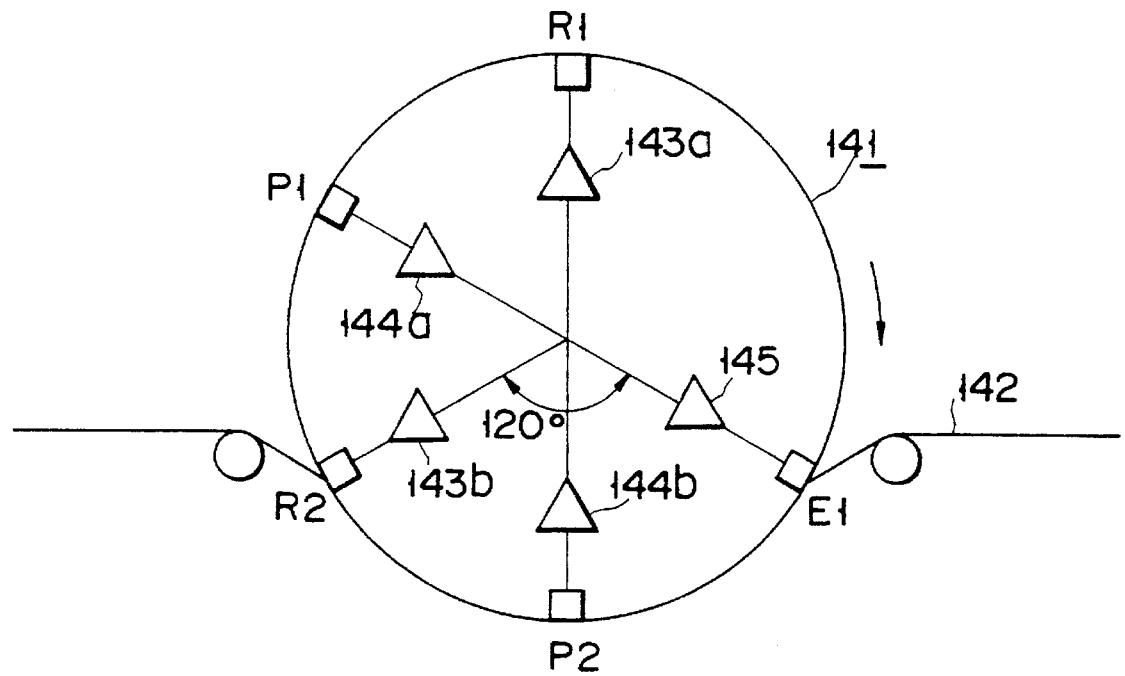
F I G. 69
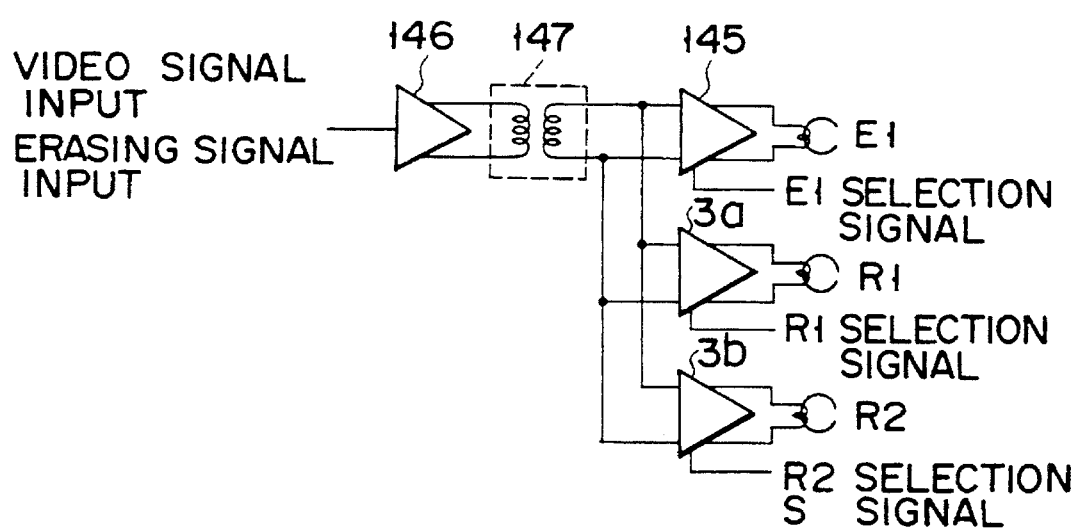
F I G. 70

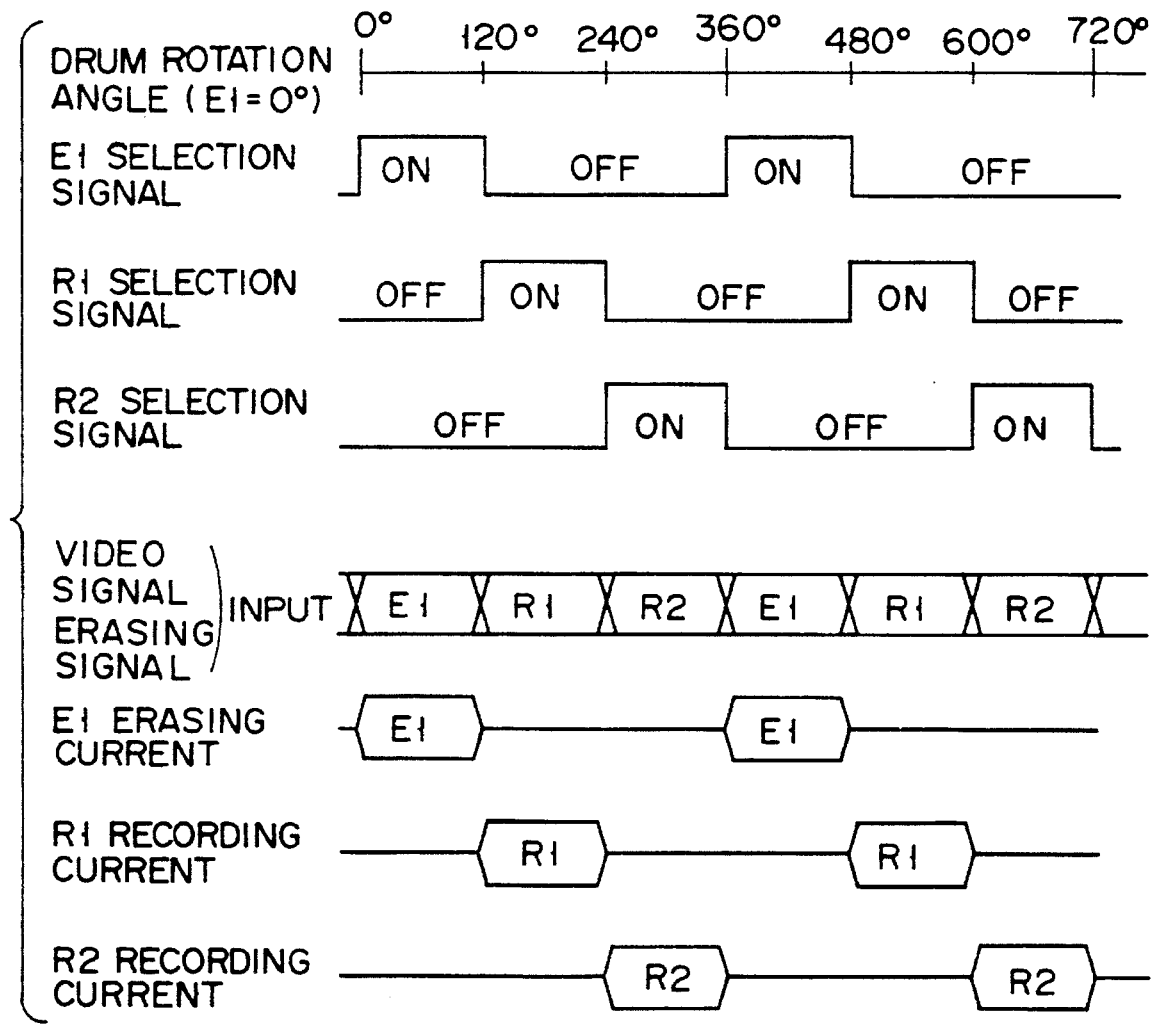
F I G. 71

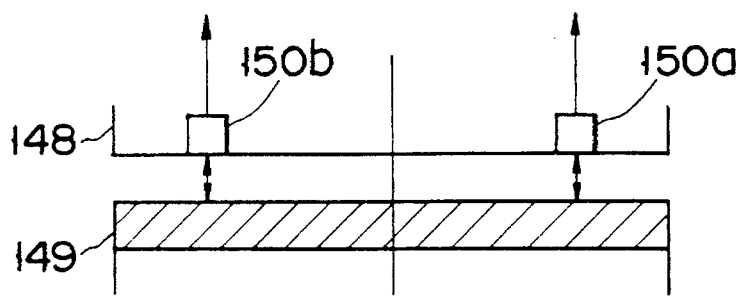
F I G. 72A
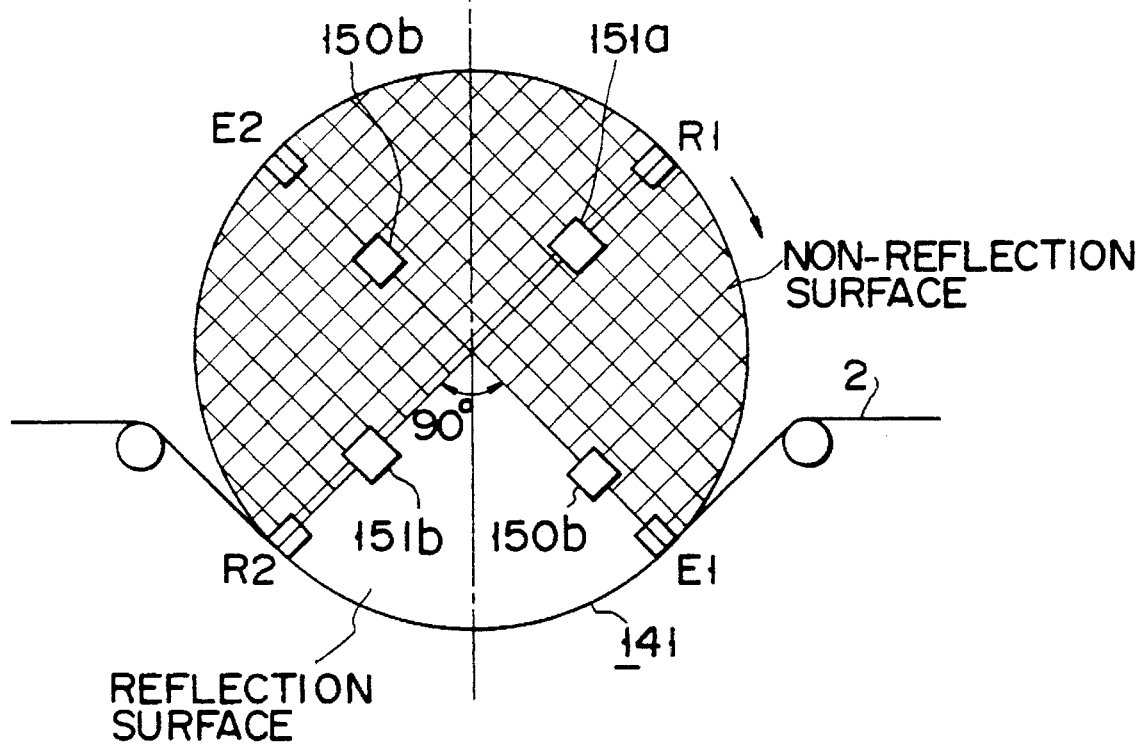
F I G. 72B

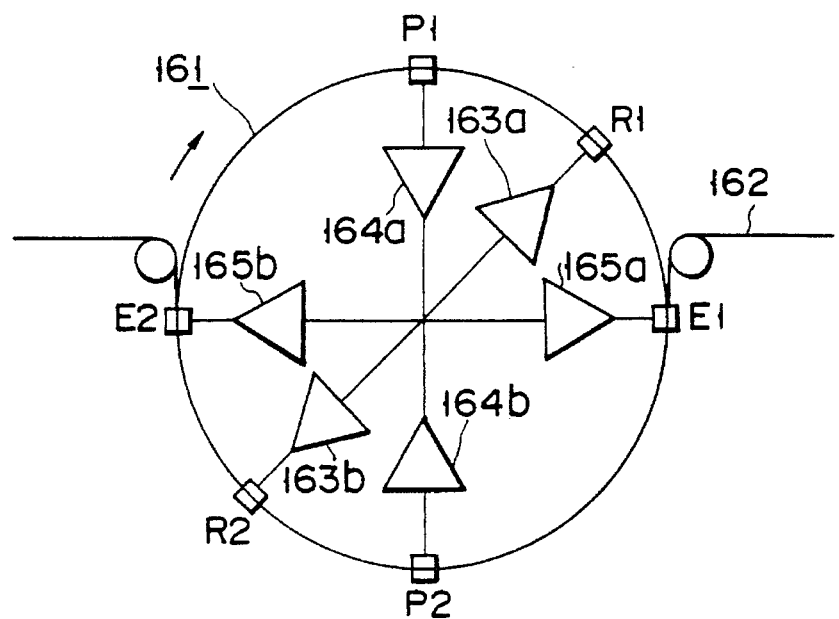
F I G. 74
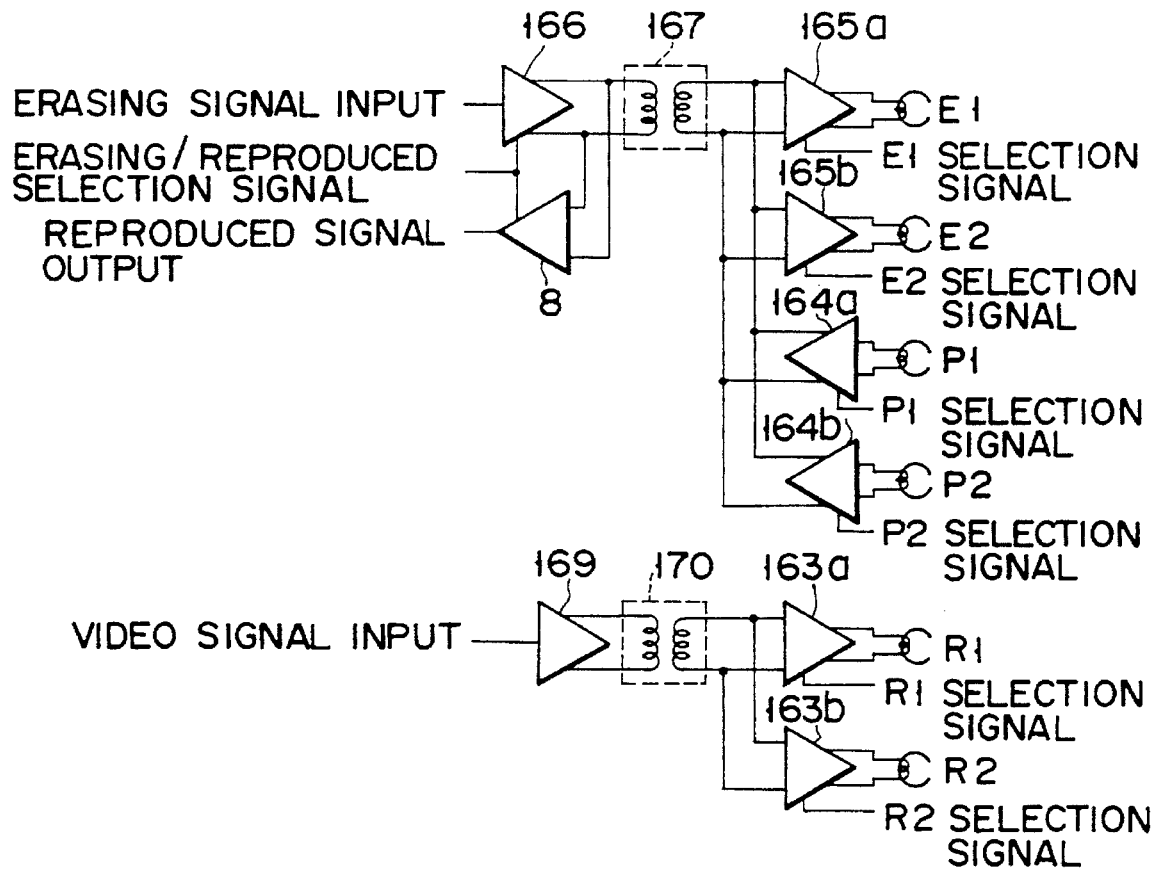
F I G. 75

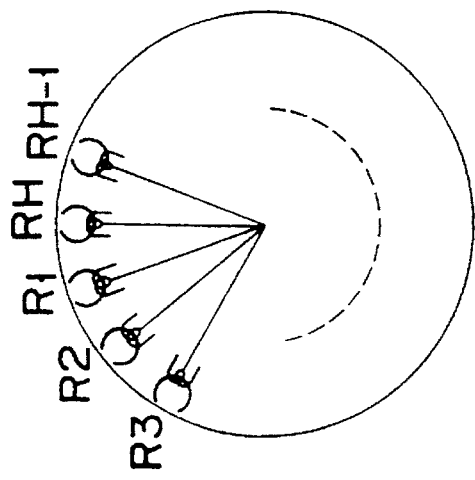
FIG. 80A
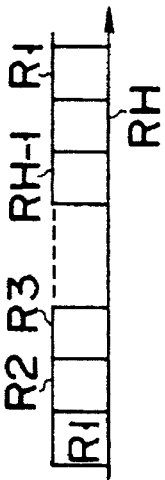
FIG. 80B
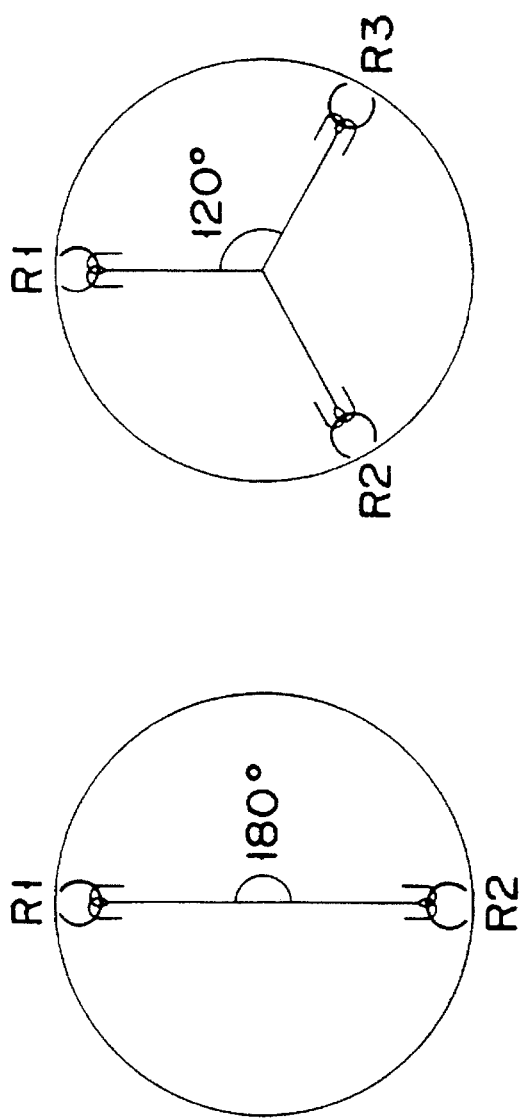
FIG. 79A
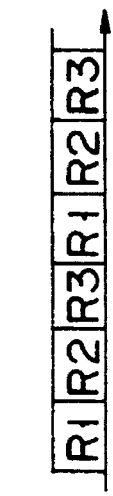
FIG. 79B
FIG. 78A
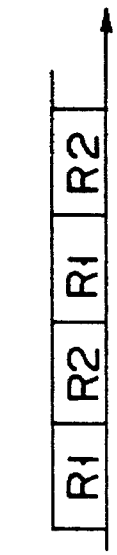
FIG. 78B

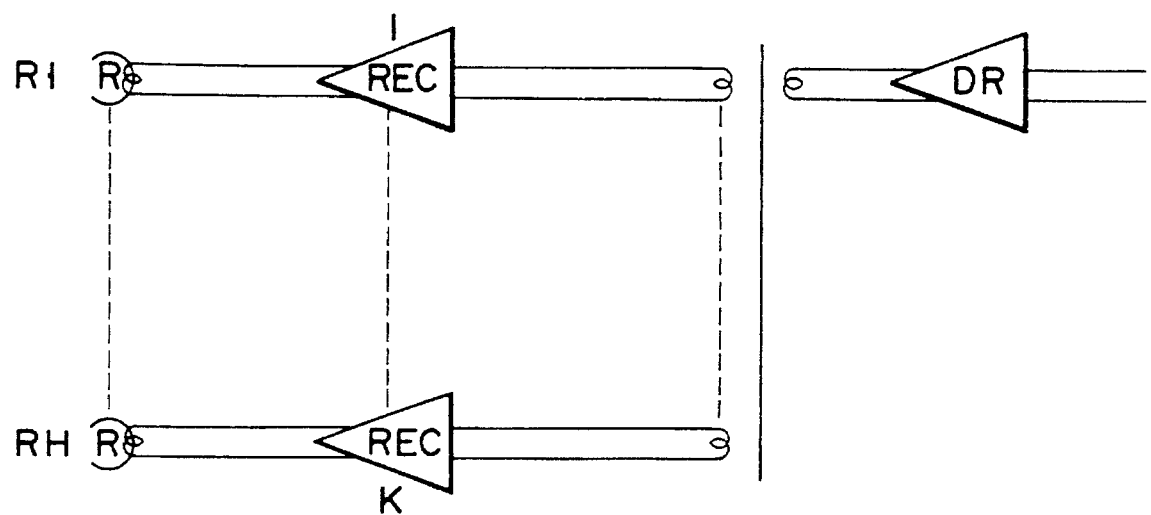
F I G. 84
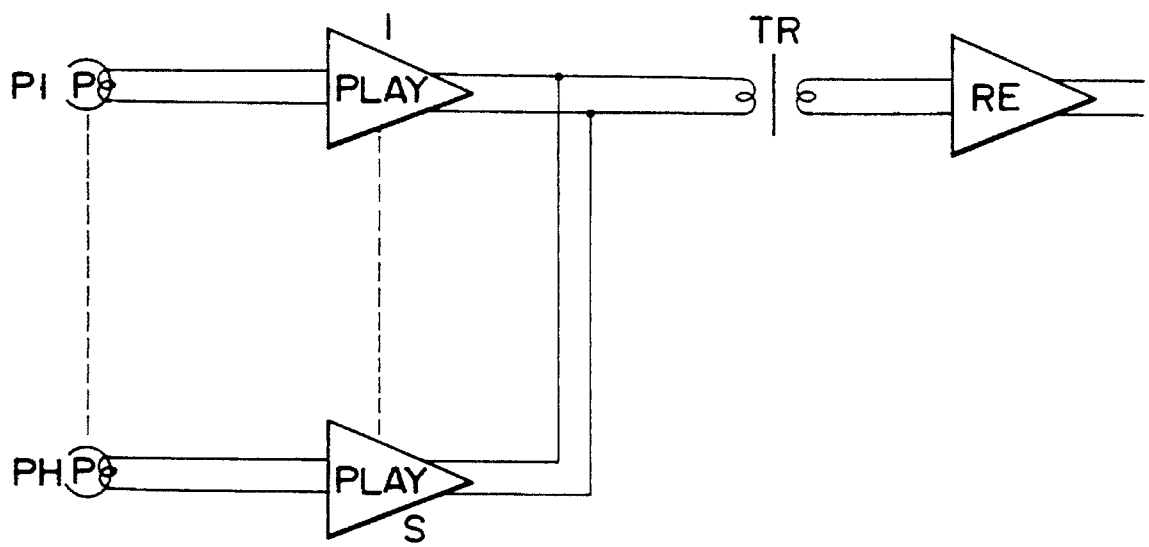
F I G. 85

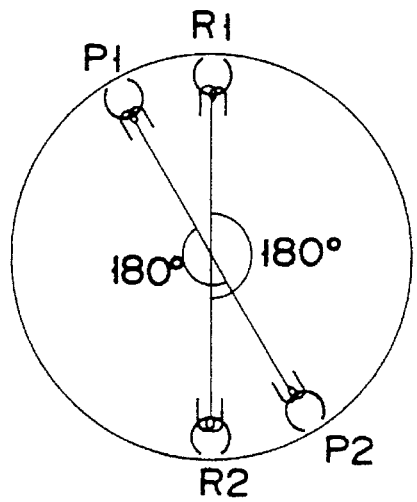 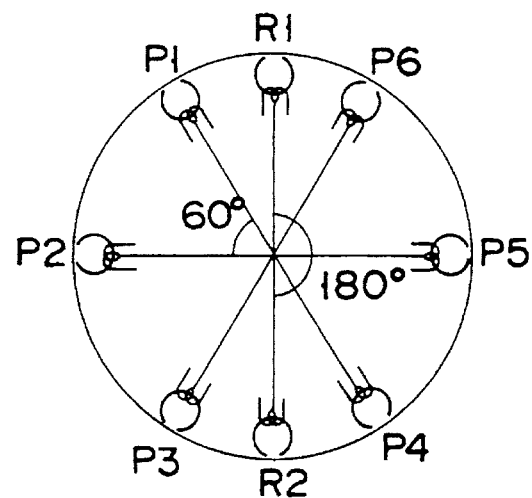
F I G. 94A   F I G. 95A
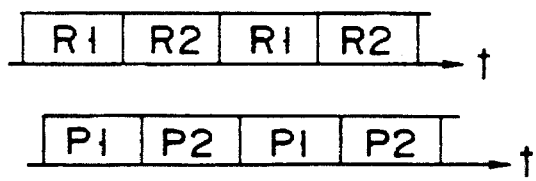 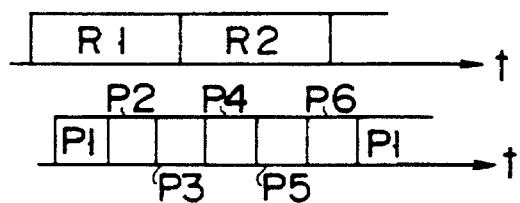
F I G. 94B   F I G. 95B

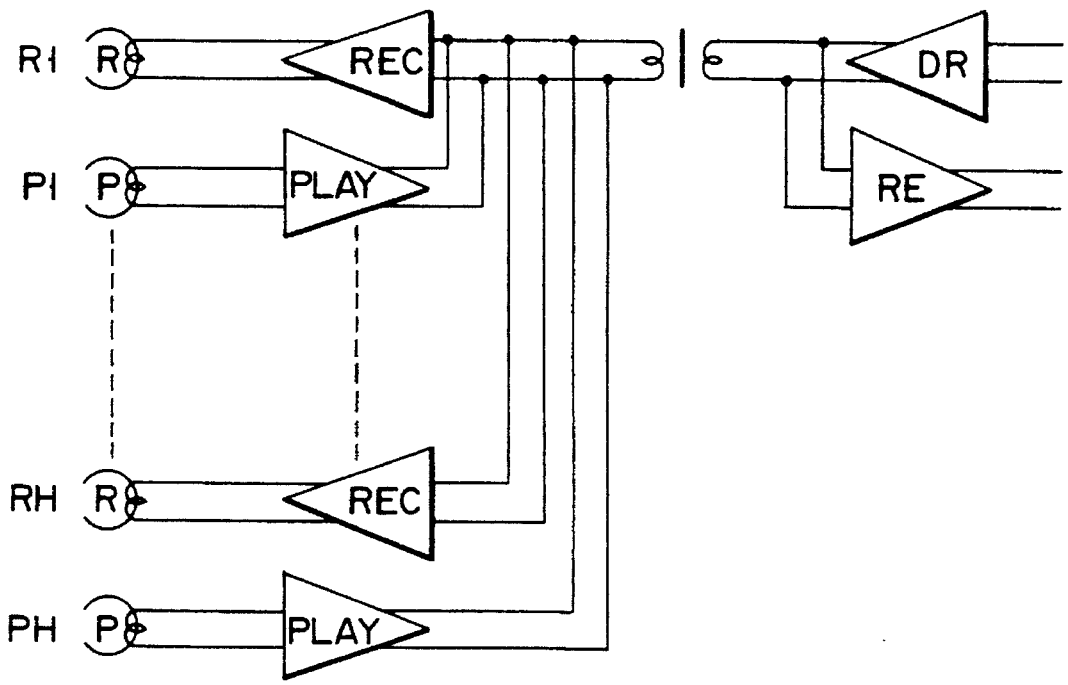
F I G. 97
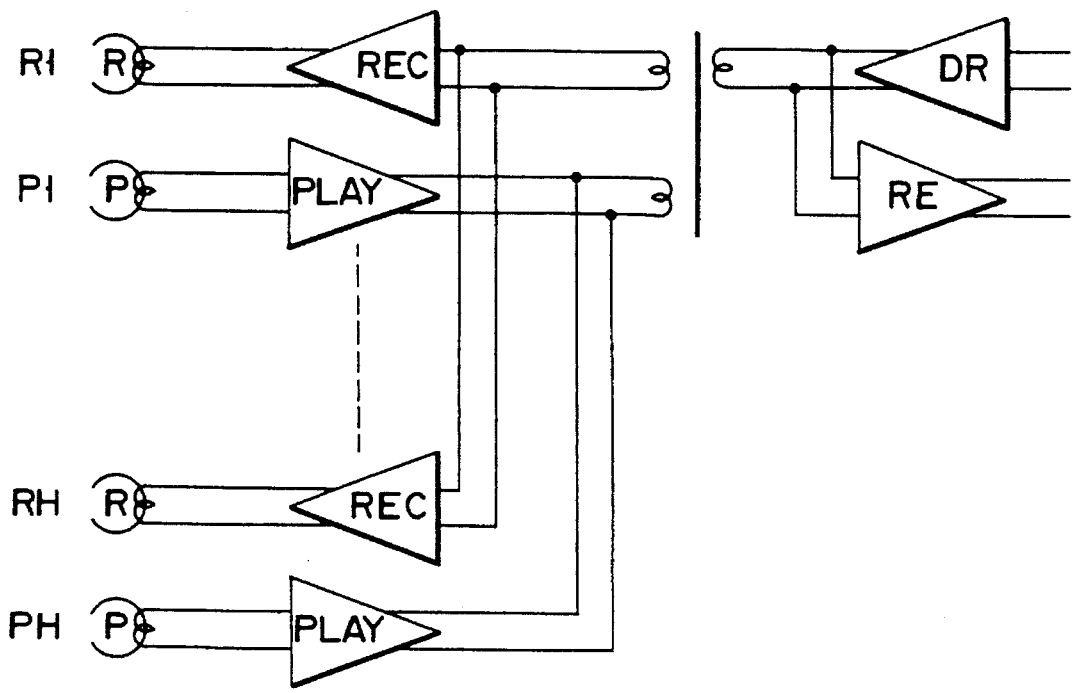
F I G. 98

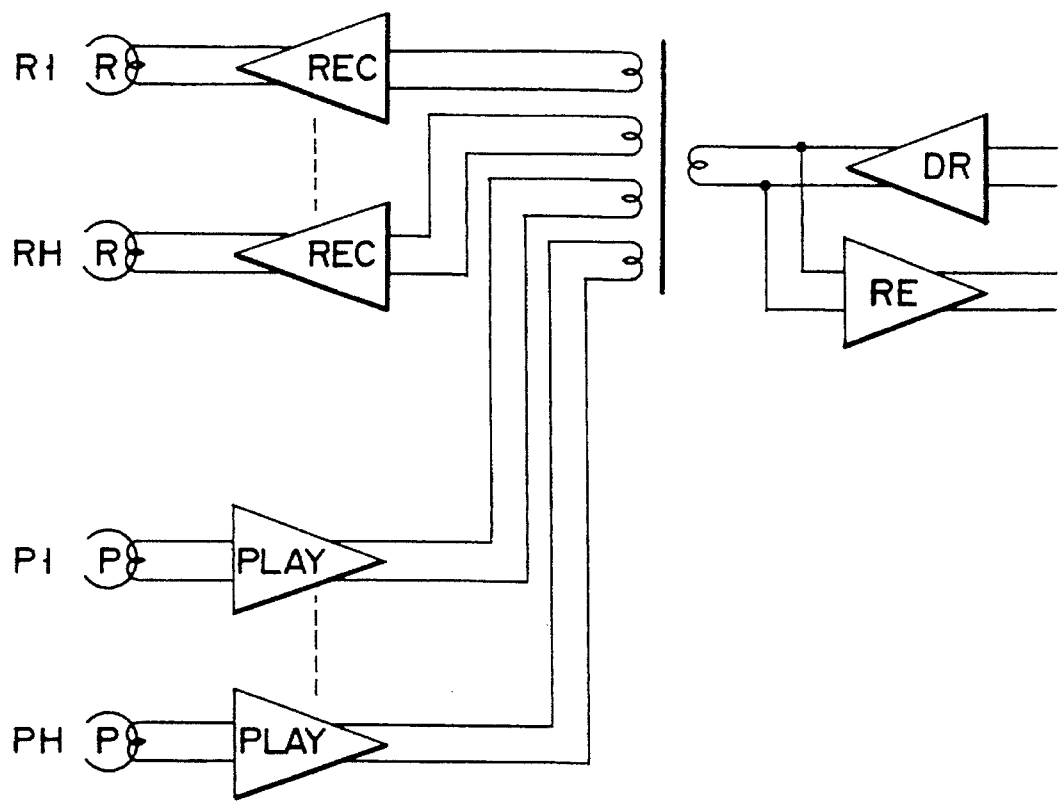
F I G. 99
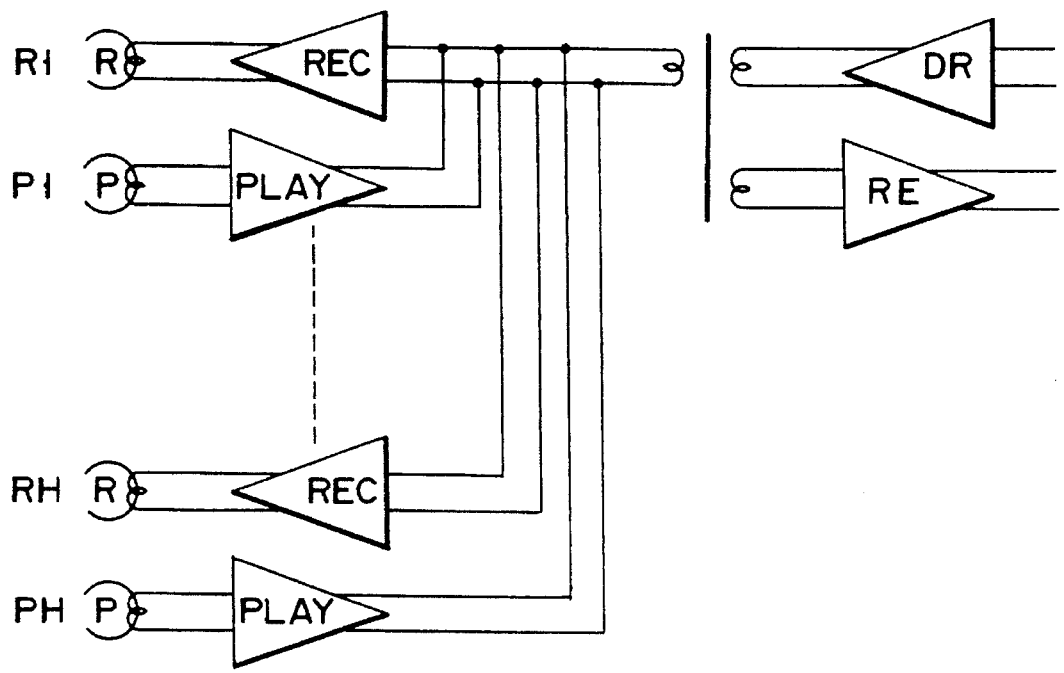
F I G. 100

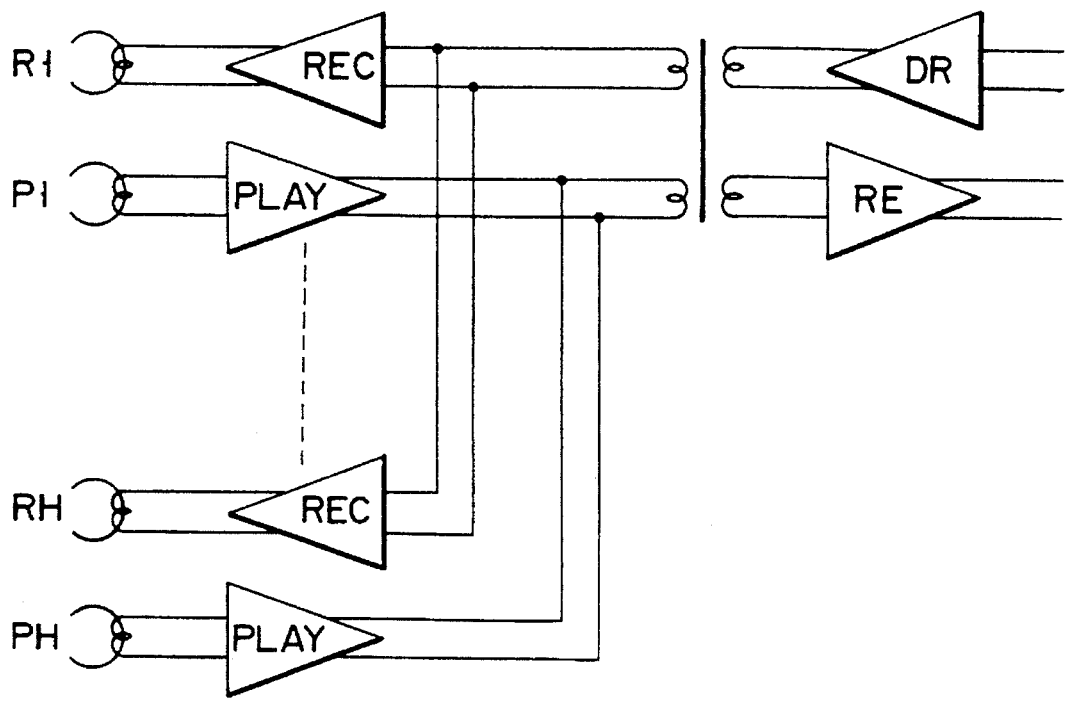
F I G. 101
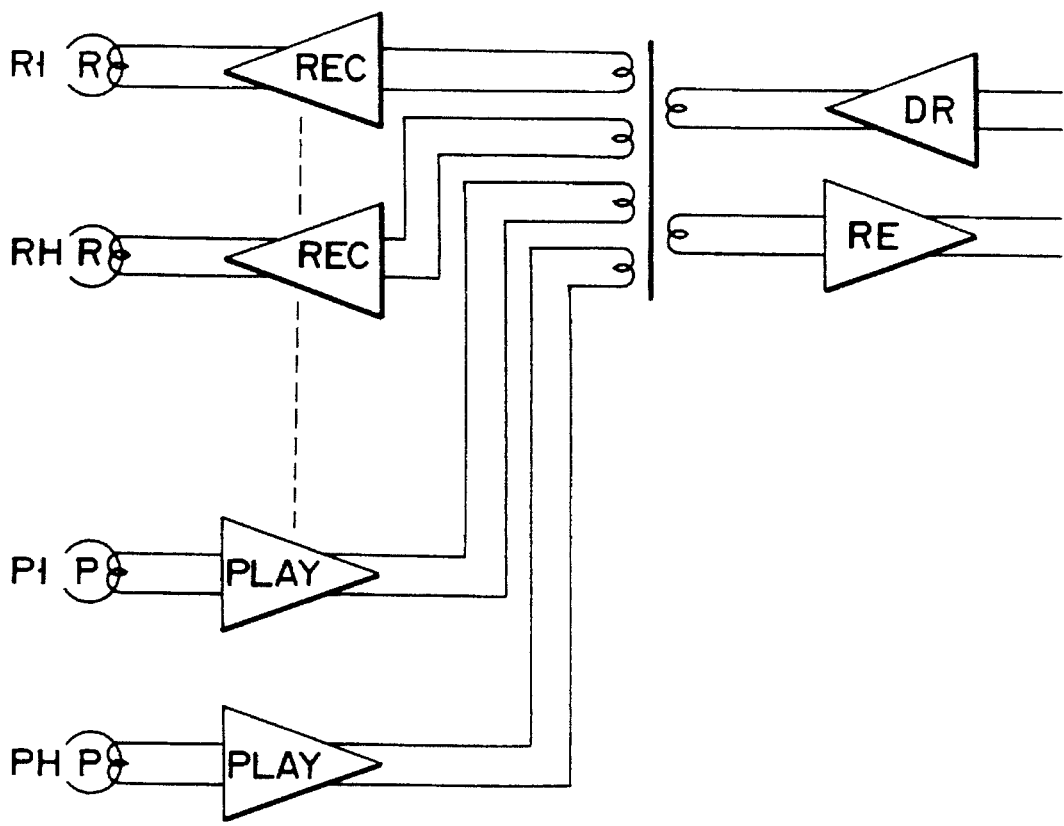
F I G. 102

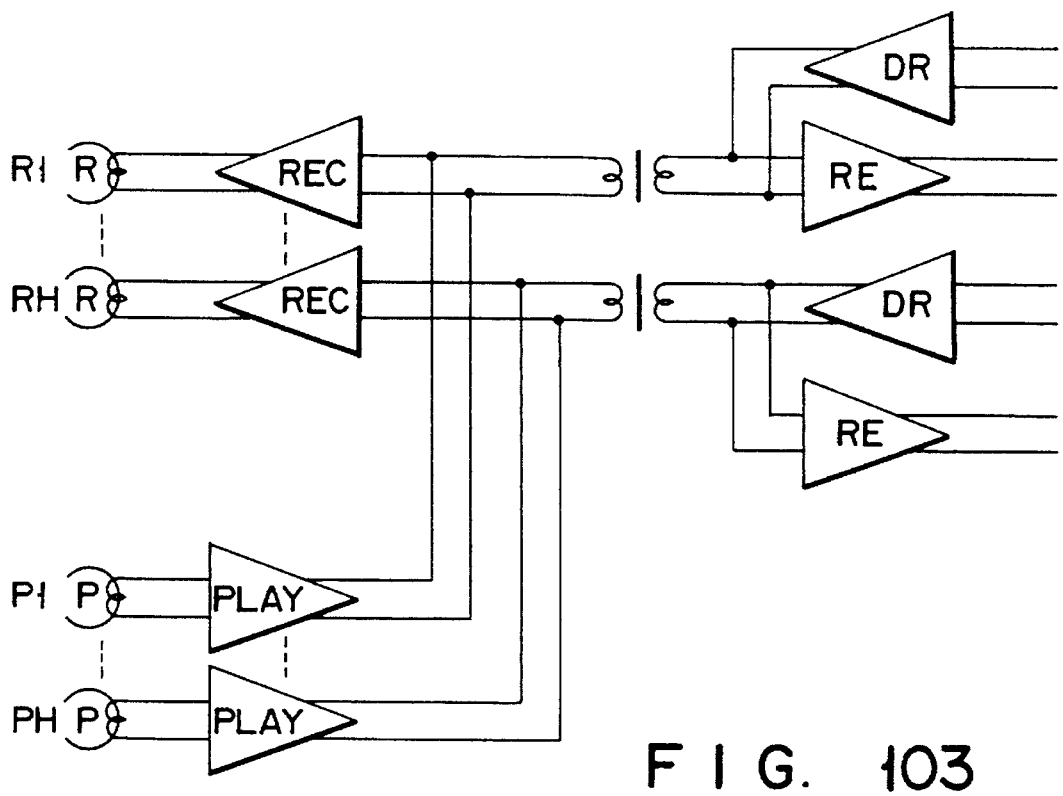
F I G. 103
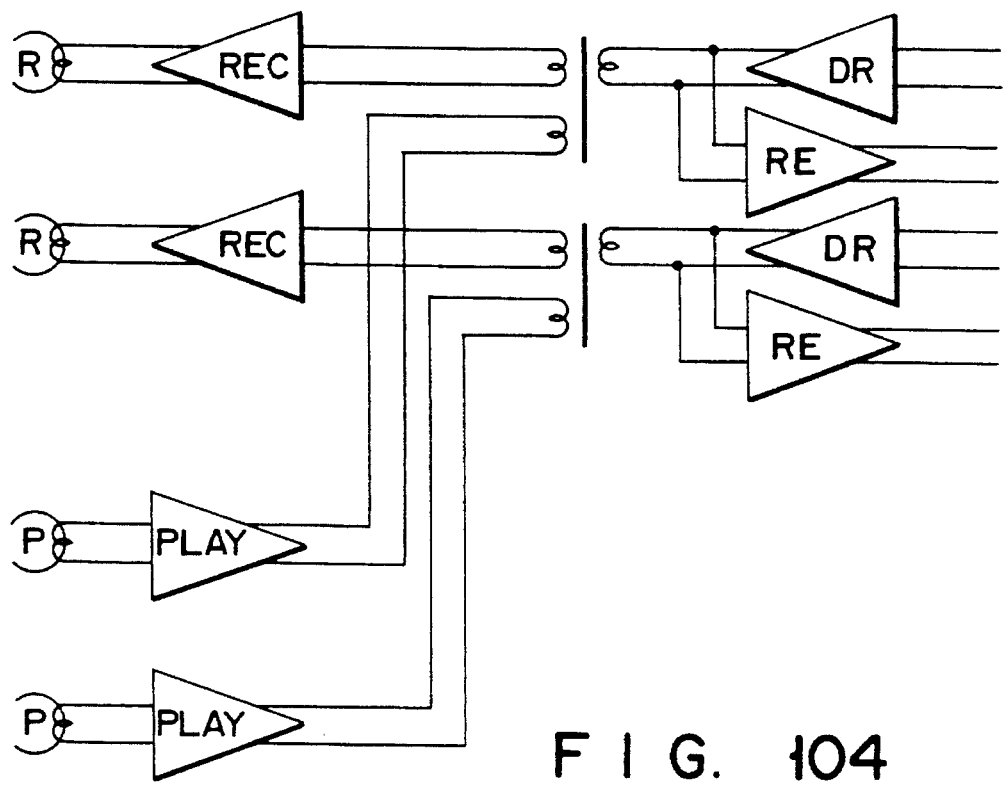
F I G. 104

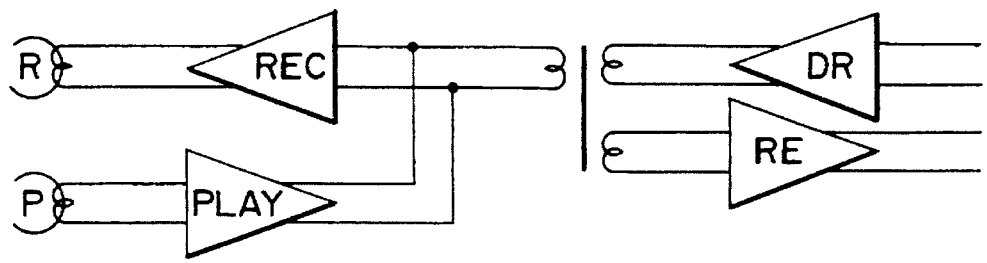
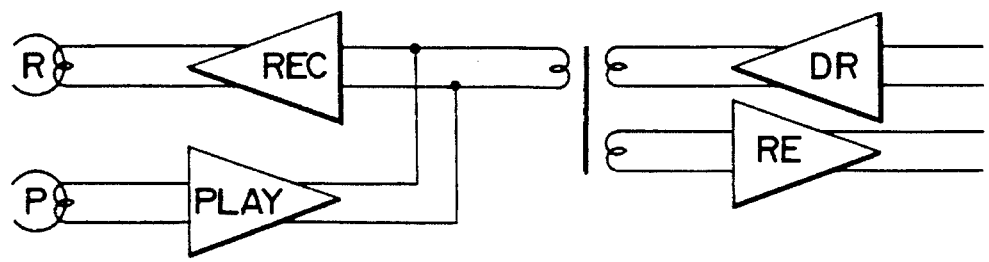
F I G. 105
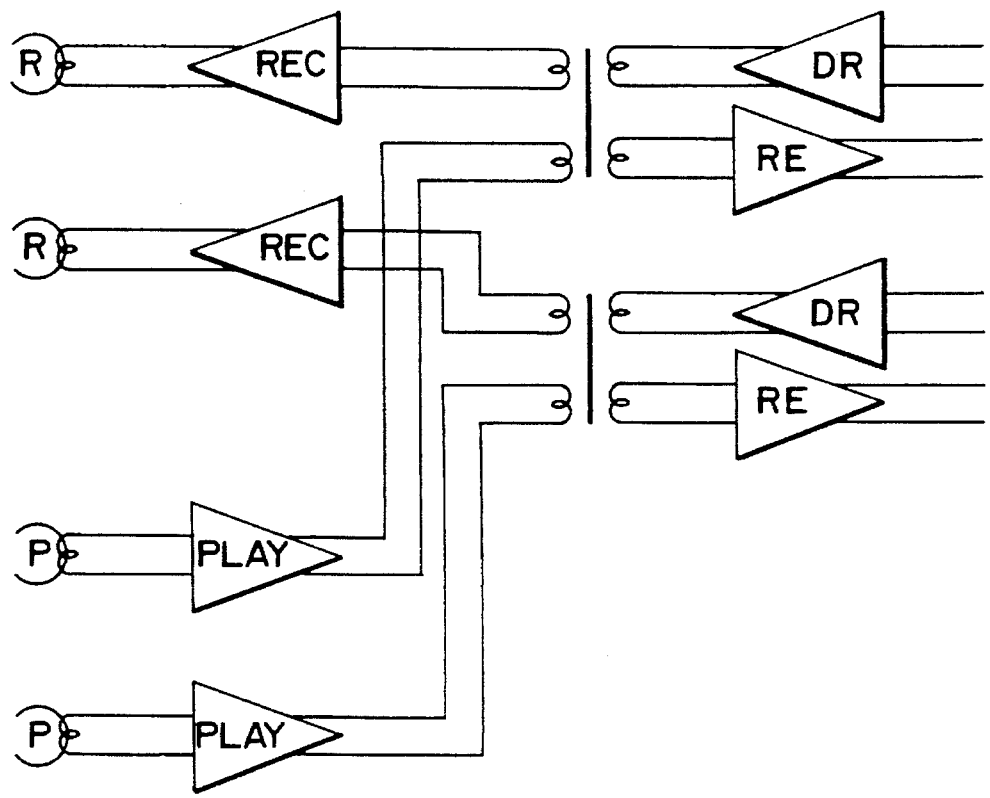
F I G. 106

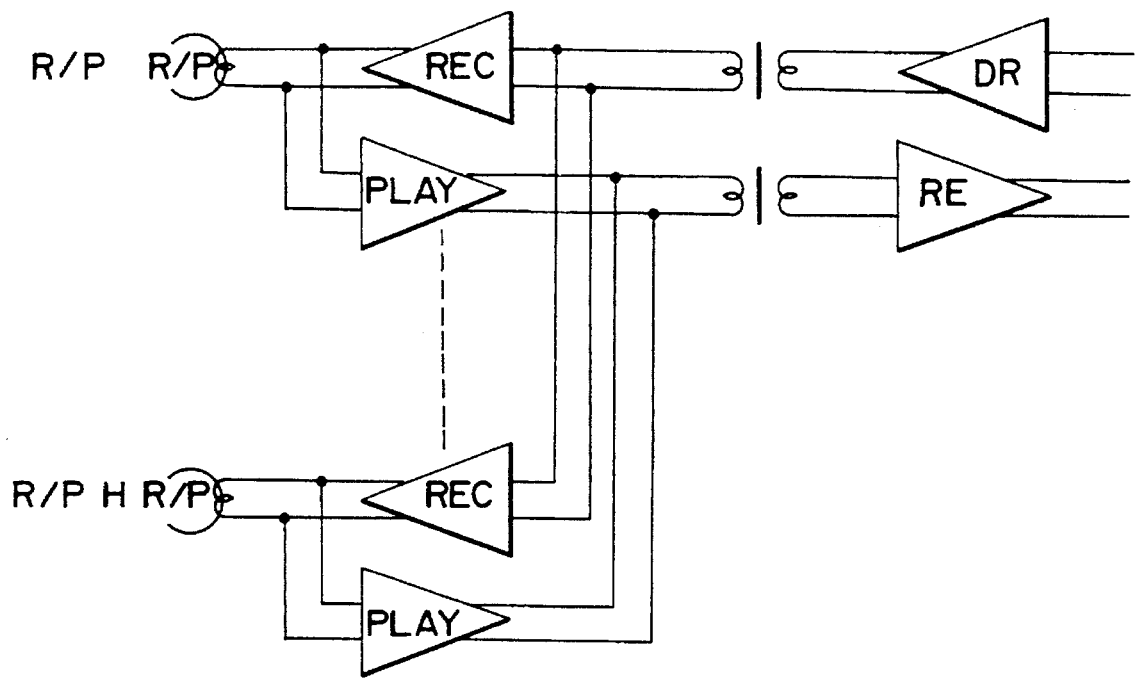
F I G. 107
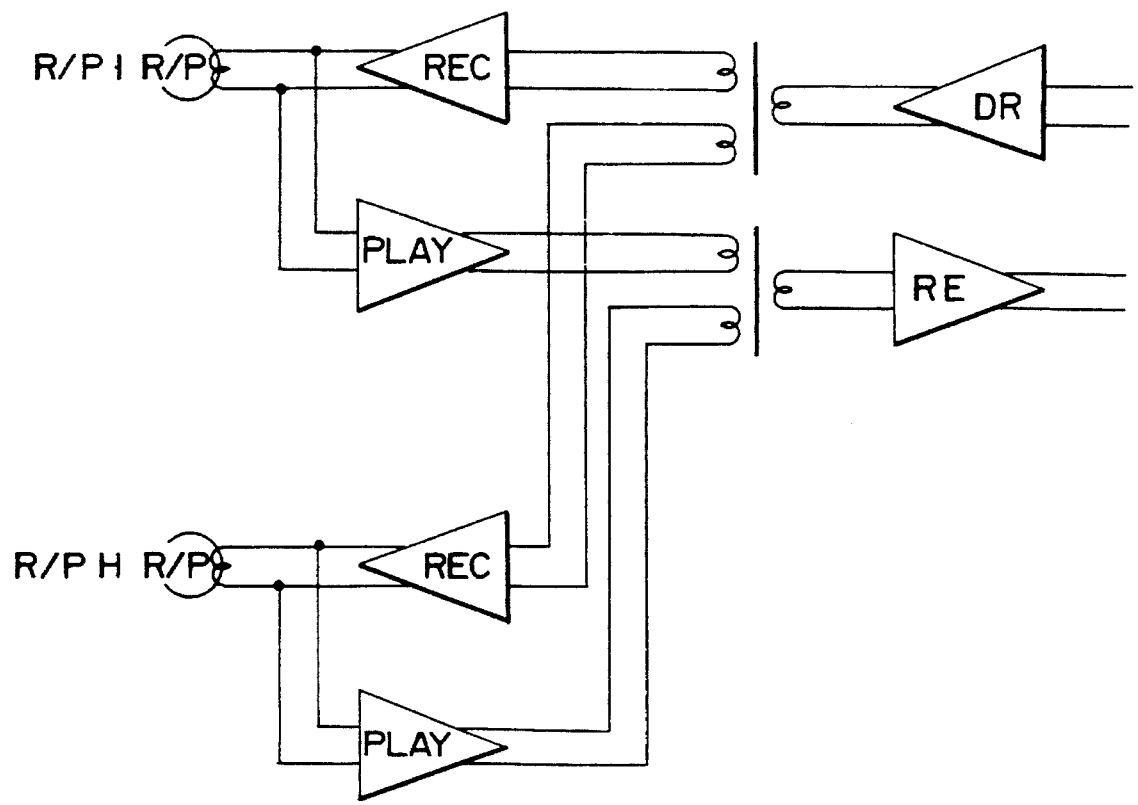
F I G. 108

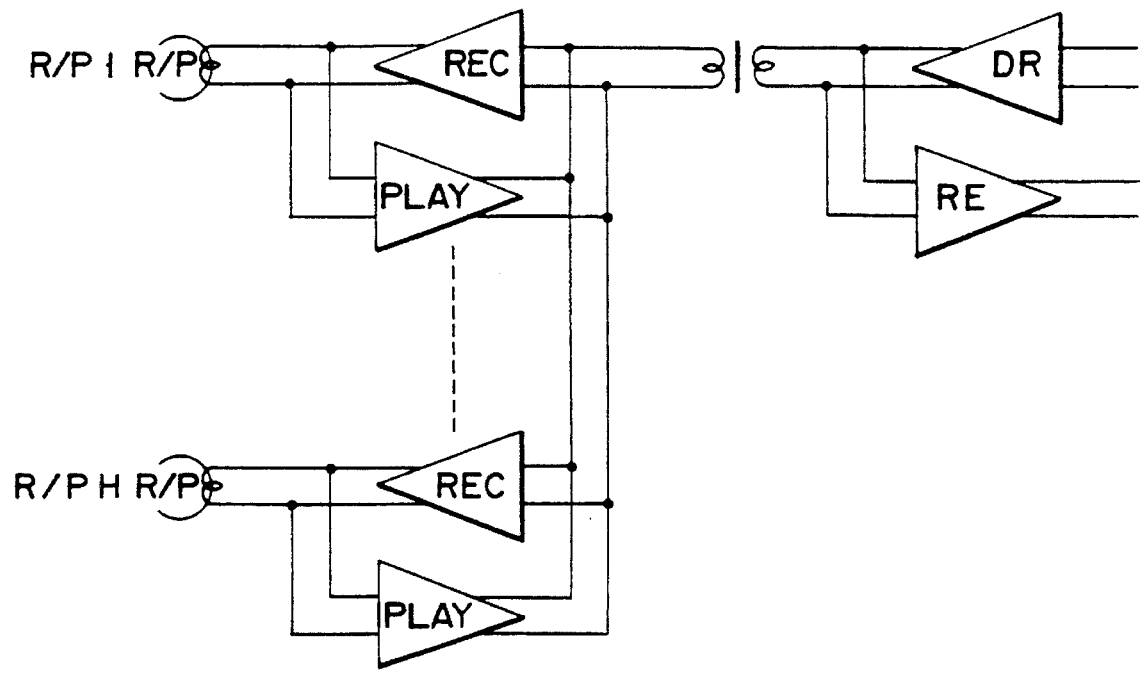
F I G. 109
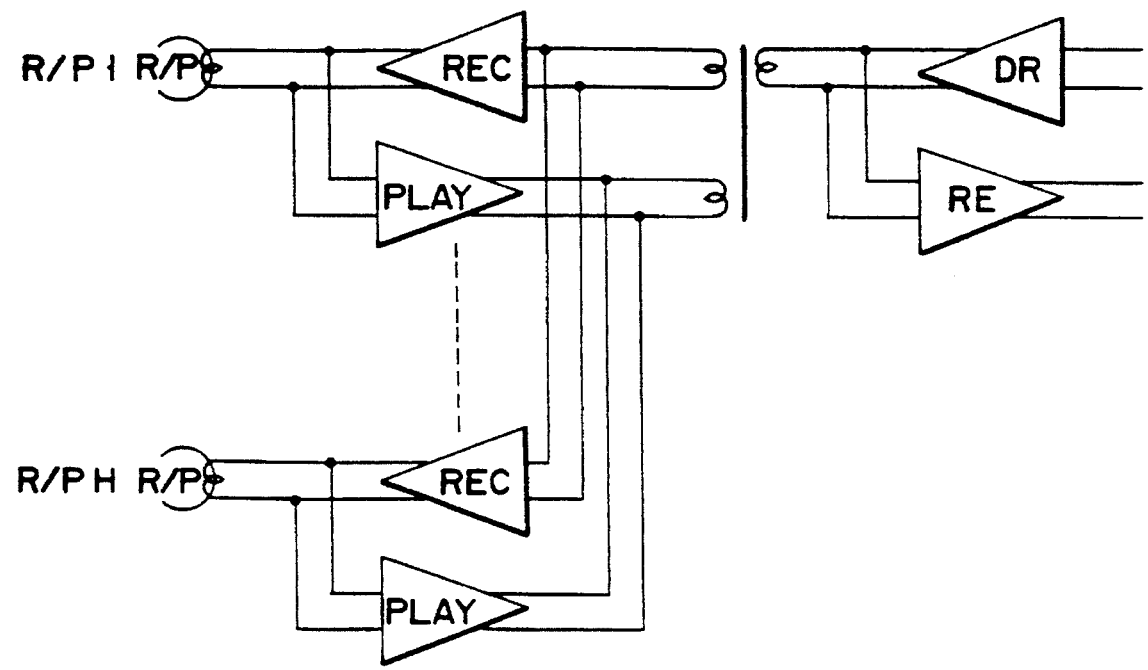
F I G. 110

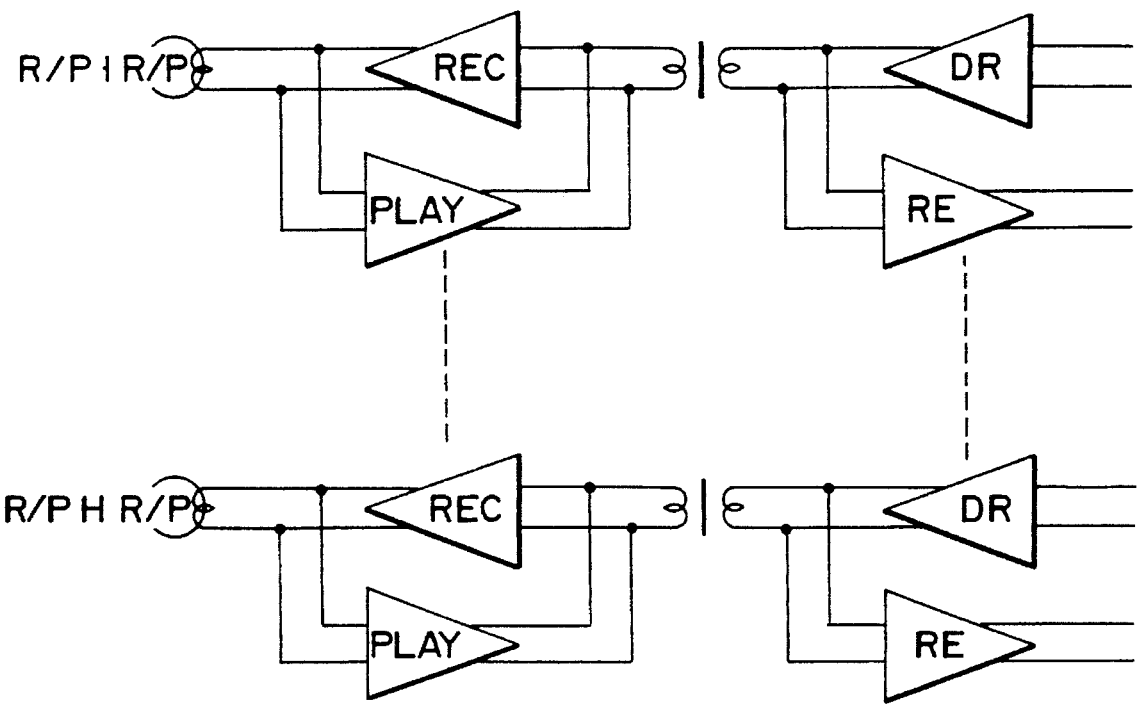
F I G. 115
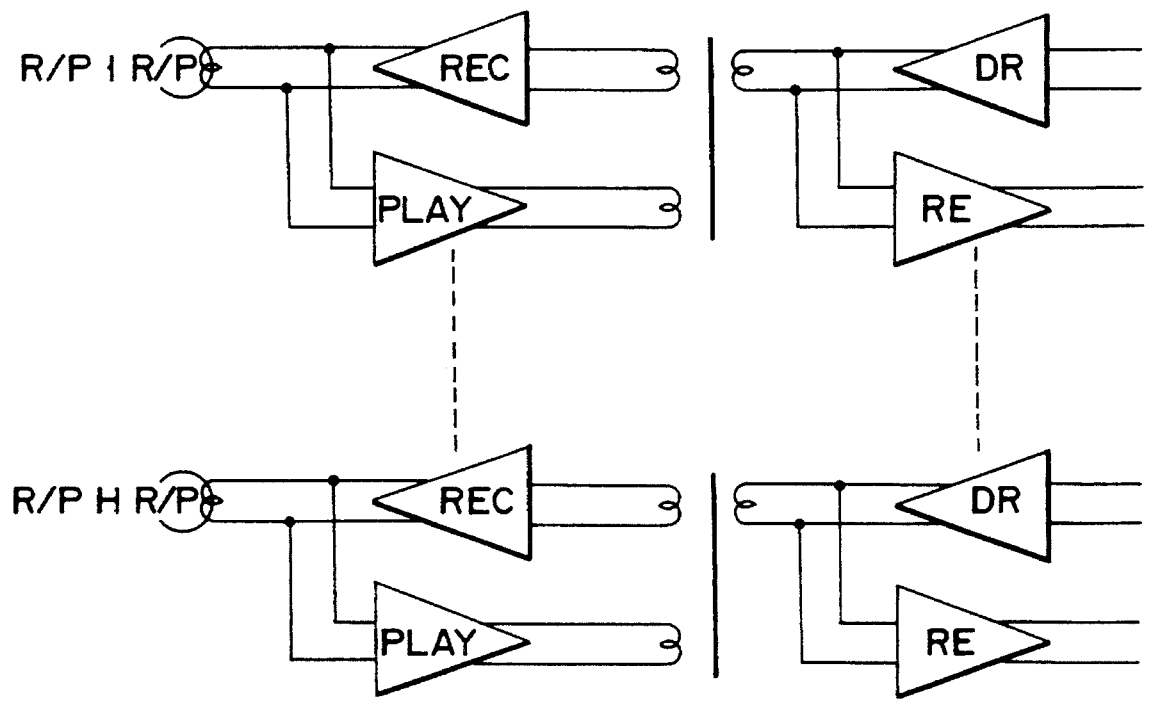
F I G. 116

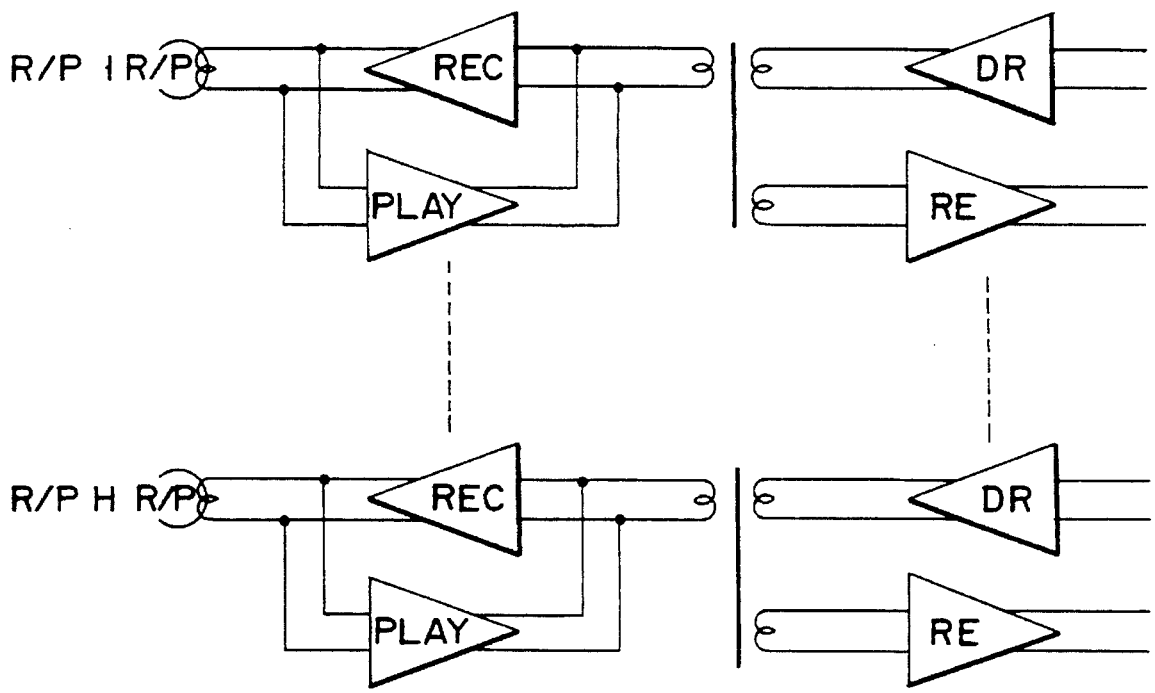
F I G. 117
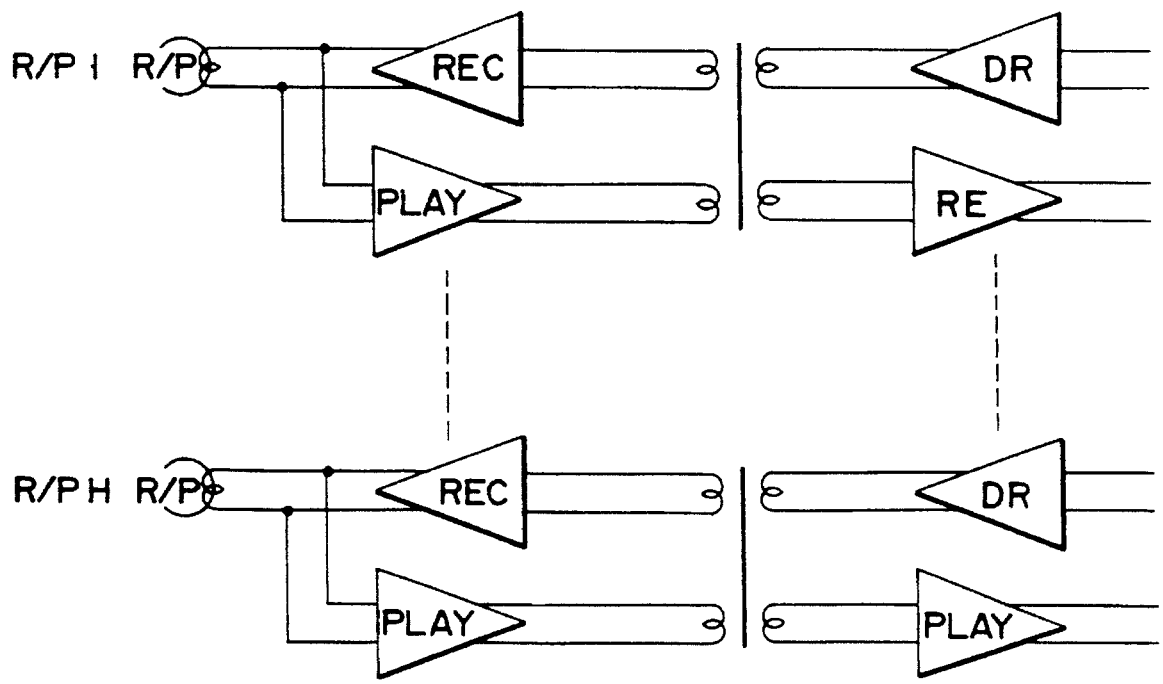
F I G. 118

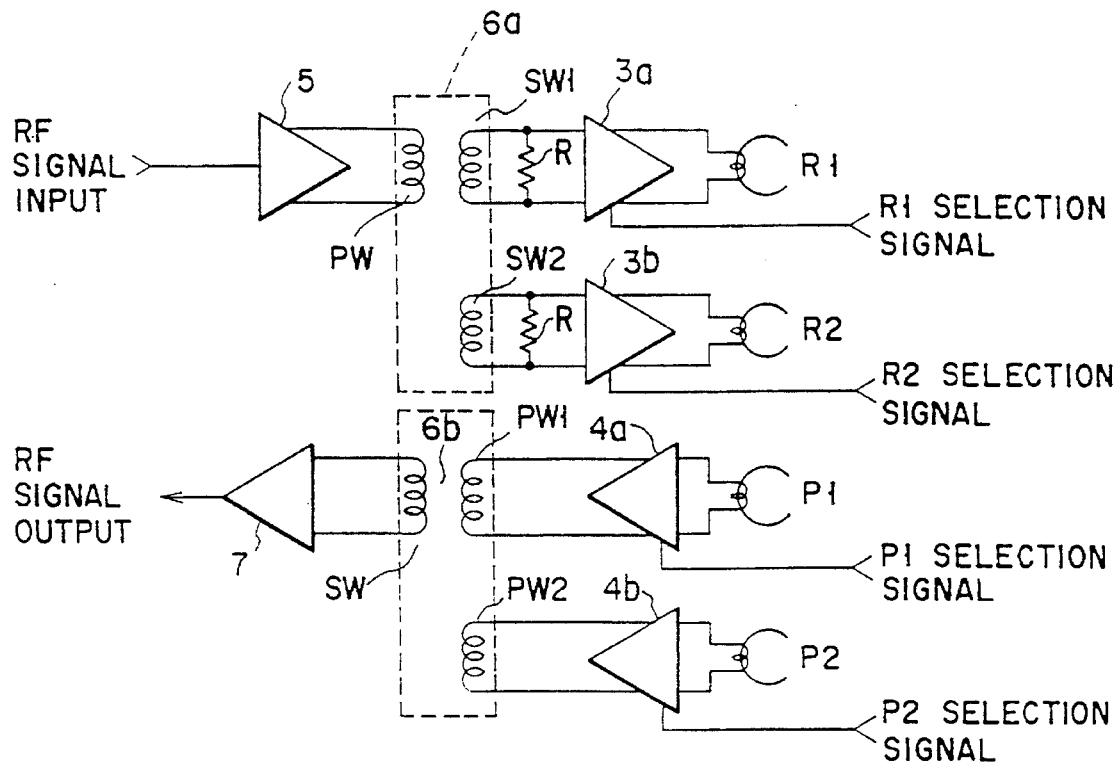
F I G. 119
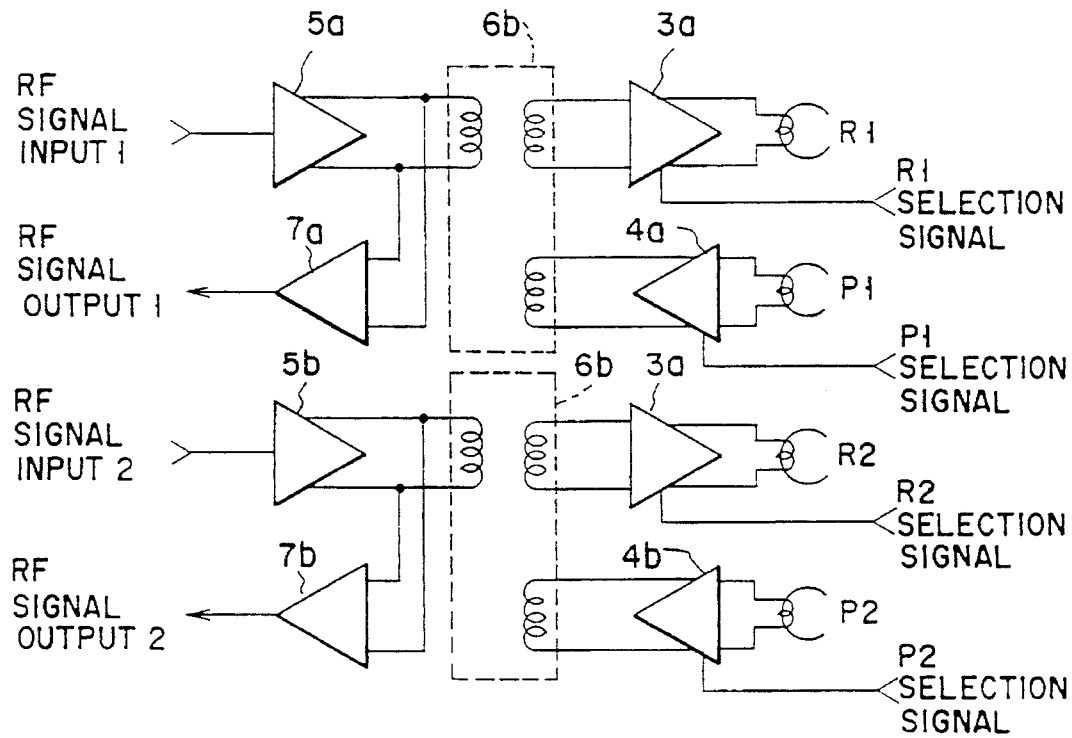
F I G. 121

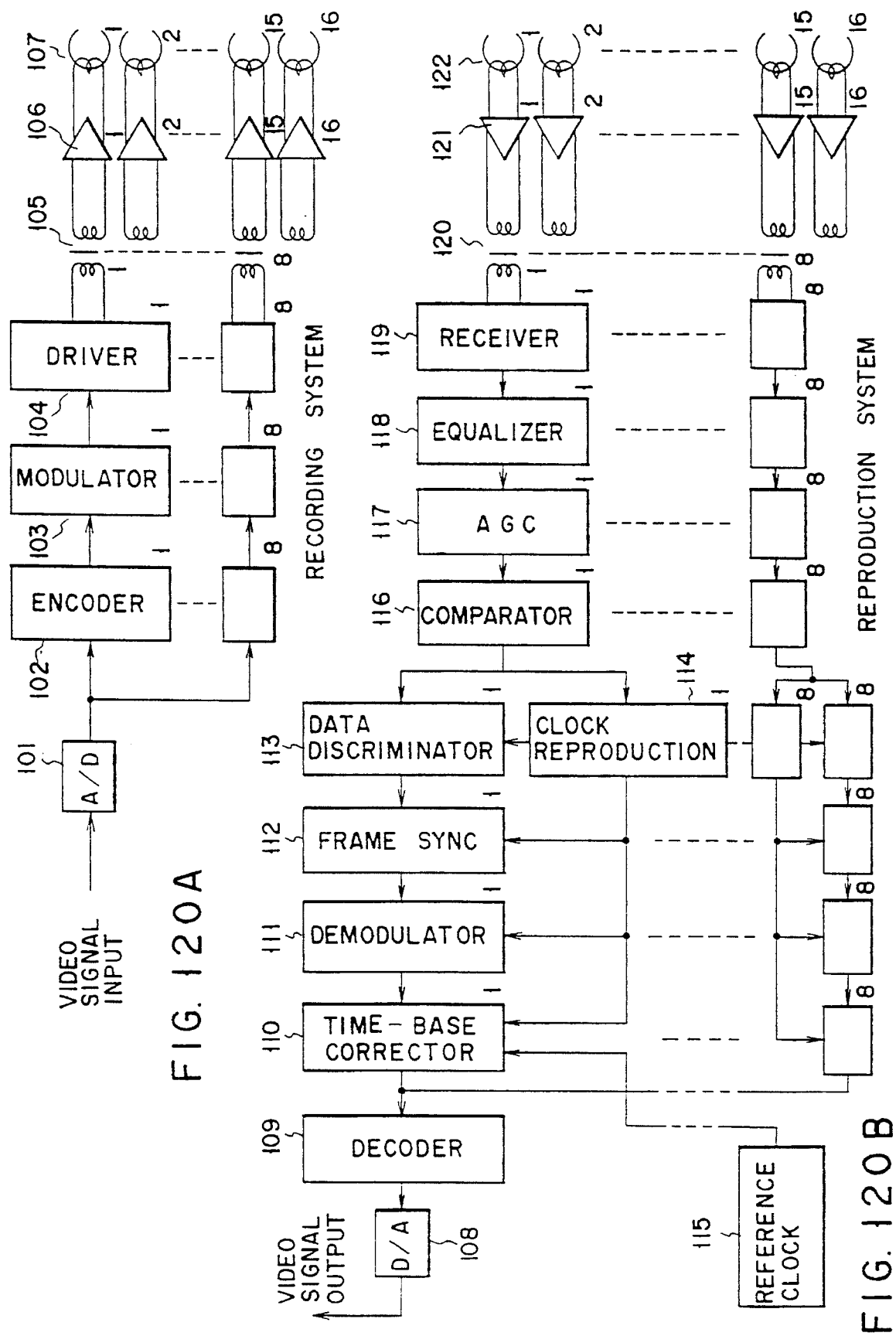

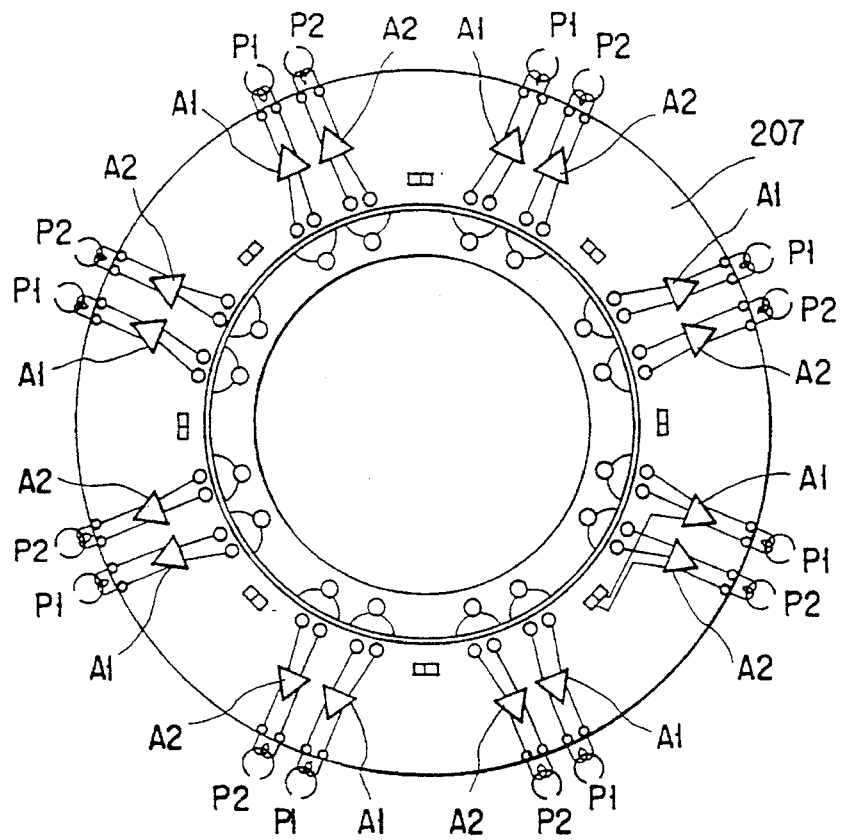
F I G. 128
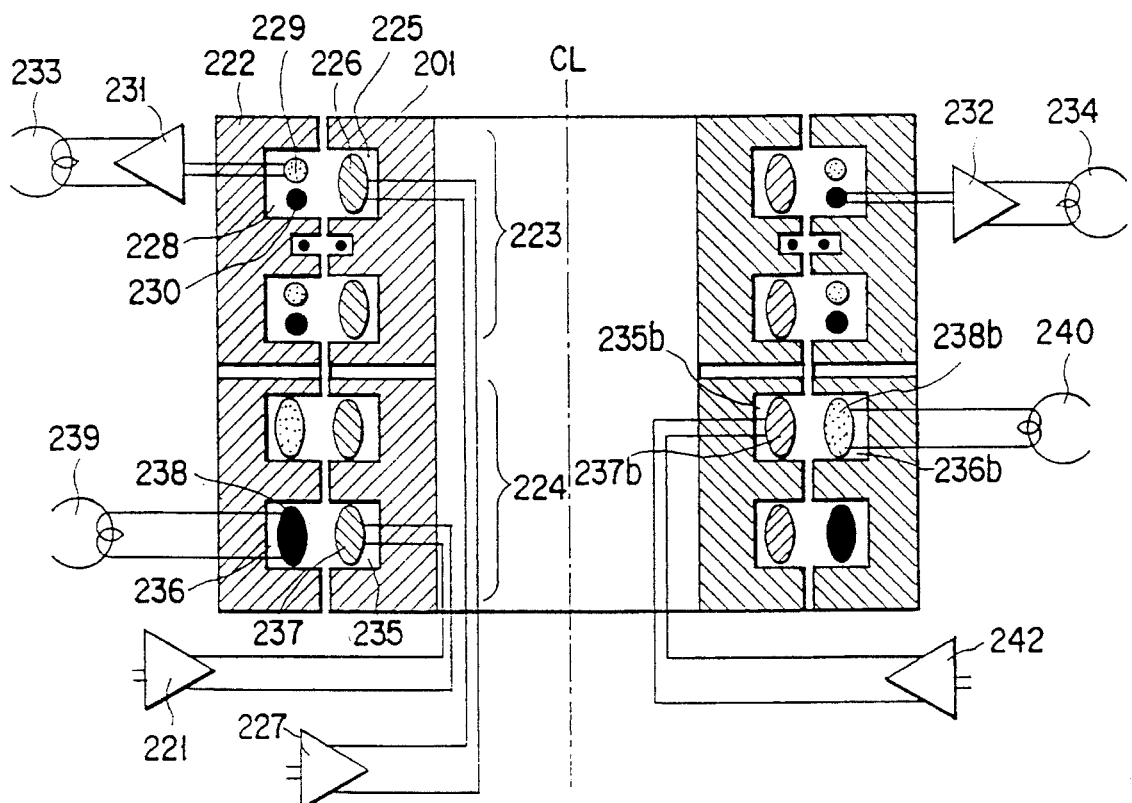
F I G. 129

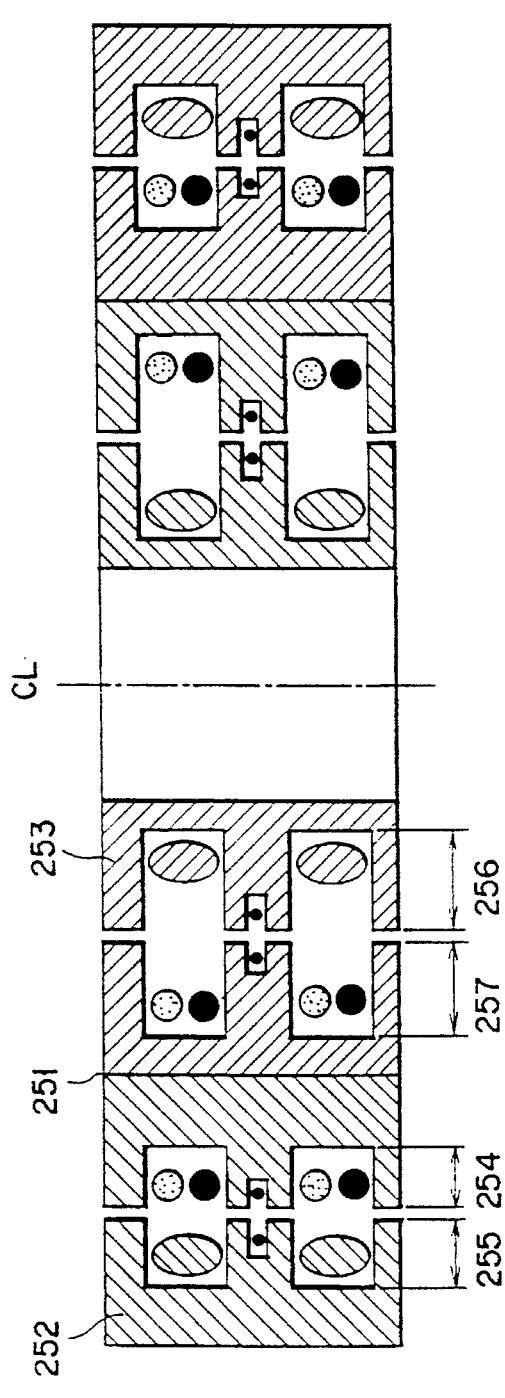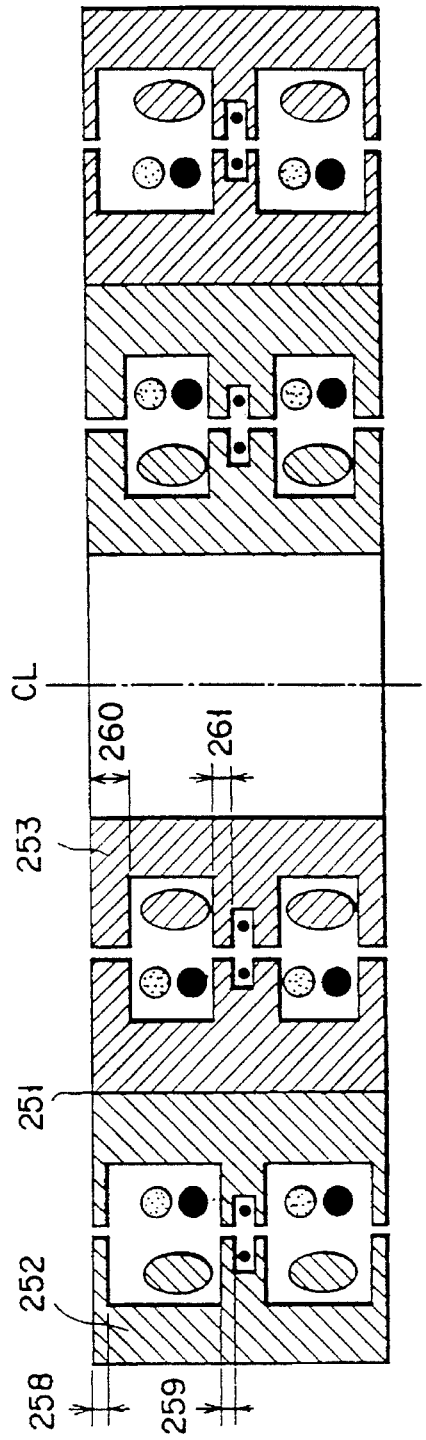

θ1: EFFECTIVE WRAP ANGLE
θ2: TOTAL WRAP ANGLE
θ3: 180° WRAP ANGLE

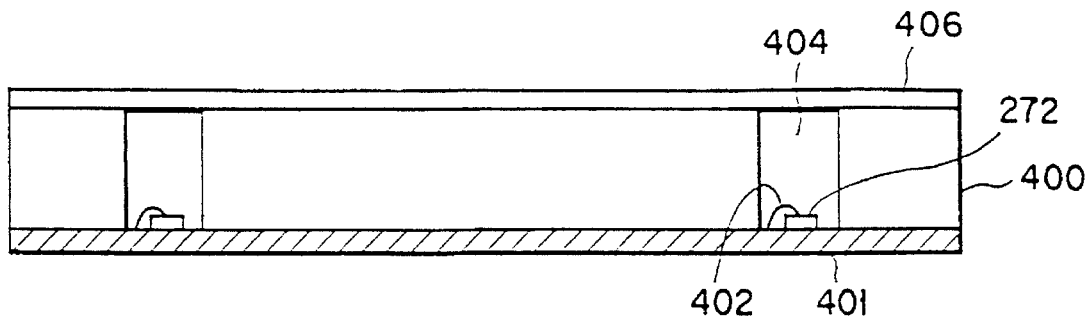
F I G. 137
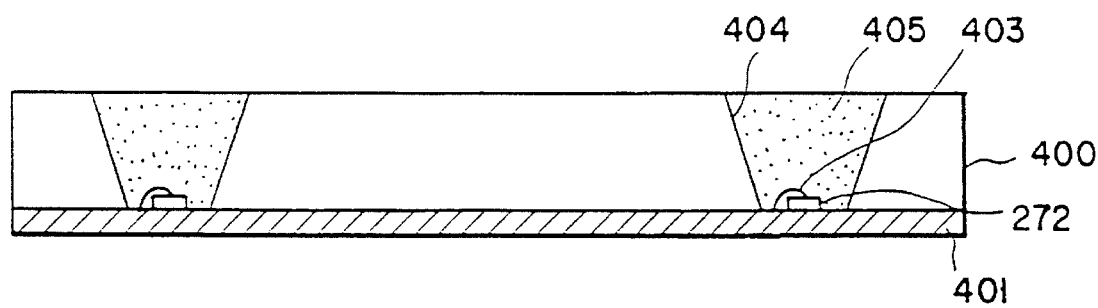
F I G. 138
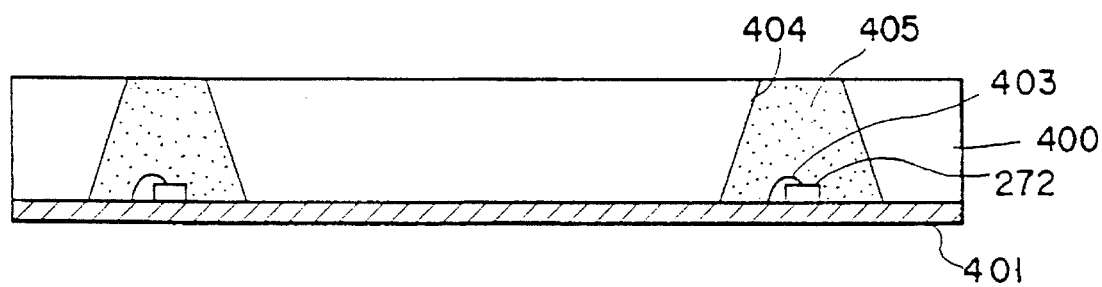
F I G. 139
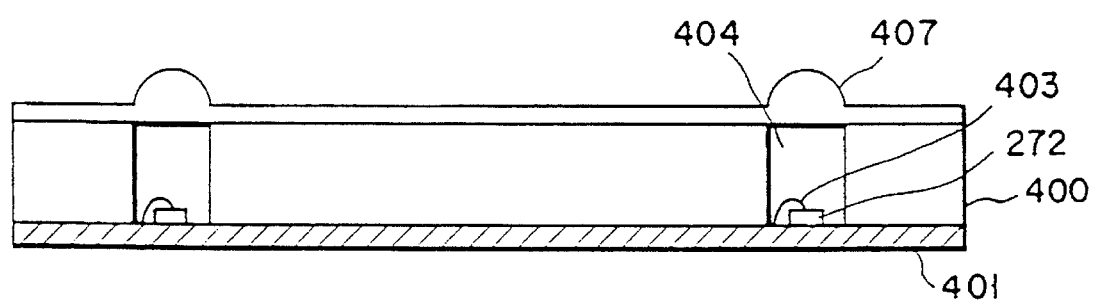
F I G. 140

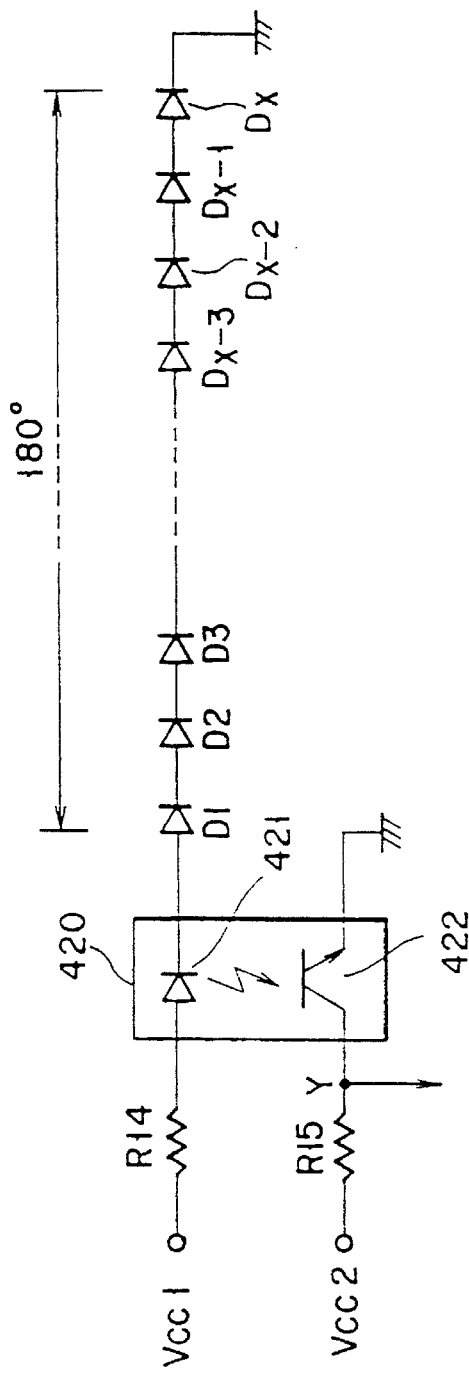
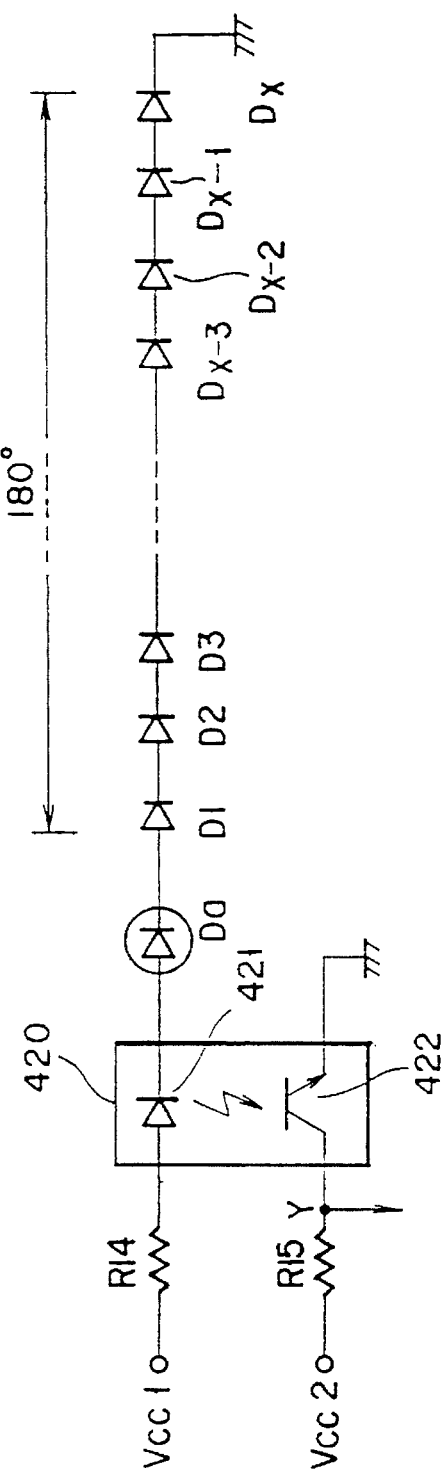
FIG. 142A
FIG. 142B

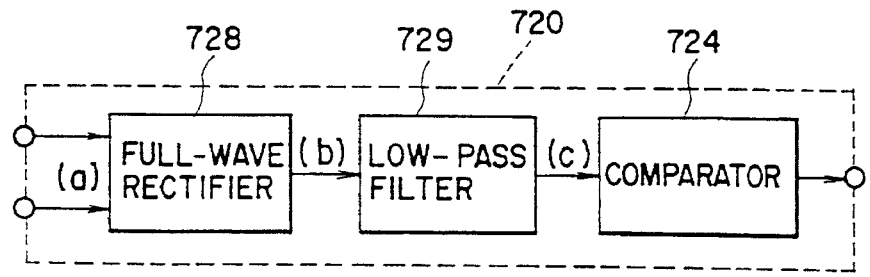
F I G. 145
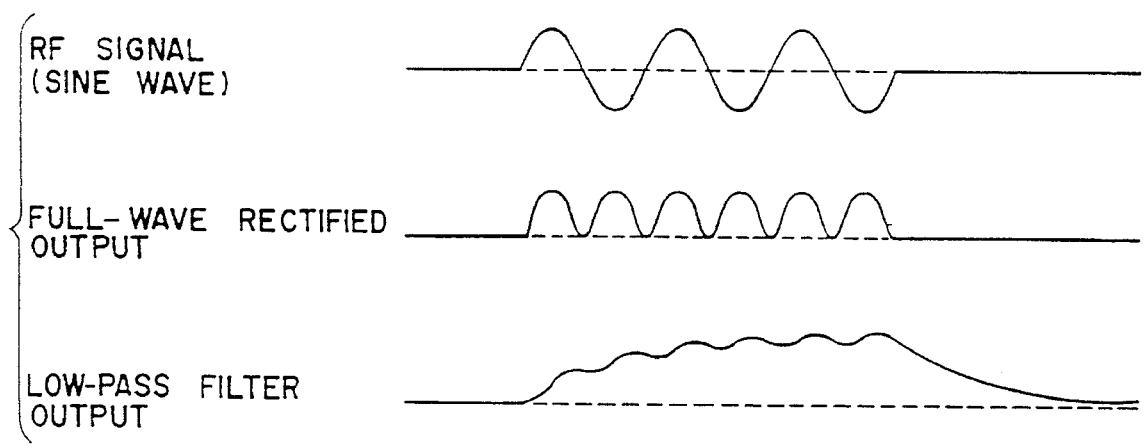
F I G. 146

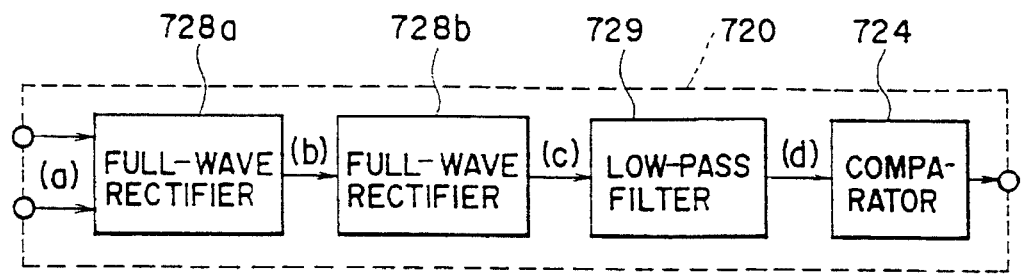
F I G. 147
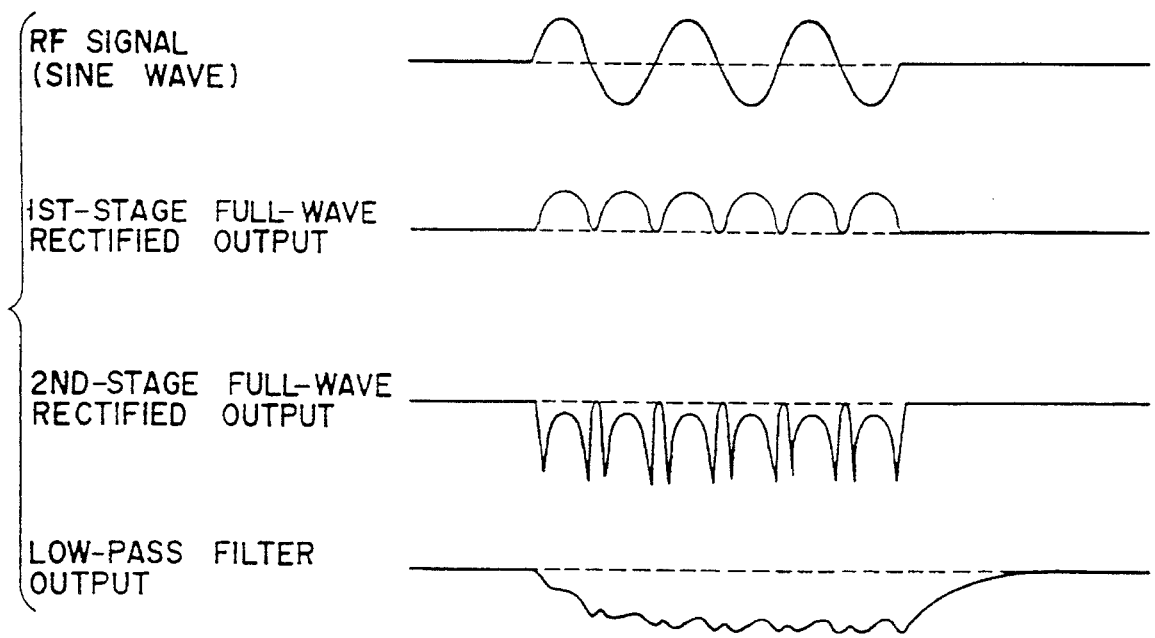
F I G. 148

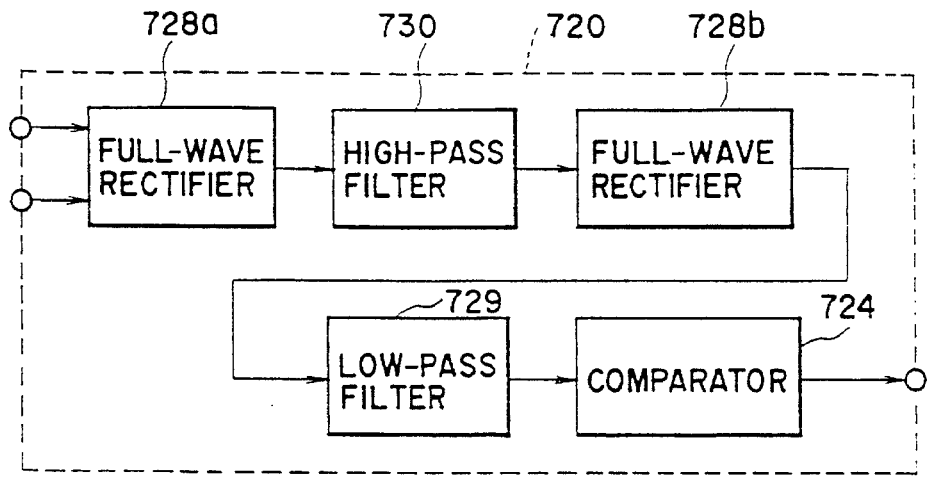
F I G. 149
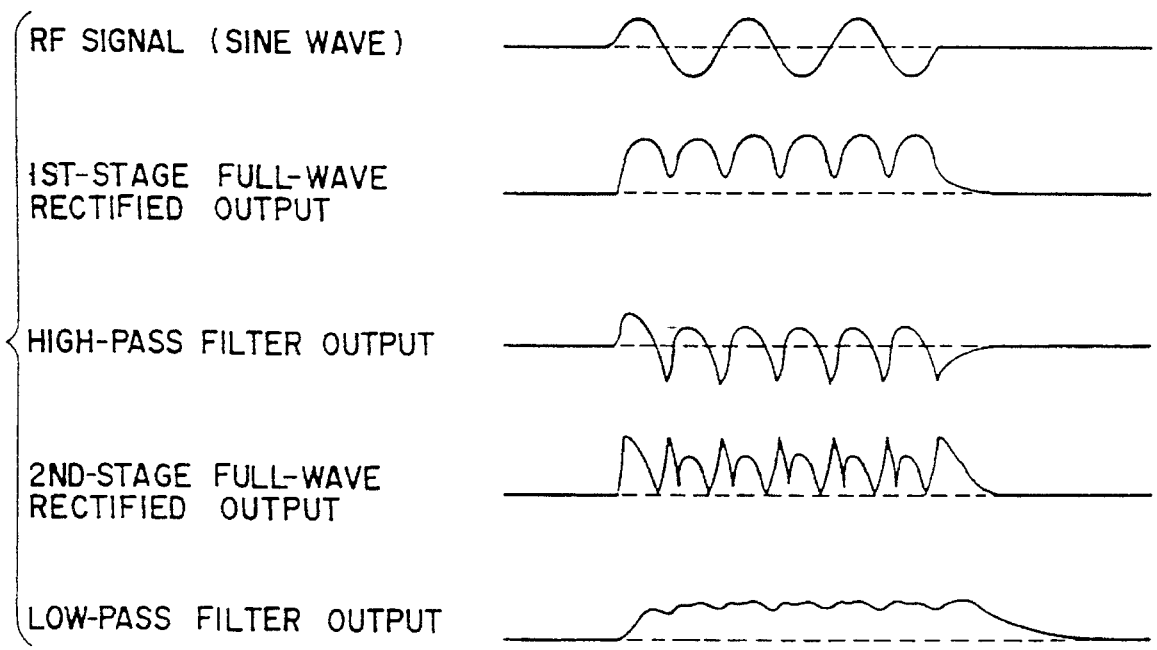
F I G. 150

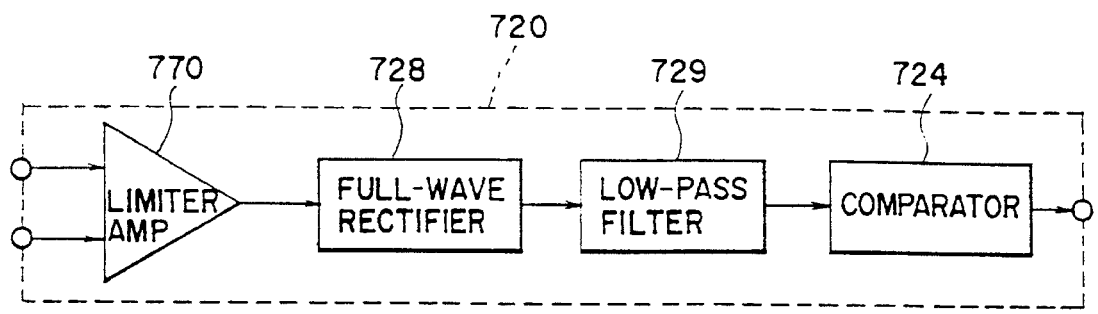
F I G. 151
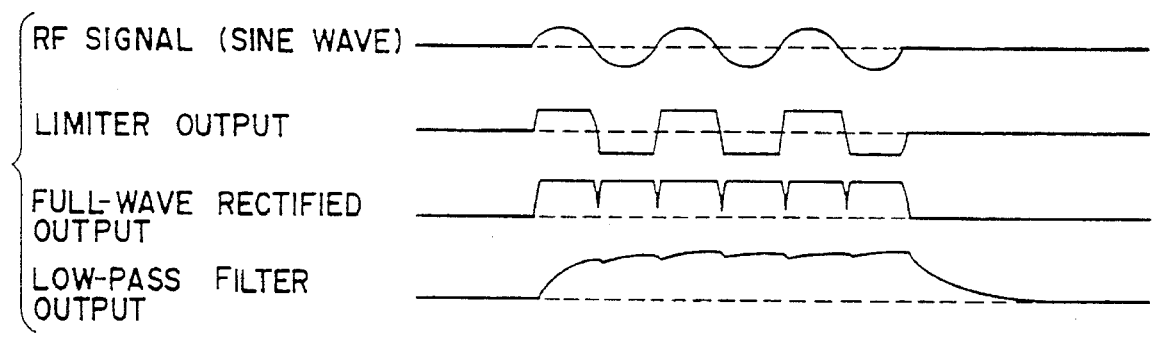
F I G. 152

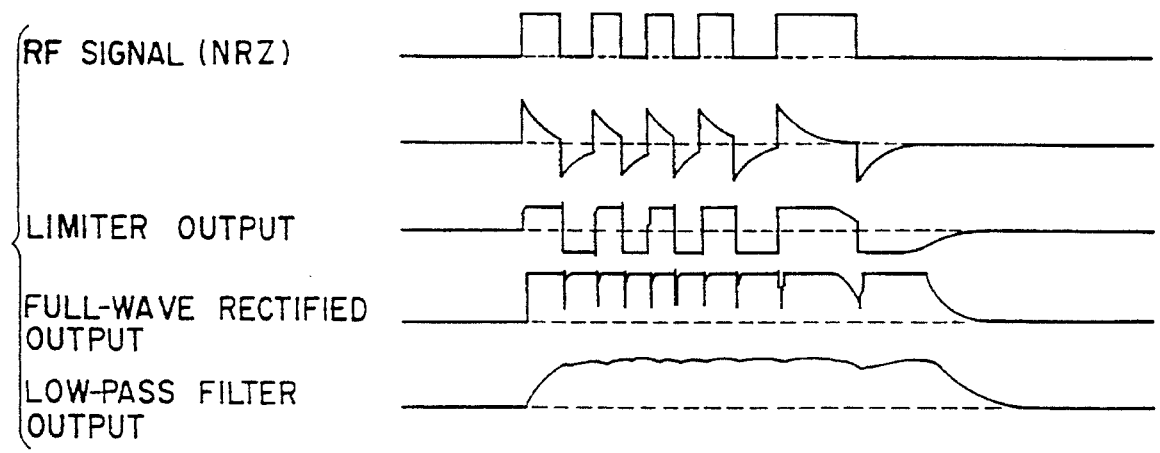
F I G. 153
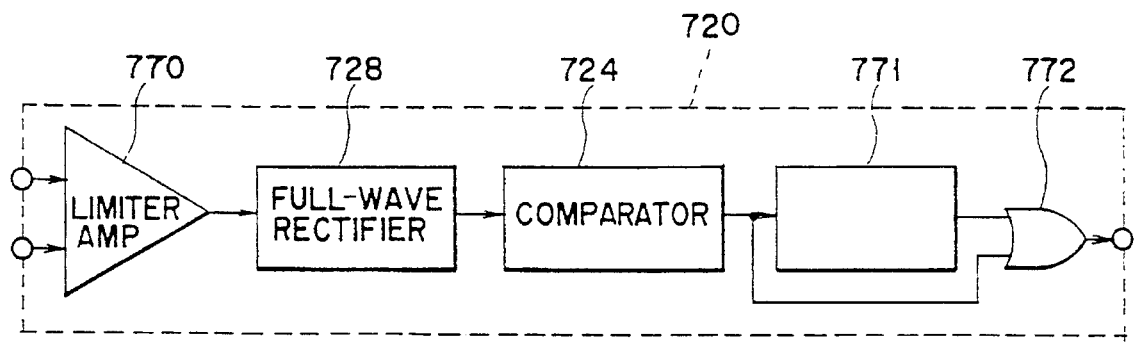
F I G. 154

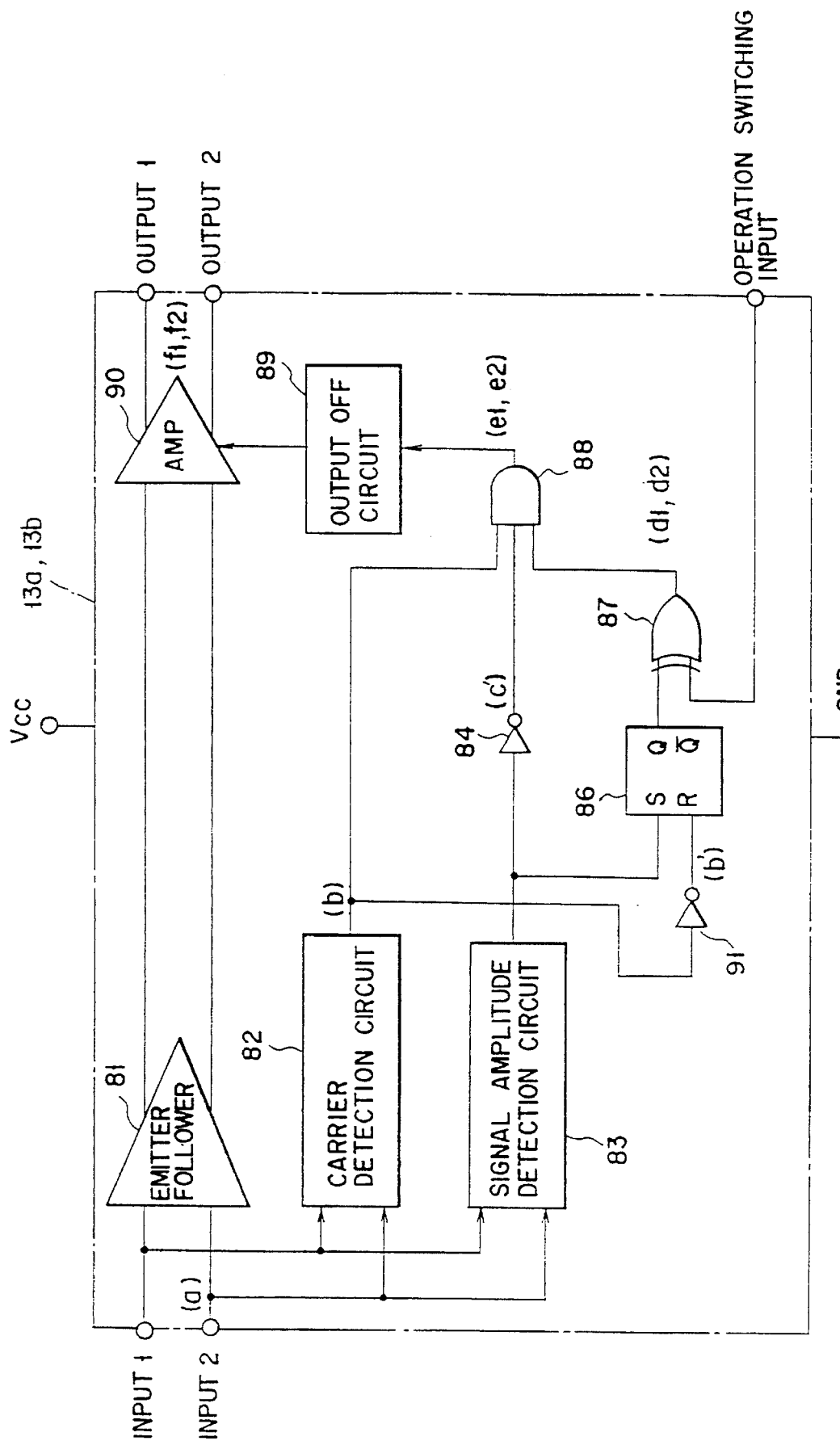
F I G. 159

MAGNETIC RECORDING AND REPRODUCTION APPARATUS

CROSS REFERENCE TO RELATED APPLICATION

This is a continuation-in-part of U.S. Ser. No. 07/617,081, filed on Nov. 21, 1990, now abandoned, which in turn is a continuation-in-part application of U.S. Ser. No. 07/525,831, filed on May 18, 1990, now U.S. Pat. No. 5,276,565.

BACKGROUND OF THE INVENTION

1. Field of the Invention

The present invention relates to a magnetic recording and reproduction apparatus for magnetically recording and/or reproducing information by using a magnetic tape as a recording medium.

2. Description of the Related Art

In recent years, wide-band, high-transmission rate VTRs (to be referred to as "wide-band/high-transmission rate VTRs" hereinafter) such as a high-resolution VTR and a digital VTR of a current TV system have been developed and put into practical use. In these wide-band/high-transmission rate VTRs, an inductance of a rotary transformer, a stray capacitance, and a cable coupling capacitance between the rotary transformer and a magnetic head, which are not so problematic in conventional VTRs, have been considered as problems. That is, transmission characteristics of an electromagnetic conversion system in magnetic recording are determined by a resonance frequency obtained by inductances of a magnetic head and a rotary transformer and the stray capacitance including an input capacitance of a reproduction circuit in a recording system, and is determined by a resonance frequency obtained by an inductance of the magnetic head, an inductance of the rotary transformer, and the stray capacitance including the input capacitance of the reproduction circuit in a reproduction system. In order to realize a wide-band/high-transmission rate VTR, therefore, no rotary transformer is desirably interposed between the magnetic head and the recording and reproduction circuits.

In a VTR of this type, therefore, as described in "Technical Bulletin of Institute of Electronics, Information and Communication Engineers", MR85-54, a recording circuit and a reproduction circuit are mounted in a rotary drum portion and connected directly to a magnetic head without using a rotary transformer, thereby widening recording and reproduction bands.

In addition, bands of a rotary transformer for transmitting signals between the rotary drum portion and an external portion (between the rotary drum portion and the other portion), a driver circuit for driving the rotary transformer, and a receiver circuit for receiving signals from the rotary transformer must be simultaneously widened. That is, as the recording and reproduction bands are determined in accordance with the input capacitances of the magnetic head and the reproduction circuit, a transmission band of the rotary transformer is determined in accordance with the inductance of the rotary transformer and the input capacitance or the stray capacitance of the receiver circuit. Therefore, a cable having a large capacitance, e.g., a coaxial cable having a large capacitance cannot be used to couple the driver and receiver circuits to the rotary transformer. In order to realize a wide band of the rotary transformer, therefore, the driver and receiver circuits must be mounted close to the rotary transformer. As a result, a scanner (an entire drum mechanism portion including a "rotary drum" and a "stationary drum" will be referred to as a "scanner" hereinafter) is complicated and enlarged since the driver and receiver circuits of the rotary transformer are mounted.

In addition, as described in "National Convention Record of the Institute of Television Engineers of Japan", Vol. 10, No. 41; VR87-5; T. Eguchi et al.; January 1987, a VTR of this type must have at least six n=magnetic heads including those for normal reproduction and special-purpose reproduction. For example, a D-1 format 525 digital VTR employs 16 magnetic heads.

A rotary transformer is normally used for signal transmission between a rotary drum portion and an external portion (between the rotary drum portion and the other portion), and the number of channels of the rotary transformer must correspond to the number of magnetic heads mounted in the rotary drum. If, however, rotary transformers are mounted in a scanner in a number corresponding to the number of multi-channel magnetic heads, a mechanism of the scanner is enlarged and complicated, resulting in insufficient mechanical precision of each portion. Although a recording or reproduction circuit must be provided in a number corresponding to the number of magnetic heads similar to the rotary transformer, it can be made compact and light by adopting an IC arrangement. Since, however, the rotary transformer must have a wide range and a low crosstalk between channels, its miniaturization is limited.

In order to simplify an arrangement of the mechanism of the scanner and that of an electronic circuit including the recording and the reproduction circuits. therefore, the number of channels of the rotary transformer must be reduced.

In addition, since the recording and reproduction circuits corresponding to the multi-channel magnetic head are mounted, power consumption is increased. Furthermore, since thermal expansion is caused in each mechanism portion of the scanner due to heat generated by circuit elements, precision of the mechanism is degraded. Therefore, low power consumption is also required for the recording and reproduction circuits to be mounted in the rotary drum and a circuit portion at the stationary drum side.

SUMMARY OF THE INVENTION

It is, an object of the present invention to provide a magnetic recording and reproduction apparatus which can reduce the number of channels of a rotary transformer without degrading frequency characteristics, reduce power consumption of the entire circuit mounted on a rotary drum, and simplify and miniaturize a mechanism of a scanner portion.

According to the invention, these is provided a magnetic recording/reproduction apparatus comprising: a rotary drum having a circumferential surface; tape running means for rotating said rotary drum and run a magnetic tape by making the magnetic tape as a recording medium contact with, at least, part of the circumferential surface of said rotary drum; a plurality of magnetic heads installed on said rotary drum so that said magnetic tape will contact them; a plurality of amplifying circuit means respectively connected to said magnetic heads and installed on said rotary drum said amplifying means being selectively gone to active state and non-active state; at least one rotary transformer having a core in which a slot is formed, at least one conductor to be received to said slot, and lead wires integrally formed with said conductor, and being connected to said amplifying circuit means in common; and control means for making said magnetic heads execute at least one of data-recording and data-reproduction through said amplifying circuit means, and said rotary transformer.

According to the invention, there is provided a magnetic recording/reproduction apparatus comprising a rotary drum having circumferential surface; tape running means for rotating the rotary drum and run a magnetic tape with the magnetic tape as a recording medium being in contact with, at least, part of the circumferential surface of the rotary drum; magnetic head means having a plurality of first magnetic heads used for erasing a record signal and installed on the rotary drum so that the magnetic tape is in contact with the first magnetic heads and a plurality of second magnetic heads used for performing at least one of recording and reproduction; a plurality of erasing circuit means installed on the rotary drum to output erasing signal to each of the first magnetic heads; a plurality of amplifying circuit means connected to the second magnetic heads respectively and installed on the rotary drum, the amplifying means being selectively gone to active state and nonactive state; at least one rotary transformer connected to the erasing circuit means in common; and control means for making the second magnetic heads execute at least one of recording and reproduction through the amplifying circuit means and the rotary transformer.

According to the invention, there is provided a magnetic recording/reproduction apparatus comprising, a rotary drum having a circumferential surface; tape running means for rotating the rotary drum and running a magnetic tape with the tape as a recording medium being in contact with, at least, part of the circumferential surface of the rotary drum; magnetic head means having a plurality of erasing magnetic heads installed on the rotary drum so that the magnetic tape is in contact with the heads, and used for erasing record signal and a plurality of recording magnetic heads used for recording information signal in the magnetic tape; a plurality of erasing circuit means installed on the rotary drum to output erasing signal to each of the erasing heads; a plurality of recording circuit means connected to the recording magnetic heads respectively and installed on the rotary drum so that the recording circuit means are selectively gone to active state and non-active state; at least one of rotary transformer connected to at least one of the recording circuit means and the erasing circuit means in common; and driving means for recording information signal in the magnetic tape through the recording magnetic heads, the recording circuit means, and the rotary transformers.

According to the invention, there is provided a magnetic recording/reproduction apparatus comprising, a rotary drum having a circumferential surface; tape running means for rotating the rotary drum and running a magnetic tape with the magnetic tape being in contact with, at least, part of the circumferential surface of said rotary drum; magnetic head means having a plurality of erasing magnetic heads installed on said rotary drum so that said magnetic tape is in contact with the heads and used for erasing recording signal and a plurality of reproduction magnetic heads used for reproducing the recording signal from said magnetic tape; a plurality of erasing circuit means installed on said rotary drum to output erasing signal to each of said erasing heads; a plurality of reproduction circuit means connected to said reproduction magnetic heads respectively and installed on said rotary drum so that the reproduction circuit means are selectively gone to active state and non-active state; at least one rotary transformer connected to at least one of said reproduction circuit means and said erasing circuit means; and means for reproducing record signal from said magnetic tape through said reproduction magnetic heads, said reproduction circuit means, and said rotary transformer.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic view showing a basic arrangement of a scanner portion of a magnetic recording and reproduction apparatus according to the first embodiment of the present invention;

FIG. 2 is a circuit diagram showing a practical circuit having the basic arrangement shown in FIG. 1;

FIG. 4 is a circuit diagram showing a basic arrangement of a circuit for increasing an impedance of an output from the reproduction circuit;

FIG. 6 is a schematic view showing a basic arrangement of a scanner portion of a magnetic recording and reproduction apparatus according to the second embodiment of the present invention;

FIG. 7 is a circuit diagram showing a practical circuit having the arrangement shown in FIG. 6;

FIG. 8 is a timing chart showing a series of time sequences of a switching operation for recording and reproduction circuits of the apparatus shown in FIGS. 6 and 9;

FIG. 9A and 9B show a basic arrangement according to a first arrangement of a selective switching device, used in the first embodiment of the present invention shown in FIGS. 1 and 2, for generating a timing signal for performing switching upon each 180° rotation, in which FIG. 9A is a schematic sectional view of a cylinder system and FIG. 9B is a schematic plan view thereof;

FIGS. 12A and 12B show a basic arrangement according to a second arrangement of the selective switching device for generating a timing signal for performing switching upon each 180° rotation, in which FIG. 12A is a schematic sectional view of a cylinder system and FIG. 12B is a schematic plan view thereof;

FIG. 13 is a schematic view showing an arrangement of a reflection type photo sensor for explaining a principle of the present invention;

FIGS. 14A and 14B show a basic arrangement according to a third arrangement of the selective switching device for generating a timing signal upon each 180° rotation;

FIG. 15 is a schematic view for explaining an arrangement of a rotary transformer portion of one channel and its peripheral circuit associated with the recording system according to the first embodiment of the present invention;

FIG. 16 is a schematic view for explaining an arrangement of a rotary transformer portion of one channel and its peripheral circuit associated with the reproduction system according to the first embodiment of the present invention;

FIG. 17 is a schematic view for explaining an arrangement of a rotary transformer portion of one channel and its peripheral circuit associated with the recording and reproduction systems according to the second embodiment of the present invention;

FIG. 21 is a schematic view for explaining an arrangement of a main part of the fourth embodiment of the present invention using, for recording, a rotary transformer unit having a rotary member as shown in FIG. 18 and a stationary member in which a winding is wound in a winding slot;

FIG. 22 is a timing chart showing a series of sequences of an operation associated with switching of a reproduction circuit according to the embodiment shown in FIG. 21;

FIGS. 25 and 26 are sectional views for explaining problems of a rotary transformer apparatus for performing signal transmission between a rotary member and a stationary member in which a plurality of windings are wound in a single slot of one member while a single winding is wound in a slot of the other member;

FIG. 27 is a sectional view schematically showing an arrangement of the sixth embodiment of the present invention for solving problems of a rotary transformer apparatus for performing signal transmission between a rotary member and a stationary member in which a plurality of windings are wound in a single slot of one member while a single winding is wound in a slot of the other member;

FIG. 31 is a sectional view schematically showing an arrangement of the tenth embodiment of the present invention for solving problems of a rotary transformer apparatus for performing signal transmission between a rotary member and a stationary member in which a plurality of windings are wound in a single slot of one member while a single winding is wound in a slot of the other member;

FIG. 32 is a sectional view schematically showing an arrangement of the 11th embodiment of the present invention for solving problems of a rotary transformer apparatus for performing signal transmission between a rotary member and a stationary member in which a plurality of windings are wound in a single slot of one member while a single winding is wound in a slot of the other member;

FIG. 33 is a plan view schematically showing an arrangement of one member shown in FIG. 31;

FIG. 34 is a sectional view schematically showing an arrangement of the 12th embodiment of the present invention;

FIG. 35 is a sectional view schematically showing an arrangement of the 13th embodiment of the present invention;

FIG. 36 is a sectional view schematically showing an arrangement of the 14th embodiment of the present invention;

FIG. 37 is a sectional view schematically showing an arrangement of the 15th embodiment of the present invention;

FIG. 38 is a sectional view schematically showing an arrangement of the 16th embodiment of the present invention;

FIG. 39 is a sectional view schematically showing an arrangement of the 17th embodiment of the present invention;

FIG. 43 is a sectional view schematically showing an arrangement of the 21st embodiment of the present invention;

FIG. 44 is a sectional view schematically showing an arrangement of the 22nd embodiment of the present invention and;

FIG. 45 is a sectional view schematically showing an arrangement of the 23rd embodiment of the present invention;

FIG. 51 is a top view of the winding according to a modified embodiment of the rotary transformer;

FIG. 52 is a top view of the winding according to another modified embodiment of the rotary transformer;

FIG. 59 is a timing chart for describing the operation of the erasing circuits in FIG. 58;

FIGS. 60A and 60B show a detection system for switching erasing circuits;

FIG. 61 shows a flip-flop circuit to control switching of erasing circuits;

FIGS. 63A and 63B show a detection system for switching the erasing circuits according to another modified embodiment;

FIG. 64 shows a photodetector used for switching erasing circuits;

FIGS. 65A and 65B show a detection system for switching the erasing circuits according to the third modified embodiment;

FIG. 69 is a schematic block diagram of the rotary drum of a magnetic recording/reproduction apparatus provided with the erasing heads according to another embodiment with the tape lap angle of 120°;

FIG. 70 is a circuit diagram of a circuit for switching the erasing and recording circuits installed on the rotary drum in FIG. 69;

FIG. 71 is a timing chart for describing the operation of the circuit in FIG. 70;

FIGS. 72A and 72B show a detection system for switching the erasing and recording circuits according to another modified embodiment;

FIG. 74 is a schematic block diagram of the rotary drum of a magnetic recording/reproduction apparatus provided with the erasing heads according to another embodiment;

FIG. 75 is a circuit diagram of a circuit for switching the erasing, recording, and reproduction circuits installed on the rotary drum in FIG. 74;

FIGS. 78A through 83B show the rotary drums with variously-arranged recording magnetic heads and the recording signals corresponding to them;

FIG. 84 is a circuit diagram of a recording apparatus using a rotary transformer with several winding in one slot;

FIG. 85 is a circuit diagram of a multiple-channel reproduction apparatus using one rotary transformer;

FIGS. 94A through 95B show the rotary drums with variously-arranged reproduction magnetic heads and the reproduction signals corresponding to them;

FIGS. 97 through 106 show circuit diagrams of various magnetic recording/reproduction apparatuses using magnetic heads dedicated to recording and those dedicated to reproduction; and FIGS. 107 through 118 show circuit diagrams of various magnetic recording/reproduction apparatuses using magnetic heads for both recording and reproduction.

FIG. 119 is a circuit diagram of the scanner section of a magnetic recording/reproduction apparatus using a rotary transformer with a plurality of windings in a single winding slot;

FIGS. 120A and 120B are block diagrams of a recording system and a reproduction system of a magnetic recording/ reproduction apparatus using a rotary transformer with a plurality windings in a single winding slot;

FIG. 121 is a circuit diagram of the scanner section of a magnetic recording/reproduction apparatus using a rotary transformer with a plurality windings in a single winding slot;

FIG. 128 is a sectional view of a scanner taken along line A—A of FIG. 127;

FIG. 129 is a sectional view of a coaxial rotary transformer;

FIG. 130 is a sectional view of a double coaxial rotary transformer;

FIG. 131 is a sectional view of another double coaxial rotary transformer;

FIG. 137 is a view showing a mounting arrangement of an LED array;

FIG. 138 is a view showing a mounting arrangement of an LED array;

FIG. 140 is a view showing a mounting arrangement of an LED array;

FIGS. 142A and 142B are connection diagrams of an LED array;

FIG. 145 is a block diagram showing a construction of the full-wave rectifying RF detector of FIG. 144;

FIG. 146 is an illustration of operating waveform charts for various parts of FIG. 145;

FIG. 147 is a block diagram showing another construction of the full-wave rectifying RF detector of FIG. 144;

FIG. 148 is operating waveform charts for various parts of FIG. 147;

FIG. 149 is a block diagram showing another construction of the full-wave rectifying RF detector of FIG. 144;

FIG. 150 is an illustration of operating waveforms for various parts of FIG. 149;

FIG. 151 is a block diagram showing another construction of the full-wave rectifying RF detector of FIG. 144;

FIG. 152 is an illustration of operating waveforms for various parts of FIG. 151 with respect to a sine-wave RF signal;

FIG. 153 is an illustration of operating waveforms for various parts of FIG. 151 with respect to a square-wave RF signal;

FIG. 154 is a block diagram showing another construction of the full-wave rectifying RF detector of FIG. 144;

FIG. 155 is an illustration of operating waveforms for various parts of FIG. 154;

FIG. 156 is a block diagram showing the construction of a recording circuit with a 180° switching control function according to the present invention;

FIG. 157 is a time chart for the operation of the FIG. 156 recording circuit during normal recording;

FIG. 158 is a time chart for the operation of the FIG. 156 recording circuit during insert recording;

FIG. 159 is a block diagram showing the construction of a recording circuit with a 180° switching control function according to the present invention;

FIG. 160 is a time chart for the operation of the FIG. 159 recording circuit during normal recording;

FIG. 161 is a time chart for the operation of the FIG. 159 recording circuit during insert recording;

FIG. 162 is a block diagram showing the construction of a recording circuit with a 180° switching control function according to the present invention;

FIG. 163 is a time chart for the operation of the FIG. 162 recording circuit during normal recording;

Figure 162:
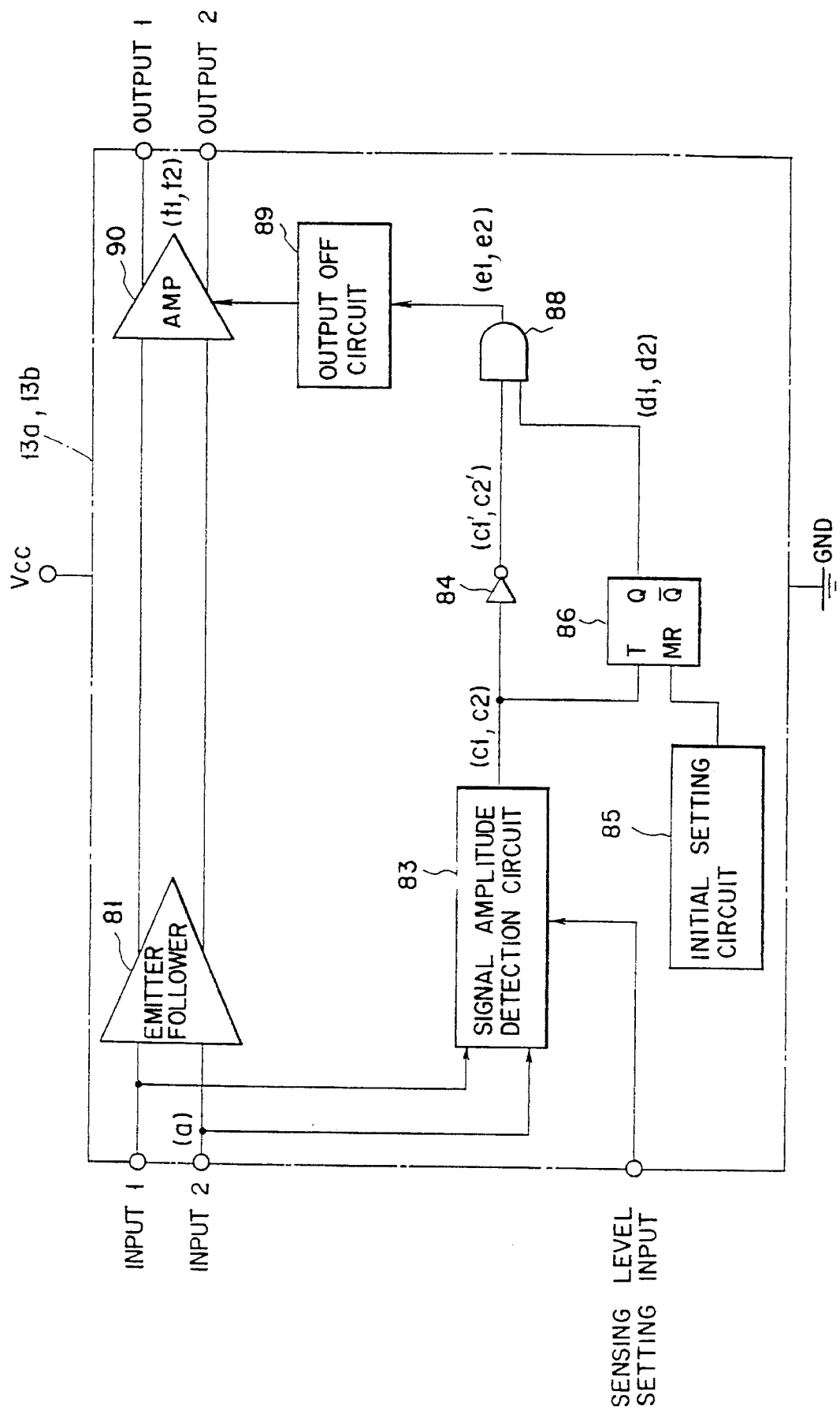
Figure 164:
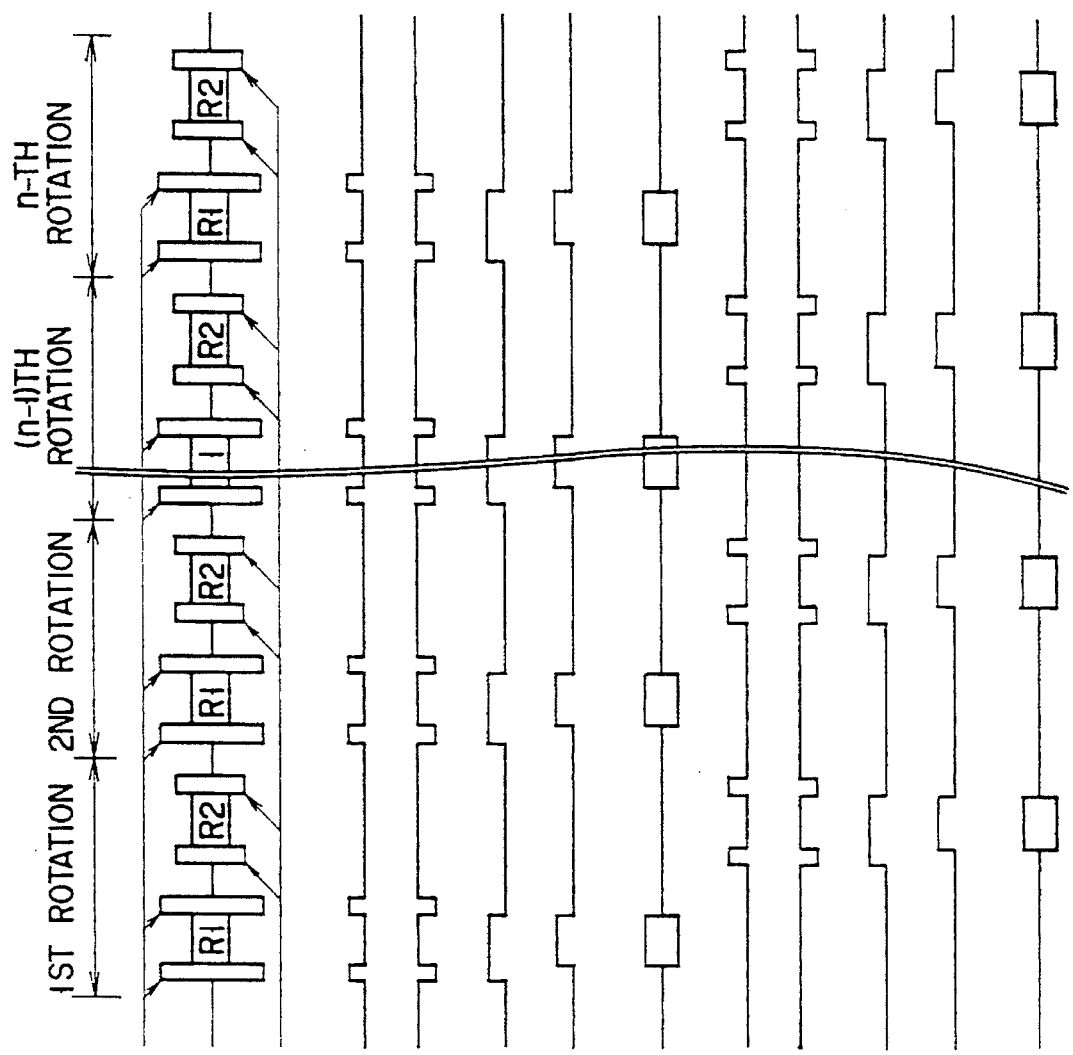
Figure 165:
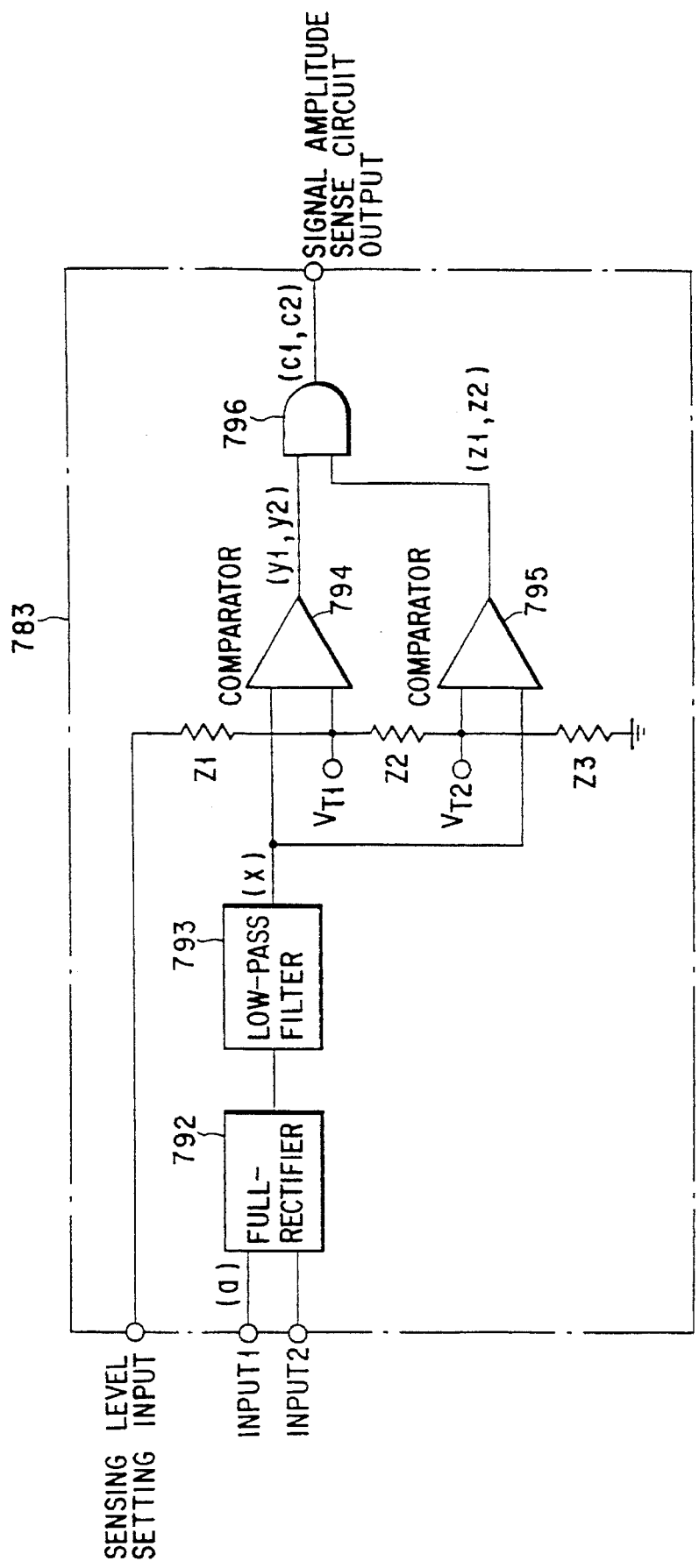
Figure 166:
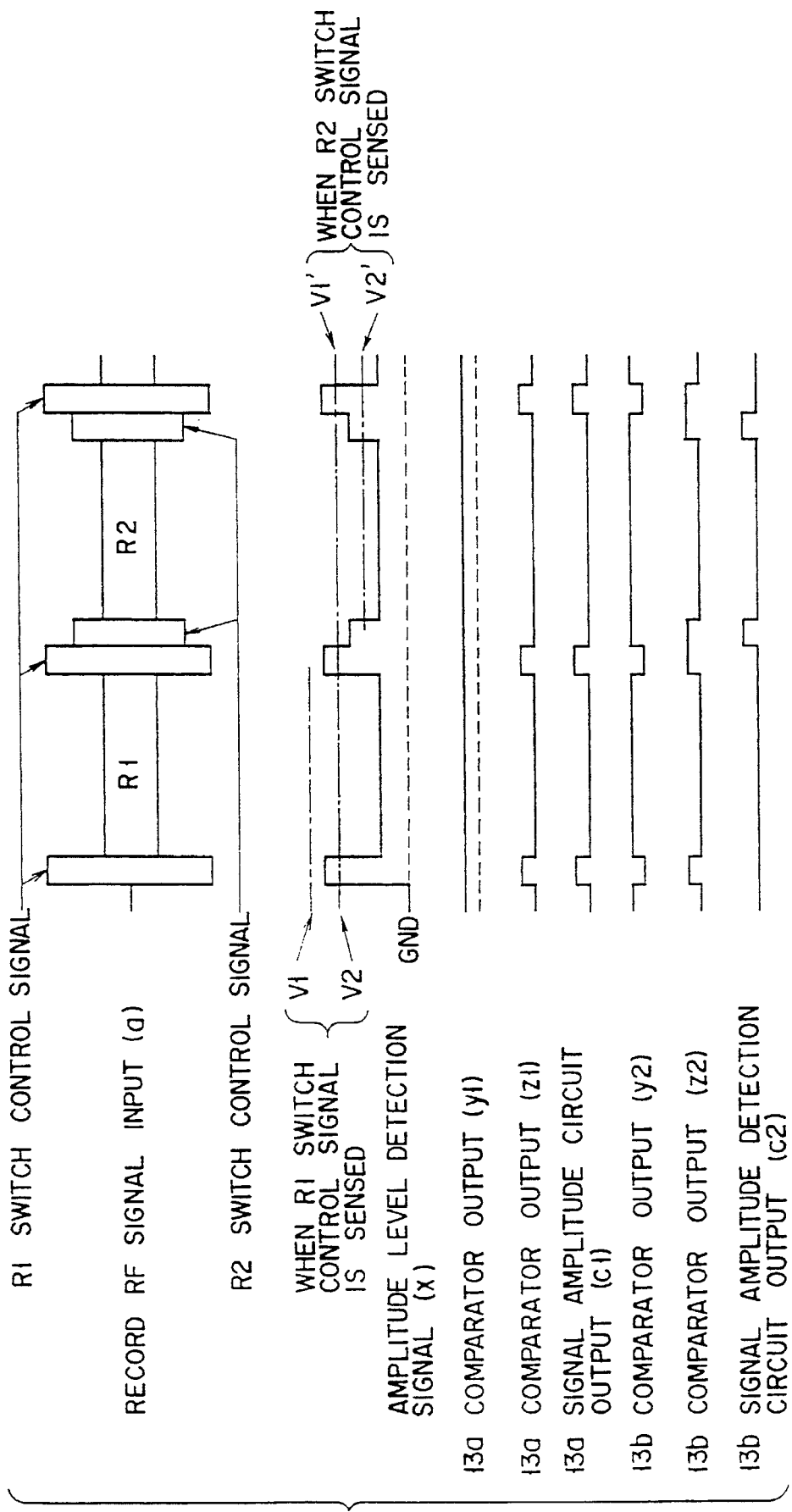
Figure 167:
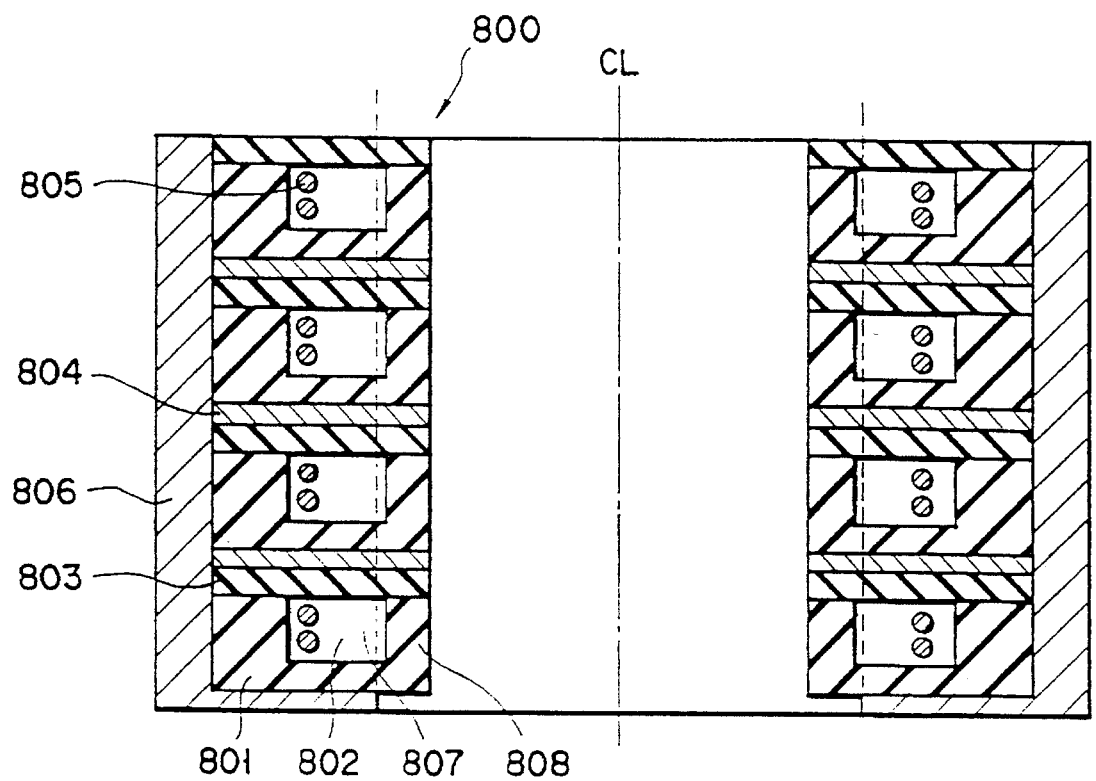
Figure 168:
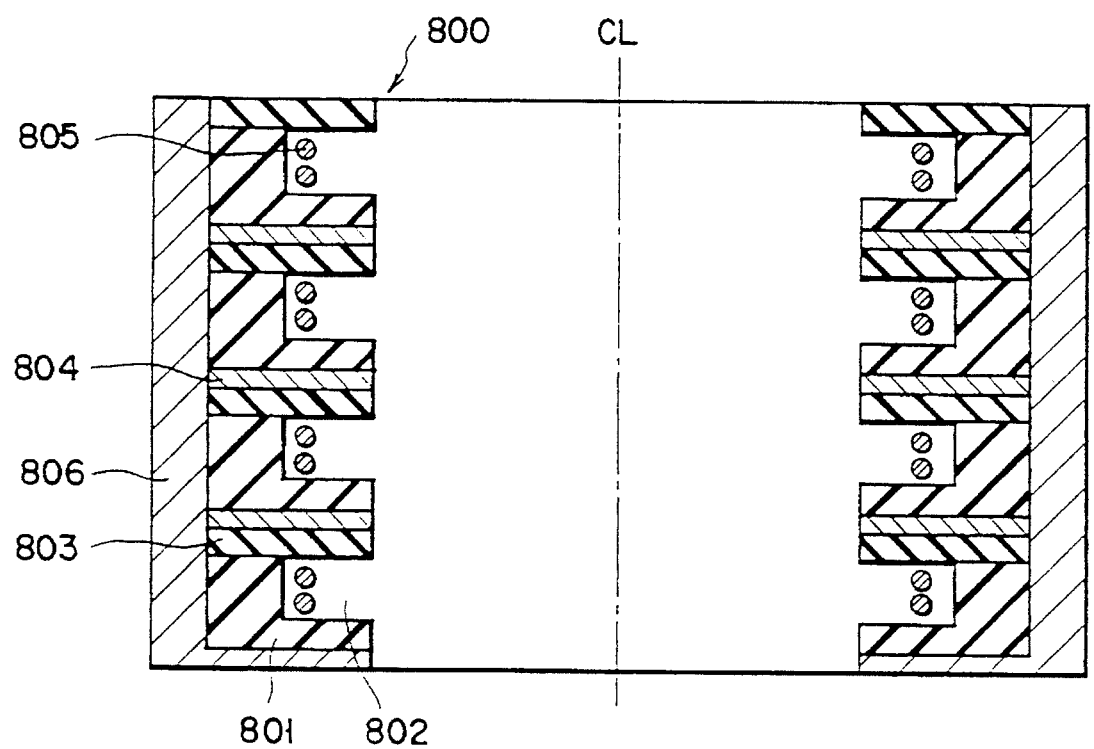
Figure 169A:
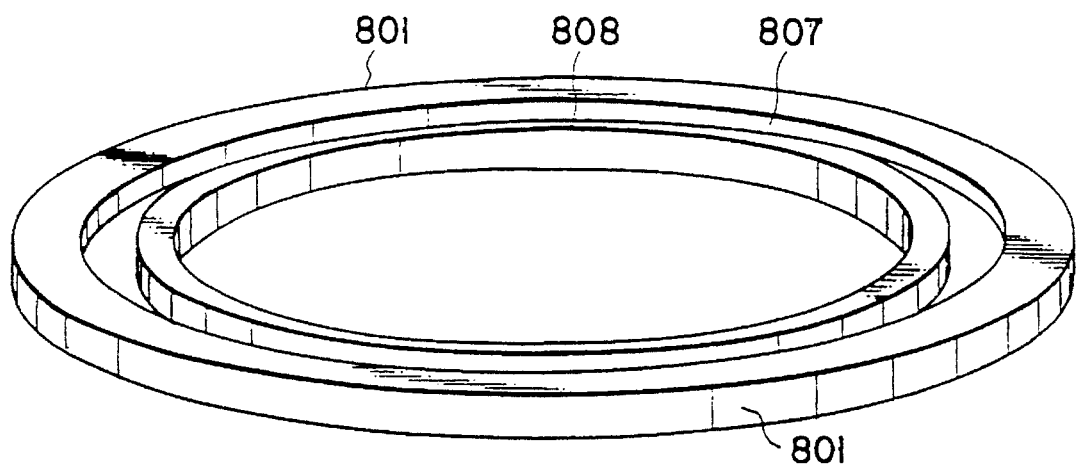
Figure 169B:
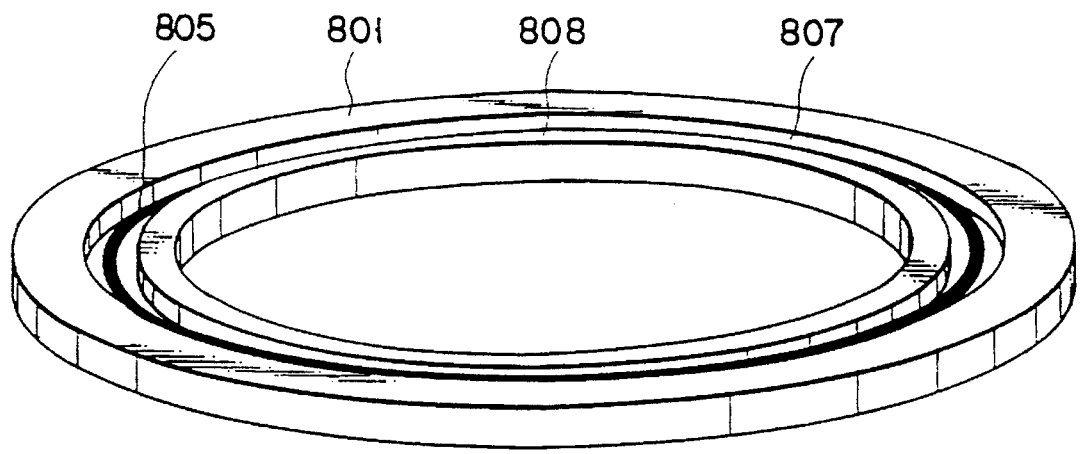
Figure 169C:
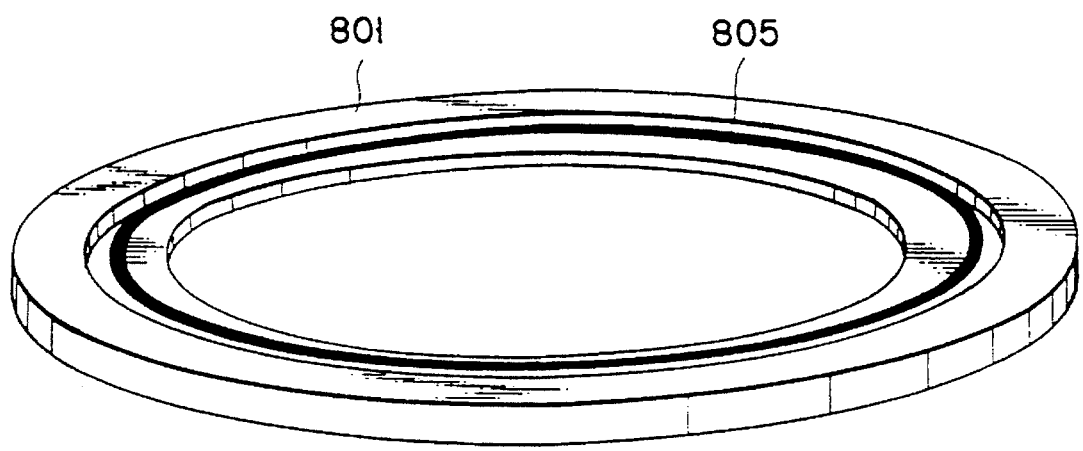
Figure 172:
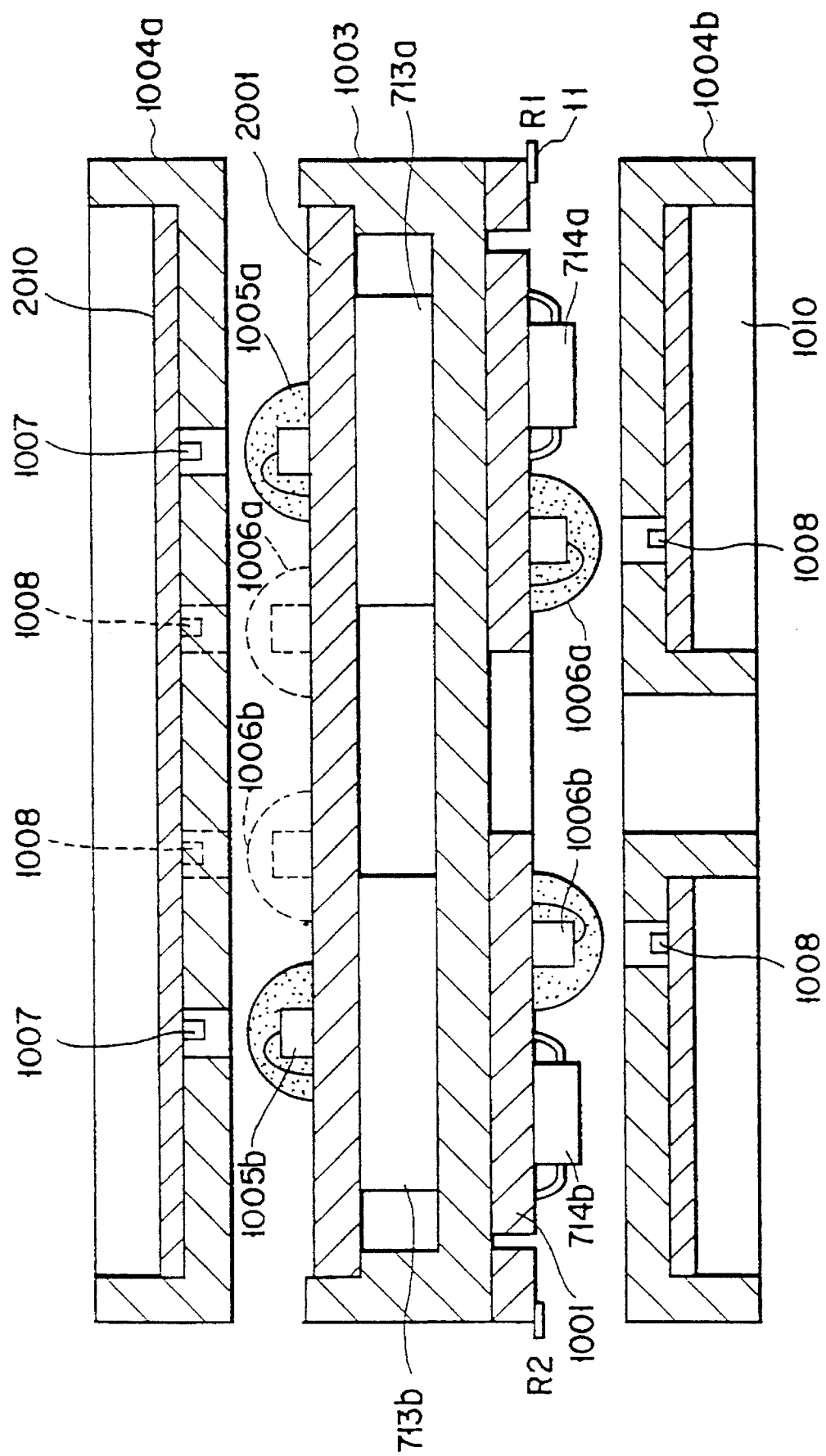
Figure 171:
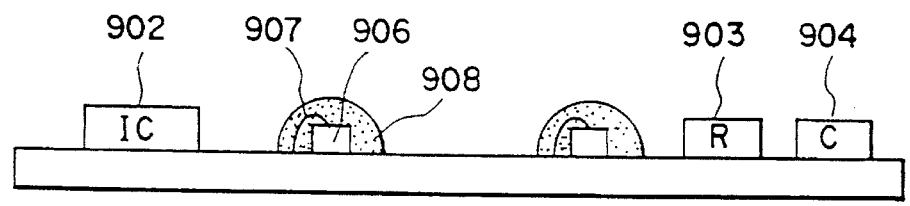

FIG. 164 is a time chart for the operation of the FIG. 162 recording circuit during insert recording;

FIG. 165 is a block diagram showing a construction of the FIG. 162 is signal amplitude sense circuit;

FIG. 166 is a time chart for the operation of the signal amplitude sense circuit of FIG. 165;

FIG. 167 is a sectional view for explaining a manufacturing method of coaxial rotary transformer apparatuses according to the present invention;

FIG. 168 is a sectional view of a coaxial rotary transformer apparatus;

FIG. 169A through 169C are perspective view for explaining the manufacturing processes of coaxial rotary transformer apparatuses according to the present invention;

FIG. 170A through 170D are views for explaining the construction of the reproduction circuit board unit in the scanner section of the present invention and its manufacturing processes;

FIG. 171 is a view of another example of the reproduction circuit board unit;

FIG. 172 is a sectional view showing a mounting arrangement of a recording circuit board unit, a reproduction circuit board unit, a recording LED array, a recording photodetector, a reproduction LED array, and a reproduction photodetector.

DETAILED DESCRIPTION OF THE PREFERRED EMBODIMENTS

Embodiments of the present invention will be described in detail below with reference to the accompanying drawings.

Figure 3:
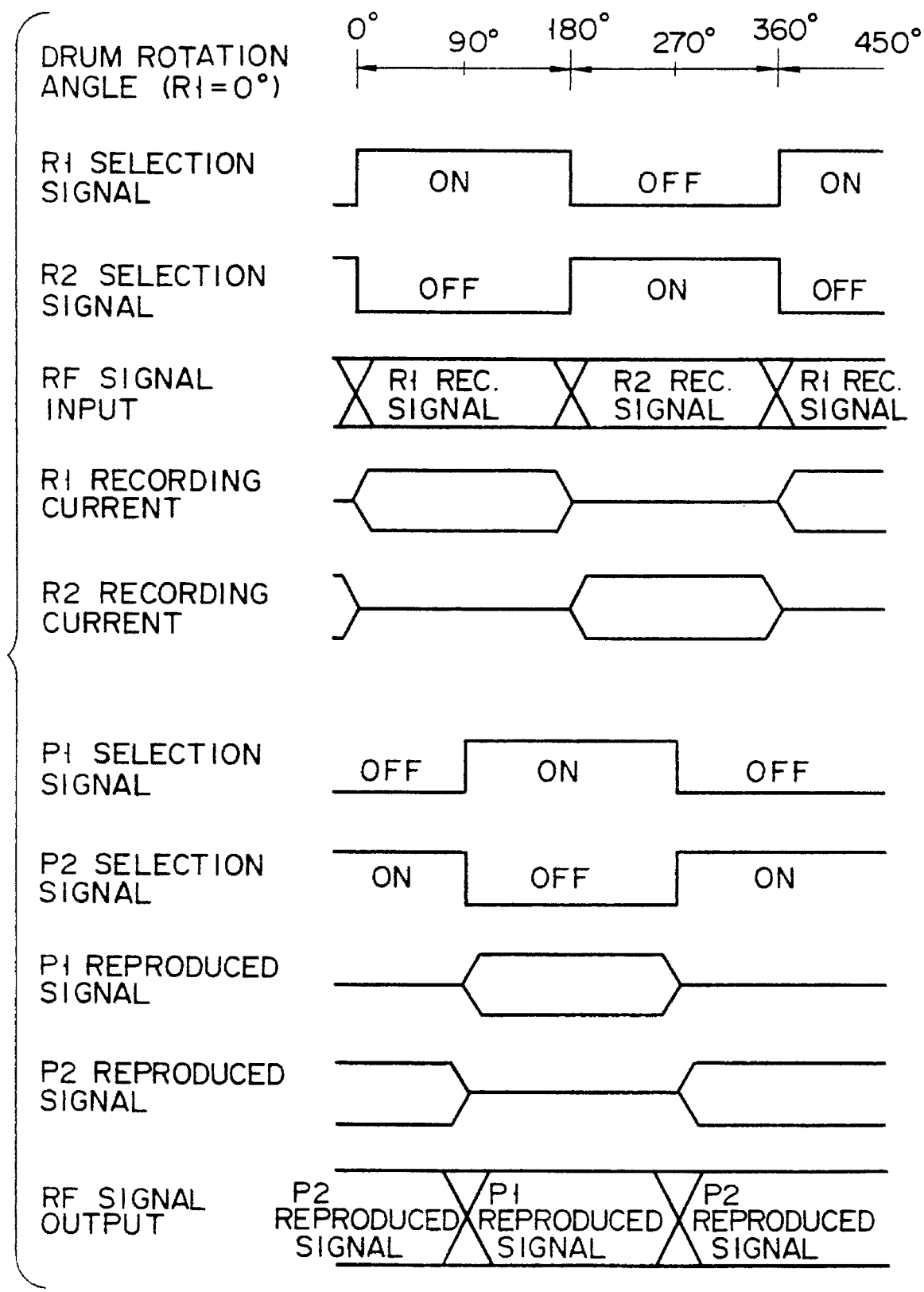
FIG. 3 is a timing chart showing a series of time sequences of a switching operation for recording and reproduction circuits in the apparatus shown in FIGS. 1 and 2.

FIG. 1 schematically shows a basic arrangement of a scanner portion of a magnetic recording and reproduction apparatus according to the first embodiment of the present invention. FIG. 2 shown a practical circuit having the arrangement shown in FIG. 1 and FIG. 3 shows a series of time sequences of a switching operation of the recording and reproduction circuits.

In the first embodiment, assume that an effective recording area angle of a magnetic tape 2 is 180°. The magnetic tape 2 is wound around the circumferential surface of a rotary drum of a scanner 1. The tape 2 is in contact with the circumferential surface of the rotary drum through 180°. This contact portion serves as an effective recording area of an information signal of the tape 2.

A recording circuit 3a amplifies an information signal supplied from a rotary transformer 6a (shown in FIG. 2) and supplies the amplified signal to a recording magnetic head R1, thereby driving the magnetic head R1. A recording magnetic head R2 is arranged at a position shifted from the magnetic head R1 by 180° so that the rear surfaces of the two heads oppose each other. The magnetic head R2 is driven by a recording circuit 3b having an input side commonly connected to the recording circuit 3a. The information signal is reproduced from the magnetic tape 2 to a reproduction magnetic head P1, amplified by a reproduction circuit 4a, and transmitted outside the rotary drum by a a rotary transformer 6b (shown in FIG. 2) connected to the output side of the reproduction circuit 4a. A reproduction magnetic head P2 is arranged at a position shifted from the magnetic head P1 by 180° so that the rear surfaces of the two heads oppose each other. An information signal reproduced by the magnetic head P2 is amplified by a reproduction circuit 4b having an output side commonly connected to the reproduction circuit 4a.

An information signal (to be referred to as an "RF signal" hereinafter) to be recorded in a magnetic tape is amplified by a rotary transformer driving circuit 5 as an amplifier and transmitted to the rotary drum portion by the rotary transformer 6a. The RF signal to be input to the rotary transformer driving circuit 5 includes both information signals to be recorded by the magnetic heads R1 and R2. The recording circuits 3a and 3b have input sides commonly connected to the rotary transformer 6a. As shown in FIG. 3, the recording circuits 3a and 3b are alternately switched to enable and disable states upon each 180° rotation by R1 and R2 selection signals having opposite phases, respectively. The recording circuit 3a (3b) amplifies the input RF signal in its enable state and drives the magnetic head R1 (R2) by the amplified RF signal, thereby recording the RF signal corresponding to an R1 (R2) recording current in a magnetic tape.

Reproduction of the RF signal recorded in the magnetic tape will be described below. The RF signals reproduced from the magnetic tape by the magnetic heads P1 and P2 are amplified by the reproduction circuits 4a and 4b, respectively. The rotary transformer 6b commonly connected to the output sides of both the reproduction circuits 4a and 4b is driven to transmit the reproduced RF signals outside the rotary drum portion. As shown in FIG. 3, the reproduction circuits 4a and 4b are alternately switched to enable and disable states upon each 180° rotation by P1 and P2 selection signals having opposite phases, respectively. P1 and P2 reproduced signals as reproduced RF signals reproduced from the magnetic heads P1 and P2 in the enable state are transmitted outside the rotary drum portion by the commonly connected rotary transformer 6b. The P1 and P2 reproduced signals transmitted from the rotary transformer 6b are received by a rotary transformer receiving circuit 7, amplified as needed, and transmitted to the following circuit as an RF signal output. The RF signal output supplied from the rotary transformer receiving circuit 7 upon this switching operation includes both the RF signals reproduced from the magnetic heads P1 and P2, i.e., both the P1 and P2 reproduced signals.

A method of reducing the number of channels of the rotary transformers 6a and 6b will be described below.

The input sides of the recording circuits 3a and 3b are commonly connected to the rotary transformer. Therefore, in order to prevent degradation in frequency characteristics of the recording circuits 3a and 3b, emitter followers or Darlington emitter followers are used as circuits of input stages of the circuits 3a and 3b so as to increase their input impedances. The outputs of the reproduction circuits 4a and 4b are commonly connected to the rotary transformer. Therefore, in order to prevent degradation in frequency characteristics of one of the reproduction circuits 4a and 4b in an enable state, an output of the other reproduction circuit in a disable state is kept in a high-impedance state.

For example, the circuit shown in FIG. 4 is used to cause the output impedance of the reproduction circuit to be high. Although the outputs of the reproduction circuits according to this embodiment are balanced outputs, only one side output is shown to simplify the explanation. In a reproduction circuit of this type, an emitter follower or a Darlington emitter follower is normally used as an output stage in order to obtain sufficient driving power against a load. Referring to FIG. 4, a transistor Q1 having an emitter follower connection is used. A transistor Q2, a diode D1, and resistors Z1 and Z2 constitute a constant current circuit for flowing a constant current to the emitter follower transistor Q1. Switching between enable and disable states of the emitter follower is performed by transistors Q3 and Q4 and an inverter IN1. When a selection signal is at "H" (high level), the bases of the transistors Q3 and Q4 go to "L" (low level). Therefore, the transistors Q3 and Q4 are turned off, and the emitter follower of the transistor Q1 operates to output an RF signal. When the selections signal is at "L", the bases of the transistors Q3 and Q4 go to "H". Therefore, the transistors Q3 and Q4 are turned on, and the base of the emitter follower transistor Q1 goes to "L". Therefore, the transistor Q1 is turned off to set its output in a high-impedance state.

A method of simplifying a circuit by adopting the arrangement of this embodiment will be described below.

Figures 5A, 5B:
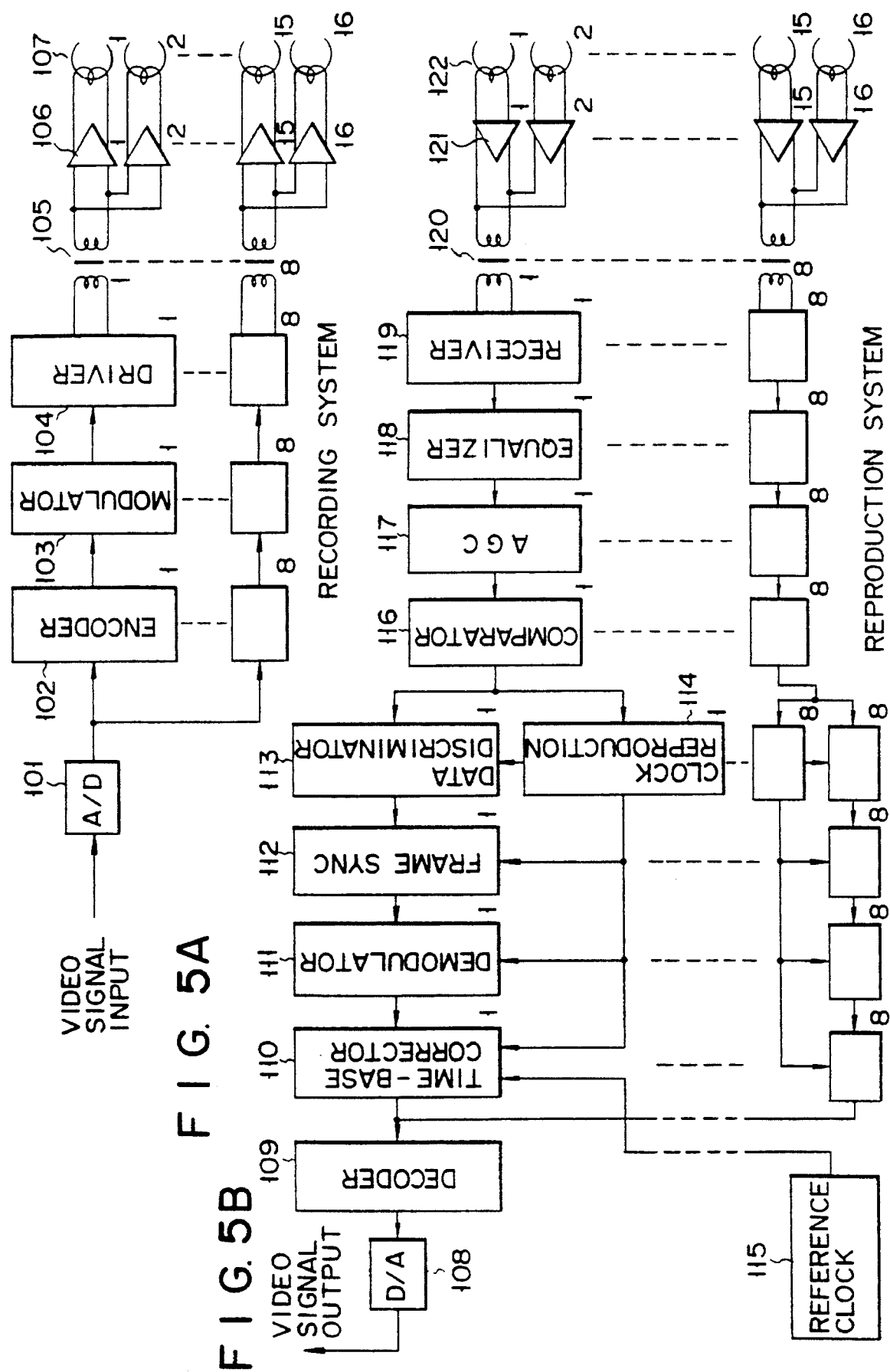
FIGS. 5A and 5B are block diagrams showing basic circuit arrangements of recording and reproduction systems, respectively, of the magnetic recording and reproduction apparatus according to the first embodiment of the present invention.

FIGS. 5A and 5B show circuits of recording and reproduction systems adopting this embodiment, respectively.

Each arrangement has 16 heads by a so-called 180° lap in which two heads of each pair are arranged through 180° so that their rear surfaces oppose each other. An input video signal is converted into a digital signal by an A/D (analog-to-digital) converter 101, and the converted digital signal is distributed to and encoded by eight encoders 102. Each of the eight divided signals is input to a stator side of a corresponding one of eight rotary transformers 105 via a corresponding pair of eight modulators 103 and eight rotary transformer drivers 104. 16 recording heads 107 provided at rotor sides of the rotary transformers 105 are connected to recording amplifiers 106 and to the rotor sides of the eight rotary transformers 105 by the arrangement as described above.

In a circuit of the reproduction system according to this embodiment shown in FIG. 6B, only eight rotary transformers 120 are required for 16 reproduction heads 122, and the number of each of rotary transformer receivers 119, equalizers 118, AGC (automatic gain controllers) circuits 117, and comparators 116 for analog-to-digital conversion is only eight. In FIG. 6B D/A (digital-to-analog) converter 108, decoder 109, time-base correctors 110, demodulators 111, frame synchronization circuits 112, data discriminators 113, clock reproduction circuits 114, reference clock generator 115 and reproduction amplifiers 121 are also shown.

FIG. 6 shows a schematic basic arrangement of a scanner portion of a magnetic recording and reproduction apparatus according to the second embodiment of the present invention. FIG. 7 shows a practical circuit having the arrangement shown in FIG. 6. Similar to the above first embodiment, a magnetic tape 2 is wound around the circumferential surface of a rotary drum of a scanner 1. The tape 2 is in tight contact with the circumferential surface of the rotary drum through 180°, and this contact portion serves as an effective recording area of an information signal of the tape 2. In this embodiment, recording and reproduction circuits are commonly connected to a rotary transformer. A recording circuit 3a amplifies an information signal supplied from a rotary transformer 6a and supplies the amplified signal to a magnetic head R1, thereby driving the recording magnetic head R1 by the information signal. A reproduction magnetic head P1 is arranged at a position on the rotary drum shifted from the magnetic head by 180°. An information signal reproduced from the magnetic tape by the magnetic head P1 is amplified by a reproduction circuit 4a and transmitted outside the rotary drum via the rotary transformer 6a connected to the output of the reproduction circuit 4a. A recording magnetic head R2 is driven by a recording circuit 3b. A reproduction magnetic head P2 is arranged at a position shifted from the magnetic head R2 by 180°. An information signal is amplified by a reproduction circuit 4b having an output side commonly connected to the input side of a recording circuit 3b. A rotary transformer 6b is used to transmit an RF signal to the recording circuit 3b and to transmit an RF signal outside the rotary drum portion from the reproduction circuit 4b.

An information signal to be recorded in a magnetic tape, i.e., an RF signal is amplified by a rotary transformer driving circuit 5a and transmitted into a rotary drum by a rotary transformer 6a. A recording circuit 3a having an input side connected to the rotary transformer 6a is sequentially switched between enable and disable states upon each 180° rotation by an R1 selection signal (to be described later). When the recording circuit 3a is in the enable state, a magnetic head R1 is driven to record the RF signal in the magnetic tape.

Reproduction of the RF signal from the magnetic tape will be described below. The RF signal reproduced from the magnetic tape by a magnetic head P1 is amplified by a reproduction circuit 4a and supplied to the rotary transformer 6a to which the output side of the reproduction circuit 4a and the input side of the recording circuit 3a are commonly connected. The rotary transformer 6a transmits the reproduced RF signal supplied from the reproduction circuit 4a to outside the rotary drum. The reproduction circuit 4a is sequentially switched between enable and disable states upon each 180° rotation by a P1 selection signal P1. When the reproduction circuit 4a is in the enable state, the RF signal reproduced from the magnetic head P1 is transmitted outside the rotary drum by a rotary transformer 6b. The reproduced RF signal transmitted from the rotary transformer 6b is received by a rotary transformer receiving circuit 7b and transmitted to a circuit at a subsequent stage. Note that an operation of a system of a rotary transformer driving circuit 5b, the rotary transformer 6b, a recording circuit 3b, a reproduction circuit 4b, and the rotary transformer receiving circuit 7b is similar to that of the above circuit.

An arrangement of an output circuit of the reproduction circuit 4 and the rotary transformer receiving circuit 7 may be the same as that of the circuit shown in FIG. 4. Note that a circuit associated with switching selection of the rotary transformer receiving circuit 7 is not shown.

FIG. 8 shows a series of time sequences of a switching operation of the above recording and reproduction circuits.

A method of sequentially switching the recording or reproduction circuit upon each 180° rotation and a device therefor (to be referred to as a "selective switching device" hereinafter) will be described below.

Figure 9A:
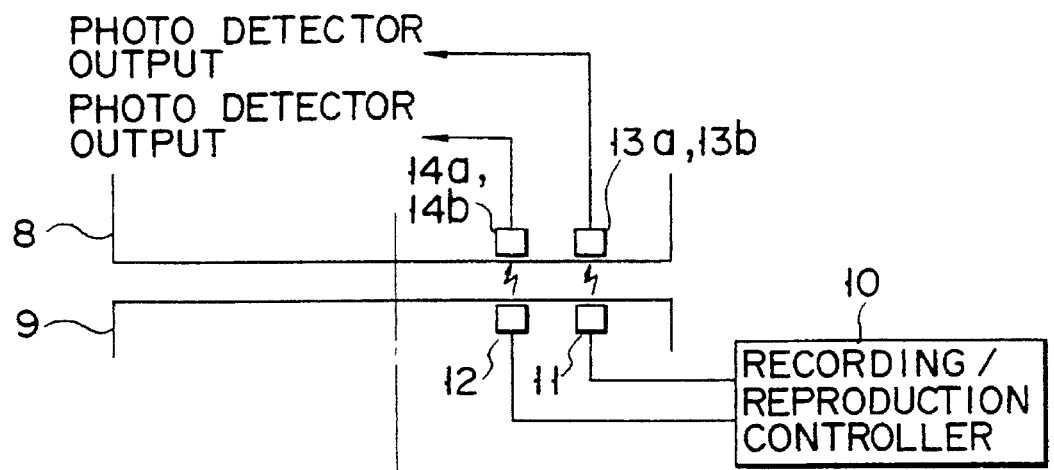
Figure 9B:
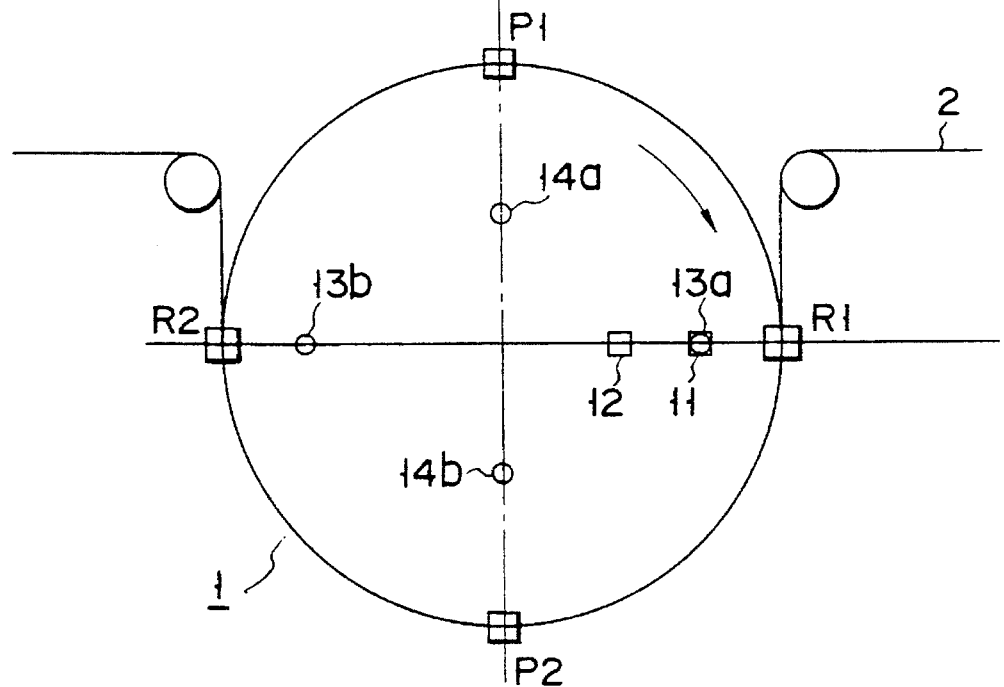

FIGS. 9A and 9B show a basic arrangement of a first arrangement of a selective switching device according to the first embodiment of the present invention described above. FIG. 9A is a schematic sectional view showing a scanner (cylinder system), and FIG. 9B is a schematic plan view of the system.

A rotary drum 8 has photodetectors 13a, 13b, 14a, and 14b, and a stationary drum 9 has a recording LED (light-emitting diode) 11 and a reproduction LED 12. A recording circuit is controlled by the recording LED 11 at the stationary drum 9 side, a reproduction circuit is controlled by the reproduction LED 12, and the recording and reproduction LEDs 11 and 12 are controlled by a recording/reproduction controller 10. The photodetectors at the rotary drum 8 side for directly controlling the recording and reproduction circuits in response to control light from the recording and reproduction LEDs 11 and 12 are mounted in a rotation position corresponding to a rotation position of a recording and reproduction heads. That is, as shown in FIG. 9B, the photodetector 13a for controlling the recording circuit of a magnetic head R1 is provided at the same rotation position as that of the magnetic head R1, and the photodetector 13b for controlling the recording circuit of a magnetic head R2 is provided at the same rotation position as that of the magnetic head R2. The photodetector 14a for controlling the reproduction circuit of a magnetic head P1 is provided at the same rotation position as that of the magnetic head P1, and the photodetector 14b for controlling the recording circuit of a magnetic head P2 is provided at the same rotation position as that of the magnetic head P2.

Figure 10:
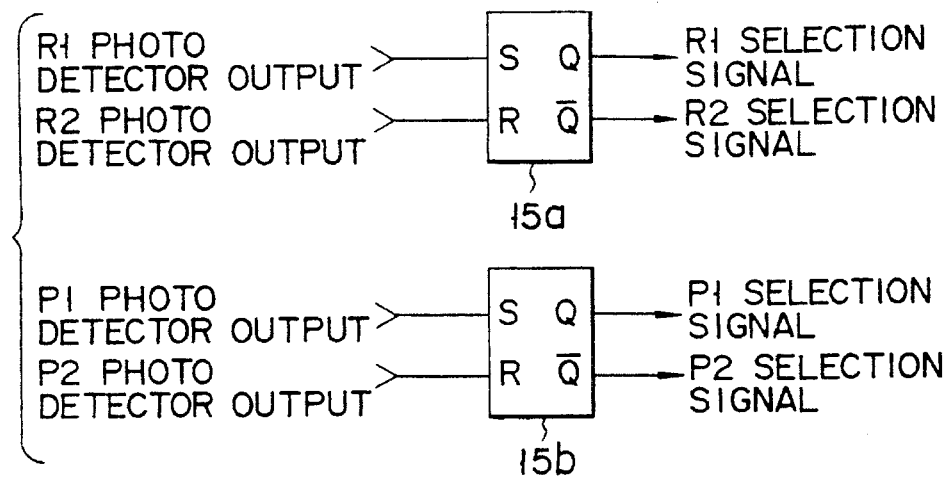
FIG. 10 is a block diagram showing an arrangement of a circuit for performing selective control in the embodiment shown in FIGS. 9A and 9B.
Figure 11:
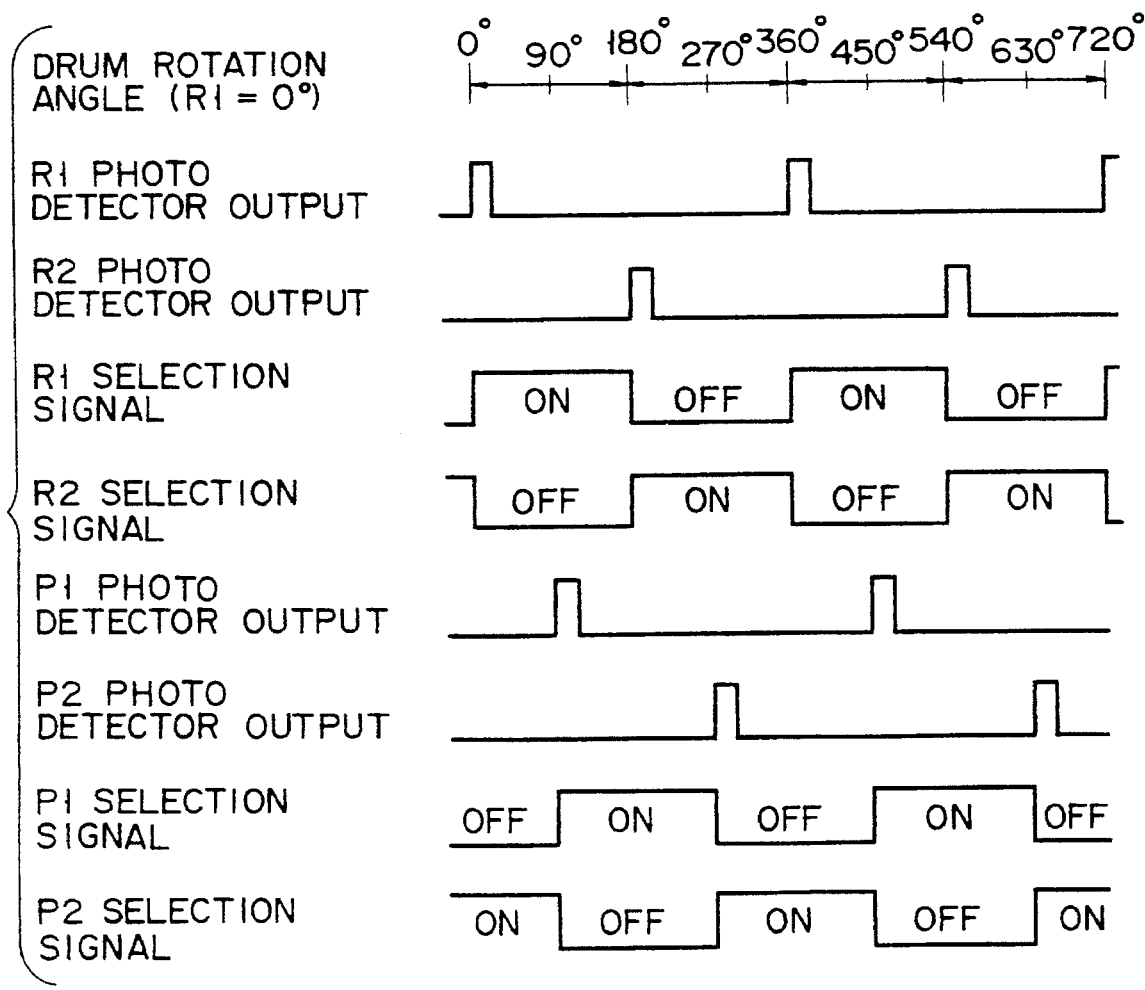
FIG. 11 is a timing chart showing a series of sequences of a switching operation in the embodiment shown in FIGS. 9A and 9B.

An operation of the selective switching device will be described below with reference to FIGS. 9A, 9B, and 10. FIG. 11 shows a series of time sequences of the switching operation of the selective switching device.

In order to simplify the explanation, assume that both the recording and reproduction LEDs 11 and 12 are turned on (to emit light) by the recording/reproduction controller 10.

A recording system will be described first. Referring to FIG. 9B, since the rotary drum 8 rotates in a direction indicated by an arrow and the positions of the photodetector 13a and the recording LED 11 coincide with each other, the photodetector 13a outputs an "H" signal. Therefore, since the output of the photodetector 13a is connected to the set input terminal of a set/reset flip-flop 15a, the "H" signal is output from the Q output terminal of the flip-flop 15a. when the rotary drum 8 further rotates in the direction indicated by the arrow shown in FIG. 9B, the output from the photodetector 13a goes to "L". when the rotary drum 8 rotates through 180°, an output from the photodetector 13b connected to the reset input terminal of the flip-flop 15a goes to "H". Therefore, a Q output from the flip-flop 15a goes to "L". Thereafter, Q and $\overline{Q}$ outputs from the flip-flop 15a sequentially, repeatedly go to "H" and "L" upon each 180° rotation of the rotary drum 8. The Q output of "H" level from the flip-flop 15a controls the R1 recording circuit to be in an enable state, while the Q outputs of "L" level controls the R1 recording circuit to be in a disable state. The $\overline{Q}$ output of "H" level from the flip-flop 15a controls the R2 recording circuit to be in an enable state, while the $\overline{Q}$ output of "L" level controls the R2 recording circuit to be in a disable state.

An operation of a circuit of the reproduction system is basically the same as that of the recording circuit. Note that the photodetector 14a starts its operation 90° after the photodetector 13a and the photodetector 14b starts its operation 90° after the photodetector 13b. Q and $\overline{Q}$ outputs from a set-reset flip-flop 15b sequentially go to "H" and "L" upon each 180° rotation of the rotary drum 8. When the Q output from the flip-flop 15b is at "H" level, the P1 reproduction circuit is set in an enable state. When the Q output is at "L" level, the P1 reproduction circuit is set in a disable state. When the $\overline{Q}$ output from the flip-flop 15b is at "H" level, the P2 reproduction circuit is set in an enable state. When the $\overline{Q}$ output is at "L" level, the P2 reproduction circuit is set in a disable state.

Note that the recording and reproduction LEDs 11 and 12 are ON/OFF-controlled in accordance with a mode of a VTR. That is, only the recording LED 11 is turned on in a recording mode, only the reproduction LED 12 is turned on in a reproduction mode, and both the recording and reproduction LEDs 11 and 12 are turned on in a simultaneous reproduction/recording mode.

Figure 12A:
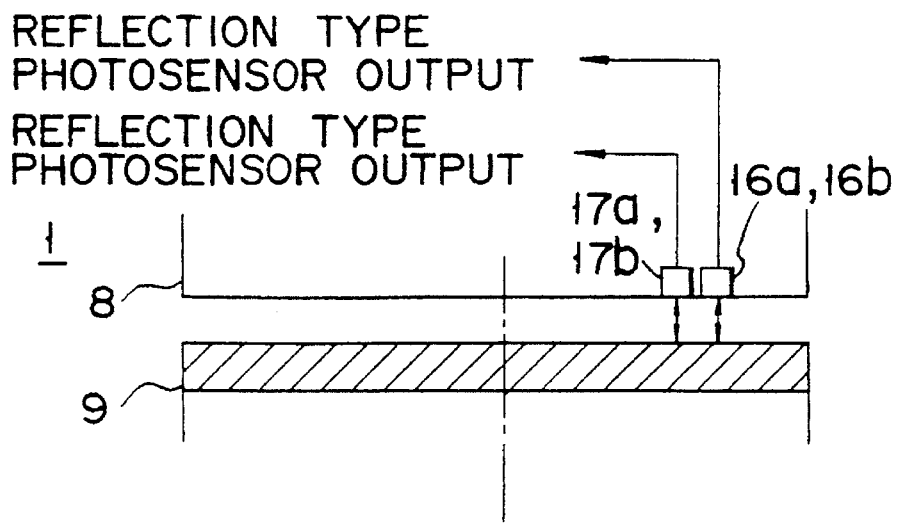
Figure 12B:
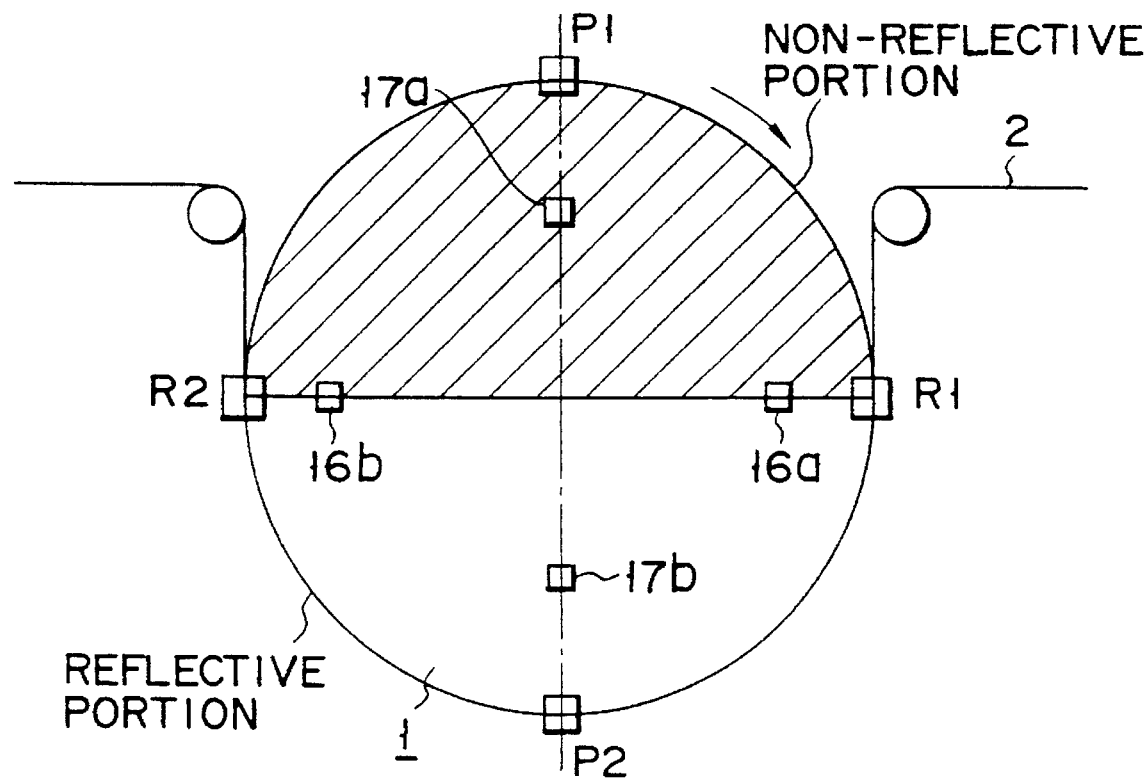

FIGS. 12A and 12B show a basic arrangement of a second arrangement of the selective switching device. FIG. 12A is a schematic sectional view showing a scanner system, and FIG. 12B is a schematic plan view of the system. In this arrangement, as shown in FIG. 12B, reflection type photo sensors 16a, 16b, 17a, and 17b for controlling recording and reproduction are mounted at a rotary drum 8 side at positions corresponding to magnetic heads R1, R2, P1, and P2, respectively. If an angle of an effective recording area is 180°, a reflective portion, e.g., a mirror is arranged at a recording side of a stationary drum 9, and a non-reflective portion which cannot be detected by a reflection type photo sensor is arranged at its nonrecording side. Note that each of the reflection type photo sensors 16a, 16b, 17a, and 17b is a unit constituted by an LED 18 and a photodetector 19 such as a photodiode or phototransistor as shown in FIG. 13. Various types of reflection type photo sensors are available. For example, an "H" signal is output when a reflective portion is present on an opposing surface, and an "L" signal is output when no reflective portion is present.

In this embodiment, an arrangement using a photo sensor which outputs the signals as described above is used. The rotary drum rotates in a direction indicated by an arrow shown in FIG. 12B, and the recording circuit of the magnetic head R1 is controlled by the reflection type photo sensor 16a and set in an enable state when it passes through a recording area side having a reflective portion. The recording circuit is set in a disable state when it passes through a non-reflective portion. Similarly, the recording circuit of the magnetic head R2 is controlled by the reflection type photo sensor 16b, the reproduction circuit of the magnetic head P1 is controlled by the reflection type photo sensor 17a, and the reproduction circuit of the magnetic head P2 is controlled by the reflection type photo sensor 17b. In this embodiment, the reflection type photo sensors 16a, 16b, 17a, and 17b generate a 180° selection signal which can be input directly to the recording or reproduction circuit. In this case, switching between recording and reproduction is performed by a signal supplied to the photo sensors 16a, 16b, 17a, and 17b via, e.g., a slip ring.

According to the arrangement of this embodiment, in the arrangement of the stationary drum side, a glass mask having a reflective portion corresponding to only an effective recording area need only be arranged, and a mechanism of the scanner is simplified.

FIGS. 14A and 14B show a basis arrangement of a third arrangement of the selective switching device. FIG. 14A is a schematic sectional view showing a cylinder system, and FIG. 14B is a schematic plan view of the system. In this arrangement, as shown in FIG. 14B, photodetectors 20a, 20b, 21a, and 21b for recording and reproduction are mounted in a rotary drum 8 at positions corresponding to magnetic heads R1, R2, P1, and P2, respectively. In a stationary drum 9, if an angle of an effective recording area is 180°, a plurality of recording LEDs and reproduction LEDs are densely arranged in an arcuated pattern each within a range corresponding to the effective recording area in correspondence with the photodetectors 20a, 20b, 21a, and 21b. In this embodiment, a plurality of LEDs for recording and reproduction are recording and reproduction LED arrays 22 and 23.

A recording circuit is controlled by the recording LED array 22 at the stationary drum side, a reproduction circuit is controlled by the reproduction LED array 23, and the recording and reproduction LED arrays 22 and 23 are controlled by a recording/reproduction controller 24. The photodetectors at the rotary drum side for directly controlling the recording and reproduction circuits in response to control light from the recording and reproduction LED arrays 22 and 23 are provided at positions corresponding to recording and reproduction heads as shown in FIG. 14B. The photodetector 20a for controlling the recording circuit of a magnetic head R1 is arranged at a position corresponding to the magnetic head R1, and the photodetector 20b for controlling the recording circuit of a magnetic head R2 at a position shifted from the magnetic head R1 by 180° is arranged at a position corresponding to the magnetic head R2. The photodetector 21a for controlling the reproduction circuit of a magnetic head P1 is provided at a position corresponding to the magnetic head P1, and the photodetector 21b for controlling the reproduction circuit of a magnetic head P2 at a position shifted from the magnetic head P1 by 180° is mounted in a position corresponding to the magnetic head P2.

An operation of the above selective switching device will be described below.

The rotary drum rotates in a direction indicated by an arrow shown in FIG. 14B, and the recording circuit of the magnetic head R1 is controlled by the photodetector 20a. That is, the recording circuit of the magnetic head R1 is set in an enable state while the photodetector 20a opposes the recording LED array 22 corresponding to the recording area, and set in a disable state while the photodetector 20a passes through a region in which the recording LED array 22 is not present. Similarly, the recording circuit of the magnetic head R2 is controlled by the photodetector 20b. The reproduction circuit of the magnetic head P1 is controlled by the photodetector 21a. That is, the reproduction circuit of the magnetic head P1 is set in an enable state while the photodetector 21a opposes the reproduction LED array 23 corresponding to the recording area, and set in a disable state while the photodetector 21a passes through a region in which the reproduction LED array 23 is not present. The reproduction circuit of the magnetic head P2 is controlled by the photodetector 21b. In this arrangement, the photodetectors 20a, 20b, 21a, and 21b generate a 180° selection signal which can be input directly to the recording or reproduction circuit.

According to the above arrangement, in the stationary drum, since a plurality of LEDs corresponding to the effective recording area need only be arranged, a mechanism of the cylinder system is simple.

Note that although an LED is used as a light-emitting element for use in recording/reproduction control in each of the above arrangements, another light-emitting element such as an EL (electro-luminescence), a semiconductor laser, or a plasma display may be used.

In the above embodiment, a rotary drum type VTR has been described. The present invention, however, can be applied to a VTR of a disc type or a medium drum type as another magnetic head mounting system.

In the above embodiment, switching is performed between a rotary transformer having one channel and a recording or reproduction circuit having two channels. Switching, however, can be similarly performed for a recording or reproduction circuit or a recording and reproduction circuit having more channels. For example, if a recording head and a recording circuit have eight channels, a reproduction head and a reproduction circuit have eight channels, and an effective recording area angle is 180°, a rotary transformer need only have eight channels.

As has been described above, by sequentially, selectively switching a recording or reproduction circuit or a recording and reproduction circuit between enable and disable states. The number of channels of a rotary transformer can be reduced to be 1/n (n=360/R: where R is the effective recording area angle and n is a natural number) the number of magnetic heads and recording circuits, magnetic heads and reproduction circuits, or magnetic heads and circuits for performing both recording and reproduction.

Since n recording or reproduction circuits or n recording and reproduction circuits are sequentially, selectively switched between enable and disable state, power consumption of the circuits can be reduced. In addition, by reducing the number of channels of a rotary transformer to be 1/n, a mechanism of a scanner portion can be simplified to improve reliability. As a result, the system can be made compact and light in weight at a low manufacturing cost, and the numbers of driver circuits and receiver circuits of the rotary transformer can be 1/n.

Furthermore, since the number of channels of the rotary transformer can be reduced to be 1/n, inertia of a rotary drum is reduced to reduce a load on a rotary drum motor, and rotation of the rotary drum can reach a static rotational speed within a short time period, thereby reducing a time required for starting transmission of an image.

As described above, the problems of the conventional apparatuses can be solved by commonly connecting recording or reproduction circuits or recording and reproduction circuits, mounted together with magnetic heads on a rotary drum, for performing recording or reproduction of an information signal to a rotary transformer, and sequentially, selectively switching the recording or reproduction circuits or recording and reproduction circuits to an enable state in accordance with a rotation position of the rotary drum.

The recording or reproduction circuits or recording and reproduction circuits are arranged at different angular positions with respect to a rotation angular direction of a rotary drum, i.e., a rotary member of a rotary transformer. Therefore, if the circuits are commonly connected to a rotary transformer in which a single winding is provided in a single winding slot as in a conventional transformer, the position in a rotation angular direction of lead wires of the rotary member of the rotary transformer differs from that in a rotation angular direction of the circuits by a maximum of 180°. In this case, a circuit having a larger difference with respect to the position in the rotation angular direction of the lead wires of the rotary member of the rotary transformer requires a longer cable for coupling a driver or receiver circuit, i.e., the recording or reproduction circuits or recording and reproduction circuits, and the rotary transformer. Therefore, a coupling capacitance between the driver or receiver circuit and the rotary transformer is increased to degrade transmission characteristics. As a result, a difference may be produced between characteristics of the n recording or reproduction circuits or recording and reproduction circuits.

For example, FIG. 15 shows an arrangement of a rotary transformer portion of one channel according to the above first embodiment in which two recording heads R1 and R2 are arranged in positions shifted by 180°, FIG. 16 shows an arrangement of a rotary transformer portion of one channel according to the above first embodiment in which two reproduction heads P1 and P2 are arranged in positions shifted by 180°, an FIG. 17 shows a rotary transformer portion of one channel according to the above second embodiment in which a recording head R and a reproduction head P are arranged in positions by 180°. As is apparent from FIGS. 15, 16, and 17, the length of wiring must be increased.

As described above, when circuits arranged in different directions with respect to a rotation angular direction of a rotary member of a rotary transformer are to be sequentially, selectively switched to an enable state, the positions in rotation angular directions of the circuits differ from the position in the rotation angular direction of the lead wires of the rotary member of the rotary transformer by a maximum of 180°. Therefore, a circuit having a larger difference from the position in the rotation angular direction of the lead wires of the rotary member of the rotary transformer requires a longer cable for coupling with respect to the driver or receiver circuit, thereby increasing a coupling capacitance between the driver or receiver circuit and the rotary transformer to degrade transmission characteristics. As a result, a difference may be produced between characteristics of the n recording or reproduction circuits or recording and reproduction circuits.

In an arrangement in which recording or reproduction circuits or circuits for performing both recording and reproduction arranged in different directions with respect to a rotation angular direction of a rotary member of a rotary transformer are sequentially, selectively switched to an enable state, thereby reducing the number of channels of the rotary transformer, therefore, a rotary transformer apparatus can be arranged as follows in order to minimize a coupling capacitance between a driver or receiver circuit and the rotary transformer and to minimize a difference between characteristics of the recording or reproduction circuit or recording and reproduction circuits.

That is, by arranging a plurality of windings in a single winding slot of a rotary member, a stationary member, or both the rotary and stationary members, a lead position of lead wires of each of a plurality of windings arranged in a single slot can be arranged to coincide with the position of a corresponding recording or reproduction circuit or recording and reproduction circuit in the rotation angular direction of the rotary transformer. In addition, a circuit for setting a high impedance in an output stage of each of n reproduction circuits commonly connected in parallel with the above rotary transformer in a disable state may be provided to prevent the reproduction circuit in a disable state from adversely affecting another circuit.

Figure 18:
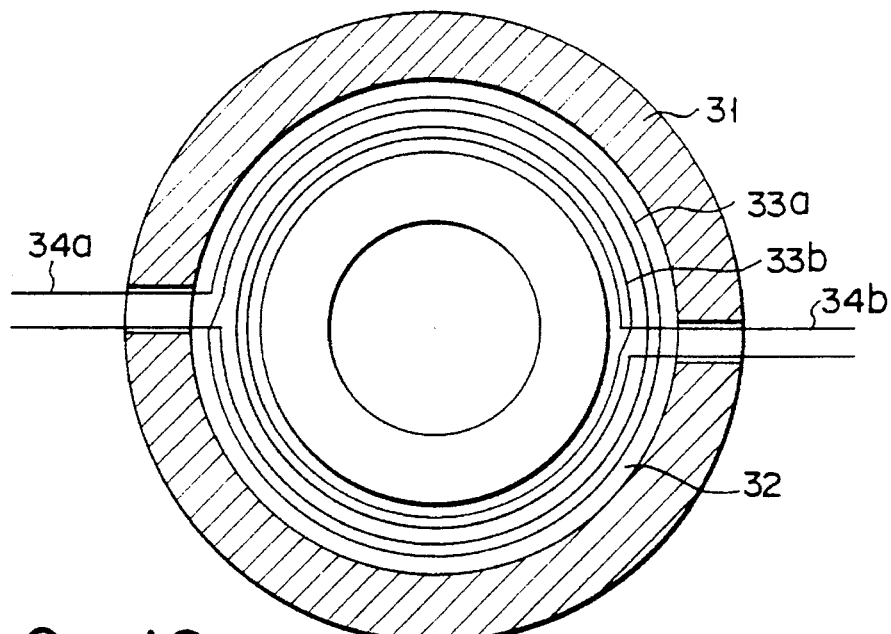
FIG. 18 is a schematic plan view for explaining an arrangement of a rotary member or a stationary member of a rotary transformer unit for use in the third, fourth, and fifth embodiments of the present invention.

FIG. 18 is a plan view showing a rotary member of a rotary transformer apparatus according to the third to fifth embodiments of the present invention. An arrangement in which an effective recording area angle is 180° will be described. Two windings 33a and 33b are wound around a winding slot 32 annularly formed in a ferrite core 31. Lead wires 34a and 34b of the two windings 33a and 33b, respectively, are led at positions having entirely different rotation angular directions (positions shifted by 180° in FIG. 18) of a rotary transformer.

Figure 19:
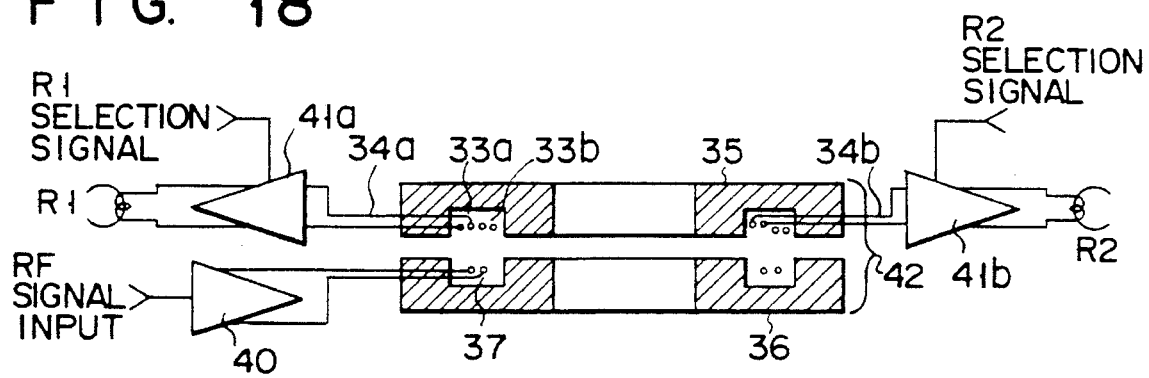
FIG. 19 is a schematic view for explaining an arrangement of a main part of the third embodiment of the present invention using, for recording, a rotary transformer unit having a rotary member as shown in FIG. 18 and a stationary member in which a winding is wound in a winding slot.
Figure 20:
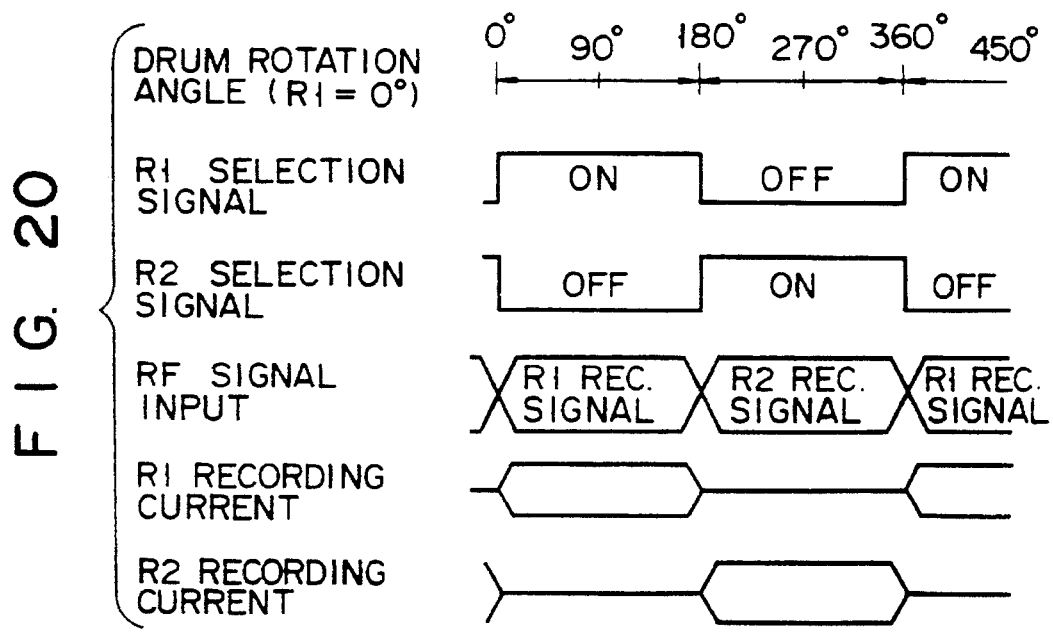
FIG. 20 is a timing chart showing a series of sequences of an operation associated with switching of a recording circuit according to the embodiment shown in FIG. 19.

FIG. 19 shows an arrangement in which a rotary transformer apparatus 42 of the third embodiment of the present invention comprising a rotary member (rotor) 35 having the arrangement shown in FIG. 20 and a stationary member (stator) 36 in which a single winding is wound in a winding slot is used for recording. An information signal (RF signal) to be recorded in a magnetic tape is amplified by a rotary transformer driving circuit 40 and transmitted into a rotary drum via the rotary transformer apparatus 42. Two magnetic heads R1 and R2 are arranged at positions shifted by 180°. Recording circuits 41a and 41b connected to the two magnetic heads R1 and R2, respectively, are arranged at positions in the rotary drum shifted by 180° so as to minimize a cable length to obtain a minimum connection capacitance. Note that the RF signal to be input to the rotary transformer driving circuit 40 includes both information signals to be recorded by the magnetic heads R1 and R2 and these signals must be transmitted to the heads R1 and R2 with minimum degradation in characteristics. One recording circuit 41a, therefore, is connected to the lead wires 34a from the first winding wound in the winding slot of the rotary member 35, and the other recording circuit 41b is connected to the lead wires 34b from the second winding wound in the winding slot of the rotary member 35. A winding 37 provided in a slot formed in the stationary member 36 is positioned at substantially the central portion between the two windings 33a and 33b provided in the rotary member 35 opposing the stationary member 36. With this arrangement, since the lead wires 34a and 34b are arranged in the rotary drum to oppose each other with an angle of 180° therebetween, connection distances from the recording circuits 41a and 41b to the windings 33a and 33b, respectively, can be minimized. Therefore, a coupling capacitance between the circuits and the rotary transformer and a difference between the two recording circuits can be minimized. The recording circuits 41a and 41b are sequentially switched between enable and disable states upon each 180° rotation by R1 and R2 selection signals, respectively. When the recording circuit is in the enable state, the magnetic head R1 or R2 is driven to record an RF signal in a magnetic tape (not shown).

In this arrangement, signal transmission is alternately performed between the windings 37 and 33a and between the windings 37 and 33b each time the rotary drum rotates through 180°. If, however, an input impedance of the recording circuit 41b is low while a signal is transmitted between the windings 37 and 33a or an input impedance of the recording circuit 41a is low while a signal is transmitted between the windings 37 and 33b, transmission characteristics are degraded. The input impedance of the recording circuit 41b, therefore, must be high while a signal is transmitted between the windings 37 and 33a, and the input impedance of the recording circuit 41a must be high while a signal is transmitted between the windings 37 and 33b. For this purpose, an emitter follower or a Darlington emitter follower is used as a circuit at an input stage of each of the recording circuits 41a and 41b so as not to cause degradation in transmission characteristics, thereby increasing the input impedance.

FIG. 20 shows a series of time sequences of a switching operation of the recording circuits.

The recording circuits 41a and 41b are sequentially switched between enable and disable states upon each 180° rotation by the R1 and R2 selection signals, respectively. When the recording circuits 41a and 41b are in an enable state, input RF signals drive the magnetic heads R1 and R2 to supply R1 and R2 recording currents to the magnetic heads, respectively. As a result, the RF signals corresponding to the currents are recorded in a magnetic tape.

FIG. 21 shows the fourth embodiment of the present invention in which a rotary transformer apparatus 42 comprising a rotary member 35 having the arrangement as shown in FIG. 18 and a stationary member 36 in which a single winding is wound in a winding slot is used for reproduction.

RF signals reproduced from a magnetic tape by magnetic heads P1 and P2 are amplified by reproduction circuits 43a and 43b, respectively. The rotary transformer apparatus 42 is driven by outputs from the reproduction circuits 43a and 43b to transmit the reproduced RF signals outside a rotary drum. As is apparent from a series of time sequences of a switching operation of the reproduction circuits shown in FIG. 22, the reproduction circuits 43a and 43b are sequentially switched between enable and disable states upon each 180° rotation by P1 and P2 selection signals, respectively. When the reproduction circuit is in an enable state, an RF signal obtained from a P1 or P2 reproduced signal reproduced from the magnetic head P1 or P2, respectively, is transmitted outside the rotary drum. The reproduced RF signal is received by a rotary transformer receiving circuit 44 and transmitted to a circuit at a subsequent stage.

In this arrangement, the two magnetic heads P1 and P2 are arranged in positions shifted by 180°. In order to minimize a cable length to obtain a minimum connection capacitance, the two reproduction circuits 43a and 43b connected to the magnetic heads P1 and P2, respectively, are arranged in the rotary drum to oppose each other with an angle of 180° therebetween. An RF signal to be input to the rotary transformer receiving circuit 44 must include both information signals to be reproduced by the magnetic heads P1 and P2, and these signals must be transmitted from the heads P1 and P2 with minimum degradation in characteristics. One reproduction circuit 43a, therefore, is connected to lead wires 34a of a first winding 33a wound in a winding slot of the rotary member 35, and the other reproduction circuit 43b is connected to lead wires 34b of a second winding 33b wound in a winding slot of the rotary member 35. With this arrangement, since the lead wires 34a and 34b are arranged at positions in the rotary drum shifted by 180°, connection distances from the reproduction circuits 43a and 43b to the windings 33a and 33b of the rotary transformer, respectively, can be minimized. Therefore, a coupling capacitance between the circuits and the rotary transformer and a difference between the two circuits can be minimized. The reproduction circuits 43a and 43b are sequentially switched between enable and disable states upon each 180° rotation by P1 and P2 selection signals, respectively. A reproduction circuit in an enable state drives the magnetic head P1 or P2 to reproduce an RF signal from the magnetic head.

Outputs from the reproduction circuits 43a and 43b are connected to the same rotary transformer apparatus 42. Therefore, in order to prevent degradation in frequency characteristics in a reproduction circuit in an enable state, an output from a reproduction circuit in a disable state is set in a high-impedance state. For this purpose, a circuit similar to that shown in FIG. 4 is used to increase the impedance of an output from the reproduction circuit. Note that although only one output side is shown in FIG. 4, outputs form the reproduction circuits are parallel outputs.

Figure 23:
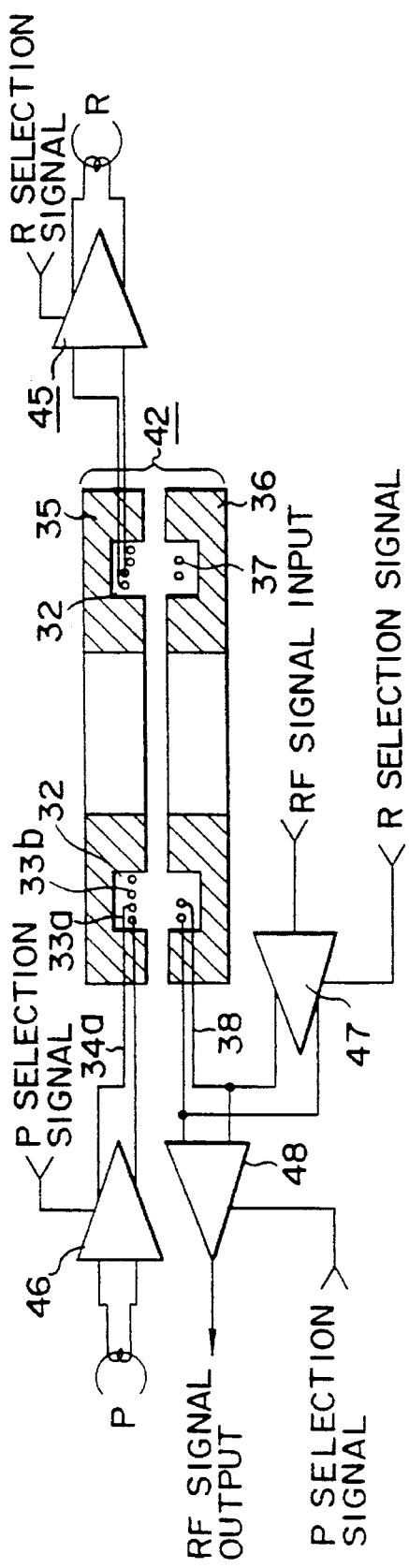
FIG. 23 is a schematic view for explaining an arrangement of a main part of the fifth embodiment of the present invention using, for recording and reproduction, a rotary transformer unit having a rotary member as shown in FIG. 18 and a stationary member in which a winding is wound in a winding slot.

FIG. 23 shows the fifth embodiment of the present invention in which a rotary transformer apparatus 42 comprising a rotary member 35 having the arrangement as shown in FIG. 18 and a stationary member 36 in which a single winding is wound in a winding slot is used for both recording and reproduction. In this embodiment, recording and reproduction are alternately performed each time the rotary drum rotates through 180°.

Figure 24:
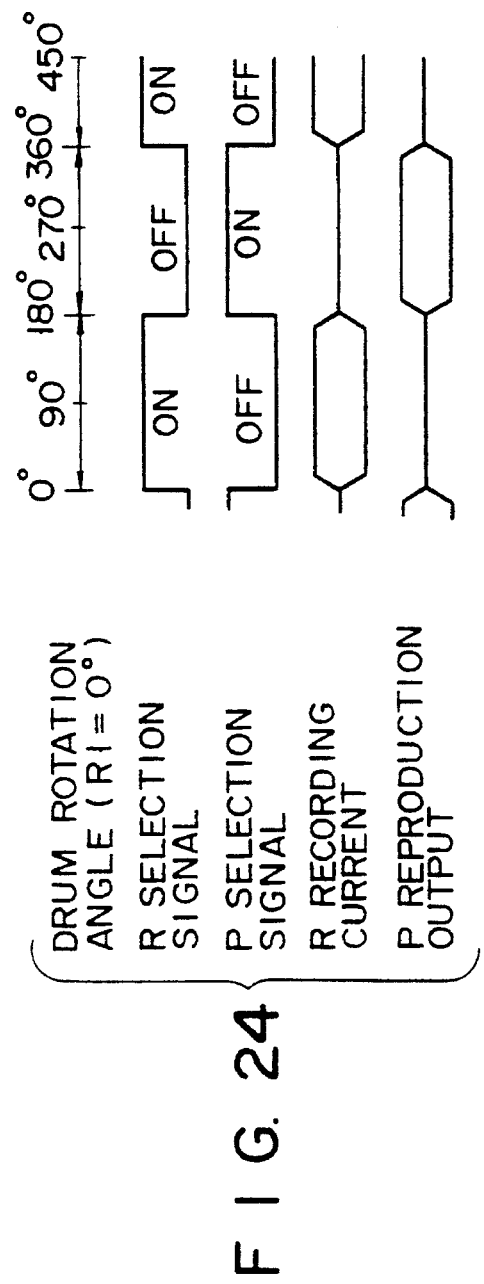
FIG. 24 is a timing chart showing a series of sequences of an operation associated with switching of the recording and reproduction circuits of the embodiment shown in FIG. 23.

A recording circuit 45 amplifies an information signal from the rotary transformer apparatus 42 and supplies the amplified signal to a magnetic head R, thereby driving the head R. A magnetic head P is arranged in a position shifted by 180° from the magnetic head R. The information signal is reproduced from a magnetic tape by the magnetic head P, amplified by a reproduction circuit 46, and transmitted outside the rotary drum by the rotary transformer apparatus 42 connected to the output side of the reproduction circuit 46. An information signal (RF signal) to be recorded in the magnetic tape is amplified by a rotary transformer driving circuit 47 and transmitted into the rotary drum by the rotary transformer apparatus 42. As is apparent from a series of time sequences of a switching operation of the recording and reproduction circuits shown in FIG. 24, the recording circuit 45 is sequentially switched between enable and disable states upon each 180° rotation by an R selection signal. When the recording circuit is in an enable state, it drives the magnetic head R by an R recording current to record the RF signal in the magnetic tape.

Reproduction of an RF signal from a magnetic tape will be described below. An RF signal reproduced from a magnetic tape by the magnetic head P is amplified by the reproduction circuit 46 to drive the rotary transformer apparatus 42. The rotary transformer apparatus 42 transmits the RF signal outside the rotary drum. As is apparent from a series of time sequences of the switching operation of the recording and reproduction circuits shown in FIG. 26, the reproduction circuit 46 is sequentially switched between enable and disable states upon each 180° rotation by a P selection signal. When the reproduction circuit is in an enable state, it transmits a reproduced output as an RF signal reproduced by the magnetic head P to outside the rotary drum. The reproduced RF signal transmitted from the apparatus 42 is received by a rotary transformer receiving circuit 48 and transmitted to a circuit at a subsequent stage.

In this arrangement, the two magnetic heads R and P are arranged in positions shifted by 180°. In order to minimize a cable length to obtain a minimum connection capacitance, the recording and reproduction circuits 45 and 46 connected to the two magnetic heads are arranged in the rotary drum at positions shifted by 180°. These signals must be transmitted from an RF signal input to the magnetic head R upon recording and from the magnetic head P to an RF signal output upon reproduction with minimum degradation in characteristics. The recording circuit 45, therefore, is connected to lead wires 34b of a second winding 33b wound in a winding slot of the rotary member 35, and the reproduction circuit 46 is connected to lead wires 34a of a first winding 33a wound in a winding slot of the rotary member 35. With this arrangement, since the lead wires 34a and 34b are arranged at positions in the rotary drum shifted by 180°, a connection distance from the recording circuit 45 to the winding 33b of the rotary transformer and that from the reproduction circuit 46 to the winding 33a of the rotary transformer can be minimized. As a result, a coupling capacitance between the circuits and the rotary transformer can be minimized to achieve minimum degradation in characteristics.

In this arrangement, the recording and reproduction circuits 45 and 46 are connected to the same rotary transformer apparatus 42. In order to prevent degradation in frequency characteristics of a circuit in an enable state, therefore, an input of the recording circuit in a disable state and an output of the reproduction circuit in a disable state are set in a high-impedance state. A method of obtaining a high impedance is the same as that of the above two embodiments.

In each of the above third to fifth embodiments, an arrangement in which the above technique is applied to only a rotary member has been described by taking a flat type one-channel rotary transformer apparatus as an example. The above technique, however, can be applied to a stationary member. In addition, the above technique can be applied also to a coaxial type rotary transformer apparatus. Furthermore, the above technique can be applied regardless of the number of channels or the number of turns of a winding of a rotary transformer apparatus.

In a rotary transformer apparatus as described above, transmission characteristics may be changed due to rotation of a rotary drum, i.e., rotation of a rotary transformer. Such a change in transmission characteristics significantly appears when the number of turns of a winding is small and is most conspicuous when a winding has only one turn. Since the number of turns of a winding must be reduced as the frequency of a transmission signal is increased, the number of turns is reduced as the band and transmission rate of a VTR using the rotary transformer are widened and increased, respectively.

For example, an arrangement in which windings 53 and 54 each having one turn are wound in a winding slot of one member (one of stationary and rotary members) 51 of a rotary transformer and a winding 55 having one turn is wound in a winding slot of the other member 52 as shown in FIGS. 25 and 26 will be described below.

Referring to FIG. 25, the one-turn winding 55 of the member 52 is wound in a central portion of the winding slot. With this arrangement, it is assumed that transmission characteristics between the windings 53 and 54 wound around the member 51 and the winding 55 wound around the member 52 are substantially equal to each other provided that the members and the windings are ideally arranged. Actually, however, it is impossible to wind, e.g., the winding 55 in the central portion of the winding slot throughout 360°. Upon rotation, therefore, transmission characteristics between the windings 53 and 55 or windings 54 and 55 are changed.

As shown in FIG. 26, the one-turn winding 55 of the member 52 may be shifted to one side of the winding slot. In this case, a change in transmission characteristics caused upon rotation between the opposing windings 54 and 55 can be reduced to a negligible level. A change in transmission characteristics between the windings 53 and 55 which do not oppose each other, however, is caused more easily than when the winding 55 is wound in the central portion of the winding slot. In addition, a large difference is produced between the transmission characteristics between the windings 53 and 55 and those between the windings 54 and 55. When the rotary transformer is used, the windings 53 and 54 are selectively used. It is, therefore, not preferred that a difference is produced between the transmission characteristics between the windings 53 and 55 and those between the windings 54 and 55.

As described above, in a rotary transformer apparatus for transmitting signals between rotary and stationary members, in which a plurality of windings are arranged in a single slot of the rotary member and a single winding is arranged in a slot of the stationary member or a plurality of windings are arranged in a single slot of the stationary member and a single winding is arranged in a slot of the rotary member, transmission characteristics between a plurality of transmission paths are preferably, constantly uniform.

In the embodiments of the present invention, therefore, the thickness or width of a winding of a member in which a single winding is arranged is increased to be larger than that of each of a plurality of windings of a member in which a plurality of windings are arranged, thereby obtaining constantly uniform transmission characteristics between a plurality of transmission paths. As described above, this method is most effective when a winding has only one turn. In each of the following embodiments, therefore, an arrangement in which two one-turn windings are wound around one member and single one-turn winding is wound around the other member will be described.

FIG. 27 schematically shows a rotary transformer apparatus used in the sixth embodiment of the present invention.

In this embodiment, a winding 56 of a member 52 is constituted by a wire thicker than that of windings 53 and 54 of a member 51 and wound in a winding a slot of the member 52 so that a portion corresponding to ½ of a wire diameter projects from the slot. When an opposing surface S of the member 52 with respect to the member 51 is polished, the winding 56 is simultaneously polished to obtain a semicircular section. Since the polished surface of the winding 56 uniformly opposes the windings 53 and 54, no difference is produced between transmission characteristics between the windings 53 and 56 and those between the windings 54 and 56, and a change in transmission characteristics caused upon rotation can be suppressed.

Figure 28:
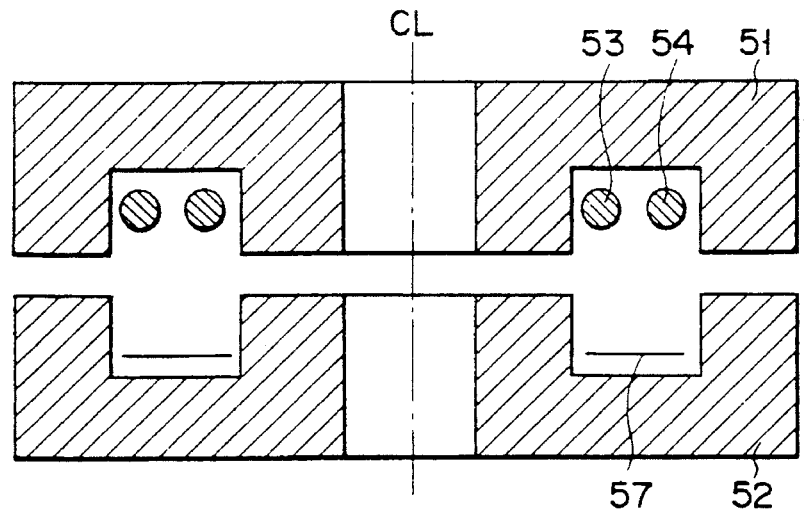
FIG. 28 is a sectional view schematically showing an arrangement of the seventh embodiment of the present invention for solving problems of a rotary transformer apparatus for performing signal transmission between a rotary member and a stationary member in which a plurality of windings are wound in a single slot of one member while a single winding is wound in a slot of the other member.

FIG. 28 schematically shows a rotary transformer apparatus used in the seventh embodiment of the present invention.

In this embodiment, since a winding 57 of a member 52 is constituted by a metal foil such as a copper foil. no difference is produced between transmission characteristics between windings 53 and 57 and those between windings 54 and 57, and a change in transmission characteristics caused upon rotation can be suppressed. In this arrangement, the metal foil is fixed on a member by an adhesive or the like.

Figure 29:
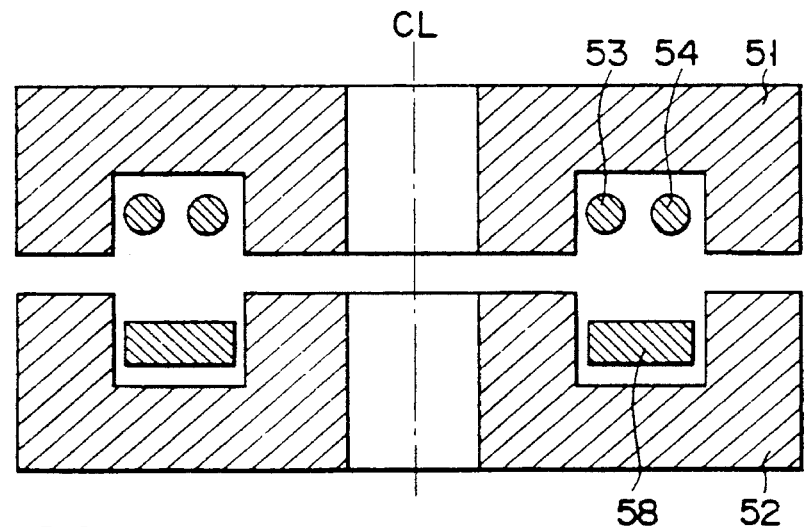
FIG. 29 is a sectional view schematically showing an arrangement of the eight embodiment of the present invention for solving problems of a rotary transformer apparatus for performing signal transmission between a rotary member and a stationary member in which a plurality of windings are wound in a single slot of one member while a single winding is wound in a slot of the other member.

FIG. 29 schematically shown a rotary transformer apparatus used in the eighth embodiment of the present invention.

In this embodiment, since a winding 58 of a member 52 is constituted by a metal plate, no difference is produced between transmission characteristics between windings 53 and 58 and those between windings 54 and 58, and a change in transmission characteristics caused upon rotation can be suppressed. In this arrangement, the metal plate is formed to have a shape corresponding to the shape of a winding slot and then fitted in the slot. If, however, the member 52 consists of a conductor, a problem may be posed in characteristics unless the member 52 and the winding 58 are electrically insulated from each other.

Figure 30:
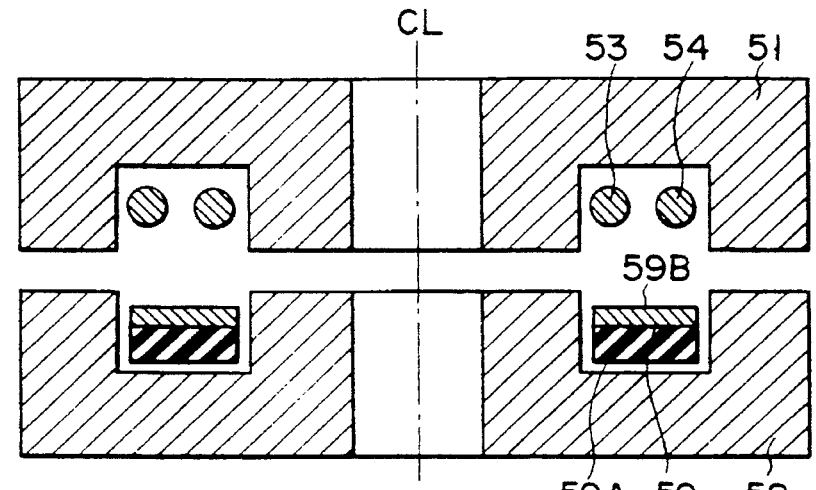
FIG. 30 is a sectional view schematically showing an arrangement of the ninth embodiment of the present invention for solving problems of a rotary transformer apparatus for performing signal transmission between a rotary member and a stationary member in which a plurality of windings are wound in a single slot of one member while a single winding is wound in a slot of the other member.

FIG. 30 schematically shows a rotary transformer apparatus used in the ninth embodiment of the present invention which solves the above problem of insulation.

In this embodiment, since a winding 59 of a member 52 is constituted by a printed wiring board composed of an insulating plate 59A and a conductor foil 59B, no difference is produced between transmission characteristics between windings 53 and 59 and those between windings 54 and 59, and a change in transmission characteristics caused upon rotation can be suppressed. In this arrangement, although not shown in FIG. 32, two side portions of the conductor foil 59B are not in direct contact with the inner walls of a winding slot of the member 52, thereby electrically insulating the member 52 and the winding 59 from each other.

FIG. 31 schematically shows a rotary transformer apparatus used in the tenth embodiment of the present invention.

In this embodiment, since a winding 60 of a member 52 is formed by deposition of a conductive metal, no difference is produced between transmission characteristics between windings 53 and 60 and those between windings 54 and 60, and a change in transmission characteristics caused upon rotation. In this arrangement, in order to electrically insulate the member 52 and the winding 60 from each other, an insulating material is preferably deposited before deposition of the metal. Alternatively, the winding 60 can be formed not by deposition but by, e.g., sputtering.

FIG. 32 schematically shows a rotary transformer apparatus used in the 11th embodiment of the present invention. FIG. 33 is a top view of a member 52 shown in FIG. 32.

In this embodiment, since a winding 61 of a member 52 is constituted by two windings 62 and 63 connected in parallel with each other to electrically form one turn, no difference is produced between transmission characteristics between windings 53 and 61 and those between windings 54 and 61, and a change in transmission characteristics caused upon rotation can be suppressed. The windings 62 and 63 are connected with each other at a lead port 64 and connected to external circuits via lead wires 65 and 66, respectively, of the rotary transformer.

In each of the above embodiments, the present invention has been described by taking a flat type one-channel rotary transformer as an example. The present invention, however, can be applied to a coaxial type rotary transformer apparatus. In addition, the present invention can be applied regardless of the number of channels of a rotary transformer apparatus.

In addition, in a rotary transformer apparatus for transmitting signals between a rotary member having a plurality of windings wound in a single slot and a stationary member having a single winding wound in a slot or between a stationary member having a plurality of windings wound in a single slot and a rotary member having a single winding wound in a slot, uniformity of transmission characteristics can be increased by setting a winding slot width of a member having a single winding to be different from that of a member having a plurality of windings.

For example, the width of a winding slot of a member having a single winding is set to be larger than that of a member having a plurality of slots so that a thicker (larger diameter) or wider winding can be wound As a result, since a single winding and a plurality of windings oppose each other more easily, uniformity of transmission characteristics of a plurality of transmission paths can be improved.

With this arrangement, a core width of a member having a wider winding slot width can be made smaller than that of a member having a narrower winding slot width. Therefore, since a core opposing width is defined by the core width of the member having a wider winding slot width, an influence of variation caused by rotation can be reduced.

FIGS. 34 to 45 show arrangements of rotary transformer apparatuses according to the 12th to 23rd embodiments of the present invention obtained by adopting the above technique to the embodiments shown in FIGS. 29 to 34, respectively.

In these embodiments, similar to the embodiments shown in FIGS. 27 to 32, the effect of the present invention is remarkable when a winding is wound by one turn. In each of the following embodiments, therefore, an arrangement in which two one-turn windings are wound in one member and one one-turn winding is wound in the other member will be described.

FIGS. 34 and 35 schematically show rotary transformer apparatuses according to the 12th and 13th embodiments of the present invention, respectively.

These embodiments differ from the embodiment shown in FIG. 27 in that a winding slot width 76 of a member 52 is made wider than a winding slot width 77 of a member 51. With this arrangement, a winding 56' of the member 52 can be made thicker than the winding 56 shown in FIG. 29 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 36, the outer diameter of the member 52 can be made smaller than that of the member 51 as shown in FIG. 37. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

FIGS. 36 and 37 schematically show rotary transformer apparatuses according to the 14th and 15th embodiments of the present invention, respectively.

These embodiments differ from the embodiment shown in FIG. 28 in than a winding slot width 76 of a member 52 is made wider than a winding slot width 77 of a member 51. With this arrangement, a thin film 57' used as a winding of the member 52 can be made wider than the thin film 57 shown in FIG. 28 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 36, the outer diameter of the member 52 can be made smaller than that of the member 51 as shown in FIG. 37. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

FIGS. 38 and 39 schematically show rotary transformer apparatuses according to the 16th and 17th embodiments of the present invention, respectively.

These embodiments differ from the embodiment shown in FIG. 29 in that a winding slot width 76 of a member 52 is made wider than a winding slot width 77 of a member 51. With this arrangement, a metal plate 58' used as a winding of the member 52 can be made wider than the metal plate 58 shown in FIG. 29 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is hanged in FIG. 38, the outer diameter of the member 52 can be made smaller than that of the member 51 as shown in FIG. 39. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

Figure 40:
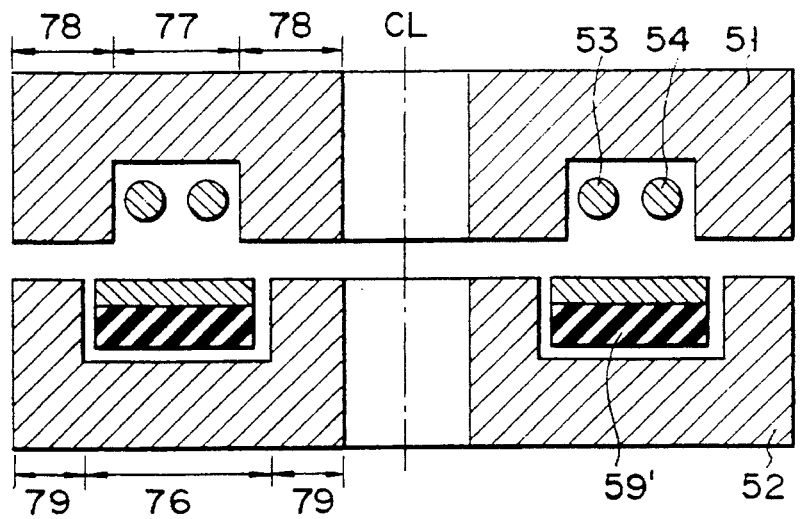
FIG. 40 is a sectional view schematically showing an arrangement of the 18th embodiment of the present invention.
Figure 41:
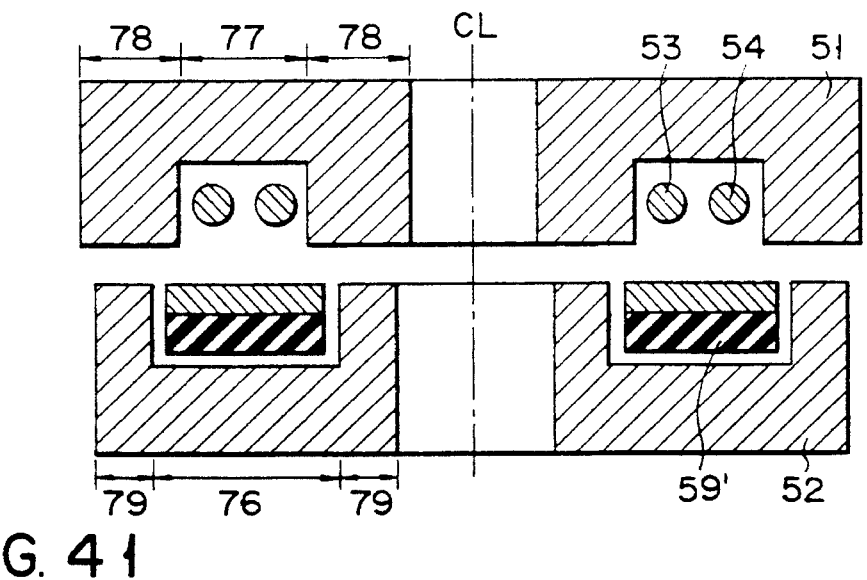
FIG. 41 is a sectional view schematically showing an arrangement of the 19th embodiment of the present invention.

FIGS. 40 and 41 schematically show rotary transformer apparatuses according to the 18th and 19th embodiments of the present invention, respectively.

These embodiments differ from the embodiment shown in FIG. 30 in that a winding slot width 76 of a member 52 is made wider than a winding slot width 77 of a member 51. With this arrangement, a printed wiring board 59' used as a winding of the member 52 can be made wider than the printed wiring board 59 shown in FIG. 30 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 40, the outer diameter of the member 52 can be made smaller than that of the member 51 as shown in FIG. 41. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

Figure 42:
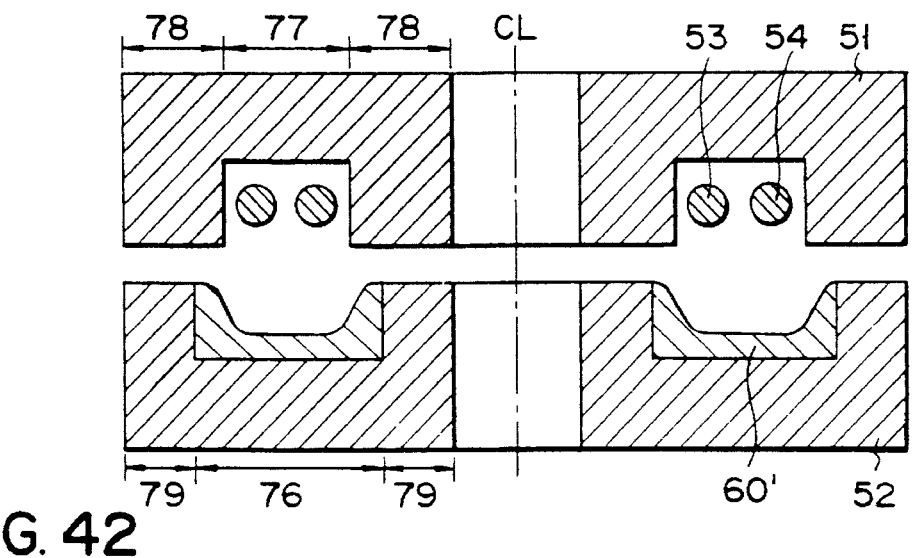
FIG. 42 is a sectional view schematically showing an arrangement of the 20th embodiment of the present invention.

FIGS. 42 and 43 schematically show rotary transformer apparatuses according to the 20th and 21st embodiments of the present invention, respectively.

These embodiments differ from the embodiment shown in FIG. 31 in that a winding slot width 76 of a member 52 is made wider than a winding slot width 77 of a member 51. With this arrangement, a deposited or sputtered film 60' used as a winding of the member 52 can be made wider than the deposited or sputtered film 60 shown in FIG. 31 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 42, the outer diameter of the member 52 can be made smaller than that of the member 51 as shown in FIG. 43. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

FIGS. 44 and 45 schematically show rotary transformer apparatuses according to the 22nd and 23rd embodiments of the present invention, respectively.

These embodiments differ from the embodiment shown in FIG. 32 in that a winding slot width 76 of a member 52 is made wider than a winding slot width 77 of a member 51. With this arrangement, a (double) winding 61' used as a winding of the member 52 can be made wider than the (double) winding 61 shown in FIG. 32 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 44, the outer diameter of the member 52 can be made smaller than that of the member 51 as shown in FIG. 45. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

The following is the description of an embodiment designed so that disconnection will hardly occur between a metal wiring film in a slot and lead wires by integrally forming, by means of etching or die-cutting, the wiring film in the slot and the lead wire of a rotary transformer to transmit signals between rotary member and stationary member.

Figure 46:
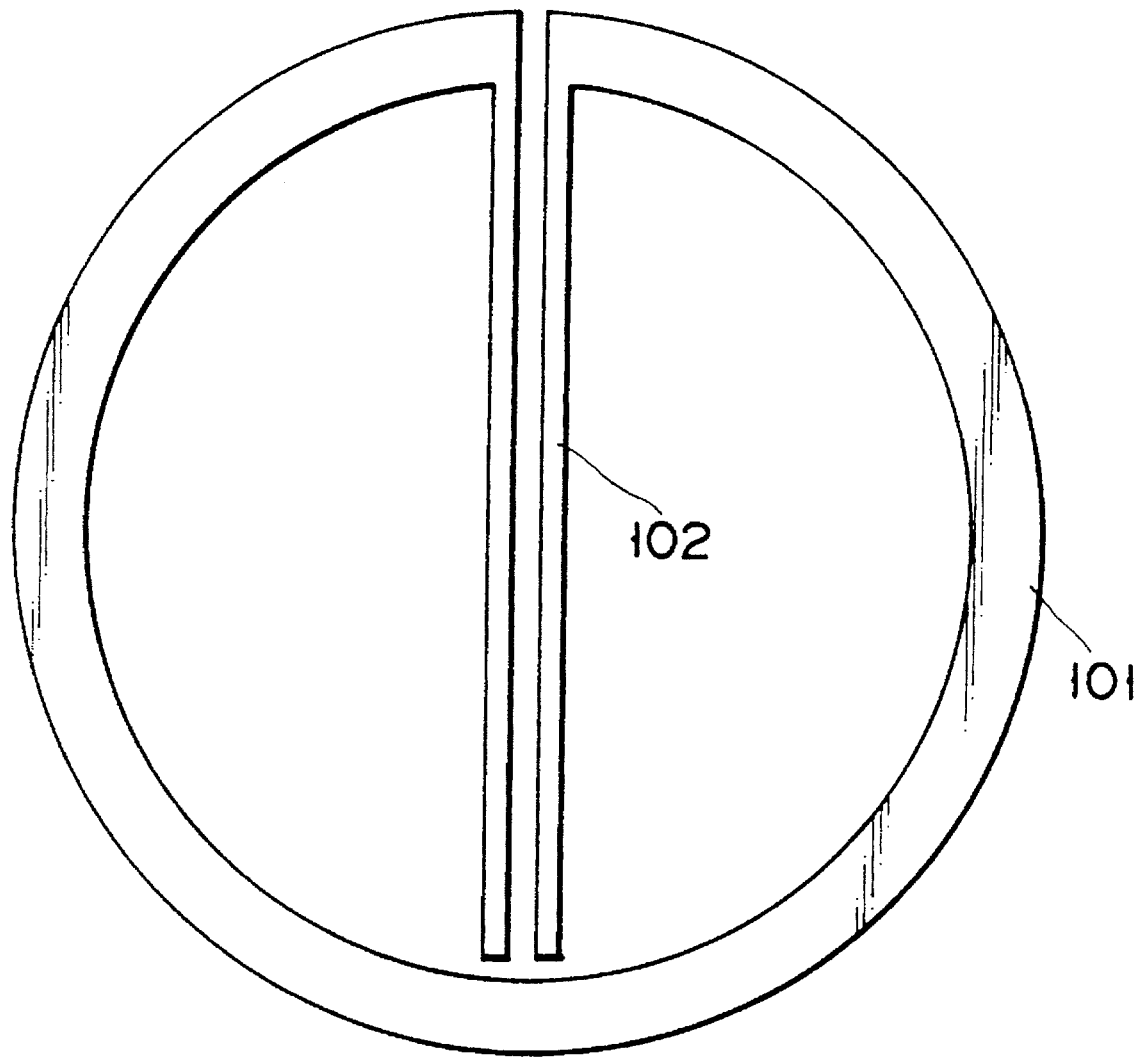
FIG. 46 is a top view of a rotary transformer winding.

In FIG. 46, the winding of a rotary transformer device has the wire portion 101 in the core slot and the lead-wire portion 102, which are integrally formed by etching or die-cutting. Under the state shown in FIG. 46, it is difficult to lead the lead wire to the outside of the rotary transformer and electrically connect them with an external circuit.

Figure 47:
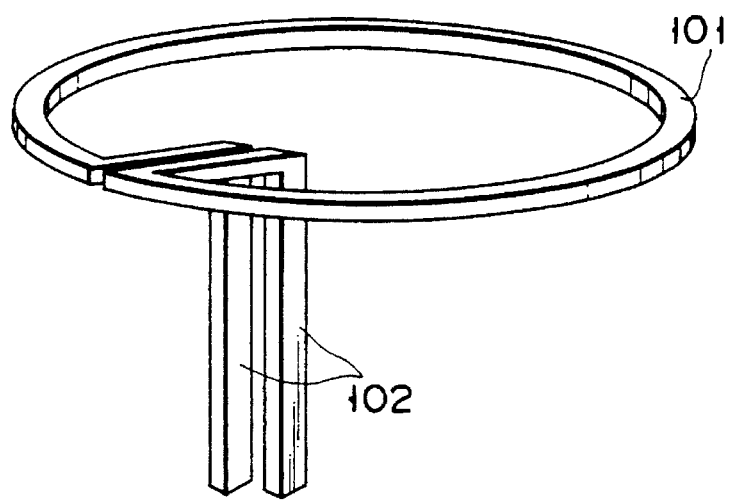
FIG. 47 is a perspective view of the rotary transformer winding.

Therefore, as shown in FIG. 47, the lead wire is let to the outside of the rotary transformer and electrically connected to the external circuit by folding the lead-wire portion 102. In this case, the folding position is determined according to the position and shape of the leading hole or slot of the rotary transformer.

Figure 48:
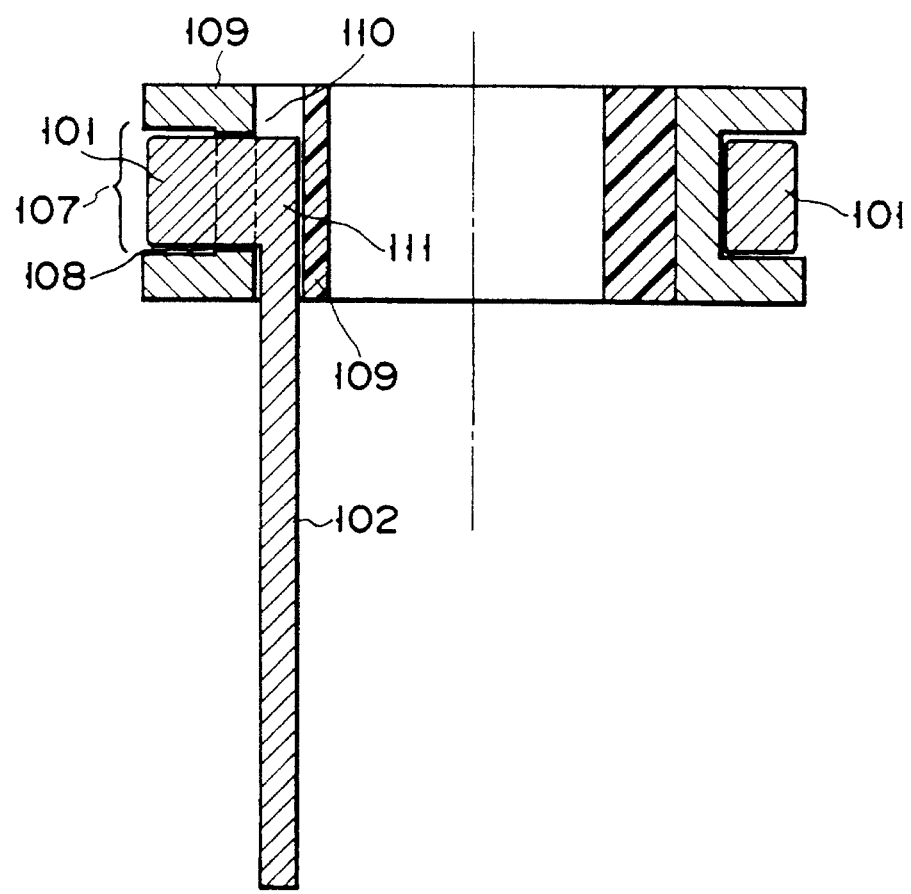
FIG. 48 is a sectional view of the rotary transformer.
Figure 49:
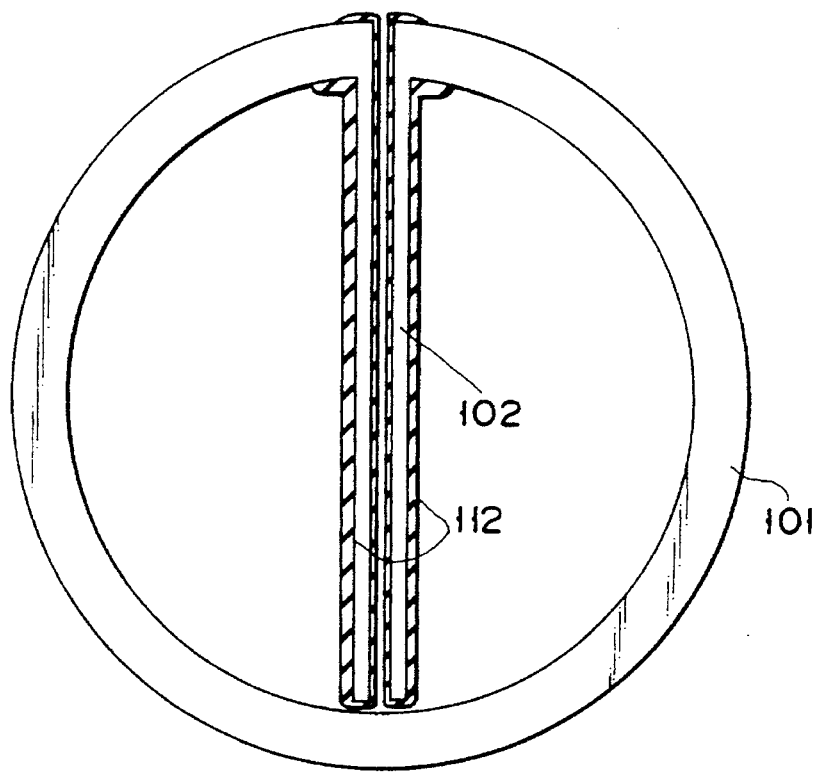
FIG. 49 is a top view of a rotary transformer winding covered with insulation sheath.

FIG. 48 shows an embodiment in which the present invention is applied to a coaxial-type rotary transformer. The portions 101 and 102 in FIG. 48 correspond to the portions 106 and 107 in FIG. 47 respectively. The winding 101 is wound in the slot 107 of the core 106. The lead wire 102 integrally formed with the winding 101 by etching or die-cutting is led to the outside of the rotary transformer through lead-wire hold 108 of the core 106 and the lead-wire slot 110 formed on the housing 109 to which the core 106 is secured.

In this case, the portion 11 is folded according to the shapes of the core 106 and the housing 109.

Therefore, the wire in the slot can be formed so that the metal plate will be integrated with the leading portion.

However, because the lead-wire portion 102 in FIG. 48 is exposed unlike the case of using a general enameled wire, two lead wires may electrically contact each other and either or both of the winding may electrically contact the housing 111.

The contacting possibility is the highest at the folding portion. Therefore, the lead-wire portion 102 is covered with the insulation coating 112 by dipping it in, for example, varnish. Thus, two lead wires do not electrically contact each other and either or both of the windings do not electrically contact the housing 111.

The insulation coating can be realized by various types of insulation processings with enamel or epoxy as well as varnish. It is also possible to simply cover the lead wire with an insulating tube or heat-shrinkable tube.

Figure 50:
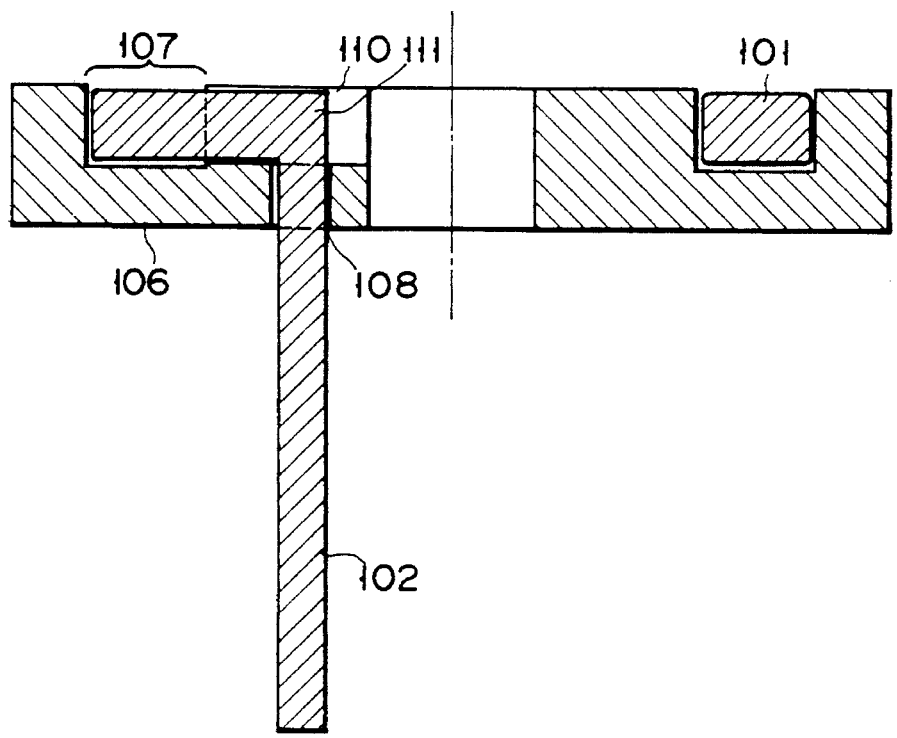
FIG. 50 is a sectional view of the rotary transformer.

FIG. 50 shows a flat-type rotary transformer to which the present invention is applied. In FIG. 50, the winding 101 is wound in the slot 107 of the core 106 and the lead wire 102 integrally formed with the winding 101 by etching or die-cutting is folded at the lead-wire hole 108 of the core 106 and led to the outside of the rotary transformer.

In this case, the lead wire is folded at the housing according to the position of the hole on the core 106. Therefore, the wire in the slot is integrated with the metal plate and leading portion. The winding and lead wire integrally formed by etching or die-cutting can be not only formed into the structure shown in FIG. 46 but formed of the circular conductor 101 and the straight conductor 102 extended form the circular conductor 101 as shown in FIG. 51 or the circular conductor 101 and the straight conductor 102 extended into the circular conductor 101 as shown in FIG. 52, depending on the shape of the rotary transformer.

Figure 53:
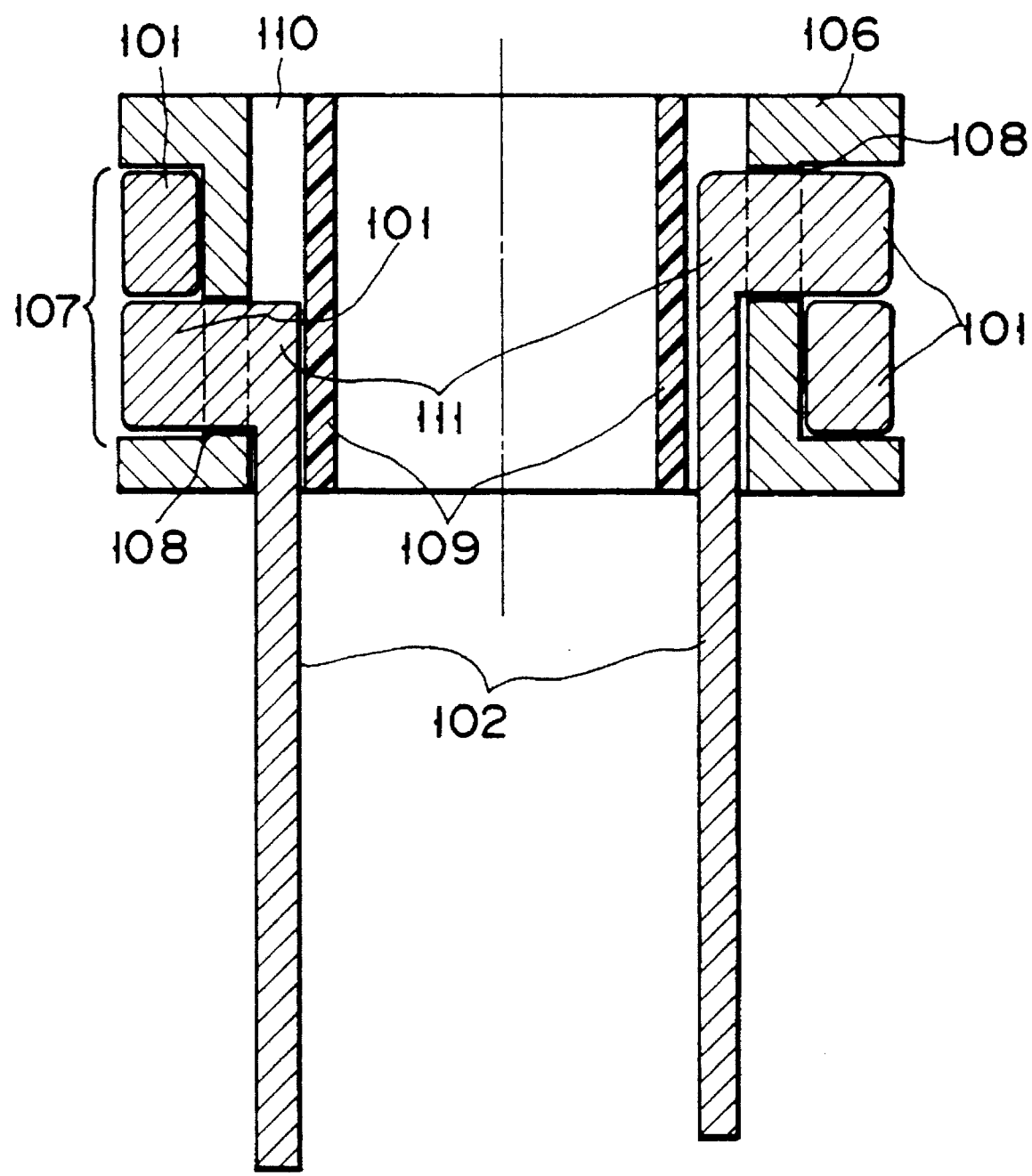
FIG. 53 is a sectional view of a rotary transformer with a double winding.

FIG. 53 shows a coaxial-type rotary transformer provided with double winding. In the rotary transformer, the double winding 101 is wound at the top and bottom stages in the slot 107 of the core 106 and the lead wire 102 integrally formed with the double winding 101 by etching or die-cutting is led to the outside of the rotary transformer through the lead wire hole 108 of the core 106 and the lead wire slot 11 formed on the housing 109 where the core 106 is secured.

In this case, the portion 111 is folded according to the shapes of the core 106 and housing 109. The present invention can be applied to the rotor or stator of the coaxial-type rotary transformer provided with said double winding.

In the above embodiment, the present invention is described by taking an one-channel rotary transformer as an example. However, the present invention can be applied to various types of rotary transformers regardless of the number of channels.

The following is the description of a magnetic recording/reproduction apparatus having an erasing circuit, in which the erasing frequency characteristic is hardly degraded, the number of channels of a rotary transformer can be decreased, the power consumption of the erasing circuit mounted on a rotary drum can be decrease, and a scanner mechanism can be simplified and compacted.

This embodiment describes an apparatus having the magnetic-tape lap angle of 180° and comprising two erasing circuits.

Figure 54:
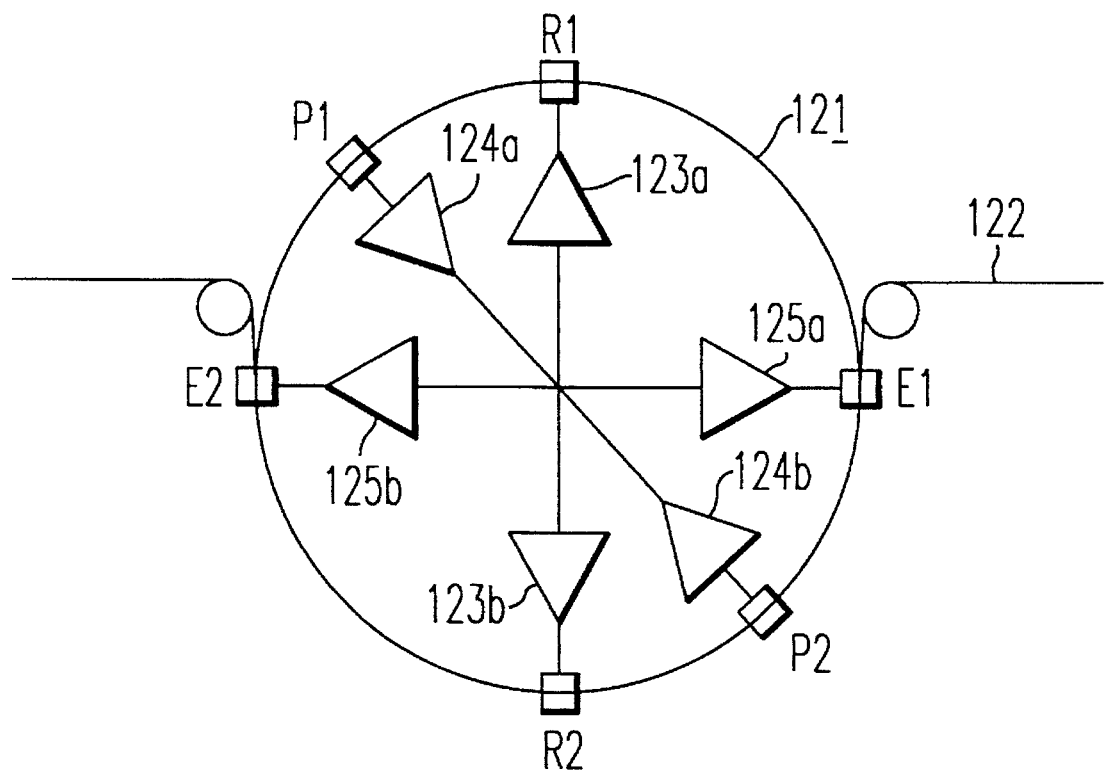
FIG. 54 is a schematic block diagram of a rotary drum provided with an erasing head.

In FIG. 54, the magnetic tape 122 is wound on the circumferential surface of the rotary drum of the scanner 121 so that the effective recording area of the magnetic tape 122 will be 180°. To record data, the recording circuit 123a amplifies the information signal sent from the rotary transformer and drives the recording magnetic head R1 according to the information signal.

The recording magnetic head R2 is installed at the position 180° apart form the recording magnetic head R1 and drive by the recording circuit 123b.

To reproduce data, the reproduction magnetic head P1 reproduces the information signal from the magnetic tape and the information signal is amplified by the reproduction circuit 124a.

The reproduction magnetic head P2 is installed at the position 180° apart from the reproduction magnetic head P1 and the information signal reproduced by the magnetic tape is amplified by the reproduction circuit 124b through the reproduction magnetic head P2.

Reproduced information signals are transmitted to the outside of the rotary drum by the rotary transformer connected to the output terminals of the reproduction circuits 124a and 124b.

To erase data, the erasing circuit 125a amplifies the erasing signal sent from the rotary transformer to supply the amplified erasing signal to the erasing magnetic head E1.

The erasing magnetic head E1 is driven by the erasing signal in order to erase recorded information.

The erasing magnetic head E2 is installed at the position 180° apart from said erasing magnetic head E1.

The erasing magnetic head E2 is connected to the erasing circuit 125b and driven to erase the recorded information with the erasing signal amplified by the erasing circuit 125b.

Figure 55:
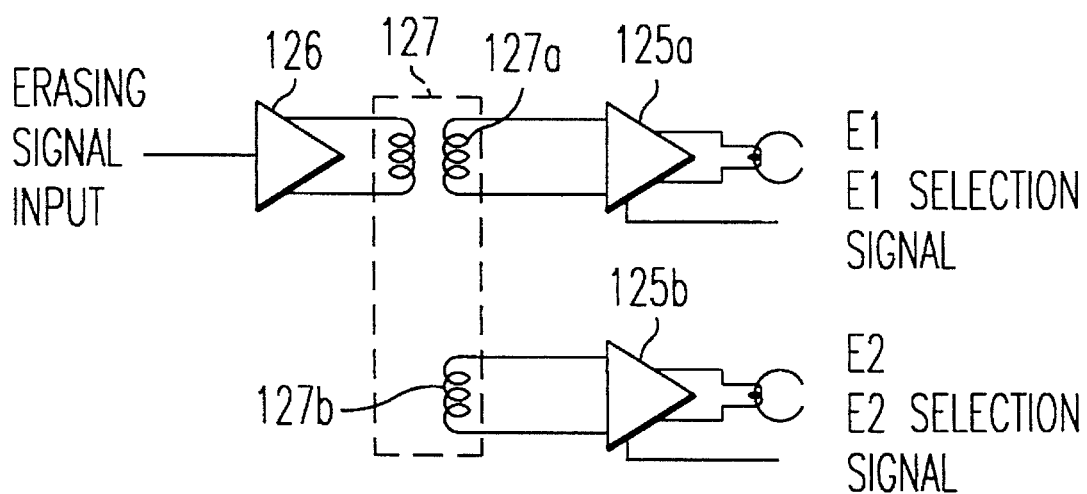
FIG. 55 is a circuit diagram of a circuit for switching erasing circuits.
Figure 56:
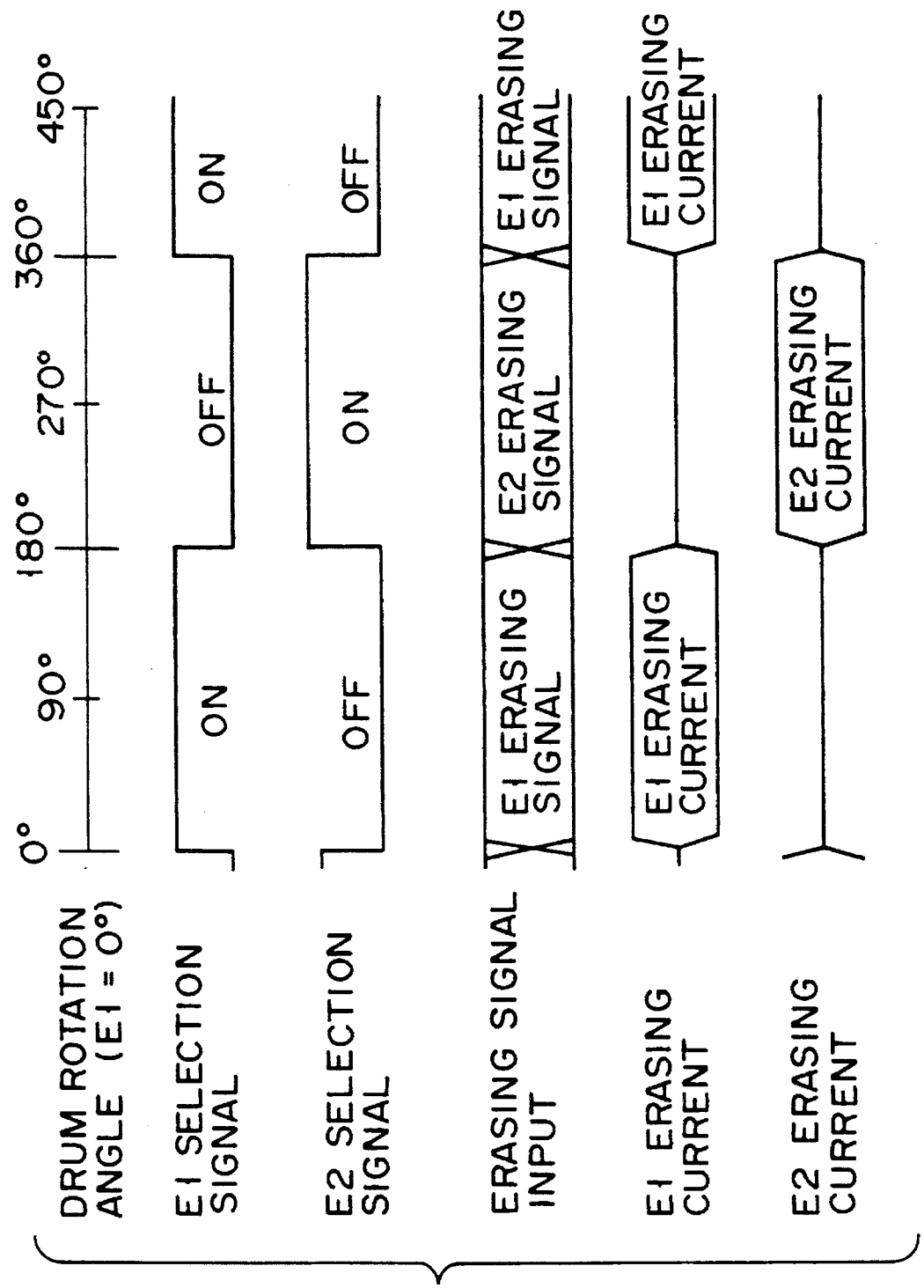
FIG. 56 is a timing chart for describing the operation of the erasing circuits in FIG. 55.

The following is the description of the operations of the erasing circuits 125a and 125b according to FIGS. 55 and 56.

To control the information signal recorded in a magnetic tape by the recording magnetic heads R1 and R2, the erasing signal is the rotary transformer driver circuit 126 and transmitted to an internal circuit of the rotary drum by the rotary transformer 127.

In this case, the erasing signal input to the rotary transformer driver circuit 126 contains the erasing signal for both the erasing magnetic heads E1 and E2.

The input terminals of the erasing circuits 125a and 125b are connected to the secondary windings 127a and 127b of the rotary transformer 127, respectively.

The erasing circuits 125a and 125b are alternately switched to the active state and non-active state by the E1 and E2 switching signals every 180°, supplying the erasing signal to the erasing magnetic heads E1 and E2 in order to erase the information signal in the magnetic tape under the active state.

The following is the description of the erasing circuit to decrease the number of rotary transformer channels.

The input stage of an erasing circuit is configured as an emitter follower or Darlington emitter follower circuit so that frequency characteristics will not be degraded when input terminals of the erasing circuits 125a and 125b are connected to the output terminal of the rotary transformer in common. Therefore, the input impedance is set high.

By increasing the input impedance of an erasing circuit, damping is applied to frequency characteristics to prevent them from degradation.

Because the input capacity of the emitter follower is normally small, degradation of frequency characteristics does not matter. The following is the description of a 4-channel erasing circuit according to FIGS. 57 through 59.

Figure 57:
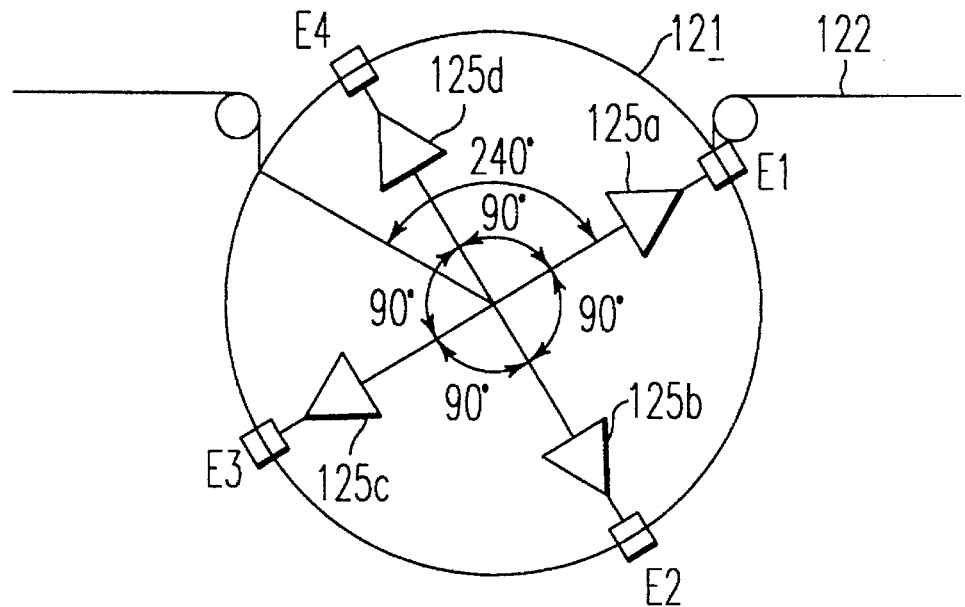
FIG. 57 is a schematic block diagram of a rotary drum provided with erasing heads according to another embodiment.

FIG. 57 shows a magnetic recording/reproduction apparatus to operate a 4-channel erasing circuit with one rotary transformer, in which the magnetic-tape lap angle is set to 240°, that is, the magnetic tape 12 is wound on the circumferential surface of a rotary drum so that the effective recording area of information signals will be 240°.

Figure 58:
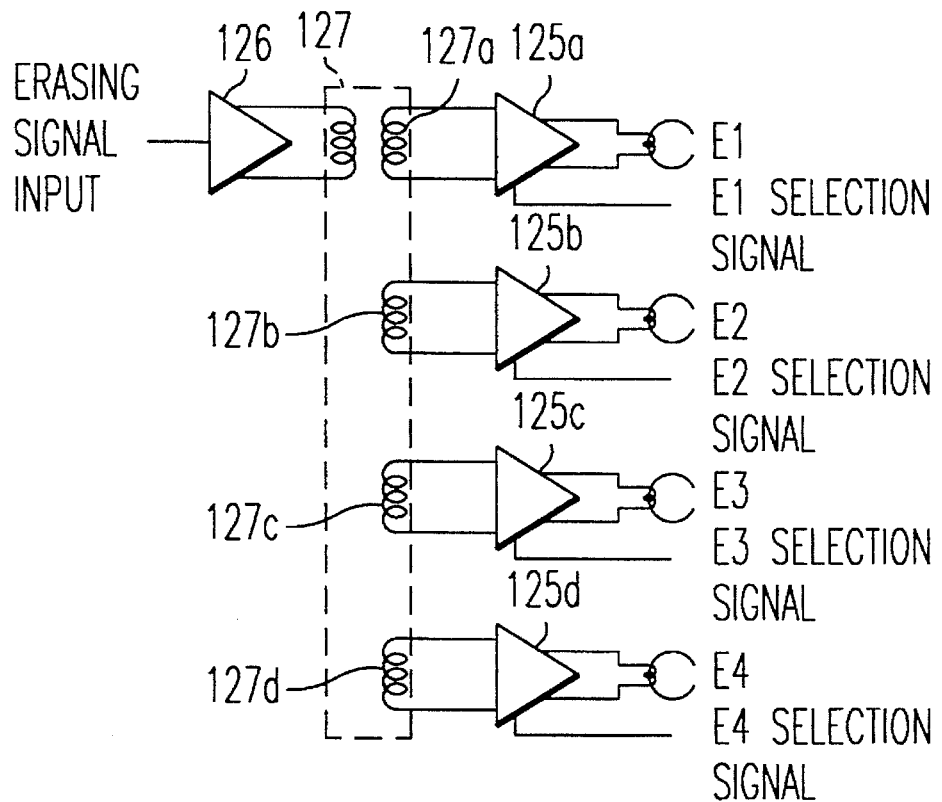
FIG. 58 is a circuit diagram of a circuit for switching the erasing circuits installed on the rotary drum in FIG. 57.
Figure 62:
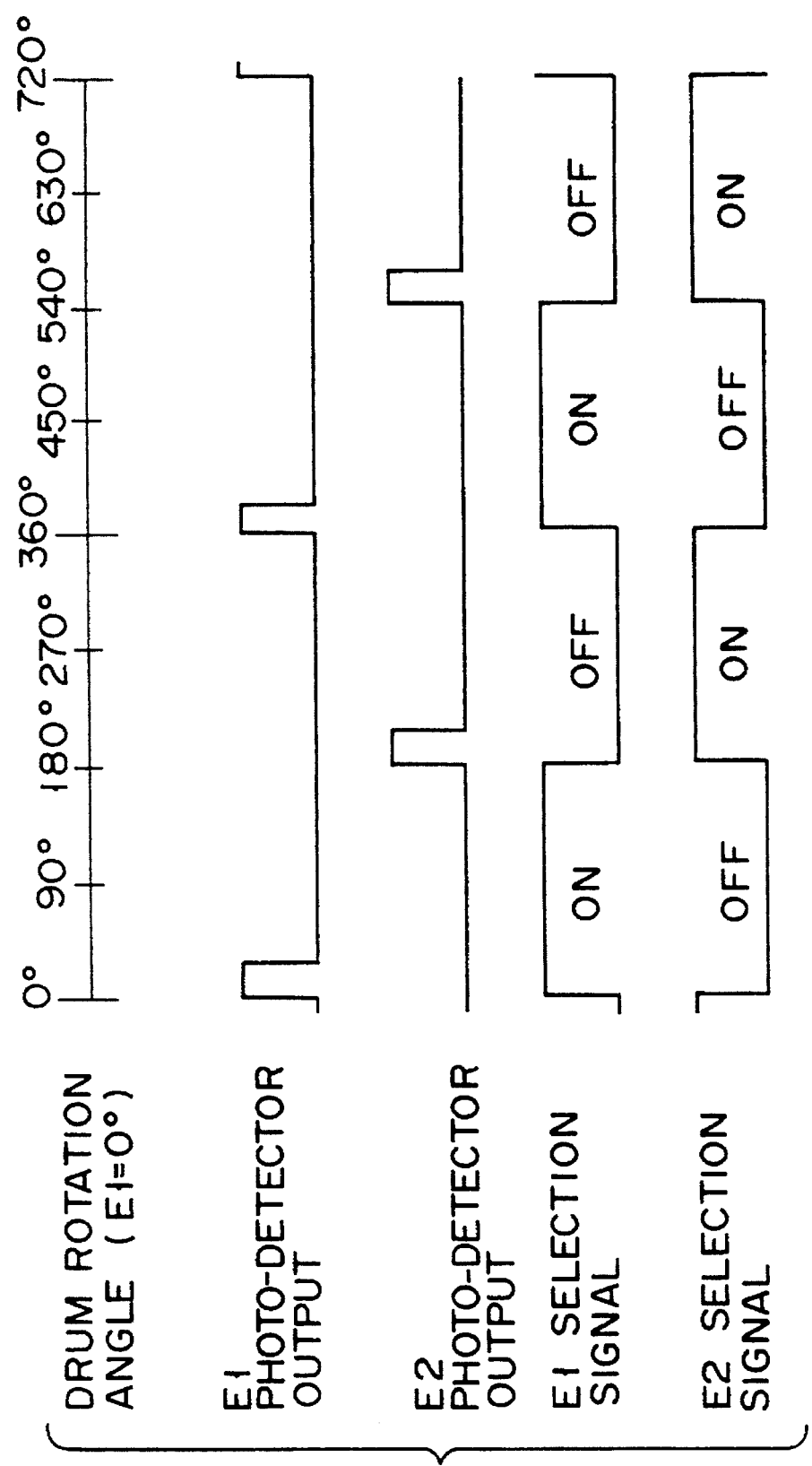
FIG. 62 is a timing chart for describing the switching operation of erasing circuits.

FIG. 58 shows the circuit configuration of the erasing circuit in FIG. 56. FIG. 59 shows a series of time charts for describing the switching operation of an erasing circuit. In FIG. 57, recording and reproduction circuits are omitted. In this embodiment, the erasing signal for erasing the recording signal in the magnetic tape 122 is input to the rotary transformer driver circuit 126 from the outside of the scanner 1, amplified, and transmitted to the internal circuit of a rotary drum through the rotary transformer 127.

The secondary windings 127a through 127d of the rotary transformer 127 are connected to the input terminals of the erasing circuits 125a through 125d, respectively to transmit the erasing signal to each erasing circuit. When the erasing signal is input to the erasing circuits 125a through 125d via the rotary transformer 127, the erasing signal is amplified by the erasing circuit and supplied to the erasing heads E1 through E4 respectively connected to the output terminals of the erasing circuits 125a through 125d.

Therefore, the erasing head is driven by the erasing signal in order to erase the information signal recorded in the magnetic tape 122.

The erasing circuits 125a through 125d are alternately switched to active state and non-active state by the E1 through E4 switching signals to be mentioned later respectively.

In this embodiment, the magnetic tape is wound on the rotary drum with the lap angle of 240° and 4-channel erasing circuits are selectively operated.

In this case, thought several erasing circuits are operated, the frequency characteristics of the recording/reproduction apparatus are not degraded by increasing the input impedance of the erasing circuits.

Because erasing signals have a single frequency, there is no problem in erasing if signals with the frequency can adequately be transmitted to erasing circuits. That is, problems are eliminated from erasing if degradation of frequency characteristics caused by connecting several erasing circuits in parallel is compensated by a rotary transformer driver circuit.

The following is the description of the method and circuit to alternately switch an erasing circuit to active state and non-active state according to FIGS. 60A, 60B, 61, and 62.

In the embodiment shown in FIGS. 60A and 60B, the magnetic-tape lap angle is set to 180° and two erasing heads are installed at the position 180° apart from each other.

The rotary drum 128 faces the stationary drum 129 as shown in FIG. 60A.

The erasing circuit is controlled by the LED (light emitting diode) 131 installed on the stationary drum and the erasing control circuit 130 to control the LED 131.

That is, the erasing circuit is controlled by the detection signal by the fact that the control beam emitted from the LED 131 is detected by light-detecting elements or the photodetectors 132 and 132b installed on the rotary drum 128 respectively facing the erasing heads E1 and E2 which are installed at the position 180° apart from each other and the detection signal is supplied to the erasing circuit.

In FIGS. 60A and 60B, the LED 131 is turned on by the erasing control circuit 130 and the rotary drum 128 rotates in the direction of the arrow. When the position of the photodetector 132a coincides with that of the erasing LED 131, the photodetector 132a outputs Hi-level signals.

Because the output terminal of the photodetector 132a is connected to the set input terminal of the flip-flop circuit 133 as shown in FIG. 61, the flip-flop circuit 133 outputs Hi-level signals through the output terminal Q.

when the photodetector 132a separates from the LED 131 after the rotary drum 128 further rotates in the direction of the arrow, the output of the photodetector 132 goes Lo-level. When the rotary drum 128 further rotates in the direction of the arrow and the photodetector 132b connected to the reset input terminal of the flip-flop circuit 133 detects the beam emitted from the LED 131, the flip-flop circuit 133 is reset and the output of the terminal Q of the flip-flop circuit 133 goes Lo-level.

Similarly, whenever the rotary drum 128 rotates 180°, the output of the flip-flop circuit 133 alternately goes Hi-level and Lo-level.

The output of the terminal Q brings the erasing circuit E1 under active state in Hi level and under non-active state in Lo level. Also, the output of the terminal Q brings the erasing circuit E2 under active state in Hi level and under non-active state in Lo level. (See FIG. 62.)

As mentioned above, in this embodiment, the circuit system at the rotary and stationary drum side can be composed of simple circuits and the power consumption of the erasing circuit mounted on the rotary drum can be decreased.

In this embodiment, the erasing LED 131 is turned on when VTR is in the erasing mode and turned off when it is in other mode. The following is the description of the switching circuit of another embodiment.

In this embodiment, the reflection-type photosensors 134a and 134b are installed on the rotary drum 128 so that they will face the erasing magnetic heads E1 and E2 respectively.

For the effective recording area of 180°, a reflector (e.g. a mirror) is installed at the erasing side and a non-reflector at the non-erasing side.

The reflection-type photosensors 134a and 134b are configured by integrating the LED 135 with the photodiode or phototransistor 136 as shown in FIG. 64.

It is assumed that this embodiment uses the reflection-type photosensor to output Hi-level signals when it faces the reflector and Lo-level signals when it faces the non-reflector. The erasing circuit is in active state while the rotary drum 128 rotates in the direction of the arrow, the erasing circuit corresponding to the erasing head E1 is controlled by the reflection-type photosensor 134a, and the photosensor 134b passes through the erasing area where the reflector is installed. Similarly, the erasing circuit corresponding to the erasing head E2 is controlled by the reflection-type photosensor 134b. As mentioned above, the switching signal to be directly input to the erasing circuit by the reflection-type photosensors 134a and 134b can be generated according to this embodiment. Switching is executed by, for example, a slip ring.

Moreover, the control circuit at the rotary drum side is very simply configured which is able to control the circuit mounted on the rotary drum and decrease power consumption.

If the stationary drum uses, for example, a glass mask with a reflection surface only for the effective recording area, the control mechanism can be simplified.

The following is the description of a switching circuit used for another embodiment according to FIGS. 65A and 65B.

In this embodiment, the photodetectors 137a and 137b to control erasing circuits are installed on the rotary drum 128 so that they will face the erasing heads E1 and E2 respectively. For the effective recording area of 180° at the side of the stationary drum 129, several erasing LEDs are semicircularly arranged in the effective recording area in correspondence with the photodetectors 137a and 137b. The LED array 138 is formed by arrangement of several LEDs.

Through the LED array 138 controls erasing circuits, it is controlled and turned on/off by the erasing control circuit 139. The photodetectors 137a and 137b detect the beam emitted from the LED array 138 and control the corresponding erasing circuit with the detection signal.

The following is the description of the operations of this embodiment.

The erasing circuit of the erasing magnetic head E1 is in active state while the rotary drum 128 rotates in the direction of the arrow, the circuit is controlled by the photodetector 137a, and the photodetector 137a passes through the erasing area where the erasing LED array 138 is installed.

On the contrary, the erasing circuit is in non-active state while the photodetector 137a passes through the erasing area where the LED array 138 is not installed. Similarly to the erasing circuit E1, the erasing circuit of the erasing magnetic head E2 is controlled by the photodetector 137b.

As mentioned above, the switching signal to be directly input to the erasing circuit by the photodetectors 137a and 137b can be generated according to this embodiment.

Moreover, according to this embodiment, the circuit to control the erasing circuit at the rotary drum side is very simply configured which is able to decrease the power consumption of the circuit mounted on the rotary drum. Also, at the stationary drum side, the control circuit and mechanism of the drum system can be simplified because several LEDs are arranged only for the effective recording area.

Through LEDs are used for the light emitting elements for erasing control, illuminates such as EL (electroluminescence), optical fiber, and plasma display may also be used.

Through this embodiment is described by assuming that the present invention is applied to a rotary drum-type VTR, the invention can be applied to the disk-type VTR which is another magnetic head mounting type or the medium-drum-type VTR.

Also, in this embodiment, through the present invention is described as the example to switch a 1-channel rotary transformer and a 4-channel erasing circuit by setting the magnetic-tape lap angle to 180° and a 1-channel rotary transformer and a 2-channel erasing circuit or lap angle to 240°, the invention can also be applied to the example to connect another multiple-channel erasing circuit to a 1-channel rotary transformer with another lap angle.

In view of the recording format, or if the power consumption of an erasing circuit does not matter, the erasing circuit may constantly be brought under active state.

In this case, it is permitted to externally control and input the control signal to be supplied to erasing circuit according to the track or range to be erased.

Figure 66:
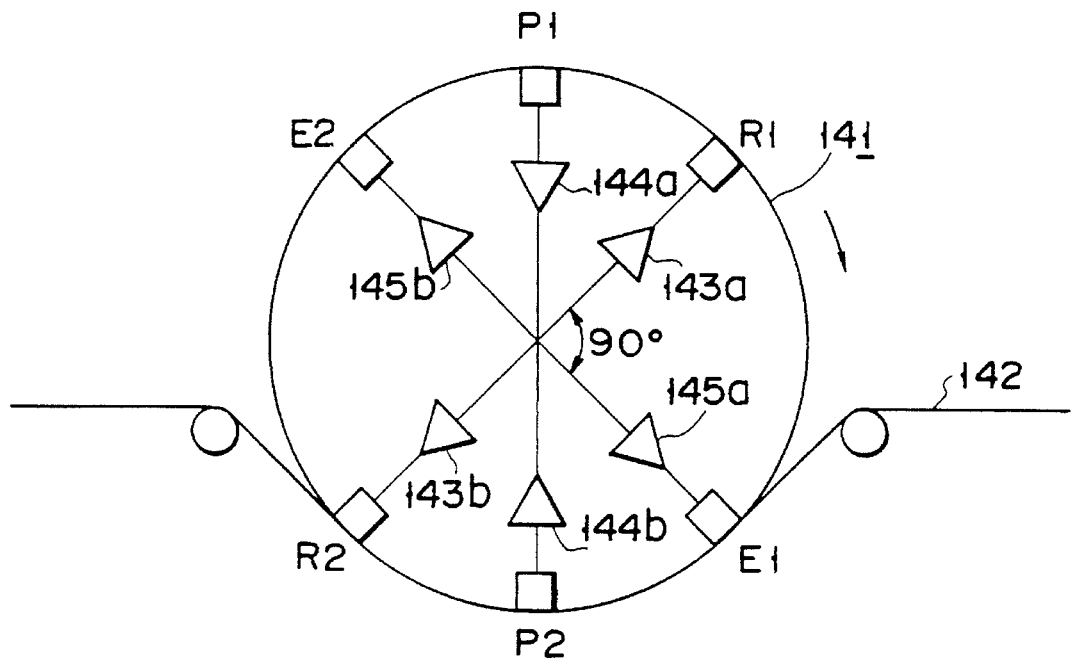
FIG. 66 is a schematic block diagram of the rotary drum of a magnetic recording/reproduction apparatus provided with the erasing heads according to another embodiment with the tap lap angle of 90°.

The following is the description of an embodiment in which a recording magnetic head and erasing magnetic head are mounted on a rotary drum, one or more recording circuits and one or more erasing circuits are connected to a rotary transformer in common, and the timing to make the recording circuit(s) active is different from that to make the erasing circuit(s) active, according to FIG. 66.

In this embodiment, the magnetic tape 142 is wound on the circumferential surface of a rotary drum of the scanner 141 so that the effective recording area of information signal will be 90°.

The recording circuit 143a amplifies the information signal sent from the rotary transformer (not illustrated) and drives the recording head R1.

The recording head R2 is installed at the position 180° apart from the recording head R1.

The recording head R2 is driven by the recording circuit 143b. The information signal is recorded in the magnetic pate by the recording heads R1 and R2.

The information signal recorded in the magnetic tape is reproduced by the reproduction magnetic heads P1 and P2 and amplified by the reproduction circuits 144a and 144b.

The reproduction magnetic heads P1 and P2 are installed at the position 180° apart from each other and the outputs of the reproduction circuits 144a and 144b are connected each other and transmitted to the outside of the rotary drum through the rotary transformer.

Erasing is executed by the erasing circuits 145a and 145b and the erasing magnetic heads E1 and E2.

The erasing circuits 145a and 145b are connected to the recording circuits 143a and 143b and the rotary transformer in common. For erasing, the erasing circuit 145a amplifies the erasing signal sent from the rotary transformer and drives the erasing magnetic head E1.

The erasing magnetic head E2 installed at the position 180° apart from the erasing magnetic head E1 is driven by the erasing circuits 145a and 145b.

Figure 67:
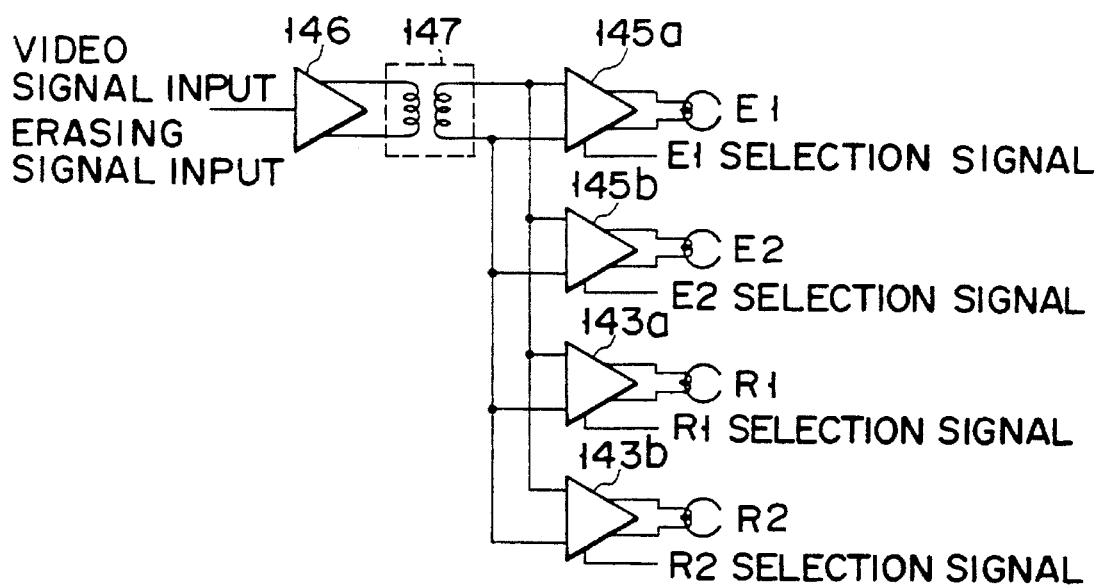
FIG. 67 is a circuit diagram of a circuit for switching the erasing and recording circuits installed on the rotary drum in FIG. 66.
Figure 68:
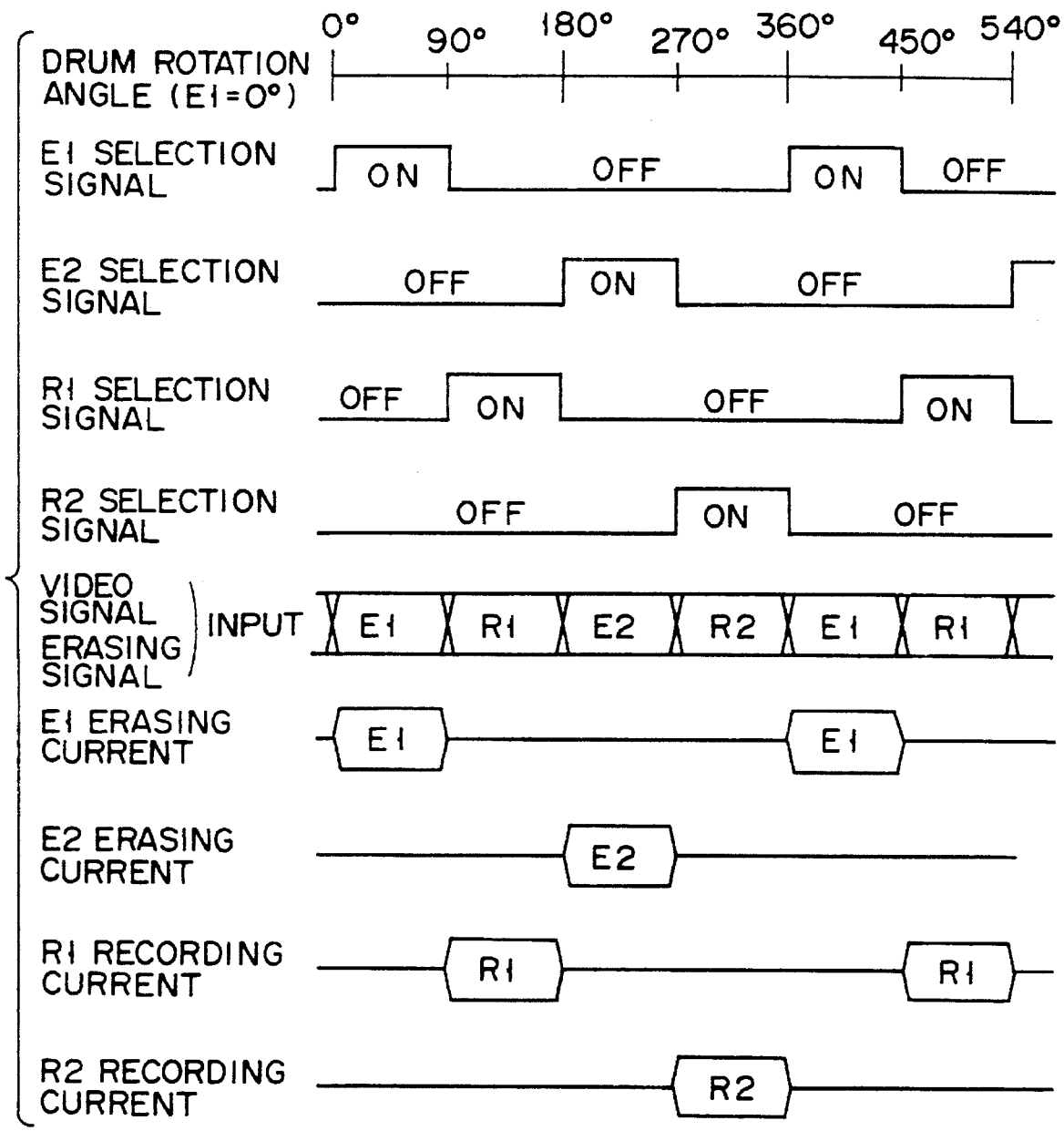
FIG. 68 is a timing chart for describing the operation of the erasing circuits in FIG. 67.

The following is the description of the configuration and operations of the erasing circuit in this embodiment according to FIGS. 67 and 68.

Information signal is recorded in a magnetic tape by the recording magnetic heads R1 and R2. To execute so-called insert edition in which the recorded information signal is erased and recorded again, erasing signal is amplified by the rotary transformer driver circuit 146 and transmitted to the inside of a rotary drum via the rotary transformer 147.

The signal to be input to the rotary transformer driver circuit 146 contains both the erasing signal of the erasing heads E1 and E2 and the recorded information signal of the recording magnetic heads R1 and R2.

The input of the recording circuits 143a and 143b and that of the erasing circuits 145a and 145b are connected to the output of the rotary transformer 147 in common.

The recording circuits 143a and 143b and the erasing circuits 145a and 145b are alternately switched to active state and non-active state by the R1 and R2 switching signals and the E1 and E2 switching signals to be mentioned later whenever the rotary drum rotates 90°.

Under active state, the erasing head is driven by the erasing signal and the information signal in the magnetic tape is erased. Then, the recording head is driven by the recording circuit and new information signal is recorded in the data-erased magnetic tape.

The following is the description of recording and erasing circuits to decrease the number of rotary transformer channels. Because the inputs of the recording and erasing circuits are connected to a rotary transformer in common, the input stages are configured into the emitter follower or Darlington emitter follower type and the input impedance is set high so that frequency characteristics will not be degraded.

The following is the description of an embodiment to operate a 2-channel recording circuit and a 1-channel erasing circuit with one rotary transformer by setting the magnetic-tape lap angle to 120°, according to FIGS. 69 through 71.

The magnetic tape is wound around a rotary drum by 120° and data in two re-recording tracks corresponding to the recording magnetic heads R1 and R2 are simultaneously erased by the erasing magnetic head E1 previously to the data re-recorded information track.

That is, to execute insert edition, erasing signal is amplified by the rotary transformer driver circuit 146 and transmitted to an internal circuit of the rotary drum through the rotary transformer 147.

The signal to be input to the rotary transformer driver circuit 146 contains both the erasing signal of the erasing magnetic head E1 and the recording signal of the recording magnetic heads R1 and R2.

The input of the recording circuits 143a and 143b are connected to the output of the rotary transformer 147 in common. The recording circuits 143a and 143b and the erasing circuit 145 are alternately switched to active state and non-active state by the R1 and R2 switching signals and the E1 switching signal to be mentioned later whenever the rotary drum rotates 120°.

Under active state, the erasing signal is sent to the erasing magnetic head to drive the head. Thus, the information signal in the magnetic tape is erased. Then the recording magnetic head is driven by the recording circuit and new information signal is recorded in the data-erased magnetic tape.

In this embodiment, the description of the configuration of the recording and erasing circuits to decrease the number of rotary transformer channels is omitted because the configuration is the same as that of the embodiment in FIG. 66.

The following is the description of the method and circuit to switch a recording or erasing circuit to active state and non-active state according to FIGS. 72A and 72B.

In this embodiment, the reflection-type photosensors 150a, 150b, 151a, and 151b to control recording and erasing circuits are installed on the rotary drum 148 so that they will face the erasing magnetic heads E1 and E2 and the recording magnetic heads R1 and R2 respectively.

When the effective recording area of the stationary drum 149 is 90°, a reflector (e.g. mirror) is installed at the recording side of the recording area and a non-reflector at the non-recording side of it.

The non-reflector is made of non-reflection material which cannot be detected by the reflection-type photosensors.

The reflection-type photosensors 150a, 150b, 151a, and 151b have the same configuration as that of the sensor 134a shown in FIG. 64, which are integrated with LEDs and photodiodes (or phototransistors).

It is assumed that this embodiment uses the reflection-type photosensor to output Hi-level signals when it faces the reflector and Lo-level signals when it faces the non-reflector. The recording circuit is in active state while the rotary drum 148 rotates in the direction of the arrow, the recording circuit corresponding to the recording head R1 is controlled by the reflection-type photosensor 151a, and the photosensor 151a passes through the recording area where the reflector is installed. On the contrary, the recording circuit is in non-active state while the photosensor 151a passes through the non-reflector.

Similarly, the recording circuit corresponding to the recording head R2 is controlled by the reflection-type photosensor 151b, the erasing circuit corresponding to the erasing head E1 by the reflection-type photosensor 150a, and the erasing circuit corresponding to the erasing head E2 by the reflection-type photosensor 150b.

According to this embodiment, the 90° switching signal to be directly input to a recording or erasing circuit can be generated by the reflection-type photosensors 150a, 150b, 151a, and 151b.

The generated signal functions as the E1, E2, R1, and R2 switching signals as shown in FIG. 67.

Recording and erasing in this embodiment are switched by a slip ring or a mechanical shutter installed between the reflection surface for recording and erasing and the reflection-type photosensor.

According to this embodiment, the circuit installed on the rotary drum is simplified and the power consumption is decreased. Moreover, a glass mask having a reflection surface may be installed only in the effective recording area. Therefore, the cylinder-system mechanism can be simplified by using said glass mask.

Figure 73A:
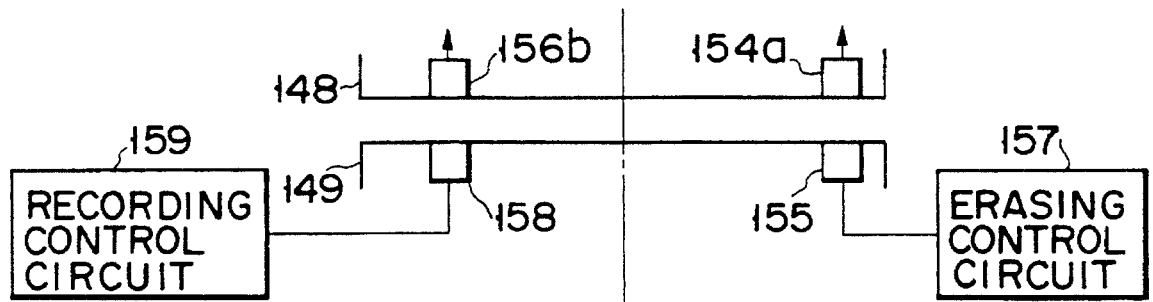
FIGS. 73A and 73B show a detection system for switching the erasing and recording circuits according to the third modified embodiment.
Figure 73B:
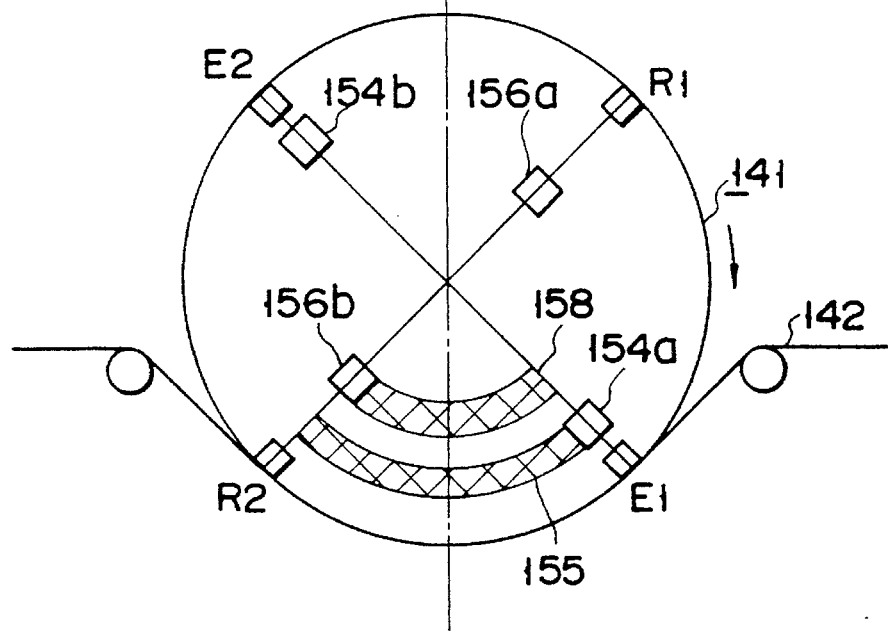

The following is the description of another embodiment according to FIGS. 73A and 73B.

In this embodiment, the photodetectors 154a, 154b, 156a, and 156b to control recording and erasing circuits are installed on the rotary drum 148 so that they will face the magnetic heads R1 and R2, and the erasing magnetic heads E1 and E2 respectively. In this case, the recording heads R1 and R2 are installed at the position 180° apart from each other. Similarly, the erasing magnetic heads E1 and E2 are installed at the position 180° apart from each other.

When the effective recording area of the stationary drum 149 is 90°, several recording and erasing LEDs are installed in the effective recording area so that they will face the photodetectors 154a, 154b, 156a, and 156b.

The recording circuit is controlled by the recording LED array 158 installed on the stationary drum and the erasing circuit by the erasing LED array 155. That is, when the photodetectors 154a, 154b, 156a, and 156b receive the beam emitted from the recording LED array 158 and the erasing LED array 155, the recording and erasing circuits are controlled by the detection signal of these photodetectors.

The following is the description of the 90° switching circuit of this embodiment.

The R1 recording circuit is in active state while the rotary drum rotates in the direction of the arrow, the R1 recording circuit is controlled by the photodetector 156a, and the photodetector 156a passes over the recording area where the recording LED array 158 is installed.

On the contrary, the recording circuit is in non-active state while the photodetector passes over the area where the recording LED array 158 is not installed.

Similarly, the R2 recording circuit is controlled by the photodetector 156b and the E1 erasing circuit by the photodetector 154a.

While the photodetector 154a passes over the recording area where the erasing LED array 155 is installed, the E1 erasing circuit is in active state.

On the contrary, while the photodetector passes over the area where the erasing LED array 155 is not installed, the E1 erasing circuit is in non-active state. Similarly, the E2 erasing circuit is controlled by the photodetector 154b.

According to this embodiment, the 90° switching signal to be directly input to a recording or erasing circuit can be generated.

The generated signal contains the E1, E2, R1, and R2 switching signals as shown in FIG. 67.

The invention related to the above embodiment can also be applied to switching of a multiple-channel recording circuit or erasing circuit or a multiple-channel recording/erasing circuit. For example, if the present invention is applied to an apparatus in which a 4-channel recording head and recording circuit and a 4-chanel erasing head and erasing circuit are used and the effective recording area angle is 45°, switching can be executed by a 1-channel rotary transformer.

Also, the present invention can be applied to a so-called self-recording head which performs recording and reproduction with one head.

Moreover, the present invention allows a recording circuit and erasing circuit to be respectively integrated or both circuits to be combined and integrated. It also allows several circuit windings corresponding to the number of recording and erasing circuits to be arranged in one winding slot of a rotary transformer.

Figure 76:
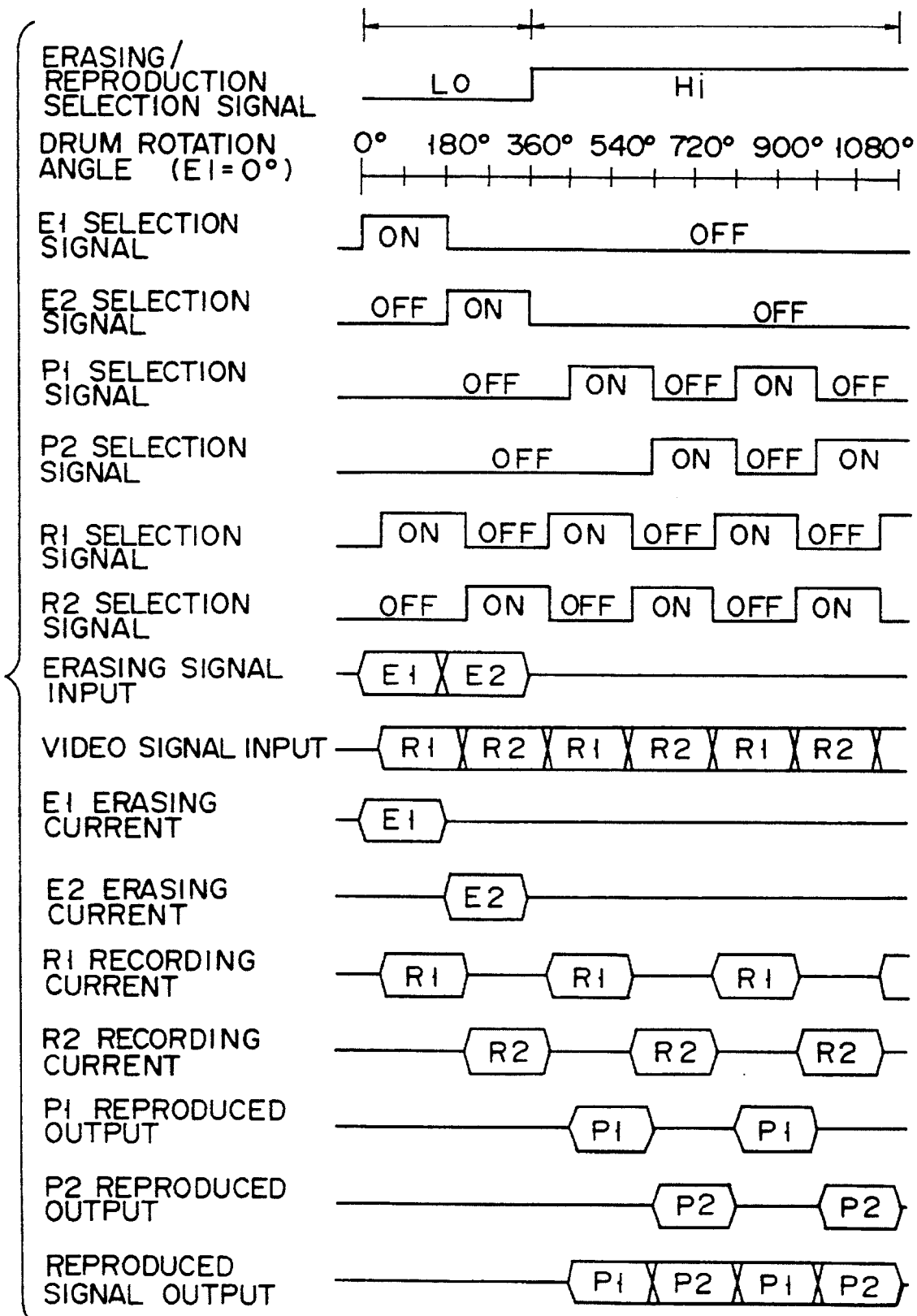
FIG. 76 is a timing chart for describing the operation of the circuits in FIG. 75.

The following is the description of an embodiment in which a reproduction magnetic head and erasing magnetic head are mounted on a rotary drum together, one or more reproduction circuits and one or more erasing circuits are connected to a 1-channel rotary transform in common, and the timing to drive the reproduction circuit is different from that to drive the erasing circuit, according to FIGS. 74 through 76.

In this embodiment, the magnetic tape 162 is wound on the circumferential surface of the rotary drum of the scanner 161 so that the effective recording area of information signal will be 180°.

The recording circuit 163a amplifies the information signal sent from the rotary transformer (not illustrated) and drives the recording head R1.

The recording head R2 is installed at the position 180° apart from the recording head R1.

The recording head R2 is driven by the recording circuit 163b. The information signal is recorded in the magnetic tape by the recording heads R1 and R2.

The information signal recorded in the magnetic tape is reproduced by the reproduction magnetic heads P1 and P2 and amplified by the reproduction circuits 164a and 164b.

The reproduction magnetic heads P1 and P2 are installed at the position 180° apart from each other and the outputs of the reproduction circuits 164a and 164b are connected each other and transmitted to the outside of the rotary drum through the rotary transformer.

Erasing is executed by the erasing circuits 165a and 165b and the erasing magnetic heads E1 and E2.

The erasing circuits 165a and 165b are connected to the recording circuits 163a and 163b and the rotary transformer in common. For erasing, the erasing circuit 165a amplifies the erasing signal sent from the rotary transformer and drives the erasing magnetic head E1.

The erasing magnetic head E2 installed at the position 180° apart from the erasing magnetic head E1 is driven by the erasing circuits 165a and 165b.

As shown in FIGS. 75 and 76, information signals are recorded in the magnetic tape by the recording magnetic heads R1 and R2. However, to execute so-called insert edition to erase the recorded information signal and record it again, the erasing signal is amplified by the rotary transformer driver circuit 166 and transmitted to the inside of the rotary drum through the rotary transformer 167. The rotary transformer driver circuit 166 is connected to the rotary transformer receiver circuit 168 and the rotary transformer 167.

For rotary erasing, because the erasing/reproduction switching signal goes to Lo level, the rotary transformer receiver circuit 168 goes to a non-active state and the erasing rotary transformer drive 166 to an active state.

The erasing circuits 165a and 165b are alternately switched to the active state and non-active state by the E1 and E2 switching signals every 180° of rotation to drive the erasing magnetic heads E1 and E2 by applying erasing current to these heads under the active state.

Thus, the information signal in the magnetic tape 162 is erased by the erasing magnetic head. In this case, the reproduction circuits 164a and 164b turn off both the P1 and P2 switching signals.

The new information signal input to the recording circuit transformer drive 169 is amplified and transmitted to an internal circuit of the rotary drum through the recording circuit transformer 170.

The recording rotary transformer 170 and recording circuits 163a and 163b are connected together and the recording circuits 163a and 163b are switched to active state and non-active state by the R1 and R2 switching signal every 180° of rotation.

In the active state, the recording circuits 163a and 163b drive the recording magnetic heads R1 and R2 to record the information signal in the data-erased magnetic tape.

After the above insert edition, because the E1 and E2 switching signals are turned off, rotary erasing and erasing signal input are stopped.

Then, the erasing/reproduction switching signal is set to Hi level and the erasing rotary transformer driver circuit 166 and rotary transformer receiver circuit 168 go to the non-active state. Then, the P1 and P2 switching signals are sequentially turned on according to the rotation of the rotary drum.

Thus, the information signals sent from the reproduction magnetic heads P1 and P2 are amplified by the reproduction circuits 164a and 164b and transmitted to the outside of the rotary drum through the rotary transformer 167.

The transmitted information signal is amplified by the rotary transformer receiver circuit 168 again.

When normal recording is executed while erasing is executed by a stationary head, as shown in FIG. 76; the erasing/reproduction switching signal is set to Hi level, the erasing rotary transformer driver circuit 166 goes to the non-active state, and the rotary transformer receiver circuit 168 goes to the active state.

In this case, the information signal to be recorded is transmitted through route previously mentioned and input to the recording circuits 163a and 163b.

The recording circuits 163a and 163b drive the recording magnetic heads R1 and R2 according to information signal to record the information signal in a magnetic tape.

The recorded information signal is immediately reproduced by the reproduction magnetic heads P1 and P2 (simultaneous reproduction).

The information signal reproduced by the reproduction magnetic heads P1 and P2 is amplified by the reproduction circuits 164a and 164b and transmitted through the route previously mentioned. In this embodiment, the method to decrease the number of rotary transformer channels uses the same configuration as that in the previous embodiment.

The rotary transformer receiver 168 connected to the rotary transformer in common can be switched to the erasing rotary transformer driver circuit 166 to be mentioned later by the same means as erasing circuit.

Because the reproduction circuit is connected to the input of the erasing circuit and the rotary transformer in common, the output of the reproduction circuit under non-active state goest to a high impedance state so that frequency characteristics of the erasing circuit under active state will not be degraded. Therefore, the circuit to bring the output of the reproduction circuit shown in FIG. 4 into high impedance is installed. The description of the method and circuit (180° switching circuit) to alternately switch a reproduction circuit or erasing circuit to active state and non-active state in this embodiment is omitted because the method and circuit are the same as those of the embodiment shown in FIGS. 60A through 65B.

The following is the description of recording/reproduction apparatuses according to various specifications.

Figure 77:
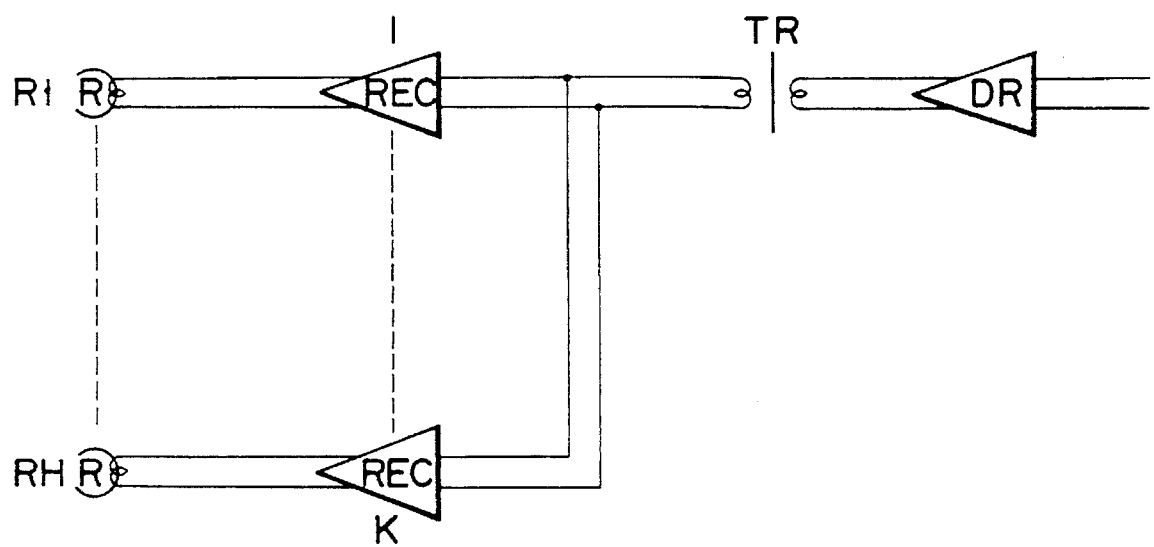
FIG. 77 is a circuit diagram of a multiple-channel recording apparatus using a rotary transformer.

First, description is made on a recording apparatus using several recording-only magnetic heads and a one-winding rotary transformer according to FIG. 77.

In the recording apparatus in FIG. 77, inputs of the recording heads R1 through Rh are connected to outputs of the recording circuits REC1 through RECk respectively.

The inputs of the recording circuits REC1 through RECk are connected in common and connected to the secondary winding of the rotary transformer TR.

The primary winding of the rotary transformer TR is connected to the output of the rotary-transformer driver circuit DR.

The following is the description of the arrangement of recording heads of the recording apparatus using said recording circuits at various tape lap angles and the transmission state of the recording signal to be input to said recording heads from the rotary transformer.

In the lap angle is set to 180° as shown in FIG. 78A, two recording magnetic heads R1 and R2 are installed on a rotary drum so that they will be faced to each other at the interval of 180°. In this embodiment, the rotary transformer TR sends recording signal to the recording magnetic heads R1 and R2 alternately as shown in FIG. 78B.

According to the recording apparatus with the above configuration, the number of rotary transformers can be decreased to ½ the number of recording magnetic heads and recording circuits.

Moreover, the number of rotary transformer driver circuits can be decreased to ½ the number of recording magnetic heads and recording circuits. Thus, power consumption can be decreased. If the lap angle is set to 120° as shown in FIG. 79A, three recording magnetic heads R1, R2, and R3 are installed on the rotary drum at the interval of 120°.

In this embodiment, the rotary transformer TR repeatedly sends recording signal to the recording magnetic heads R1, R2, and R3 in order as shown in FIG. 79B.

According to the recording apparatus with the above configuration, the number of rotary transformers can be decreased to ⅓ the number of recording magnetic heads and recording circuits. Moreover, the number of rotary transformer driver circuits can be decreased to ⅓ the number of recording magnetic heads and recording circuits.

Therefore, power consumption can be decreased.

If the lap angle is set to (360/H)° as shown in FIG. 80A, 360/H recording magnetic heads R1, R2, ..., and RH are installed on the rotary drum at the interval of (360/H)°.

In this embodiment, the rotary transformer TR repeatedly sends the corresponding recording signal to the recording magnetic heads R1, R2, ..., and RH in order.

According to the recording apparatus with the above configuration, the recording signals of the magnetic head R1 and R1 recording circuit (not shown) through the magnetic head RH and the K recording circuit (not shown) can be transmitted by the rotary transformer TR.

Therefore, the number of rotary transformers can be decreased to 1/H the number of recording magnetic heads and recording circuits. Moreover, the number of rotary transformer driver circuits can be decreased to 1/H the number of recording magnetic heads and recording circuits.

Figure 81A:
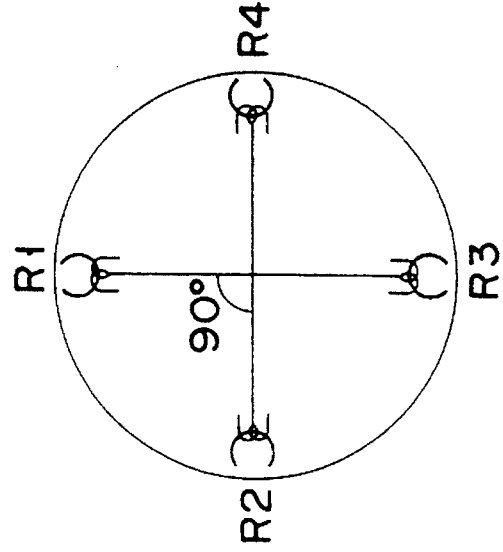
Figure 81B:
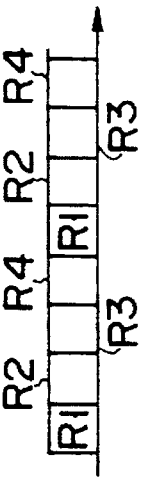

If the lap angle is set to 90° as shown in FIG. 81A, four recording magnetic heads R1 through R4 are installed on the rotary transformer at the interval of 90°. In this embodiment, the rotary transformer TR repeatedly sends the corresponding recording signal to the recording magnetic heads R1 through R4 in order.

Figure 82A:
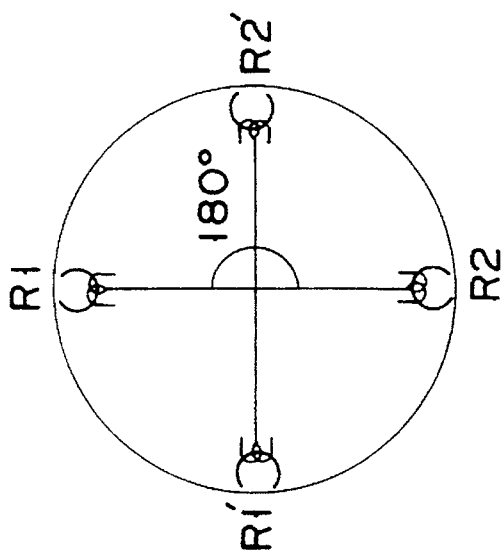

According to the apparatus with the above configuration, the number of rotary transformers can be deceased to ¼ the number of recording magnetic heads and recording circuits. Moreover, the number of rotary transformer driver circuits can be decreased to ¼ the number of recording magnetic heads and recording circuits. Therefore, power consumption can be decreased. In the recording apparatus shown in FIG. 82A, two sets of magnetic heads R1 and R2 and R1' and R2' are installed and the magnetic heads of each set are installed with the lap angle of 180°.

That is, the first set of recording magnetic heads R1 and R2 and the second set of recording magnetic heads R1' and R2' are installed on the rotary transformer at the interval of 180° respectively, and two sets of recording magnetic heads are perpendicularly arranged.

Figure 82B:
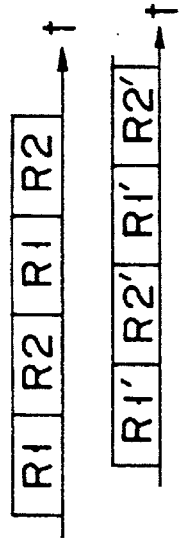

In this embodiment, the first set of magnetic heads R1 and R2 and the second set of magnetic heads R1' and R2' receive recording signal from another rotary transformer TR. That is, recording signal is repeatedly supplied to the first set of magnetic heads in order of R1, R2, R1, and R2 from the rotary transformer as shown in FIG. 82B. Similarly, recording signal is repeatedly supplied to the second set of magnetic heads R1' and R2' from another rotary transformer in order of R1', R2', R1', and R2'. According to the apparatus with the above configuration, the number of rotary transformers can be decreased to ½ the number of recording magnetic heads and recording circuits. Moreover, the number of rotary transformer driver circuits can be decreased to ½ the number of recording magnetic heads and recording circuits. Therefore, power consumption can be deceased.

Figure 83A:
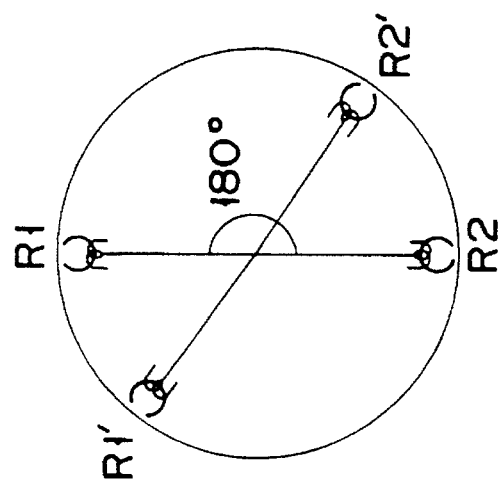

In the recording apparatus shown in FIG. 83A, two pairs of magnetic heads R1 and R2 and R1' and R2' are installed and magnetic heads of each set are arranged with the lap angle of 180°. That is, the first pair of recording magnetic heads R1 and R2 and the second pair of magnetic heads R1' and R2' are installed on the rotary drum at the interval of 180° respectively. In this case, two pairs of the magnetic heads may not be perpendicular to each other and the height of each magnetic head is set so that it will meet the recording format of magnetic tape.

Figure 83B:
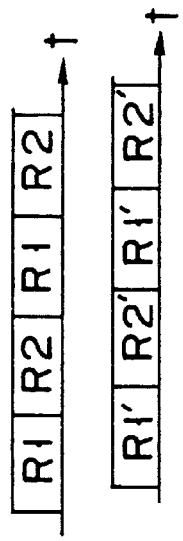

In this embodiment, the first pair of magnetic heads R1 and R2 and the second pair of magnetic heads R1' and R2' receive recording signal from another rotary transformer TR. That is, recording signal is repeatedly supplied to the first pair of magnetic heads from the rotary transformer in order of R1, R2, R1, and R2 as shown in FIG. 83B. Similarly, recording signal is repeatedly supplied to the second pair of magnetic heads R1' and R2' from another rotary transformer in order of R1', R2', R2', and R2'. According to the recording apparatus with the above configuration, the number of rotary transformer is can be decreased to ½ the number of recording magnetic heads and recording circuits. Moreover, the number of rotary transformer driver circuits can be decreased to ½ the number of recording magnetic heads and recording circuits. Therefore, power consumption can be decreased.

In this recording apparatus in FIG. 84, the rotary transformer TR is used in which several secondary windings are set in one winding slot. These secondary windings of the rotary transformer TR are connected to the inputs of the recording circuits REC1 through RECk respectively. The outputs of the recording circuits REC1 through RECk are connected to the inputs of the recording magnetic heads R1 through RH respectively. The primary winding of the rotary transformer TR is connected to the output of the rotary transformer driver circuit DR.

This type of circuit can be applied to the magnetic heads shown in FIGS. 78A through 83A.

According to the apparatus with the above configuration, because the winding leading terminal of a rotary transformer can be installed at the position close to each recording circuit, the substrate pattern is simplified and the wire length is decreased. Thus, frequency characteristics are improved. Moreover, the effect same as that of the apparatus in FIG. 77 can be obtained. FIG. 85 shows a circuit of a reproduction apparatus. In this circuit, the outputs of the reproduction magnetic heads P1 through PH are connected to the outputs of the reproduction circuits PLAY1 through PLAYk respectively. The inputs of the reproduction circuits PLAY1 through PLAYk are connected in common and connected to the primary winding of the rotary transformer TR.

The secondary winding of the rotary transformer TR is connected to the input of the rotary transformer receiver circuit DE. The following is the description of the arrangement of the reproduction heads of the reproduction apparatus using said reproduction circuits at various tape lap angles and the transmission state of the recording signal to be input to the recording heads from a rotary transformer.

Figure 86A:
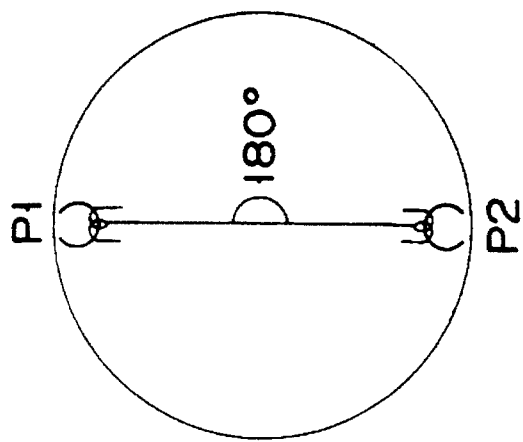

If the lap angle is set to 180° as shown in FIG. 86A, two reproduction magnetic heads P1 and P2 are installed on a rotary drum so that they will face each other at the interval of 180°.

Figure 86B:

In this embodiment, the rotary transformer TR receives reproduction signal alternately from the reproduction magnetic heads P1 and P2 as shown in FIG. 86B.

According to the reproduction apparatus with the above configuration, the number of rotary transformers can be decreased to ½ the number of reproduction magnetic heads and reproduction circuits. Moreover, the number of rotary transformer receiver circuits can be decreased to ½ the number of reproduction magnetic heads and reproduction circuits. Therefore, power consumption can be decreased.

Figure 87A:
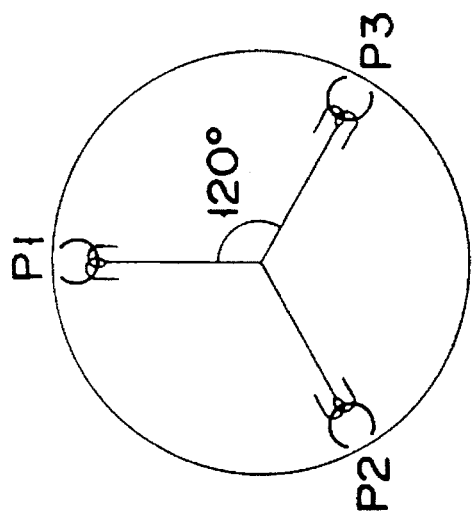
Figure 87B:

If the lap angle is set to 120° as shown in FIG. 87A, three reproduction magnetic heads P1, P2, and P3 are installed on a rotary drum at the interval of 120°. In this embodiment, reproduction signal is repeatedly supplied to the rotary transformer TR from the reproduction magnetic heads P1, P2, and P3 in order as shown in FIG. 87B.

According to the reproduction apparatus with the above configuration, the number of rotary transformers can be decreased to ⅓ the number of reproduction magnetic heads and reproduction circuits. Moreover, the number of rotary transformer receiver circuits can be decreased to ⅓ the number of reproduction magnetic heads and reproduction circuits. Therefore, power consumption can be decreased.

Figure 88A:
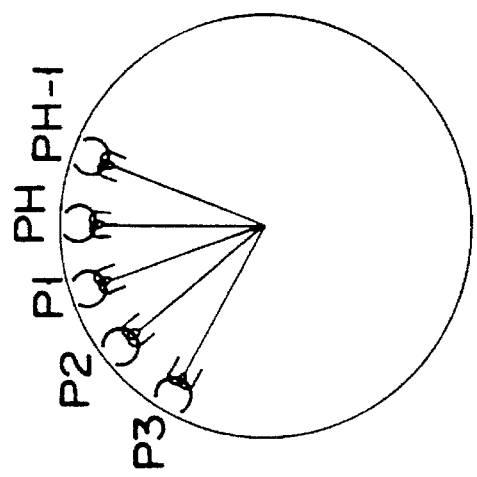
FIGS. 86A through 91B show the rotary drums with variously-arranged reproduction magnetic heads and reproduction signals corresponding to them.
Figure 88B:
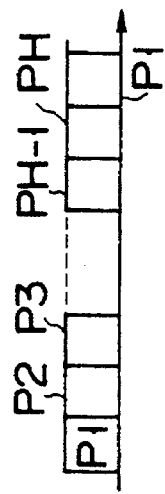

If the lap angle is set to (360/H)° as shown in FIG. 88A, 360/H reproduction magnetic heads P1, P2, ... , and PH are installed on a rotary drum at the interval of (360/H)°. In this embodiment, reproduction signal is repeatedly supplied to the rotary transformer TR from the reproduction magnetic heads P1, P2, ... , and PH in order as shown in FIG. 88B.

According to the reproduction apparatus with the above configuration, the reproduction signals of the magnetic head P1 and the P1 recording circuit (not shown) through the magnetic head PH and the S reproduction circuit (not shown) can be transmitted by one rotary transformer TR.

Therefore, the number of rotary transformers can be decreased to 1/H the number of reproduction magnetic heads and reproduction circuits. Moreover, the number of rotary transformer receiver circuits can be decreased to 1/H the number of reproduction magnetic heads and reproduction circuits. Therefore, power consumption can be decreased.

Figure 89A:
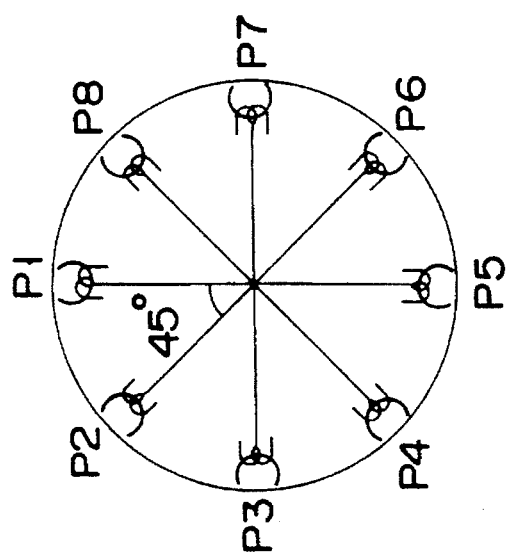
Figure 89B:
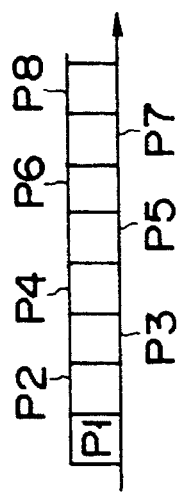

If the lap angle is set to 45° as shown in FIG. 89A, eight reproduction magnetic heads P1 through P8 installed on a rotary drum at the interval of 45°. In this embodiment, reproduction signal is repeatedly supplied to the rotary transformer TR from the reproduction magnetic heads P1 through P8 in order as shown in FIG. 89B.

According to the recording apparatus with the above configuration, the number of rotary transformers can be decreased to ⅛ the number of reproduction magnetic heads and reproduction circuits. Moreover, the number of rotary transformer receiver circuits can be decreased to ⅛ the number of reproduction magnetic heads and reproduction circuits. Therefore, power consumption can be decreased.

Figure 90A:
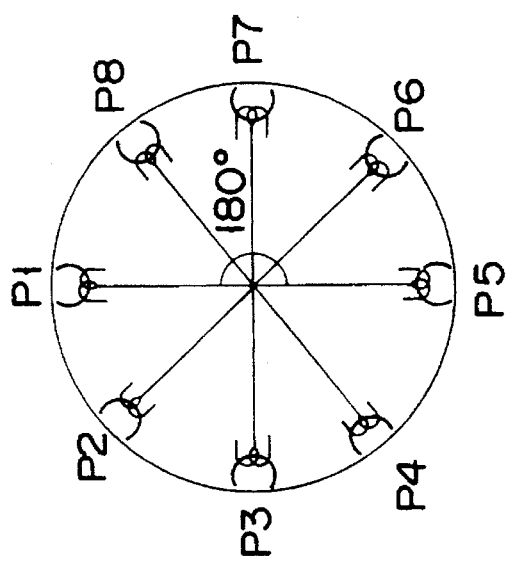

In the reproduction apparatus shown in FIG. 90A, four sets of magnetic heads P1 through P5, P2 and P6, P3 and P7, and P4 and P8 are installed and the magnetic heads of each set are arranged with the lap angle of 180°.

These sets of magnetic heads are sequentially arranged at the angle of 45°.

Figure 90B:
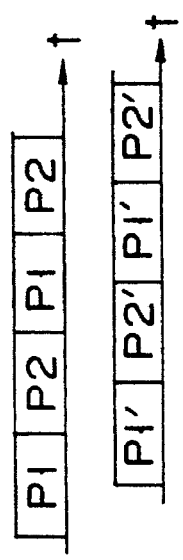

In this embodiment, the reproduction signal from each set of magnetic heads is supplied to each corresponding rotary transformer. For example, as shown in FIG. 90B, reproduction signals is repeatedly supplied to the rotary transformer from the reproduction magnetic heads P1 and P5 in order.

Similarly, reproduction signal is repeatedly supplied to another rotary transformer from the second set of reproduction heads P2 and P6 in order.

According to the reproduction apparatus with the above configuration, the number of rotary transformers can be decreased to ½ the number of reproduction magnetic heads and reproduction circuits. Moreover, the number of rotary transformer receiver circuits can be decreased to ½ the number of reproduction magnetic heads and reproduction circuits. Therefore, power consumption can be decreased.

Figure 91A:
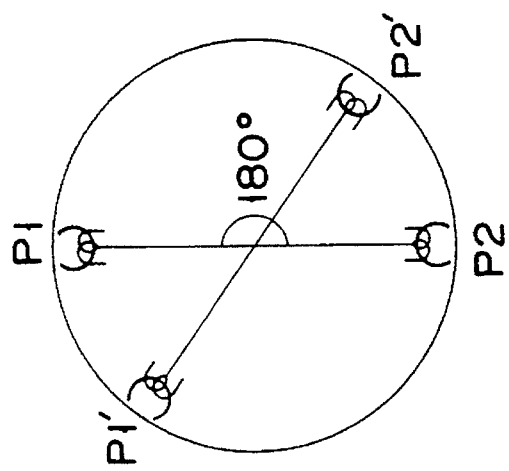

In the reproduction apparatus shown in FIG. 91A, two pairs of magnetic heads P1 and P2 and P1' and P2' are installed and magnetic heads of each pair are arranged with the lap angle of 180°. That is, the first pair of reproduction magnetic heads P1 and P2 and the second pair of magnetic heads P1' and P2' are installed on a rotary drum at the interval of 180° respectively. In this case, two pairs of the magnetic heads may not be perpendicular to each other, and the height of each magnetic head is set so that it will meet the recording format of the magnetic tape.

Figure 91B:
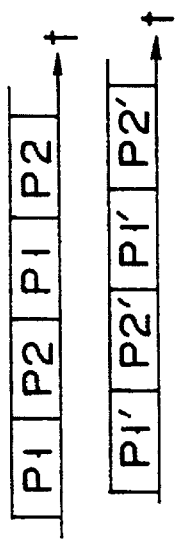

In this embodiment, the first pair of magnetic heads P1 and P2 and the second pair of magnetic heads P1' and P2' supply reproduction signal to another rotary transformer TR. That is, reproduction signal is repeatedly supplied to the first pair of magnetic heads of the rotary transformer from the reproduction magnetic heads P1, P2, P1, and P2 in order as shown in FIG. 91B.

Similarly, reproduction signal is repeatedly supplied to the second pair of magnetic heads P1' and P2' of another rotary transformer in order of P1', P2', P1', and P2'.

According to the reproduction apparatus with the above configuration, the number of rotary transformers can be decreased to ½ the number of reproduction magnetic heads and reproduction circuits. Moreover, the number of rotary transformer receiver circuits can be decreased to ½ the number of reproduction magnetic heads and reproduction circuits. Therefore, power consumption can be decreased.

Figure 92:
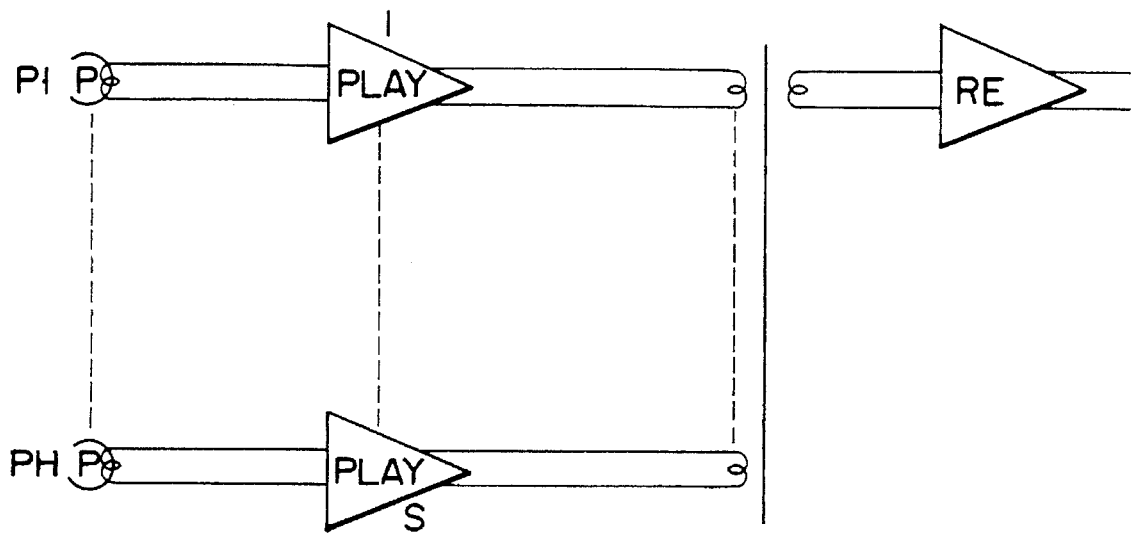
FIG. 92 is a circuit diagram of a reproduction apparatus using a rotary transformer with several windings in one slot.

The reproduction apparatus in FIG. 92 uses the rotary transformer TR with several secondary windings set in one winding slot. These secondary windings of the rotary transformer TR are connected to the outputs of the reproduction circuits PLAY1 through PLAYk respectively. The inputs of these reproduction circuits PLAY1 through PLAYk are connected to the outputs of the reproduction magnetic heads P1 through PH respectively.

The primary winding of the rotary transformer TR is connected to the input of the rotary transformer receiver circuit RE. These circuits can be applied to the magnetic heads shown in FIGS. 86A through 91A.

According to the reproduction apparatus with the above configuration, the substrate pattern is simplified and the wire length is decreased because the leading terminal of the rotary transformer winding can be installed at the position close to each reproduction circuit. Therefore, frequency characteristics are improved. Moreover, the same effect as that of the apparatus in FIG. 85 can be obtained.

Figure 93:
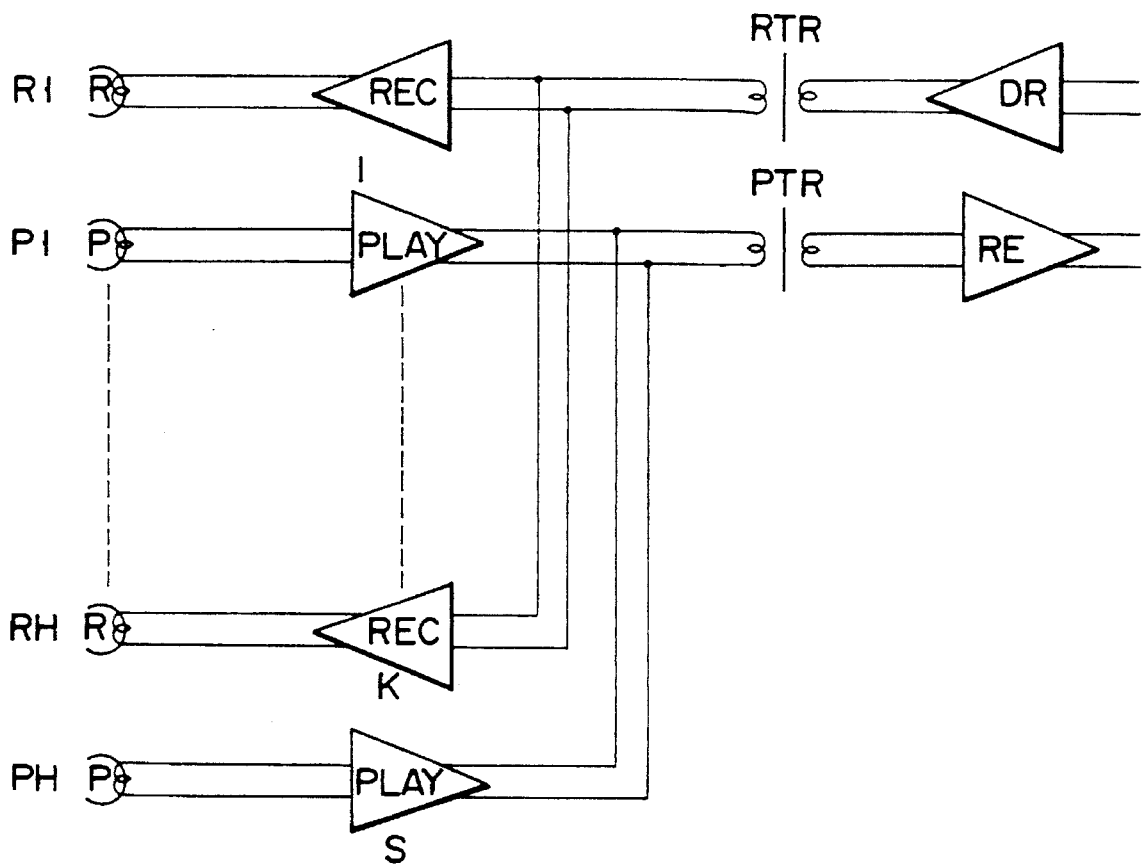
FIG. 93 is a circuit diagram of a multiple-channel recording/reproduction apparatus using one rotary transformer for recording and reproduction respectively.

FIG. 93 shows a magnetic recording/reproduction apparatus.

The magnetic recording/reproduction apparatus is made by combining the recording apparatus in FIG. 77 and the reproduction apparatus in FIG. 85. That is, the recording apparatus comprises the recording magnetic heads R1 through Rh, the recording circuits REC1 through RECk which are connected to the inputs of said magnetic heads respectively, the inputs of said recording circuits REC1 through RECk, the rotary transformer driver circuit DR, and the rotary transformer RTR connected between the recording circuits and the rotary transformer driver.

The reproduction apparatus comprises the reproduction magnetic heads P1 through PH, the reproduction circuits PLAY1 through PLAYk which are connected to the outputs of said reproduction magnetic heads respectively, the rotary transformer receiver circuit DE, and the rotary transformer PTR connected between the reproduction circuits PLAY1 through PLAYk and the rotary transformer receiver.

In the above configuration, the height and position of each recording magnetic head and those of the corresponding reproduction magnetic head are determined according to the recording format of the magnetic tape so that the data in the track recorded by each recording magnetic head will be reproduced by the corresponding reproduction magnetic head.

In this case, the angle of the reproduction head corresponding to a recording head can optionally be set.

If the tape lap angle is set to 180°, the recording magnetic heads R1 and R2 are installed so that they will face each other at the interval of 180° as shown in FIG. 94A and also the reproduction magnetic heads P1 and P2 are installed so that they will face each other at the interval of 180°.

In this case, as shown in FIG. 94B, recording signal is repeatedly transmitted to the recording magnetic heads R1 and R2 in order through one recording rotary transformer RTR and the reproduction signal sent from the reproduction magnetic heads P1 and P2 is repeatedly transmitted in order of P1, P2, P1, and P2 through one reproduction rotary transformer.

According to the reproduction apparatus with the above configuration, the number of rotary transformers can be decreases to ½ the number of magnetic heads and recording (reproduction) circuits in both the recording and reproduction systems. Also, the number of rotary transformer drivers and that of rotary transformer receivers can be decreases to ½ the number of them.

The recording/reproduction apparatus in FIG. 94A is able to read recorded information twice or three times by increasing the number of reproduction magnetic heads. Therefore, the frequency of data error can be decreased. If precedent reproduction heads are added, re-recording is realized after precedent reproduction. If the tape lap angle is set to 180°, the sets of reproduction magnetic heads P1 and P4, P2 and P5, P3 and P6, . . . can be installed for a set of recording magnetic heads R1 and R2 as shown in FIG. 95A.

In this case, as shown in FIG. 95B, the information signal recorded by the recording magnetic heads R1 and R2 in order is reproduced by the reproduction magnetic heads P2 and P5 in the same order. For special reproduction the information signal recorded by the recording magnetic heads R1 and R2 is repeatedly reproduced by the reproduction magnetic heads P1 through P6 in order.

Also said recording/reproduction apparatus decreases the number of rotary transformer to ½ the number of magnetic heads and recording (reproduction) circuits and the number of rotary transformer receivers and that of magnetic heads to the number of magnetic heads and recording (reproduction) circuits.

This embodiment is also able to read recorded information twice or three times by increasing the number of reproduction magnetic heads.

Thus, the frequency of data error can be decreased.

If the magnetic heads P3 and P6 are used as precedent reproduction heads, re-recording is realized by the recording magnetic heads R1 and R2 after precedent reproduction.

Figure 96A:
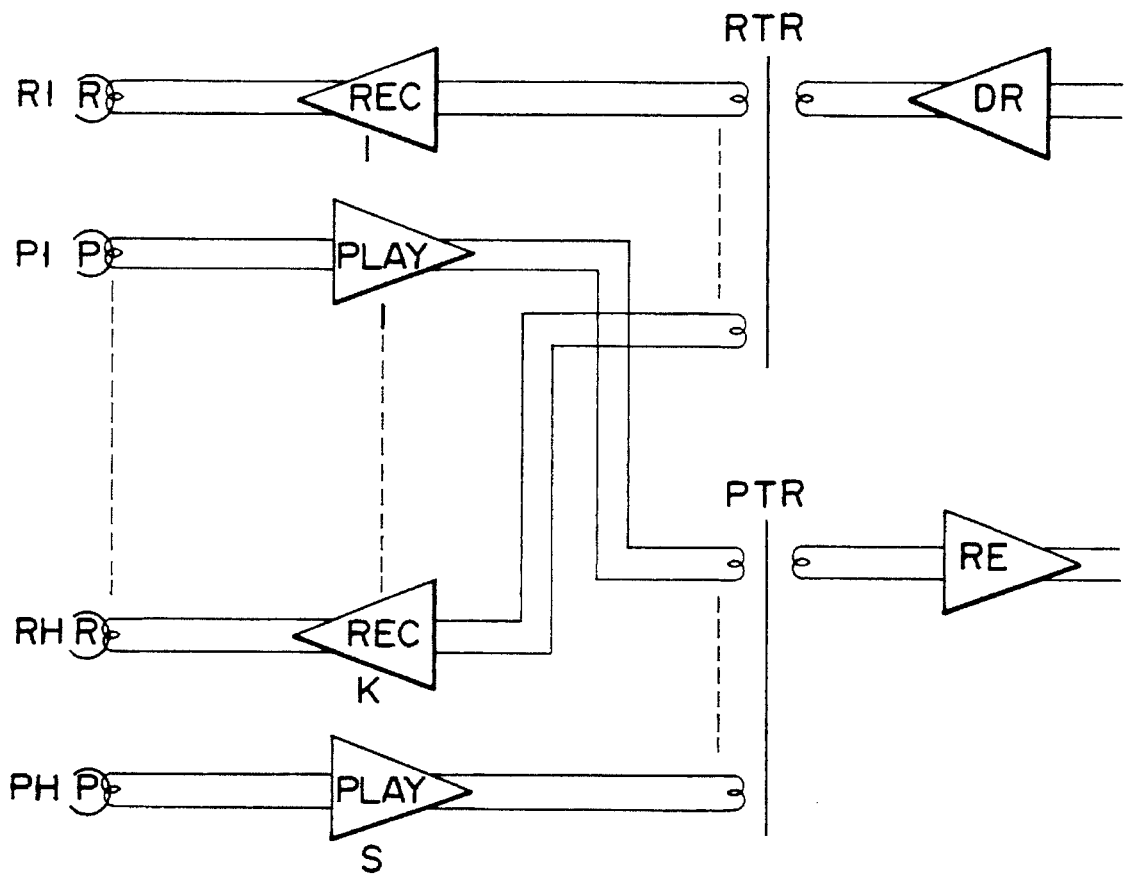
FIG. 96A is a circuit diagram of a magnetic recording/ reproduction apparatus using a rotary transformer with several windings in one slot for recording and reproduction respectively.

FIG. 96A shown a recording/reproduction apparatus made by combining the recording apparatus in FIG. 84 and the reproduction apparatus in FIG. 92. This recording/reproduction apparatus uses rotary transformers RTR and PTR with several secondary windings set in one slot respectively.

In this case, several recording systems (including recording heads and recording circuits) and several reproduction systems (including reproduction heads and reproduction circuits) are alternately installed.

The secondary windings of the rotary transformer RTR are connected to recording circuits REC1 through RECk respectively and the outputs of the recording circuits REC1 through RECk to the inputs of the recording magnetic heads R1 through RH respectively.

The primary winding of the rotary transformer TR is connected to the output of the rotary transformer driver circuit DR.

Similarly, the secondary windings of the rotary transformer PTR are connected to the outputs of the reproduction circuits PLAY1 through PLAYk respectively, and the inputs of the reproduction circuits PLAY1 through PLAYk to the outputs of the reproduction magnetic heads P1 through PH respectively. The primary winding of the rotary transformer PTR is connected to the input of the rotary transformer receiver circuit RE.

Figure 96B:
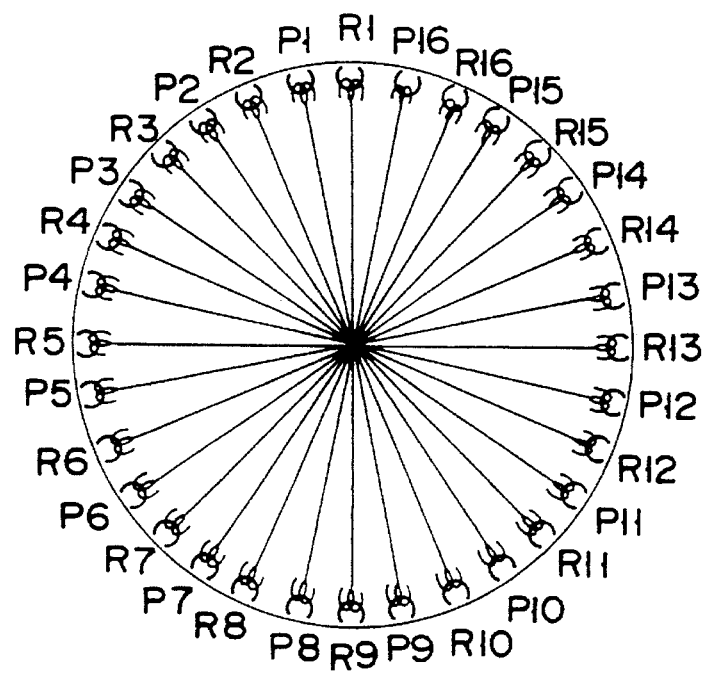
FIG. 96B shows the arrangement of magnetic heads on the apparatus in FIG. 96A.

FIG. 96B shows a rotary drum containing the recording and reproduction magnetic heads in FIG. 96A.

In this embodiment, like the previous embodiment, the tape lap angle is set to 180° and the height and position of each recording magnetic head and those of the corresponding reproduction magnetic head are determined according to the recording format of the magnetic tape so that data in the track recorded by each recording magnetic head will be reproduced by the corresponding reproduction magnetic head. The angle of the reproduction head corresponding to a recording head can optionally be set.

For this embodiment, the recording magnetic heads R1 through R16 and the reproduction magnetic heads P1 through P16 are alternately installed in the circumferential direction and every two magnetic heads are faced to each other.

In the above recording/reproduction apparatus, recorded information signal is input to the recording magnetic head R1 and the R1 recording circuit and the recording magnetic head R9 and the R9 recording circuit from one rotary transformer. The reproduction magnetic head P1 and the P1 reproduction circuit, and the reproduction magnetic head P1 and the P1 reproduction circuit send reproduction signal to one rotary transformer.

Similarly, each set of the recording magnetic heads R2 and R10, R3 and R11, R4 and R12, R5 and R13, R6 and R14, R7 and R15, and R8 and R16 receives recorded information signal from one rotary transformer.

Each set of the reproduction magnetic heads P2 and P10, P3 and P11, P4 and P12, P5 and P13, P6 and P14, P7 and P15, and P8 and P16 sends reproduction information signal to one rotary transformer.

Therefore, this embodiment requires a rotary transformer equivalent to 16 channels.

According to this embodiment, like the previous embodiment, the number of rotary transformers can be decreased to ½ the number of recording magnetic heads and spare recording circuits and also to ½ the number of reproduction magnetic heads and reproduction circuits. Moreover, the number of rotary transformer driver circuits can be decreased to ½ the number of recording magnetic heads and recording circuits and the number of rotary transformer receiver circuits to ½ the number of reproduction magnetic heads and reproduction circuits.

Also in this embodiment, because the leading terminal of rotary transformers can be installed at the position close to each reproduction circuit, the substrate pattern is simplified and the wire length is decreased.

Thus, frequency characteristics are improved. Moreover, recorded information can be read twice or three times by increasing the number of reproduction magnetic heads.

Therefore, the frequency of data error can be decreased. If precedent reproduction heads are added, re-recording is realized after precedent reproduction.

The following is the description of various modified embodiments of a recording/reproduction apparatus using magnetic heads dedicated to recording and those dedicated to reproduction according to FIGS. 97 through 106.

In the modified embodiment in FIG. 97, several recording circuits (REC) and several reproduction circuits (PLAY) are connected to the rotary transformer driver circuit DR and rotary transformer receiver circuit RE through one rotary transformer TR.

In the modified embodiment in FIG. 98; one rotary transformer having one primary winding and two secondary windings are installed, and the rotary transformer driver circuit DR and rotary transformer receiver circuit RE are connected to the primary winding, several recording circuits (REC) to one secondary winding, and several reproduction circuits (PLAY) to the other secondary winding.

In the modified embodiment in FIG. 99, the rotary transformer TR has several secondary windings connected to several recording circuits and several reproduction circuits respectively and a primary winding connected to one rotary transformer driver circuit DR and one rotary transformer receiver circuit RE in common.

In the modified embodiment in FIG. 100, the rotary transformer TR has two primary windings connected to the rotary transformer driver circuit DR and rotary transformer receiver circuit RE respectively and a secondary winding connected to several recording circuits and several reproduction circuits in common.

In the modified embodiment in FIG. 101, the rotary transformer TR has two primary windings and two secondary windings, and said primary windings are connected to a rotary transformer driver circuit and rotary transformer receiver circuit respectively, one secondary winding to several recording circuits in common, and the other secondary winding to several reproduction circuits in common.

In the modified embodiment in FIG. 102, the rotary transformer TR has several secondary windings connected to several recording circuits and several reproduction circuits respectively and two primary windings connected to one rotary transformer driver circuit DR and one rotary transformer receiver circuit RE respectively.

In the modified embodiment in FIG. 103, several rotary transformers are installed, and recording circuits and reproduction circuits are connected to the primary winding of each rotary transformer in common and one rotary transformer driver circuit and one rotary transformer receiver circuit are connected to secondary windings in common.

According this embodiment, the signal recorded by a recording magnetic head can immediately be reproduced by a reproduction head.

In the modified embodiment in FIG. 104, several rotary transformers are installed each of which has one primary winding and two secondary windings. In this embodiment, recording and reproduction circuits are connected to two secondary windings of each rotary transformer and one rotary transformer driver circuit and one rotary transformer receiver circuit are connected to one primary winding in common.

In the modified embodiment in FIG. 105, several rotary transformers are installed each of which has two primary winding and one secondary winding. In this embodiment, one rotary transformer driver circuit and one rotary transformer receiver circuit are connected to two primary windings of each rotary transformer, and recording and reproduction circuits are connected to one secondary winding in common.

In the modified embodiment in FIG. 106, several rotary transformers are installed each of which has two primary windings and two secondary windings. In this embodiment, one rotary transformer driver circuit and one rotary transformer receiver circuit are connected to two primary windings of each rotary transformer, and recording and reproduction circuits are connected to two secondary windings respectively.

The following is the description of various modified embodiments of a recording/reproduction apparatus using magnetic heads for both recording and reproduction according to FIGS. 107 through 118.

In the modified embodiment in FIG. 107, several recording-and-reproduction magnetic heads and several rotary transformers are installed. Each recording-and-reproduction magnetic head is connected to the secondary windings of two rotary transformers, and one rotary transformer driver circuit and one rotary transformer receiver circuit are connected to each primary winding of these rotary transformers.

In the modified embodiment in FIG. 108, two recording-and-reproduction magnetic heads and two rotary transformers are installed. Each rotary transformer has two secondary windings and one primary winding. One recording-and-reproduction magnetic head is connected to one secondary winding of two rotary transformers respectively through recording and reproduction circuits and the other recording-and-reproduction magnetic head to the other secondary winding of two rotary transformers respectively through recording and reproduction circuits. One rotary transformer driver circuit and one rotary transformer receiver circuit are connected to the primary windings of these rotary transformers respectively.

In the modified embodiment in FIG. 109, several recording-and-reproduction magnetic heads and one rotary transformer are installed. Each recording-and-reproduction magnetic head is connected to the secondary winding of the rotary transformer through recording and reproduction circuits in common, and one rotary transformer driver circuit and one rotary transformer receiver circuit are connected to the primary winding of the rotary transformer in common.

In the modified embodiment in FIG. 110, several recording-and-reproduction magnetic heads and one rotary transformer having one primary winding and two secondary windings are installed. Each recording-and-reproduction magnetic head is connected to two secondary windings of the rotary transformer respectively through the corresponding recording circuit and reproduction circuit, and one rotary transformer receiver circuit are connected to the primary winding of the rotary transformer in common.

Figure 111:
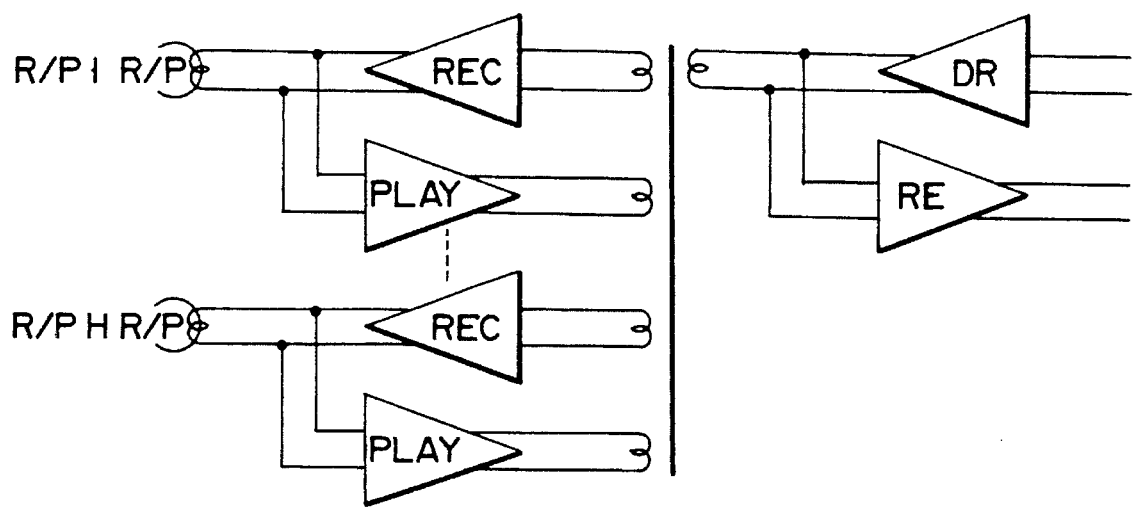

In the modified embodiment in FIG. 111, several recording-and-reproduction magnetic heads and one rotary transformer having one primary winding and several secondary windings are installed. Each recording-and-reproduction magnetic head is connected to the secondary winding of the rotary transformer through the corresponding recording circuit and reproduction circuit, and one rotary transformer driver circuit and one rotary transformer receiver circuit are connected to the primary winding of the rotary transformer in common.

Figure 112:
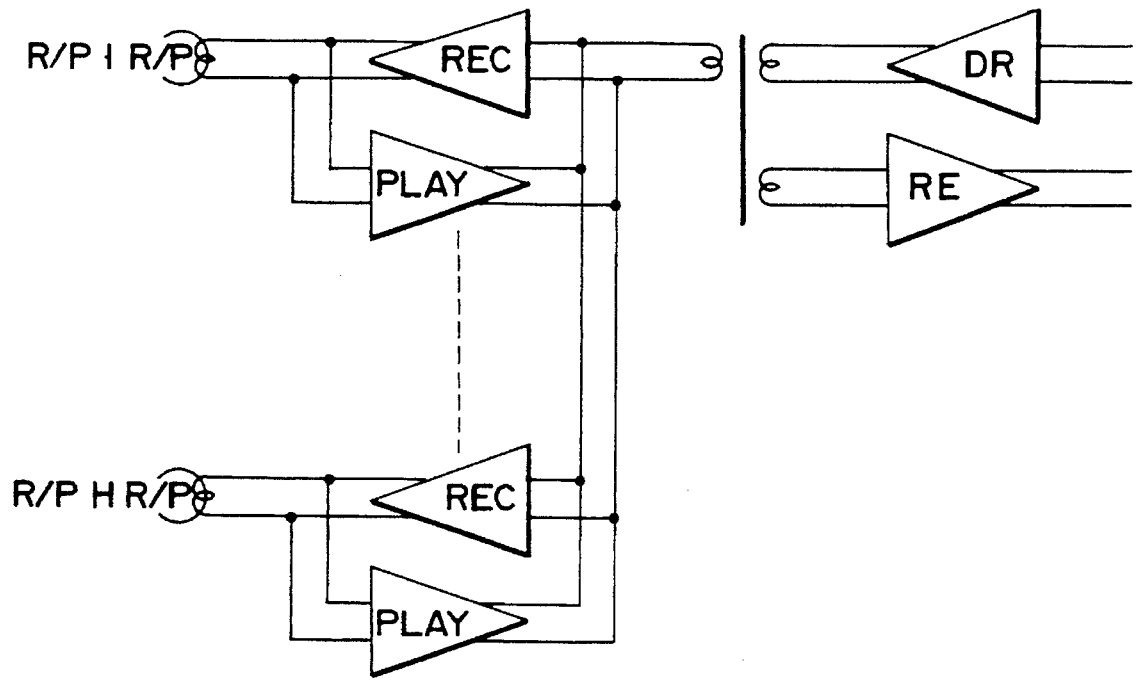

In the modified embodiment in FIG. 112, several recording-and-reproduction magnetic heads and one rotary transformer having two primary windings and one secondary winding are installed.

Each recording-and-reproduction magnetic head is connected to the secondary winding of the rotary transformer in common through the corresponding recording circuit and reproduction circuit, and one rotary transformer driver circuit and one rotary transformer receiver circuit are connected to the two primary windings of the rotary transformer respectively through the corresponding recording circuit and reproduction circuit.

Figure 113:
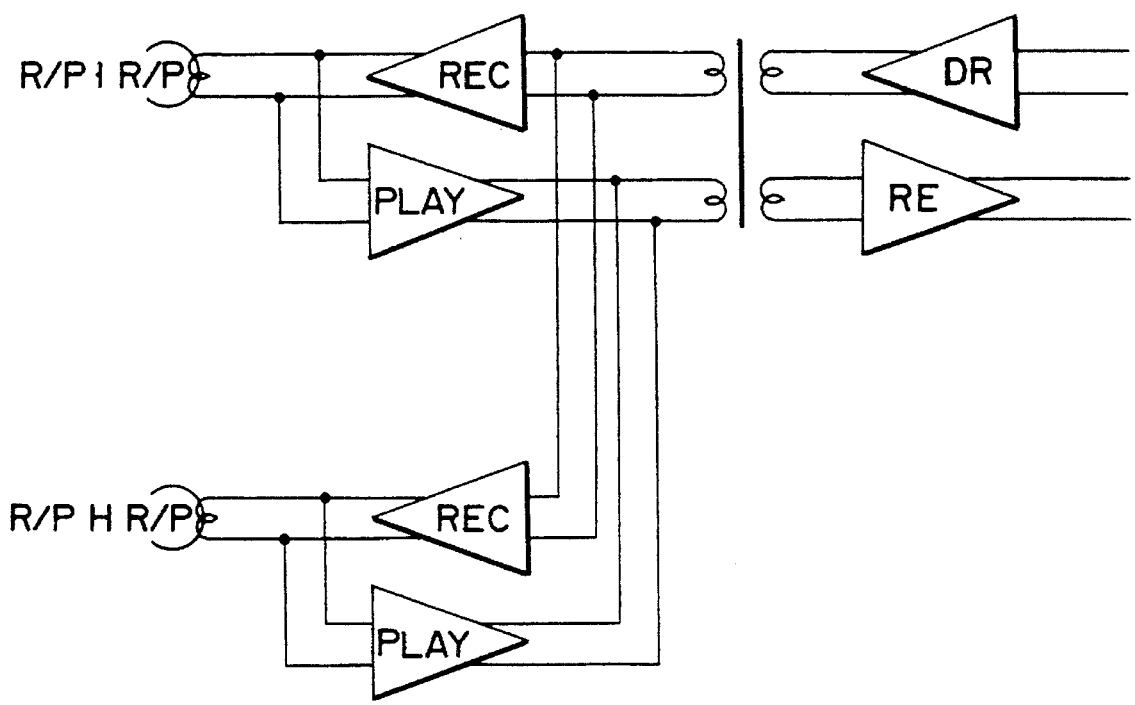

In the modified embodiment in FIG. 113, several recording-and-reproduction magnetic heads and one rotary transformer having two primary winding and two secondary windings are installed. Each recording-and-reproduction magnetic head is connected to the two secondary windings respectively through the corresponding recording circuit and reproduction circuit, and one rotary transformer driver circuit and one rotary transformer receiver circuit are connected to the two primary windings of the rotary transformer respectively.

Figure 114:
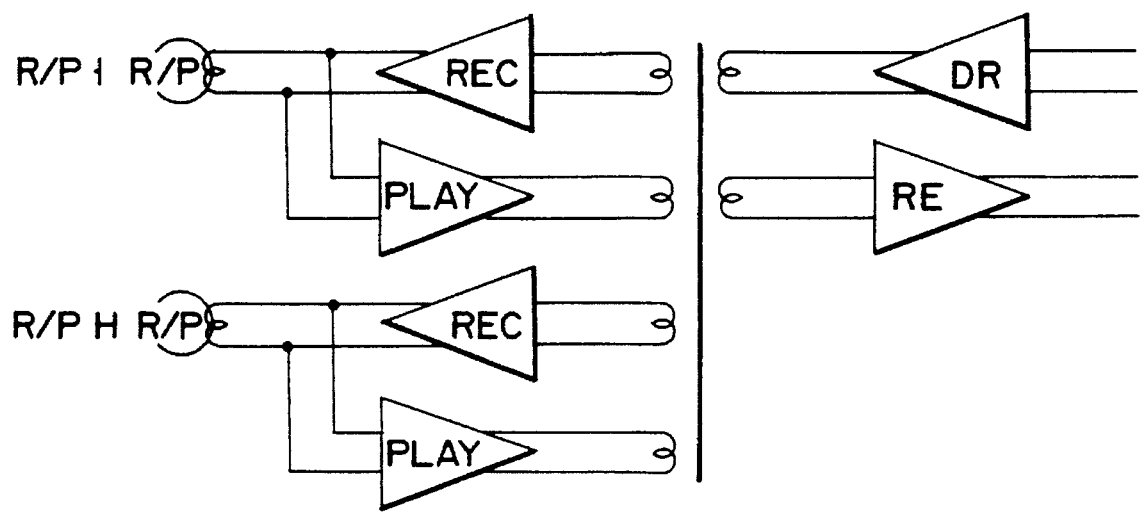

In the modified embodiment in FIG. 114, several recording-and-reproduction magnetic heads and one rotary transformer having two primary windings and several secondary windings are installed. Each recording-and-reproduction magnetic head is connected to the secondary windings of the rotary transformer respectively through the corresponding recording circuit and reproduction circuit, and one rotary transformer driver circuit and one rotary transformer receiver circuit are connected to the two primary windings of the rotary transformer respectively.

In the modified embodiment in FIG. 115, several recording-and-reproduction magnetic heads and several rotary transformers each of which has one primary winding and one secondary winding are installed. Each recording-and-reproduction magnetic head is connected to the secondary winding of the corresponding rotary transformer through the corresponding recording circuit and reproduction circuit in parallel, and the corresponding rotary transformer driver circuit and rotary transformer receiver circuit are connected to the primary winding of the rotary transformer in common.

In the modified embodiment in FIG. 116, several recording-and-reproduction magnetic heads and several rotary transformers each of which has one primary winding and two secondary windings are installed. Each recording-and-reproduction magnetic head is connected to the secondary windings of the corresponding rotary transformer through the corresponding recording circuit and reproduction circuit, and the corresponding rotary transformer driver circuit and rotary transformer receiver circuit are connected to the primary winding of the rotary transformer in common.

In the modified embodiment in FIG. 117, several recording-and-reproduction magnetic heads and several rotary transformers each of which has two primary windings and one secondary winding are installed. each recording-and-reproduction magnetic head is connected to the secondary winding of the corresponding rotary transformer through the corresponding recording circuit and reproduction circuit in parallel, and the corresponding rotary transformer driver circuit and rotary transformer receiver circuit are connected to the primary windings of the rotary transformer respectively.

In the modified embodiment in FIG. 118, several recording-and-reproduction magnetic heads and several rotary transformers each of which has tow primary windings and two secondary windings are installed. Each recording-and-reproduction magnetic head is connected to the secondary windings of the corresponding rotary transformer through the corresponding recording circuit and reproduction circuit, and the corresponding rotary transformer driver circuit and rotary transformer receiver circuit are connected to the primary windings of the rotary transformer respectively.

The embodiments of FIGS. 2, 5A, 5B, 7, 55, 58, 67, 70, and 75 use a magnetic recording/reproduction circuit which has a primary winding and a secondary winding wound in each winding slot in the rotor and stator of each of the rotary transformers 6a and 6b. In contrast, FIGS. 119 through 126 show embodiments in which a plurality of winding coils are wound around an axis of rotation of the rotor in a winding slot in the rotor or stator of the rotary transformer.

Specifically, in the recording/reproduction circuit of FIG. 119, which corresponds to the recording/reproduction circuit of FIG. 2, a primary winding, e.g. a single coil PW is wound and housed in a winding slot in the stator of the rotary transformer 6a, and two secondary windings, e.g. two coils SW1 and SW2 are wound and housed in one winding slot in its rotor, whereas two primary windings, e.g. two coils PW1 and PW2 are wound and housed in a winding slot in the rotor of the rotary transformer 6b, and a secondary winding SW is wound and housed in a winding slot in its stator. Each of the coils is wound around an axis of rotation of the rotor of the rotary transformer. A resistor R of 50 to 1,000 Ω for example, preferable 150 Ω is connected across two terminals of each of the coils PW1 and PW2 connected to the recording amplifiers 3a and 3b, respectively.

The construction of a transformer core that has two windings in a winding slot is shown in FIG. 18. The recording circuit in this figure is equivalent to the schematic circuit of FIG. 19, and the reproduction circuit is equivalent to the schematic circuit of FIG. 21.

The recording circuit and reproduction circuit shown in FIG. 120A and 120B correspond to the embodiments in FIGS. 5A and 5b, respectively. FIG. 120A shows a recording circuit using a rotary transformer in which a primary winding, e.g. a single coil is wound and housed in a winding slot in the stator of the rotary transformer of each channel in the rotary transformer 105, and two secondary windings, e.g. two coils are wound and housed in a winding slot in its rotor. FIG. 120B shows a reproduction circuit using a rotary transformer in which a secondary winding, e.g. a single coil is wound and housed in a winding slot in the stator of the rotary transformer of each channel in the rotary transformer 120, and two primary windings, e.g. two coils are wound and housed in a winding slot in its rotor. Each of the coils is wound around an axis of rotation of the rotor of the rotary transformer.

The recording/reproduction circuit in FIG. 121 corresponds to the recording/reproduction circuit of FIG. 7. The recording/reproduction circuit of FIG. 121 uses a rotary transformer in which a winding (a single coil) connected to both of an input amplifier 5a and an output amplifier 7a is wound and housed in a winding slot in the stator of the rotary transformer 6a, and two windings (two coils) connected to a record signal amplifier 3a and a reproduction signal amplifier 4a, respectively, are wound and housed in a winding slot in its rotor, whereas a winding (a single coil) connected to both of an input amplifier 5b and an output amplifier 7b is wound and housed in a winding slot in the stator of the rotary transformer 6b, and two windings (two coils) connected to a record signal amplifier 3b and a reproduction signal amplifier 4b, respectively, are wound and housed in a winding slot in its rotor. Each of the coils is wound around an axis of rotation of the rotor of the rotary transformer.

Figure 122:
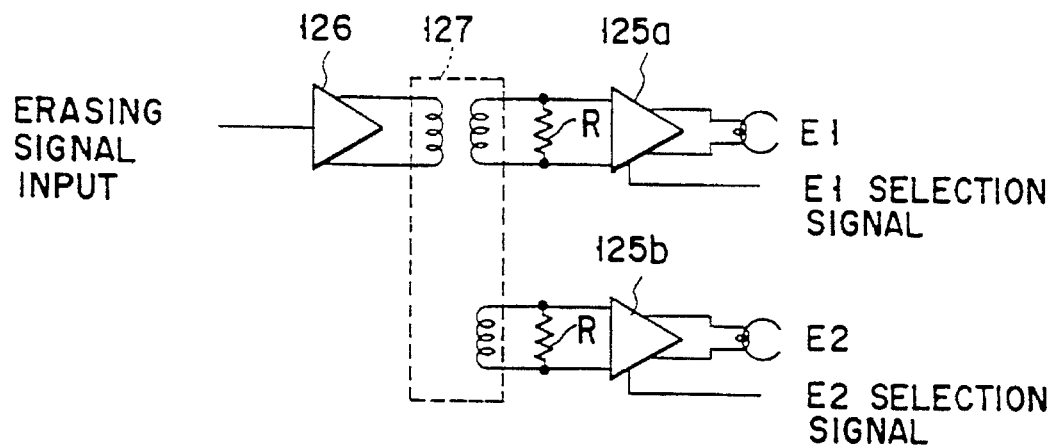
FIG. 122 is a circuit diagram of a magnetic recording/ reproduction apparatus using a rotary transformer with a plurality windings in a single winding slot and an erase head.

The erase circuit in FIG. 122 corresponds to the erase circuit in FIG. 55. The erase circuit of FIG. 122 uses a rotary transformer in which a primary winding (a single coil) connected to a driver circuit 126 is wound and housed in a winding slot in the stator of the rotary transformer 127, and two secondary windings (two coils) connected to amplifiers 125a and 125b, respectively, are wound and housed in a winding slot in its rotor. Each of the coils is wound around an axis of rotation of the rotor of the rotary transformer. A resistor R of 50 to 1,000 Ω for example, preferable 150 Ω is connected across two terminals of each of the secondary windings.

Figure 123:
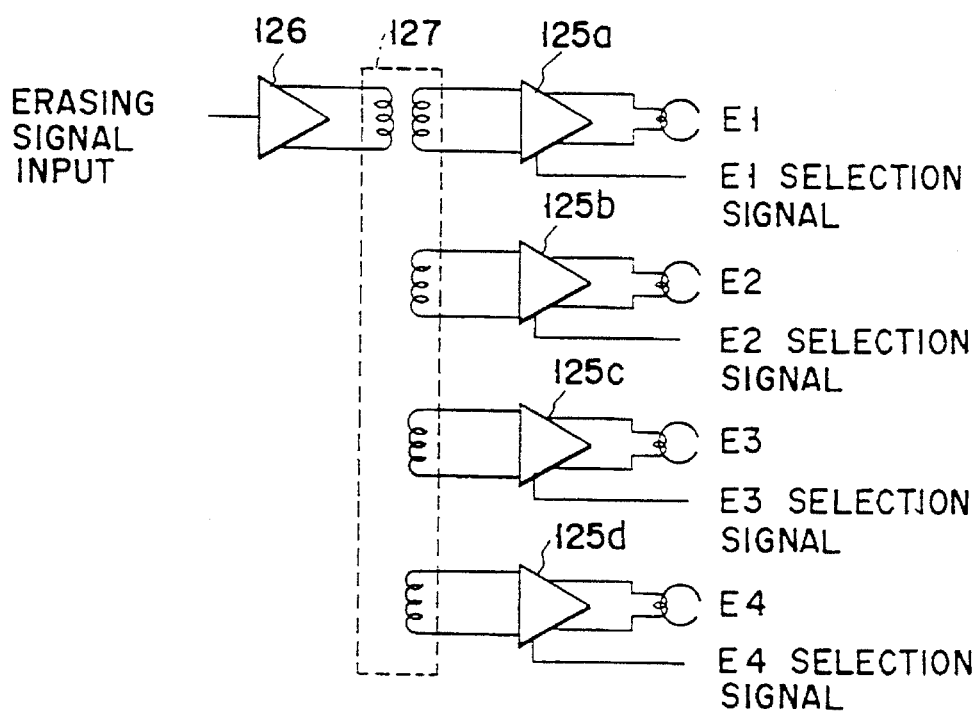
FIG. 123 is a circuit diagram of a magnetic recording/ reproduction apparatus using a rotary transformer with a plurality windings in a single winding slot and an erase head.

The erase circuit in FIG. 123 corresponds to the erase circuit in FIG. 58. The erase circuit of FIG. 123 uses a rotary transformer in which a primary winding (a single coil) connected to a rotary transformer driver circuit 126 is wound and housed in a winding slot in the stator of the rotary transformer 127, and four secondary windings (four coils) connected to amplifiers 125a through 125d, respectively, are wound and housed in a winding slot in its rotor.

Figure 124:
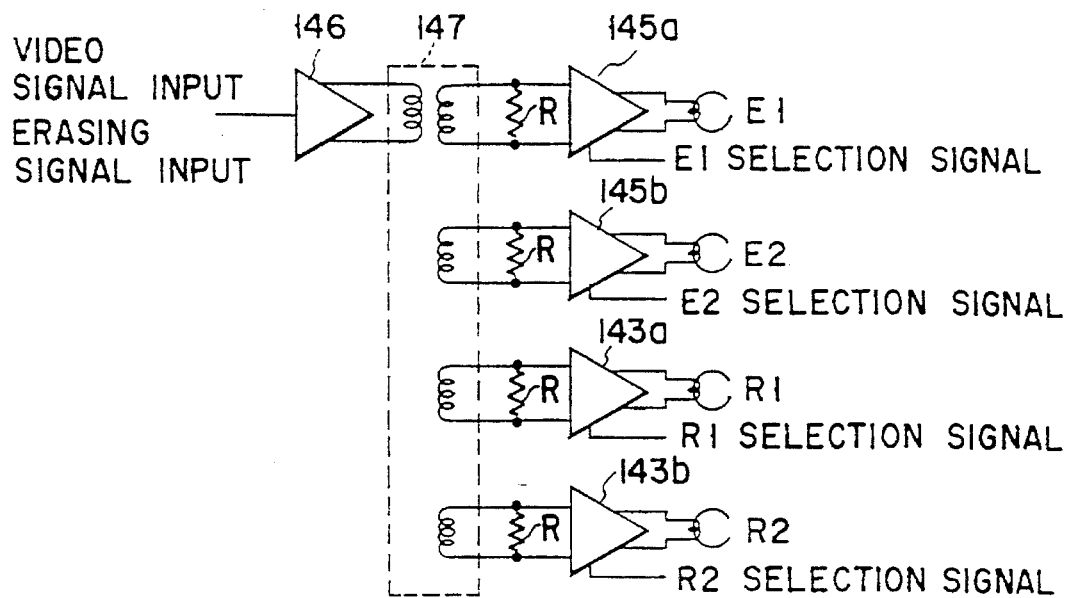
FIG. 124 is a circuit diagram of a magnetic recording/ reproduction apparatus using a rotary transformer with a plurality windings in a single winding slot, a recording head, and an erase head.

A record/erase circuit in FIG. 124 corresponds to the record/erase circuit in FIG. 67. The record/erase circuit of FIG. 124 uses a rotary transformer in which a primary winding (a single coil) connected to a rotary transformer driver circuit 146 is wound and housed in a winding slot in the stator of the rotary transformer 147, and four secondary windings (four coils) connected to erase signal amplifiers 145a and 145b and record signal amplifiers 143a and 143b, respectively, are wound and housed in a winding slot in its rotor. The output of the erase signal amplifiers 145a and 145b are connected to erasing magnetic heads E1 and E2, respectively. The output of the record signal amplifiers 143a and 143b are connected to recording magnetic heads R1 and R2. The gap width of the erasing magnetic head is for example, 4 μpm larger than that (for example, 0.3 μm) of the recording magnetic head.

Figure 125:
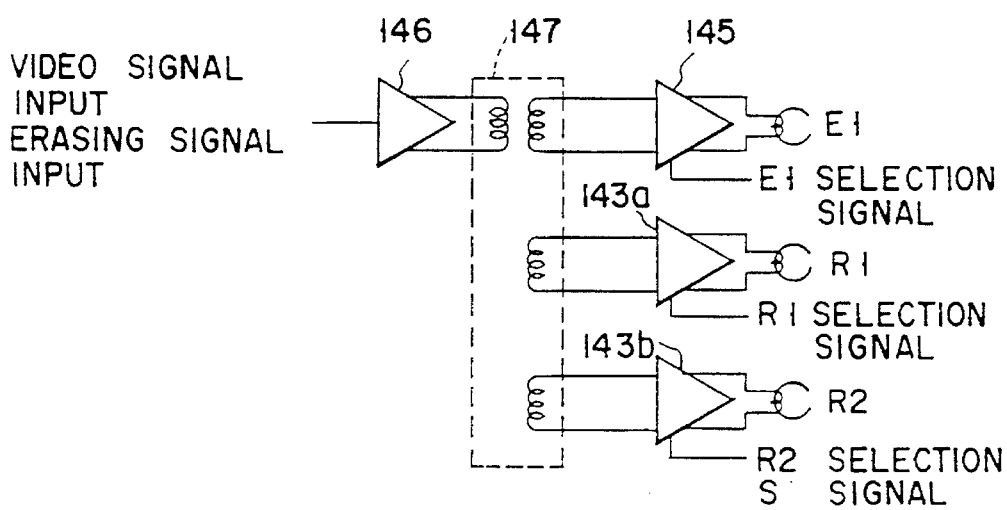
FIG. 125 is a circuit diagram of a magnetic recording/ reproduction apparatus using a rotary transformer with a plurality windings in a single winding slot, a recording head, and an erase head.

The record/erase circuit in FIG. 125 corresponds to the record/erase circuit in FIG. 70. The record/erase circuit of FIG. 125 uses a rotary transformer in which a primary winding (a single coil) connected to a rotary transformer driver circuit 146 is wound and housed in a winding slot in the stator of the rotary transformer 147, and three secondary windings (three coils) connected to an erase signal amplifier 145 and record signal amplifiers 143a and 143b, respectively, are wound and housed in a winding slot in its rotor.

Figure 126:
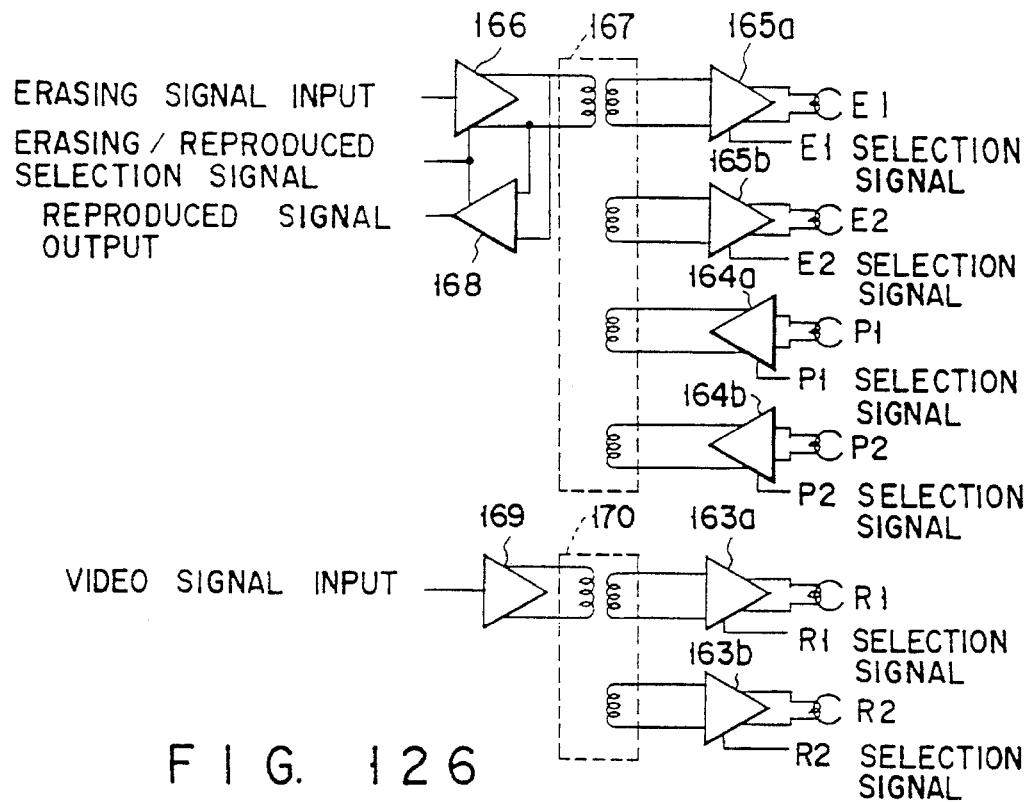
FIG. 126 is a circuit diagram of a magnetic recording/ reproduction apparatus using a rotary transformer with a plurality windings in a single winding slot, an erase head, a reproduction head, and a recording head.

The recording/reproduction circuit in FIG. 126 corresponds to the recording/reproduction circuit in FIG. 75. The recording/reproduction circuit of FIG. 126 uses a rotary transformer in which a winding connected to both of a rotary transformer driver circuit 166 and an output amplifier 168 is wound and housed in a winding slot in the stator of the rotary transformer 167, four windings (four coils) connected to erase signal amplifiers 165a and 165b and reproduction signal amplifiers 164a and 164b, respectively, are wound and housed in a winding slot in its rotor, whereas a primary winding (a single coil) connected to a rotary transformer driver circuit 169 is wound and housed in a winding slot in the stator of the rotary transformer 170, and two secondary windings (two coils) connected to record signal amplifiers 163a and 163b, respectively, are wound and housed in a winding slot in its rotor.

Figure 127:
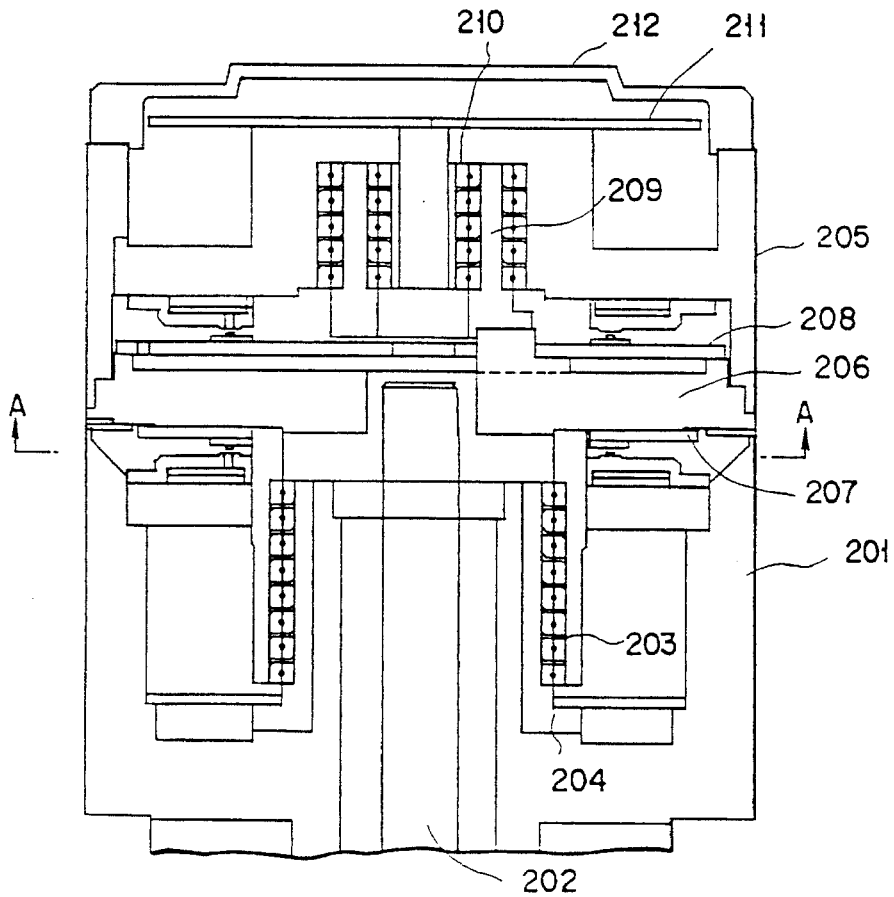
FIG. 127 is a schematic sectional view of a scanner including a rotary transformer in which a plurality of windings are provided.

Referring to FIGS. 127 and 128, the construction of rotary transformers used in the present invention will be explained.

In FIG. 127, a rotor 203 is mounted on a rotating shaft 202 in a lower stationary drum 201. A stator 204 is provided coaxially with the rotor 203 and mounted to the lower stationary drum 201. Above the lower stationary drum 201, an upper stationary drum 205 is placed. A rotary drum 206 is provided between the upper stationary drum 205 and the lower stationary drum 201 so as to rotate together with the rotating shaft 202. The rotary drum 206 has a reproduction amplifier circuit board 207 mounted on its bottom and a recording circuit board 208 on its top. The rotary drum 206 is connected to the rotor 209 of a record/erase rotary transformer. A stator 210 is provided coaxially with the rotor 209, and mounted to the upper stationary drum 205. At the top of the upper stationary drum 205, a drive circuit board 211 is mounted. Above the drive circuit board 211, a cover 212 is provided.

FIG. 128 is a view of the reproduction amplifier circuit board 206 taken along line A—A in FIG. 127. In FIG. 128, eight pairs of reproduction heads P1 and P2 are placed at regular intervals along the periphery of the board 207, those reproduction heads P1 and P2 being connected to reproduction amplifiers A1 and A2 on the board 207, respectively. Each of the reproduction amplifiers A1 and A2 is connected to one of the two coils housed in a winding slot in the rotor 209 as shown in FIG. 18. In this case, the two coils housed in a winding slot are connected to the reproduction amplifiers A1 and A1 or A2 and A2 180° opposite to each other, respectively.

In FIG. 127, the rotary transformer has a plurality of leading holes each formed at a position at which a wiring length between one of the amplifiers A1 and A2 and one of the leading holes is shortest, and each of the amplifiers is connected to one of the coils inserted in a winding slot of the core of the rotary transformer through the leading holes by lead-in wires, respectively.

Next explained will be a modification of the rotary transformer, referring to FIGS. 129 through 132. In a coaxial rotary transformer apparatus of FIG. 129, a rotor 222 is provided coaxially with a stator 221 so as to rotate. The upper half transformer section 223 of this transformer is used to transfer a record signal or a reproduction signal, whereas the lower half transformer section 224 is used to transfer an erase signal.

A single circuit winding (coil) 226 is inserted in a slot formed in the upper half portion of the stator 221 of the upper half transformer section 223, and is connected to a driver 227. A plurality of circuit windings (coils) 229 and 230 are inserted in a slot formed in the lower half portion of the rotor 222, and are connected to magnetic heads 233 and 234 via a plurality of recording amplifiers 231 and 232, respectively.

Single circuit coils 237a and 237b and single circuit coils 238a and 238b are inserted in slots 235a and 235b formed in the lower half portion of the stator 221 of the lower half transformer section 224 and slots 236a and 236b formed in the lower half portion of the rotor 222, respectively. Windings (coils) 238a and 238b are connected directly to erase heads 239 and 240, respectively. Windings (coils) 237a and 237b are connected to erase drivers 241 and 242, respectively. Selectively operating the erase drivers 241 and 242 switches the erase operation between the erase heads 239 and 240.

In the embodiment of FIG. 129, the upper half transformer section 223 is explained as a unit transferring a record signal for convenience sake, and the same applies to the transfer of reproduction signals. Although a 2-channel rotary transformer apparatus has been explained, the present invention may be applied to any other rotary transformer, regardless of the number of channels. Further, irrespective of the number of windings (coils), the invention may be applied to rotary transformers.

High-frequency band, high transfer rate VTRs such as high-vision digital VTRs require multichannel rotary transformers, such as those with 10 channels or more. To make the characteristics of each channel uniform, coaxial rotary transformers have come into use instead of the flat type widely used in the home VTR such as VHS. Since an attempt to combine such coaxial rotary transformers with multiple channel specification lengthens the transformer along the axis, so-called double coaxial transformers have recently come into use which have multiple coaxial rotary transformers stacked coaxially. Such double coaxial transformers sacrifice the little difference between individual channels, which is the advantage of coaxial transformers. For example, when the conditions other than the diameter, including the number of windings (coils), the slot width, the slot depth, and the core facing width, are the same, the higher-frequency signals are less easy to transfer and lower band signals are easier to transfer in a transformer with large outside dimensions or a larger diameter. A simple way to avoid such characteristic difference is to make the number of inner windings (coils) larger than that of outer windings (coils).

Since signals recorded and reproduced in the high-vision digital VTR is transferred at a transfer rate as high as 1.2 Gbps, signals of the order of 100 MHz must be transferred by means of a single channel of the rotary transformer, even if the signals are divided into 16 channels, for example. Therefore, to make the coefficient of electrostatic induction small, coil should be wound one turn up to several turns at best. For this reason, when the number of windings (coils) in the inner transformer is made larger than that in the outer transformer, selectable combinations are fewer and it is difficult to make the characteristics uniform between the inner and outer transformers because one turn increase or decrease causes great variations in the characteristics, as compared with a case where the number of windings (coils) is large, such as a case where the outer transformer has one turn and the inner transformer has two turns, or the outer transformer has two turns and the inner transformer has three turns.

A method of solving the above problem is to make the slot in the inner transformer of the double coaxial transformer deeper than that in the outer transformer. A transformer using this method is shown in FIG. 130.

In the double coaxial rotary transformer of FIG. 130, an outer stator 252 and an inner stator 253 are placed coaxially with the rotor 251. The depth 257 of the inner slot is greater than the depth 254 of the outer slot in the rotor 251. The depth 256 of the slot in the inner stator 253 is greater than the depth 255 of the slot in the outer stator 252. Suitably selecting those four slots can improve the characteristics of the inner transformer and that of the outer transformer to the extent that they are acceptable in practical use. In this case, it is not necessary to equalize the number of windings (coils) between the inner transformer and the outer transformer. The number of windings (coils) and the slot depth may be selected suitably as required. Similarly, the slot width and the core facing width may be selected suitably for the inner and the outer rotary transformer.

While in this embodiment, the present invention is applied to a 2-channel rotary transformer, it may be applied to any other rotary transformer, regardless of the number of channels in the rotary transformer apparatus. The invention is not limited to double coaxial rotary transformers, but may be applied to triple coaxial transformers.

When the core facing width of the inner transformer of a double coaxial rotary transformer is made greater than that of the outer transformer, the following examples can be considered:

1. The number of channels is made the same, and the slot width of the inner transformer is made narrower than that of the outer transformer.
2. The slot width is made the same, and the number of channels in the inner transformer is made smaller than that of the outer transformer.
3. The overall slot width is made different as is the number of channels.
4. The slot width and the number of channels are selected as required.

Next explained will be another embodiment, referring to FIG. 131.

In this embodiment, an outer stator 252 and an inner stator 253 are placed coaxially with a rotor 251. In this double rotary transformer, the core facing widths 260 and 261 between the inside of the rotor 251 and the stator 253 are made greater than the core facing widths 258 and 259 between the outside of the rotor 251 and the stator 252. By setting those facing widths so as to be inversely proportional to the diameter of the facing portion, the characteristics of the inner and the outer transformer can be improved to the extent that they are acceptable in practical use. In this case, it is not necessary to equalize the number of windings (coils) between the inner transformer and the outer transformer. The number of windings (coils) and the facing width may be selected suitably as required. Similarly, the slot depth may be selected suitably for the inner and outer transformers.

While in this embodiment, the present invention is applied to a 2-channel rotary transformer, it may be applied to any other rotary transformer, regardless of the number of channels in the rotary transformer apparatus. The invention is not limited to double coaxial rotary transformers, but may be applied to triple coaxial rotary transformers.

For the signal recorded and reproduced by the high-vision digital VTR, the characteristics are, of course, expected to be flat over the required band. Thus, it is necessary to apply damping to suppress resonance. In this case, ideally, the resonance point should be set higher than the necessary highest frequency. Since the transfer rate is as high as 1.2 Gbps, the signal of the order of 100 MHz must be transferred by means of a single channel in the rotary transformer, even if signals are divided into 16 channels, for example. As a result, there arise a situation where the characteristics must be held flat for use up to a frequency exceeding the resonance point.

In such a high frequency band, resonance takes place due to the coupling inductance of the rotary transformer, the receiver, and the capacitance around them. Further, resonance develops due to, for example, leaks in the rotary transformer, the inductance, the floating capacitance in the circuits on the rotary transformer input side, and the capacitance between the primary winding and the secondary winding of the rotary transformer. Practically, to obtain a wide band, it is necessary to eliminate those resonances simultaneously.

A method of solving the above problem is to make the depth of the slot in the inner transformer of a double coaxial rotary transformer greater than that of the outer transformer and, at the same time, determine the depth of the slots so that the capacitance between the primary winding and the secondary winding may be optimal.

Another problem is that since the signal recorded and reproduced by the high-vision VTR has a transfer rate as high as 1.2 Gbps, the signal of the order of 100 MHz must be transferred by means of a single channel of the rotary transformer, even if signals are divided into 16 channels, for example. As a result, there arise a situation where the characteristics must be held flat for use up to a frequency exceeding the resonance point.

In this case, measures are taken to basically place the stator winding (coil) closer to the rotor winding (coil) to improve the transfer characteristics over a wide band. Here, to place the winding as close to the surface of the slot as possible, the ease of winding is sacrificed to make the winding slot shallower or the core facing surfaces are ground after the placement of windings. In the coaxial rotary transformer, since either the rotor or the stator has the winding coil wound from the inside, it is very difficult to wind the winding coil when the slot is shallow.

A way to solve the above problem is to provide a dielectric between the rotor winding and the stator winding. This embodiment will be explained, referring to FIG. 132.

Figure 132:
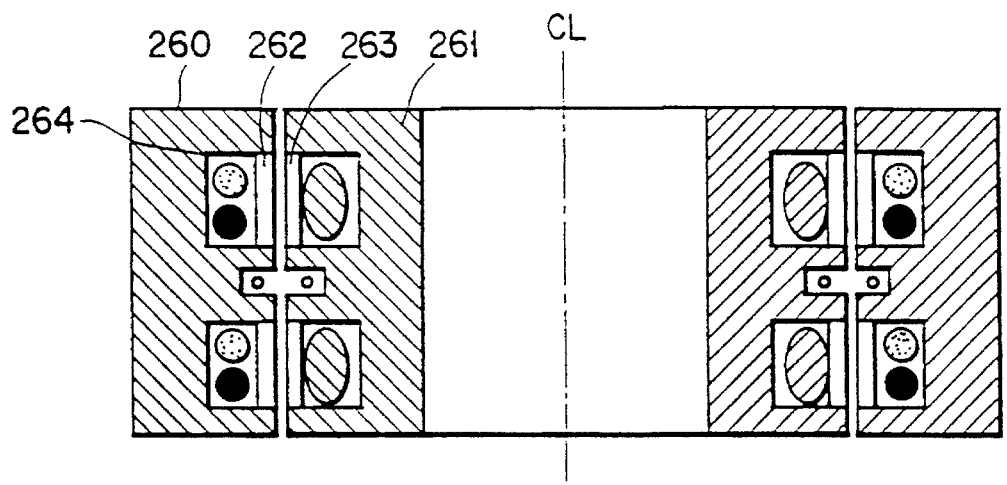
FIG. 132 is a sectional view of a coaxial rotary transformer.

In FIG. 132, a dielectric 262 is placed at the core facing surface in a slot in the rotor 262, and a dielectric 263 is place at the outer core facing surface in a slot in the stator 261. This provide the same effect as placing the rotor winding coil closer to the stator winding coil, even if the winding coil is placed deeper in the deepened slot, which makes it easier to wind the winding coil. Further, by manufacturing a core separated along line 264, placing a dielectric at the core facing surface, inserting a winding coil in the core, and then the separated core portion is attached to the core body, the winding coil can be wound around the core easily.

The rotary transformers shown in FIGS. 129 to 132 may be applied to the recording and reproduction apparatuses according to the above various embodiments and the following embodiments. Also, the stator and rotor may be exchanged in structure. That is, the structure of the stator may be used as the rotor and vice versa.

Next explained will be a 180°-switching rotary transformer-mounted circuit control apparatus, which controls a recording circuit, a reproduction circuit, and an erase circuit mounted on a rotary drum as mentioned above.

Figure 133:
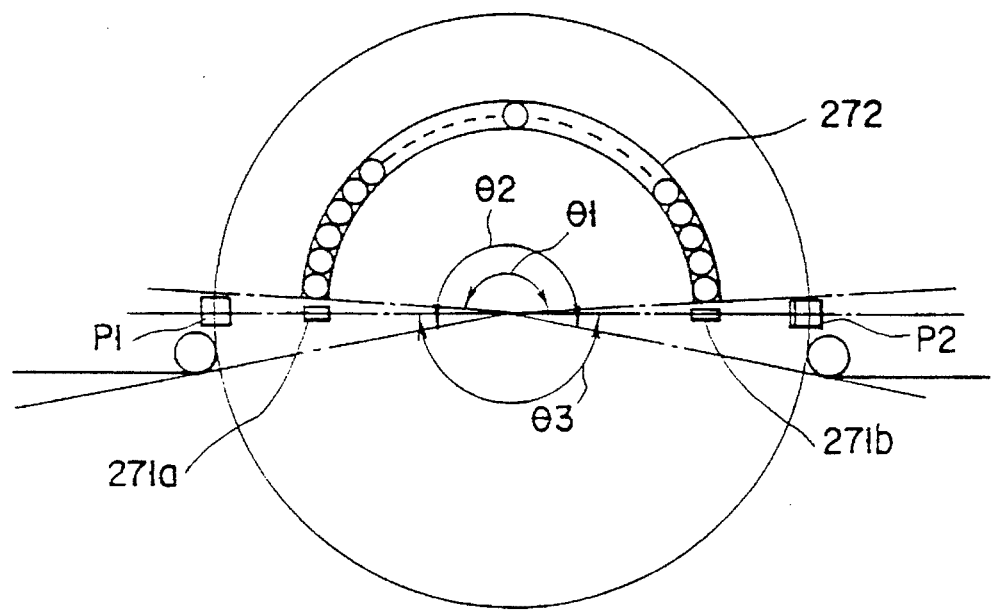
FIG. 133 is a schematic view of a position sense unit for switching magnetic heads.

In FIG. 133, reproduction heads P1 and P2 are placed 180° opposite to each other on the circumference of a rotary drum. Reproduction photodetectors 271a and 271b are mounted on the rotary drum along a line connecting the reproduction heads P1 and P2 radially.

On the stationary drum, a reproduction LED array 272, which is composed of a number of LEDs arranged in a circular arc along the direction of rotation of the rotary drum, is positioned over the effective reproduction area, in this case, over an angle of θ1, approximately 180°, for example, 178° with respect to a rotational direction of the rotary drum, in a location that allows them to face the photodetectors 271a and 271b as the rotary drum rotates. A magnetic tape is wound around the rotary drum at a wrap angle θ2 of 200° with respect to a rotational direction of the rotary drum. The angle θ1 corresponding to the effective reproduction area is called the effective wrap angle, and the wrap angle θ2 is called the total wrap angle.

The relation between the wrap angle and the number of magnetic heads is described referring to FIGS. 78A to 79B. When two magnetic heads to be sequentially activated are mounted on said rotary drum, the total wrap angle is set at more than 180°, when three magnetic heads are mounted on the rotary drum, the total wrap angle is set at more than 120°, and when four magnetic heads are mounted on the rotary drum, the total wrap angle is set at more than 90°.

Referring to FIGS. 134 through 140, various methods of placing LED arrays will be explained, using the reproduction LED array 272 as an example.

Figure 134:
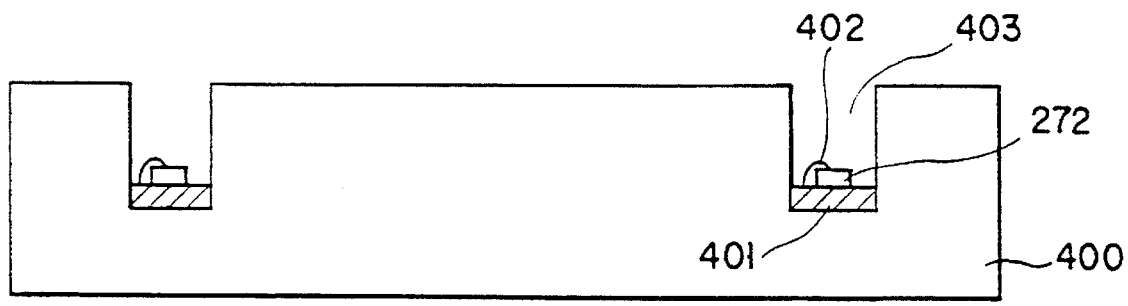
FIG. 134 is a view showing a mounting arrangement of an LED array.

In FIG. 134, a plurality of LED bare chips constituting the LED array 272 are mounted on an LED board 401, and connected to the wiring pattern on the LED board 401 with bonding wires and to a reproduction control circuit. The LED array 272 is placed within a semicircular slot 403 formed in one side of the stationary drum 400 facing the rotary drum (not shown), along the direction of rotation of the rotary drum. By constructing in this way, rays of light emitted from the LED array 272 converge efficiently in the direction perpendicular to the LED arrangement direction to form a circular arc of a narrow luminous flux.

Figure 135:
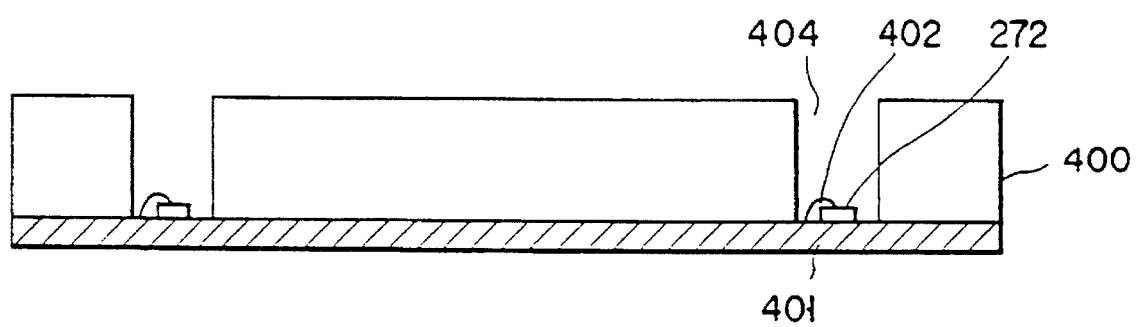
FIG. 135 is a view showing a mounting arrangement of an LED array.

FIG. 135 shows an example of mounting a plurality of LED bare chips constituting the LED array 272 on an LED board 401 attached to the back of the stationary drum 400, and placing those LED bare chips in a semicircular through hole 404 bored in the stationary drum 400. This configuration provides the same effect as that of FIG. 134.

Figure 136:
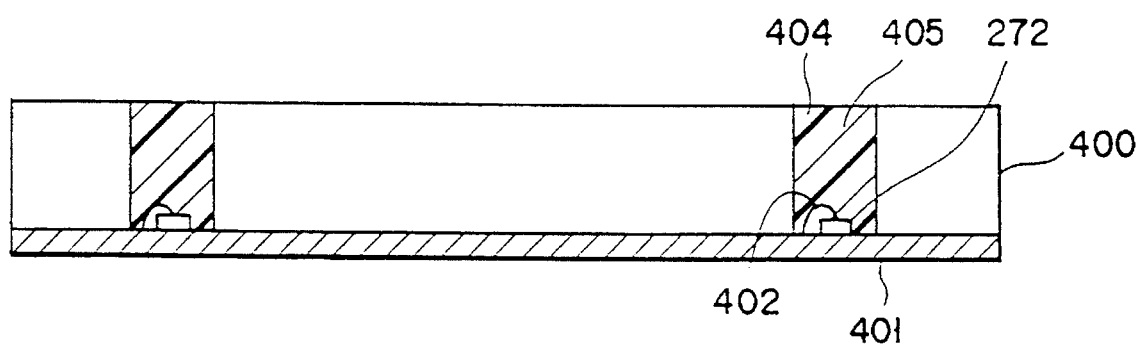
FIG. 136 is a view showing a mounting arrangement of an LED array.

FIG. 136 shows an example of filling the through hole 404 of FIG. 135 with a resin 405. The resin 405 may be a transparent material, a material which presents a large transmittance at the light-emitting wavelength of the LED, or even a resin mixed with a light diffusant. The linear light emission caused by the LED array has ripples in the amount of light proportional to the number of LEDS. By mixing a light diffusant with the resin 405 to diffuse rays of light from the LEDs, such ripples in the light amount can be decreased.

FIG. 137 shows an example of placing on one side of the stationary drum 400 a light diffusing sheet 406 made up of a material such as a resin which presents a large transmittance at the light-emitting wavelength of the LED. Use of the light diffusing sheet 406 decreases such ripples in the light amount for the LED array, as with a light diffusant mixed with the resin 405 of FIG. 136.

FIG. 138 shows an example of tapering the walls of the through hole 404 so as to fan out in the light-emitting direction in order to increase the converging efficiency. FIG. 139 shows an example of tapering the walls of the through hole 404 so as to fan out in the opposite direction to the light-emitting direction in order to increase the converging efficiency. Depending on the VTR system used, either the FIG. 138 configuration or the FIG. 139 configuration may be used.

FIG. 140 shows an example of placing above the through hole 404 of FIG. 135 a semicircular cylindrical lens 407 for more efficiently converging rays of light from the LED array 272 and enabling linear light emission over the effective recording area. The cylindrical lens is produced by injection-molding a transmittable resin, such as an acrylic acid resin, a polycarbonate resin, amorphous polyolefin, a styrene resin, a urethane resin, or an epoxy resin, and is mounted by fitting it into or bonding it to the one side of the stationary drum 400.

When LEDs constituting the LED array 272 cause failure because of the expiration of service life, for example, and emit no light, it is necessary to inform the system controller of the VTR system and the operator of the failure to urge him to take proper measures such as replacement. Since the LED array is composed of a lot of LED bare chips, it is desirable that when as few as one or two LED chips fail, the LED array as a whole should operate as expected. Embodiments taking into account measures to deal with LED failures will be explained, referring to FIGS. 141A through 142B.

Figure 141A:
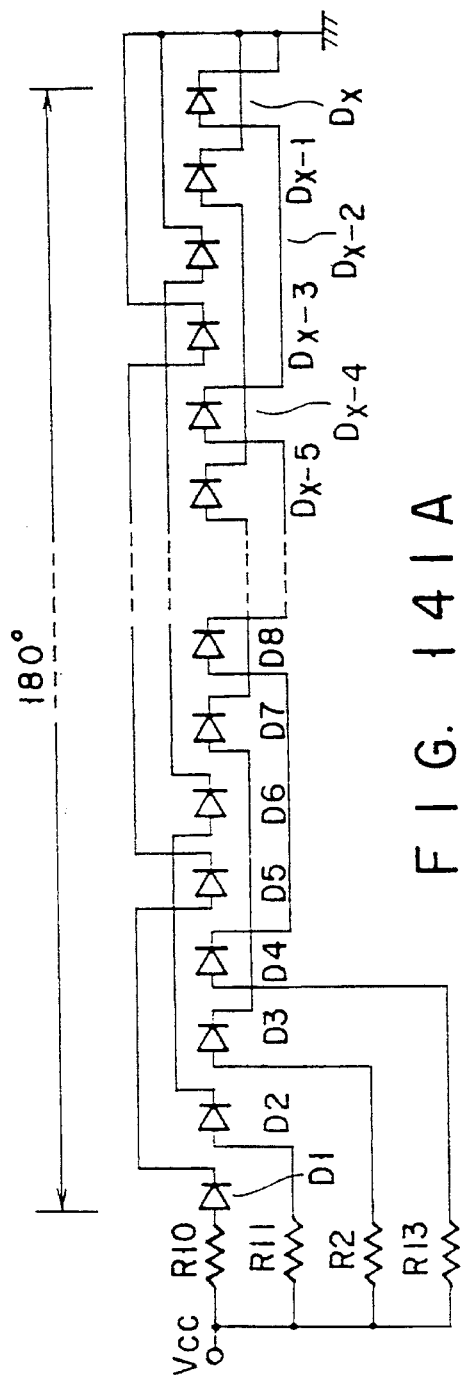
FIGS. 141A and 141B are connection diagrams of an LED array.
Figure 141B:
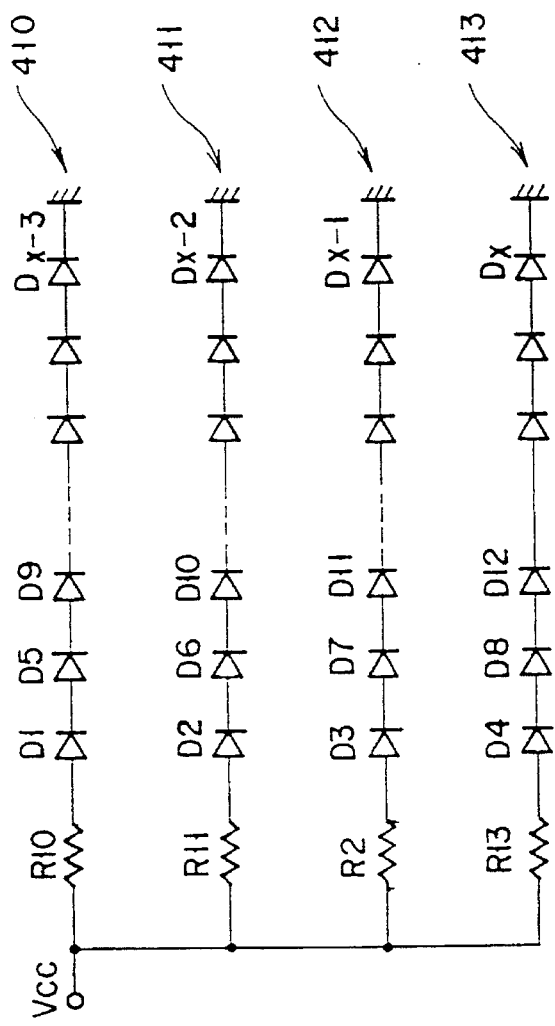

FIG. 141A shows an example of connecting a plurality of LEDs D1 through Dx at intervals of four LEDS. FIG. 141B is what FIG. 141A is redrawn for the sake of clarity. LED groups of LEDs series-connected at intervals of four LEDs are indicated by numerals 410 through 413. Current determining resistances R10 through R13 are connected to the groups 410 through 413, respectively.

By doing this, even if a relatively small number of LEDs, as few as one or two, fail, linear light emission of a specified amount of light can be made without any problem. For example, if one LED fails in LED group 410, all the LEDs in LED group 410 go off, but the remaining LED groups 411 through 413 emit light. As a result, although the amount of light decreases at the place corresponding to the individual LEDs in LED group 410, the decreased amount can be compensated by raising the power supply voltage Vcc by the corresponding amount on the part of the system controller. By using a constant-current circuit as the driving source for the LEDs, which allows the current flowing to the remaining LED groups to increase by as much current as ceased to flow in LED group 410 that has gone off, the amount of light can be increased.

FIG. 142A shows an example of using a photocoupler 420 in place of the operation-check visible-light LED, connecting an LED 421 in the photocoupler 420 in series with the LED array (LEDs D1 through Dx), and allowing a photodetector 422 in the photocoupler 420 to sense abnormalities in the LED array. While the photocoupler 420 uses a phototransistor for the photodetector 421, a photodiode or other light-receiving elements such as photo ICs may be used instead. Resistance R14 is a current-determining resistance which determines current flowing through LEDs D1 through Dx. Resistance R15 is a current-determining resistance which determines the current that flows through the photodetector 422 when the output goes to a low (L) level at the switching of the photodetector 422.

In FIG. 142A, by keeping the voltage of the power supply Vcc2 at 5 V, it is possible to supply the output of the photocoupler 420 directly to the control circuit of a VTR using digital ICs such as TTL logic ICs or MOS logic ICs.

The operation of the FIG. 142A circuit will be explained briefly. During a normal operation, current flows properly to cause LEDs D1 through Dx to emit light. At this time, LED 421 in the photocoupler 420 also emits light, which causes the photodetector 422 to turn on, bringing Y point, the output terminal of the photodetector 420 into the L level. If any one of LEDs D1 through Dx fails, which prevents the current driving LEDs D1 through Dx from flowing, stopping the light emission, with the result that LED 421 in the photocoupler 420 also ceases to emit light. This makes the photodetector 422 of the photocoupler 420 turn off, placing point Y at a high level. Therefore, it is found that LEDs D1 through Dx operate properly when point Y is at the L level, and are defective when point Y is at the H level. The control circuit judges the level of point y and informs the operator of LED failure alarm.

FIG. 142B shows an example of connecting a visible light LED Da in series with LEDs D1 through Dx, the LED 421 in the photocoupler 420, and resistance R14 for easy visual inspection.

Figure 143:
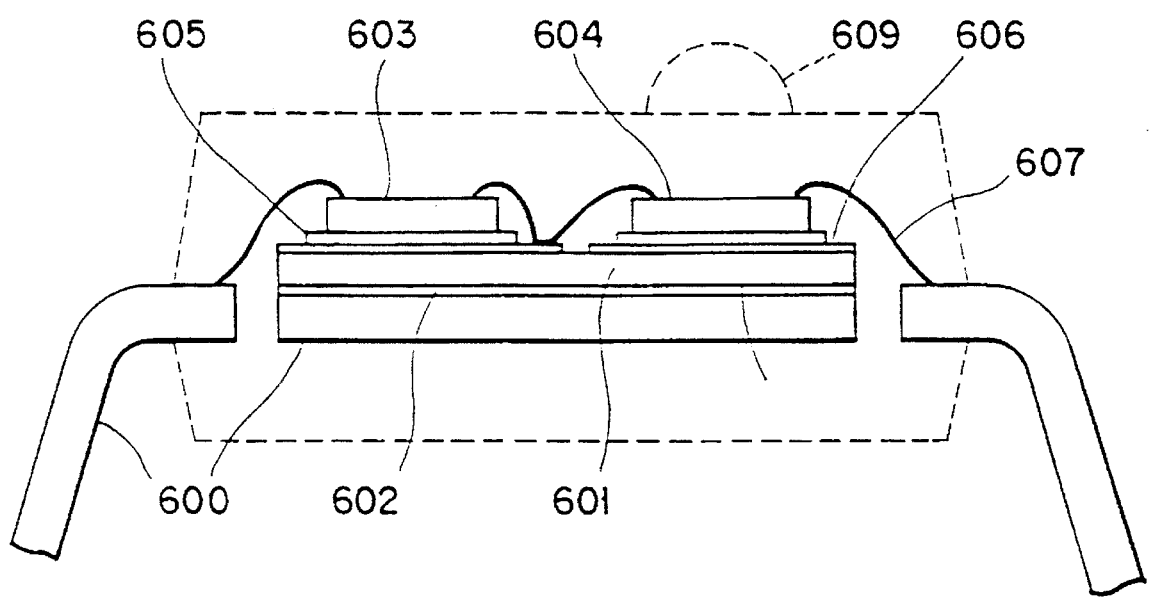
FIG. 143 is a view showing the internal construction of a package to which the MCP system is applied.

FIG. 143 is a sectional view schematically showing a package internal construction where the MCP system is applied to the present invention. In this packaging method, a conventional IC package contains a plurality of ICs or discrete elements such as hetero-semiconductor processed bare chips, and passive elements including capacitances and resistances put in silicon chips, by means of special lead frames, which are interconnected each other on the wiring board on the lead frame, and armored in a transfer mold.

This arrangement and manufacturing method will be explained briefly. First, a wiring board 601 is bonded to an IC lead frame 600 with an adhesive 602, on which an IC 603 and a photodetector 604 of the recording circuit in a bare chip are bonded with a conductive adhesive 605. Those are connected to each other by bonding wires via the wiring pattern 606 on the wiring board 601. After that, by transfer mold sealing, a hybrid IC package 608 is formed. A lens 609 for converging rays of light from the LED may be formed integrally with the package 608.

In this way, the system of putting the recording circuit, photodetector, and the related circuits in the same hybrid IC can be applied to other types of scanners.

Figure 144:
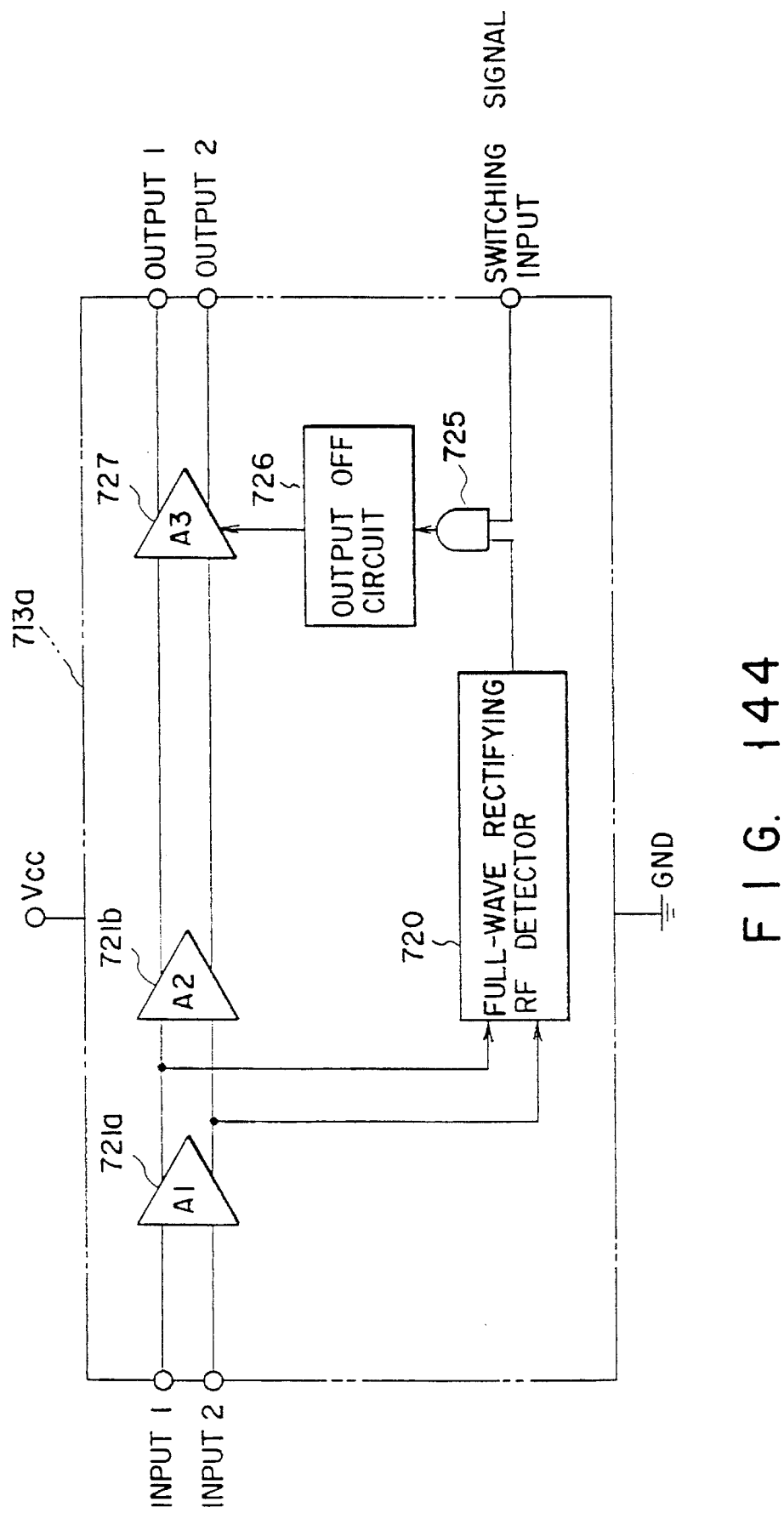
FIG. 144 is a block diagram showing the construction of a recording circuit with a carrier sensing function according to the present invention.

FIG. 144 is a block diagram of a recording circuit with a carrier sensing function. This recording circuit uses a full-wave rectifying RF detector 720 as an RF detector acting as information signal sensing means. Specifically, the record RF signal transferred from the rotary transformer (not shown) is supplied to input 1 and input 2 of the recording circuit 713a. The supplied record RF signal is amplified by an amplifier 721a and divided into two signals, one of which is supplied to a full-wave rectifying recording RF detector 720, and the other of which is supplied to an amplifier 727 via an amplifier 721b. The full-wave rectifying RF detector 720, which is composed of a full-wave rectifier circuit, supplies a high (H) level signal to an AND gate at the next stage.

FIG. 145 shows a construction of the full-wave rectifying RF detector 720, which is composed of a full-wave rectifier circuit 728, a low-pass filter 729, and a comparator 724. The operation of the RF detector 720 will be explained, referring to waveform diagrams in FIG. 146. To simplify the explanation, the RF signal supplied to the RF detector 720 is assumed to be a sine wave.

The RF signal shown in FIG. 146 is converted into the components lower and higher than the fundamental frequency of the RF signal by the full-wave rectifier circuit 728, which rectifies the RF signal into a full-wave rectified output. The full-wave rectified output from the full-wave rectifier circuit 728 is supplied to the low-pass filter 729, which removes the higher frequency components to ex tract only the lower frequency components, thereby providing a low-pass filter output. The output from the low-pass filter 729 is supplied to a comparator 724, which binarizes it.

Use of the full-wave rectifying detector 709 shown in FIG. 145 offers the following advantages.

After the RF signal is converted into the components lower and higher than its fundamental frequency by the full-wave rectifier circuit 728, the higher frequency components are removed by the low-pass filter 729 and the resulting signals are supplied to the comparator 724. This enables the cut-off frequency of the low-pass filter 729 to be set higher than the fundamental frequency of the RF signal, which makes it possible to the capacity of the capacitor used for the low-pass filter 729 smaller. The formation of the capacitor in the IC does not make the chip size larger. The reduction in the capacitor capacity shortens the charging and discharging time, making the RF signal sensing speed faster.

In the case of HDTV digital VTRs, a recording rate per magnetic head is 148.5 Mbps, as written in the Journal of "Broadcasting Technology," November special issue, Vol. 43, No. 12, 1990, pp. 20–26 and pp. 62–66. In the record modulation system, although use of 8—8 conversion ASE codes suppresses the lower-frequency components as much as possible, not all lower-frequency components are eliminated completely. Therefore, the RF detector must sense RF signals over a wide band ranging from lower frequencies to as high as 148.5 Mbps. Since the HDTV digital VTR uses as many magnetic heads as 18, as mentioned earlier, this imposes a severe restriction on the circuit mounting area of the rotary drum. For this reason, it is absolutely necessary to produce the RF detector in IC form and its chip size is desired to be as small as possible with the full-wave rectifying RF detector 720 constructed as described above, it is possible to meet these requirement easily.

FIG. 147 shows another construction of the full-wave RF detector 720, which differs from that in FIG. 144 in that there are two stages of full-wave rectifier circuits 728a and 728b. FIG. 148 is operating waveform diagrams for the FIG. 147 RF detector 720. After the RF signal is rectified into a first-stage full-wave rectified output by a first-stage full-wave rectifier circuit 728a and then rectified into a second-stage full-wave rectified output by a second-stage full-wave rectifier circuit 728b, the higher-frequency components are removed from the resulting RF signal by the low-pass filter 729 to produce a low-pass filter output.

As evident from FIG. 148, the higher-frequency components in the second-stage low-pass filter output from the second-stage full-wave rectifier circuit 728b are converted into frequency components whose frequencies are higher than those of the first-stage low-pass filter output of the first-stage full-wave rectifier circuit 728a. By performing full-wave rectification over two stages, it is possible to make the capacity of the capacitor used for the low-pass filter 729 smaller than that in a single stage of a full-wave rectifier circuit (FIG. 144).

FIG. 149 shows another construction of the full-wave rectifying RF detector 720, which has a high-pass filter 730 inserted between two stages of the full-wave rectifier circuits 728a and 728b of FIG. 147. FIG. 150 is operating waveform diagrams for the FIG. 147 RF detector 720. After the RF signal in FIG. 150 is rectified into a full-wave rectified output by the first-stage full-wave rectifier circuit 728a, only the higher-frequency components are extracted from the resulting signal to produce a high-pass filter output. After the output of the high-pass filter 730 is rectified into the second-stage full-wave rectified output by the second-stage full-wave rectifier circuit 728b, the higher-frequency components are removed from the resulting signal by the low-pass filter 729 to produce a low-pass filter output.

The high-pass filter 730 can improve the effect of full-wave rectification by the second-stage full-wave rectifier circuit 728b by removing the direct-current component of the output of the first-stage full-wave rectifier circuit 728a. Further, the high-pass filter 730 helps to increase the response speed to the RF signal of the output of the low-pass filter 729, especially the rising response speed. Since the high-pass filter 730 does not require a capacitor of a large capacitance, it is possible to make IC chips more compact without any trouble.

FIG. 151 shows another construction of the full-wave rectifying RF detector 720, which has a limiter amplifier 770 at the stage precedent to the full-wave rectifier circuit 728 of FIG. 145.

FIG. 152 is operating waveform diagrams for the FIG. 151 RF detector 720. The sinusoidal RF signal of FIG. 152 is limited in amplitude by the limiter amplifier 770 and shaped into a square wave with a sharp rising edge and a sharp falling edge to produce a limiter output. The output of the limiter amplifier 770 is rectified into a full-wave rectified output by the full-wave rectifier circuit 728. After the low-pass filter 729 removes the higher-frequency components from the resulting signal, the low-pass filter output is supplied to the comparator 24 for binarization.

As seen from the comparison of the waveforms in FIG. 146 and those in FIG. 152, ripples in the output of the full-wave rectifier circuit 728 are smaller than those in the full-wave rectified output of the FIG. 151 RF detector. This is because in FIG. 151, the input to the full-wave rectifier circuit 728 is converted into a square wave, whereas in FIG. 145, the input to the full-wave rectifier circuit 728 is sinusoidal. Thus, with the arrangement of FIG. 151, it is possible to make smaller the capacitance of the capacitor used for the low-pass filter 729 for removing ripples in the output of the full-wave rectifier circuit 728.

The arrangement of the FIG. 151 full-wave rectifying RF detector 720 is effective not only for a sinusoidal RF signal but also a square RF signal such as an NRZ signal, for example. Such a square RF signal becomes dull in wave form as its direct-current component drops when passing through the rotary transformer. The limiter amplifier 770, however, can return the dull waveform to a sharp square waveform.

This effect will be explained, referring to FIG. 153. FIG. 153 is operating waveform diagrams when the RF signal input is of a square waveform. The RF signal is an NRZ signal, which becomes a lower-frequency cut signal with the direct-current component dropped after passing through the rotary transformer. The lower-frequency cut RF signal is supplied to the limiter amplifier 770, which shapes it into a square-wave limiter output. The limiter output is rectified into a full-wave rectified output by the full-wave rectifier circuit 728. After the low-pass filter 729 removes ripples from the resulting signal, the low-pass filter output is supplied to the comparator 724.

In this way, with the arrangement of FIG. 151, it is possible to properly sense the RF signal, regardless of the type of RF signal waveform.

Similar effects, of course, can be obtained even when the limiter amplifier 770 and the full-wave rectifier circuit 728 are reversed in their position.

Figure 155:
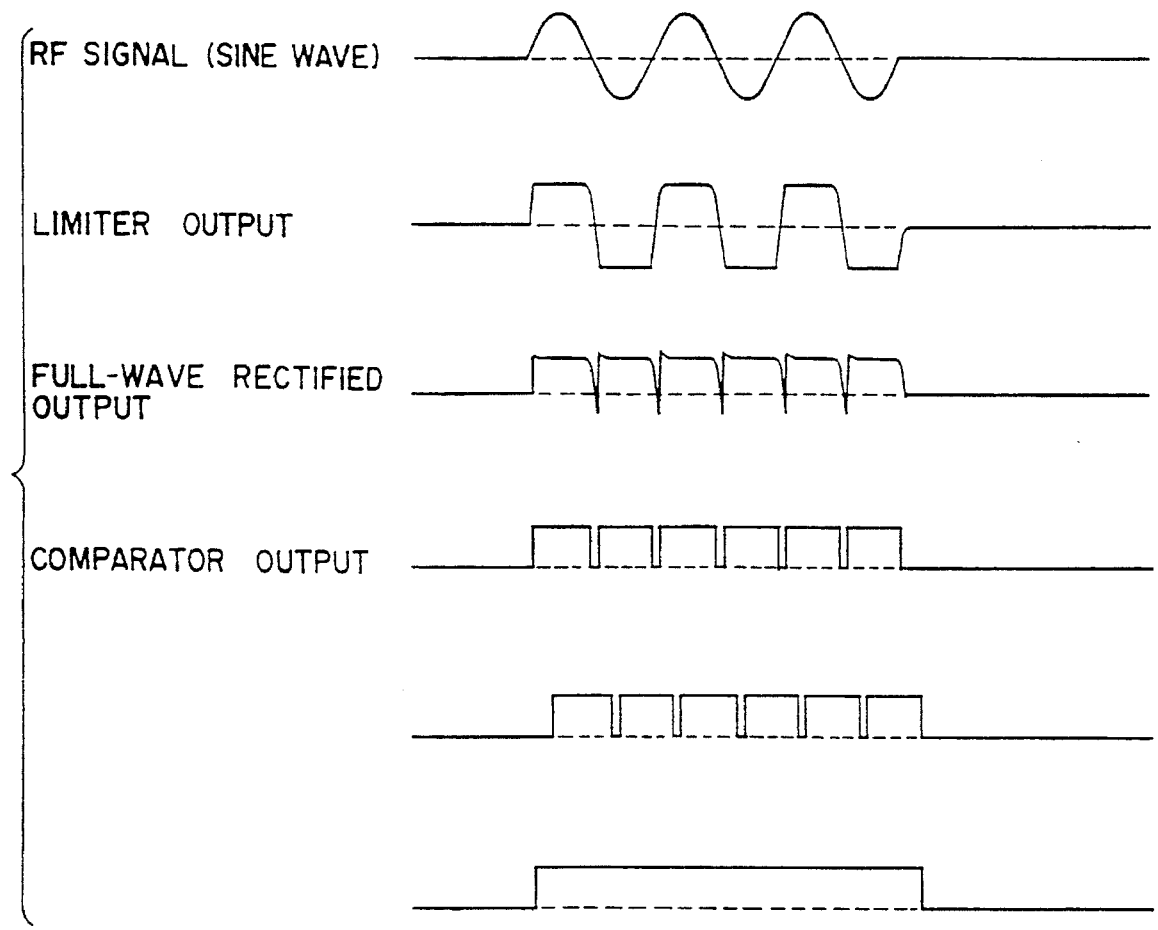

FIG. 154 shows another construction of the full-wave rectifying RF detector 720. In this example, means for eliminating the higher-frequency components after the full-wave rectification at the FIG. 151 RF detector 720 is realized without using the low-pass filter 729. In FIG. 154, the output of the full-wave rectifier circuit 728 is first supplied to the comparator 724, and then processed at a delay circuit 771 and an OR gate 772. FIG. 155 is operating waveform diagrams for the FIG. 154 RF detector 720.

The RF signal in FIG. 155 is processed in sequence into a limiter output and a full-wave rectified output by the limiter amplifier 770 and the full-wave rectifier circuit 728, respectively, as shown in FIG. 151. The full-wave rectified output of the full-wave rectifier circuit 728 is binarized by the comparator 724. The comparator output of the comparator 724 is divided into two signals, one of which is supplied to the delay circuit 771 that delays it, and the other of which is supplied to one input of the OR gate 772. The output of the delay circuit 771 is supplied to the other input of the OR gate 772. The output of the OR gate 772 is the RF signal sense output.

Since the example of FIG. 154 requires neither low-pass filter nor a high-pass filter, this makes the response speed of the OR gate output or the RF signal sense output to the RF signal very fast. Additionally, a capacitor used as a filter element is not necessary. These features are more effective in fabricating ICs.

Figure 156:
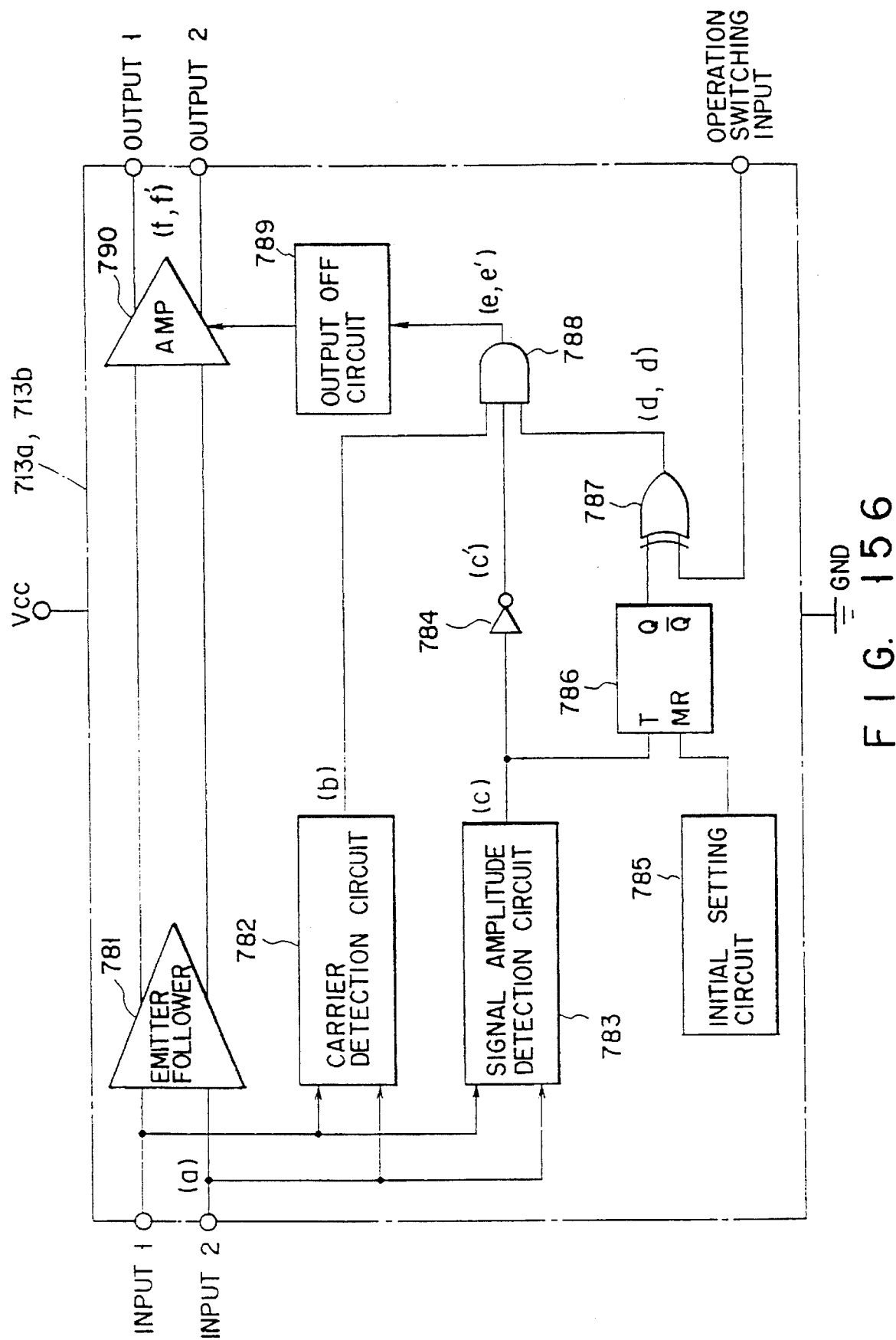
Figure 157:
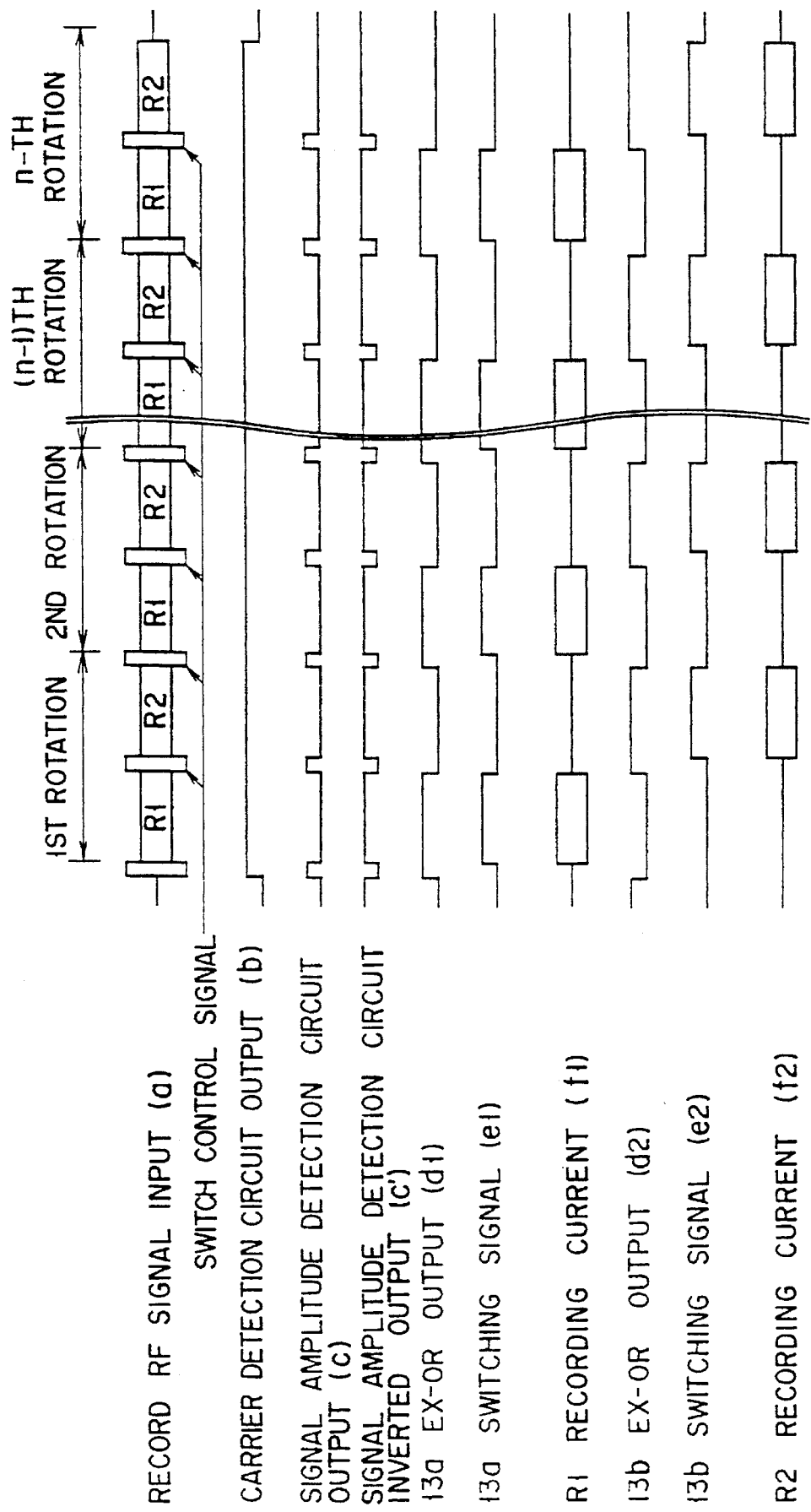
Figure 158:
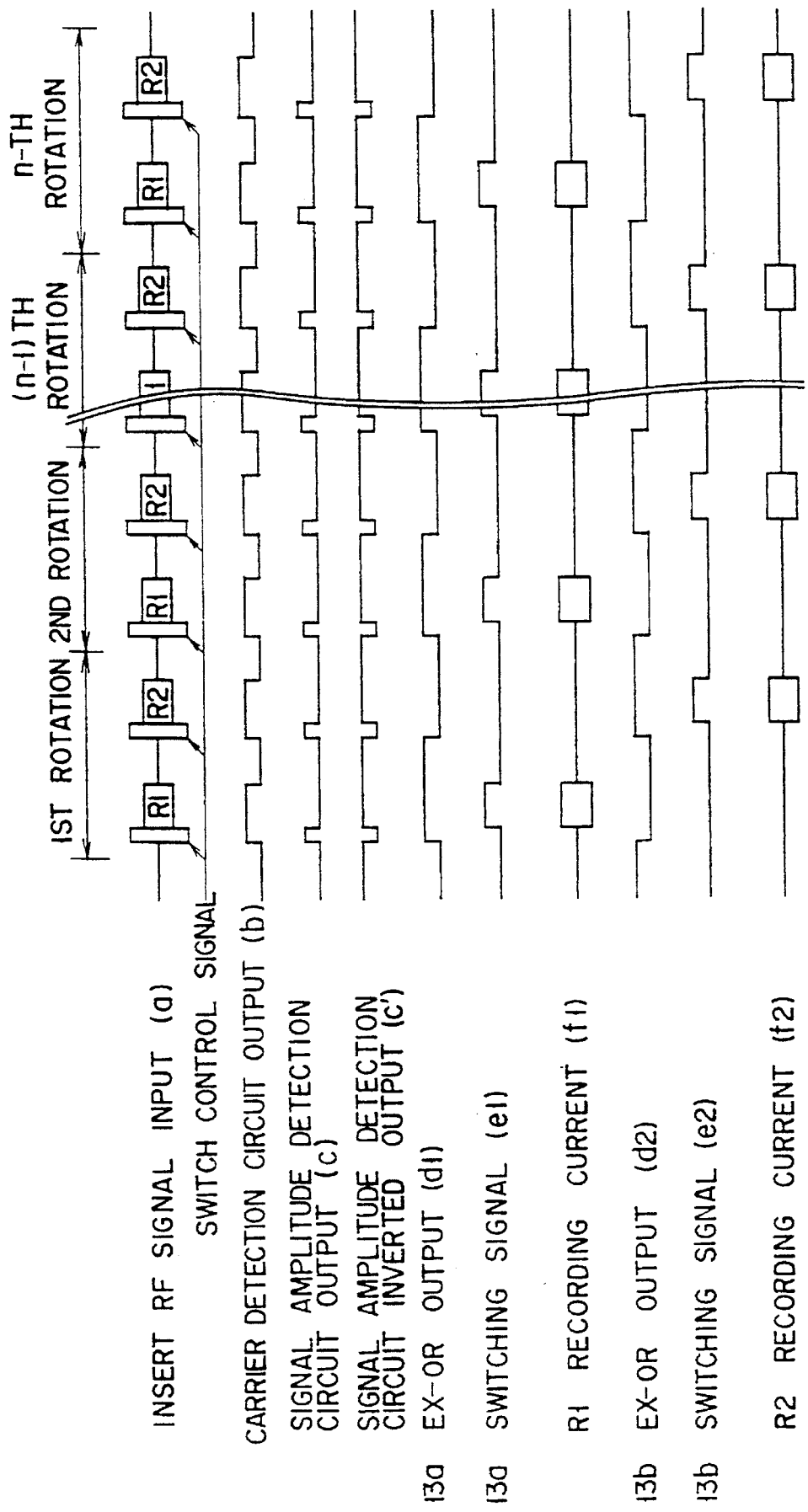

Referring to FIGS. 156 through 158, the construction and operation of another embodiment of the recording circuit will be explained.

FIGS. 157 and 158 illustrate the operation sequence for various portions of the FIG. 156 recording circuit during a normal recording operation and during an insert recording operation, respectively. In the record RF signal (a), a switch control signal inserted at the head of each of R1 record signal and R2 record signal has a greater amplitude than that of the record signal, each amplitude being equal. FIG. 156 shows an example of the recording circuits 713a and 723b, which perform control using a switch control signal sensed by signal amplitude sensing means that senses from the record RF signal the difference in amplitude between the record signal and the switch control signal.

In FIG. 156, the record RF signal transferred from the rotary transformer is supplied to input 1 and input 2 of the recording circuits 713a and 713b. The supplied record RF signal is divided into three signals, which are supplied to an emitter follower 781, a carrier sense circuit 782, and a signal amplitude sense circuit 783, respectively.

The carrier sense circuit 782 transmits a high (H) level signal to an AND gate 788 as long as the signals including the switch control signal are being supplied. As the carrier sense circuit 782, the full-wave rectifying RF detectors shown in FIGS. 145 through 155 may be used.

The signal amplitude sense circuit 783 places the output at the H level only during the time when a signal whose amplitude is larger than that of the record signal by a specified amplitude level is sensed. It then transmits the resulting signal as the switch control signal to an inverter 784 and a flip-flop 786. The signal amplitude sense circuit 783 can be constructed in a similar manner to the carrier sense circuit, by modifying the signal amplitude level to be sensed.

When the switch control signal is sensed and the output of the signal amplitude sense circuit 783 is at the H level, the inverter 784 transmits a low (L) level signal to the AND gate 788. At this time, the AND gate 788 supplies a L-level signal to an output off circuit 789, which places an amplifier 790 in an inactive state, thereby preventing the switch control signal in the record RF signal from being supplied as a recording current.

An initial setting circuit 785 is a circuit that transmits a H level signal to the MR (master reset) input of the flip-flop 786 only at the time when power is turned on, in order to reset the state of the Q output of the flip-flop 786 to a L level immediately after the turning on of the power supply.

The flip-flop 786 is a T flip-flop with a master reset input in this embodiment. It keeps the Q output state at the H level or the L level during the time from when the switch control signal sensed by the signal amplitude sense circuit 783 is transmitted to T input until the next switch control signal is transmitted. The state of Q output is inverted each time the switch control signal is supplied.

An EX-OR (exclusive OR) gate is a circuit for causing the recording circuit to operate either as the recording circuit 713a for driving the magnetic head R1 or as the recording circuit 713b for driving the magnetic head R2. The EX-OR gate 787 produces a H-level output when its two inputs are at different levels, and a L-level output when its two inputs are at the same level. For example, when one input is fixed at the L level, the output is at the L level when the other input is at the L level, and the output is at the H level when the other input is at the H level. That is, a change in the input state directly appears at the output. When one input is fixed at the H level, the output is at the H level when the other input is at the L level, and the output is at the L level when the other input is at the H level. That is, the inversion of a change in the input stage appears at the output.

When the Q output of the flip-flop 786 is supplied to the AND gate 788, the above action is used to switch the operation of the recording circuit either to transmit the output state directly or to invert and transmit the state. When the operation switching input is fixed at the L level, the Q output of the flip-flop 786 is supplied directly. When it is fixed at the Hi level, the Q output is inverted and supplied. The former operates as the recording circuit 713a to drive the magnetic head R1, and the latter operates as the recording circuit 713b to drive the magnetic head R2. This makes it possible to prevent the two recording circuits of the same construction 180° opposite to each other from operating simultaneously.

When the signals supplied from the carrier sense circuit 782, the inverter 784, and the EX-OR gate 787 are all at the H level, the AND gate 788 supplies a H-level signal to the output off circuit 789 to make the amplifier active.

Referring to FIGS. 157 and 158, the operation sequence of various portions of the FIG. 156 recording circuit during a normal recording operation and during an insert recording operation will be explained.

The record RF signal (a) transferred from the rotary transformer is supplied to input 1 and input 2 of the recording circuits 713a and 713b. The record RF signal (a) is divided into three signals, which are supplied to the emitter follower 781, the carrier sense circuit 782, and the signal magnitude sense circuit 783, respectively. The output (b) of the carrier sense circuit 782 is kept at the H level as long as the signals including the switch control signal are being supplied. The output (c) of the signal amplitude sense circuit 783 is at the H level only when the switch control signal is sensed. The output (c) of the signal amplitude sense circuit 783 is inverted by the inverter 784 to produce a signal amplitude sense circuit inverted signal (c'). Because of this, while the switch control signal is being sensed, the switching signal (e1, e2), i.e. the output of the AND gate 788, is at the L level. During this period of time, the output off circuit 789 makes the amplifier 790 inactive, preventing the switch control signal in the record RF signal from being supplied as a recording current.

The Q output of the flip-flop 786 in the L-level state reset by the initial setting circuit changes to the H level when the first switch control signal, or the switch control signal at the head of the R1 record signal, is sensed and the output (c) of the signal amplitude sense circuit 783 rises to the H level. The Q output changes to the L level when the second switch control signal, or the switch control signal at the head of the R2 record signal, is sensed and the output (c) of the signal amplitude sense circuit 783 rises to the H level again. Similarly, from this time on, the Q output of the flip-flop 786 is inverted each time the switch control signal is sensed.

In the recording circuit 713a, since the Q output of the flip-flop 786 appears directly at the output (d1) of the EX-OR gate 787, the latter output is at the H level when an odd number-th switch control signal is sensed, and is at the Lo level when an even number-th switch control signal is sensed. The switching signal (e1) goes to the H level when all the inputs to the AND gate 788 are at the H level, or when the output (b) of the carrier sense circuit 782, the signal amplitude sense circuit inverted output (c'), and the output (d1) of the EX-OR gate 787 are all at the H level. Since the output OR circuit 789, when the switch signal (e1) is at the H level, makes the amplifier 90 active, the recording current corresponding to R1 record signal is supplied as shown by the R1 recording current (f1), while the recording current corresponding to the R2 record signal is not supplied.

In the recording circuit 713b, since the inversion of the Q output of the flip-flop 786 appears at the output (d2) of the EX-OR gate 787, the latter output is at the L level when an odd number-th switch control signal is sensed, and is at the H level when an even number-th switch control signal is sensed. The switching signal (e2) goes to the H level when all the inputs to the AND gate 788 are at the H level, or when the output (b) of the carrier sense circuit 782, the signal amplitude sense circuit inverted output (c'), and the output (d2) of the EX-OR gate 787 are all at the H level. Since the output OR circuit 789, when the switching signal (e2) is at the H level, makes the amplifier 90 active, the recording current corresponding to R1 record signal is not supplied as shown by the R2 recording current (f2), while the recording current corresponding to R2 record signal is supplied.

Similarly, during an insert recording operation, partial rewriting can be done by using the switch control signal added to the heads of R1 record signal and R2 record signal to control the switching of the recording circuit 713a and 713b so as to record only the signals to be insert-recorded by the carrier sense circuit.

This embodiment also provides the same effect as does the preceding embodiment. With this embodiment, the recording circuits 713a and 713b can be switched to one another without using recording circuit control means composed of an LED array and a photodetector. Since it is not necessary to provide a special rotary transformer and channels including slip rings to transfer the switch control signal, the circuit configuration of the VTR's recording system can be made simpler and more compact without sacrificing the normal recording operation, partial rewriting only onto the video tracks, and partial rewriting onto the audio tracks.

Figure 160:
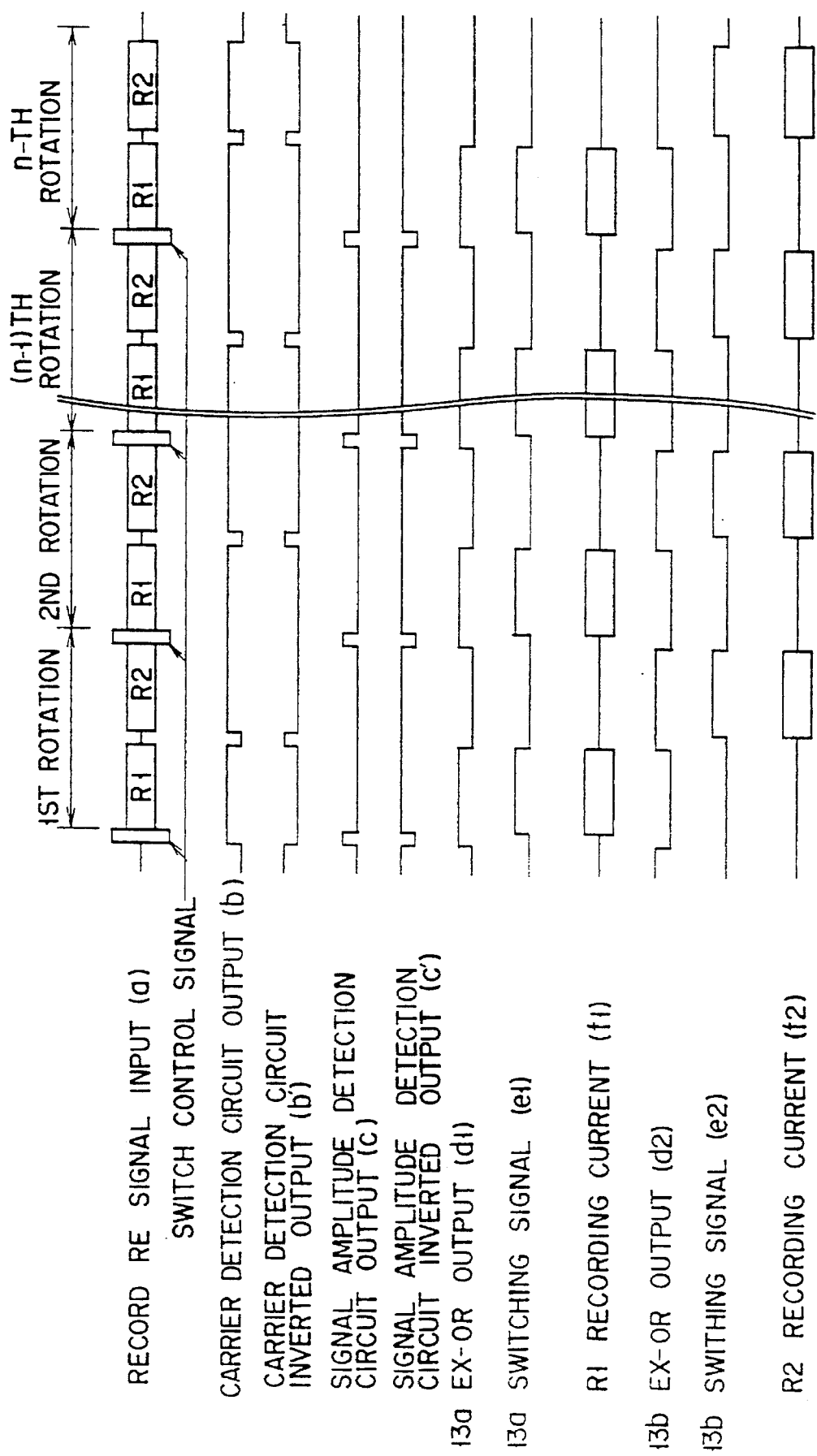
Figure 161:
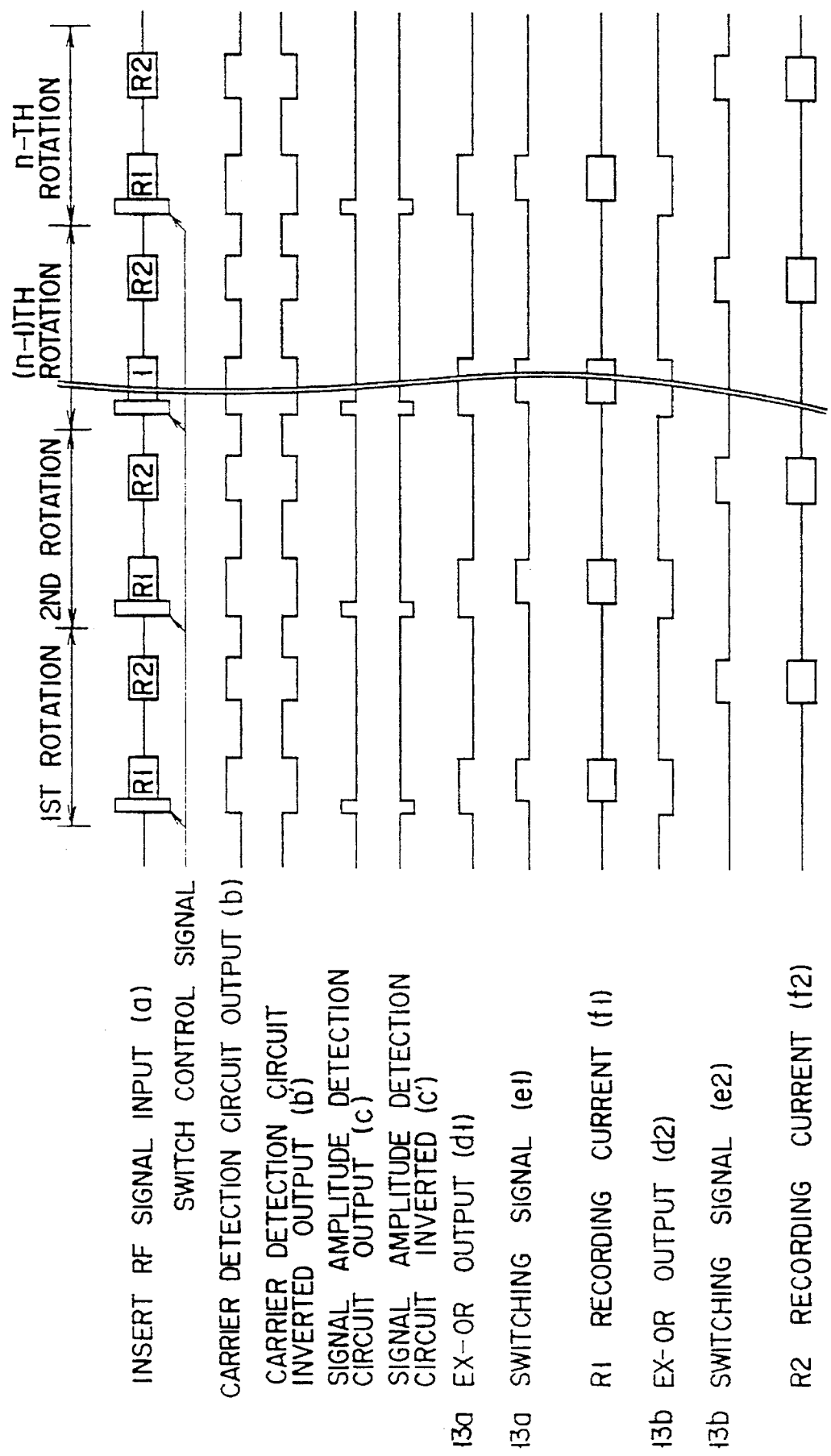

Referring to FIG. 159, another recording circuit will be explained. FIGS. 160 and 161 show the operation sequence of various portions of the FIG. 159 recording circuit during a normal recording operation and during an insert recording operation.

In the record RF signal (a), a switch control signal is inserted at the head of R1 record signal but not at the head of R2 record signal to provide a null signal period between R1 record signal and R2 record signal. The switch control signal is sensed by signal amplitude sensing means as with the first embodiment and used as a first switch control signal. The null signal period of the record RF signal is sensed by carrier sensing means and used as a second switch control signal. This embodiment provides a recording circuit that performs switching control using two switch control signals.

This embodiment differs from the recording circuit shown in FIG. 156 in that an RS flip-flop is used for the flip-flop 786, which is controlled by the first switch control signal from the signal amplitude sense circuit 783 and the second switch control signal, the output signal from the carrier sense circuit 782 inverted by the inverter 791, and that use of this control system eliminates the initial setting circuit. Since the construction of the remaining circuit is the same as that of the recording circuit shown in FIG. 156, its explanation will be omitted.

In FIG. 159, when the RF signal is in the null signal state, the output of the carrier sense circuit 782 is at the L level, and the output of the inverter, the second switch control signal, is inverted into the H level.

The R input of the flip-flop 786 is supplied with a H level signal from the inverter 791, and the Q output of the flip-flop 786 is reset to the L level. The Q output of the flip-flop 786 is maintained until the output of the signal amplitude sense circuit 783, the first switch control signal, is at the H level and supplied to the S input. When the H-level signal is supplied to the S input, the Q output of the flip-flop 786 is set at the H level. The Q output of the flip-flop 786 is kept until the carrier sense circuit 782 senses the null signal state, places the output of the inverter 791, the second switch control signal, at the H level and this high level output is supplied to the R input.

Since the Q output of the flip-flop 786 is always reset to the L level as long as the record RF signal is in the null signal state, the initial setting circuit used in the recording circuit in FIG. 156 is not necessary. The operation of the remaining circuit is the same as the recording circuit of FIG. 156.

Referring to FIGS. 160 and 161, the operation sequence of various portions of the FIG. 159 recording circuit during a normal recording operation and during an insert recording operation will be explained.

The record RF signal (a) transferred from the rotary transformer is supplied to input 1 and input 2 of the recording circuits 713a and 713b. The record RF signal (a) is divided into three signals, which are supplied to the emitter follower 781, the carrier sense circuit 782, and the signal amplitude sense circuit 783, respectively.

The output (b) of the carrier sense circuit 782 is at the H level while the signals including the switch control signal are being supplied, and at the L level before and after the record RF signal is supplied and during the time of period when R1 record signal and R2 record signal are null signals. The output (b) of the carrier sense circuit 782 is inverted by the inverter 791 to produce a carrier sense circuit inverted output (b').

The output (c) of the signal amplitude sense circuit 783 is at the H level only when the switch control signal is sensed. The output (c) of the signal amplitude sense circuit 783 is inverted by the inverter 784 to produce a signal amplitude sense circuit inverted signal (c'). Because of this, while the switch control signal is being sensed, the switching signal (e1, e2), i.e. the output of the AND gate 788, is placed at the L level. During this period of time, the output off circuit 789 makes the amplifier 790 inactive, preventing the switch control signal in the record RF signal from being supplied as a recording current.

The Q output of the flip-flop 786 in the initial state reset with no record RF signal is set to the H level when the first switch control signal, or the switch control signal at the head of R1 record signal, is sensed and the output (c) of the signal amplitude sense circuit 783 rises to the H level. The Q output is reset to the L level when the null signal period at the head of R2 record signal, is sensed and the carrier sense circuit inverted output (b') rises to the H level. Similarly, from this time on, the Q output of the flip-flop 786 is inverted by the alternate setting and resetting by the signal amplitude sense circuit output (c) 783 and the carrier sense circuit inverted output (b').

In the recording circuit 713a, since the Q output of the flip-flop 786 appears directly at the output (d1) of the EX-0R gate 787, the latter output is at the H level when the switch control signal at R1 record signal is sensed, and is at the L level when the null signal period at the head of R2 record signal is sensed. The switch signal (e1) goes to the H level when all the inputs to the AND gate 788 are at the H level, or when the output (b) of the carrier sense circuit 782, the signal amplitude sense circuit inverted output (e'), and the output (d1) of the EX-OR gate 787 are all at the H level. Since the output off circuit 789, when the switching signal (e1) is at the H level, makes the amplifier 790 active, the recording current corresponding to R1 record signal is supplied as shown by the R1 recording current (f1), while the recording current corresponding to R2 record signal is not supplied.

In the recording circuit 713b, since the inversion of the Q output of the flip-flop 786 appears at the output (d2) of the EX-OR gate 787, the latter output is at the L level when the switch control signal at the head of R1 record signal is sensed, and is at the H level when the null signal period at the head of R2 record signal is sensed. The switching signal (e2) goes to the H level when all the inputs to the AND gate 88 are at the H level, or when the output (b) of the carrier sense circuit 782, the signal amplitude sense circuit inverted output (e'), and the output (d2) of the EX-OR gate 787 are all at the H level. Since the output off circuit 789, when the switch signal (e2) is at the H level, makes the amplifier 790 active, the recording current corresponding to R1 record signal is not supplied as shown by the R1 recording current (f2), while the recording current corresponding to R2 record signal is supplied.

Similarly, during an insert recording operation, partial rewriting can be done by using the first switch control signal added to the head of R1 record signal and the null signal period at the head of R2 record signal to control the switching of the recording circuits 713a and 713b so as to record only the signals to be insert-recorded by the carrier sense circuit 782.

Figure 163:
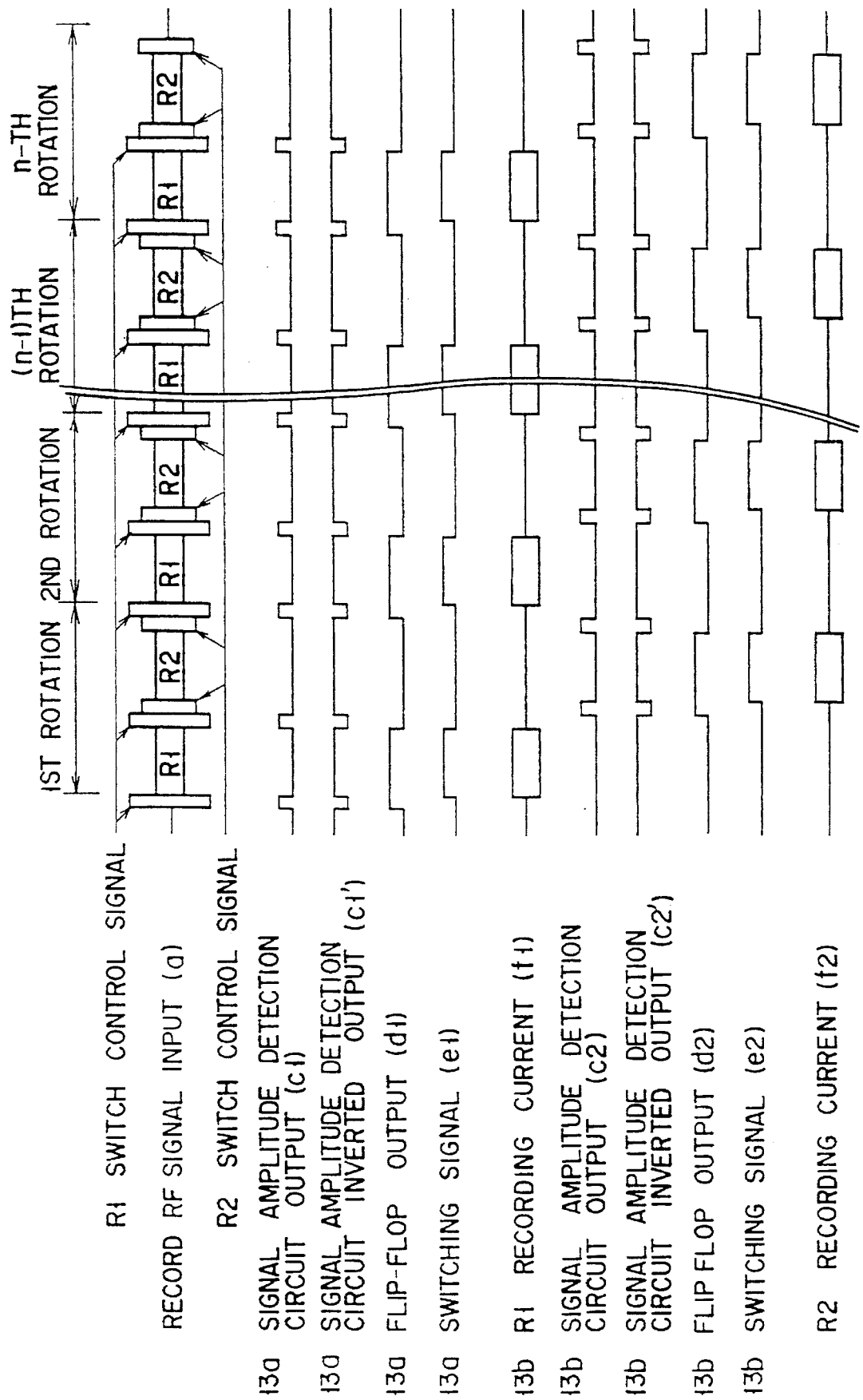

Referring to FIG. 162, the construction of another recording circuit will be explained. Referring to FIGS. 163 and 164, the operation sequence of various portions of the FIG. 162 recording circuit during a normal recording operation and during an insert recording operation will be explained.

In the record RF signal (a) of this recording circuit, the first switch control signal inserted before and after R1 record signal (hereinafter, referred to as the R1 switch control signal) has a larger amplitude than that of the second switch control signal inserted before and after R2 record signal (hereinafter, referred to as the R2 switch control signal). This embodiment provides a recording circuit which senses either R1 switch control signal or R2 switch control signal on the basis of the amplitude difference between them. For example, the recording circuit 713a senses R1 switch control signal to switch between the active and inactive states, and the recording circuit 713b senses R2 switch control signal to switch between the active and inactive states.

The record RF signal transferred from the rotary transformer is supplied to input 1 and input 2 of the recording circuits 713a and 713b. The supplied record RF signal is divided into two signals, one of which is supplied to an emitter follower 781 and the other of which is supplied to a signal amplitude sense circuit 783.

The signal amplitude sense circuit 783 of the recording circuit, whose function differs from that of the recording circuits of FIGS. 156 and 159, has the upper and lower limits of comparison reference to sense the amplitude difference between the record signal, R1 switch control signal and R2 switch control signal contained in the record RF signal, produces a Hi-level signal when the amplitude level of the signal lies within the limit range and a L-level signal when the level exceeds the range. For example, in the case of the record RF signal (a) of FIG. 163, by setting the upper limit larger than the amplitude of R1 switch control signal and by setting the lower limit smaller than the amplitude of R2 switch control signal, R1 switch control signal can be sensed. Further, by setting the upper limit larger than the amplitude of R2 switch control signal whose amplitude is smaller than that of R1 switch control signal and by setting the lower limit larger than the amplitude of the record signal, R2 switch control signal can be sensed.

The sensing level setting input is fixed to a suitable potential. By changing the potential, it is determined whether R1 switch control signal or R2 switch control signal is sensed. The recording circuit that senses the former operates as the recording circuit 713a and the recording circuit that senses the latter operates as the recording circuit 713b. This prevents the recording circuits of the same configuration 180° opposite to each other from operating simultaneously, which eliminates the EX-OR gate 87 used in the previous embodiment.

Since the recording circuit 713a of FIG. 162 records only the R1 record signal sandwiched by R1 switch control signals and the recording circuit 713b records only the R2 record signal sandwiched by R2 switch control signals, it is not necessary to perform control using the carrier sense circuit in order to supply only the signal to be recorded.

The inverter 784, initial setting circuit 785, and flip-flop 786 have the same construction as those in the recording circuit of FIG. 156, and function in the same manner.

The AND gate 788 differs from those in FIGS. 156 and 159 in that it has two inputs because the carrier sense circuit is removed. The AND gate 788, when both the signals sent from the inverter 784 and flip-flop 786 are at the H level, supplies a H-level signal to the output off circuit 789, making the amplifier 790 active.

Referring to FIGS. 163 and 164, the operation sequence of various portions of the FIG. 162 recording circuit during a normal recording operation and during an insert recording operation will be explained.

The record RF signal (a) transferred from the rotary transformer is supplied to input 1 and input 2 of the recording circuits 713a and 713b. The record RF signal (a) is divided into two signals, one of which is supplied to the emitter follower 781 and the other of which is supplied to the signal amplitude sense circuit 783.

In the case of the recording circuit 713a, the output (c1) of the signal amplitude sense circuit 783 goes to the H level when R1 switch control signal is sensed. The output (c1) of the signal amplitude sense circuit 783 is inverted by the inverter 784 to produce a signal amplitude sense circuit inverted signal (e1'). Because of this, while the R1 switch control signal is being sensed, the switching signal (e1), the output of the AND gate 788, is placed at the L level. During this period of time, the output off circuit 789 makes the amplifier 790 inactive, preventing the switch control signal in the record RF signal from being supplied as a recording current.

The Q output (d1) of the flip-flop 786 reset to the L level goes to the Hi level when the switch control signal at the head of R1 record signal is sensed. The Q output goes to the L level when the switch control signal at the end of R1 record signal is sensed. Because no R2 switch control signal is sensed, there is no change in the Q output. Similarly, from this time on, the Q output of the flip-flop 786 is inverted each time the R1 switch control signal is sensed.

The switch signal (e1) goes to the H level when all the inputs to the AND gate 788 are at the H level, or when the signal amplitude sense circuit inverted output (e1') and the output (d1) of the flip-flop 786 are all at the H level. Since the output off circuit 789, when the switching signal (e1) is at the H level, makes the amplifier 790 active, the recording current corresponding to R1 record signal is supplied as shown by the R1 recording current (f1), while the recording current corresponding to R2 record signal is not supplied.

In the case of the recording circuit 713b, the output (c2) of the signal amplitude sense circuit 783 goes to the H level when the R2 switch control signal is sensed. The output (c2) of the signal amplitude sense circuit 783 is inverted by the inverter 784 to produce a signal amplitude sense circuit inverted signal (e2'). Because of this, while the R2 switch control signal is being sensed, the switching signal (e2), the output of the AND gate 788, is placed at the L level. During this period of time, the output off circuit 789 makes the amplifier 790 inactive, preventing the switch control signal in the record RF signal from being supplied as a recording current.

The Q output (d2) of the flip-flop 786 reset to the L level goes to the H level when the switch control signal at the head of R2 record signal is sensed. The Q output goes to the L level when the switch control signal at the end of R2 record signal is sensed. Because no R1 switch control signal is sensed, there is no change in the Q output. Similarly, from this time on, the Q output of the flip-flop 786 is inverted each time the R2 switch control signal is sensed.

The switching signal (e2) goes to the H level when all the inputs to the AND gate 788 are at the H level, or when the signal amplitude sense circuit inverted output (e2') and the output (d2) of the flip-flop 786 are all at the H level. Since the output off circuit 789, when the switch signal (e2) is at the H level, makes the amplifier 790 active, the recording current corresponding to R1 record signal is not supplied as shown by the R2 recording current (f2), while the recording current corresponding to R2 record signal is supplied.

Similarly, during an insert recording operation, partial rewriting can be done by using the switch control signal added to before and after the record signal to be insert recorded by the recording circuits 713a and 713b to control the switching so as to record only the signals sandwiched by switch control signals.

Referring to FIG. 162, the construction of another recording circuit will be explained. FIGS. 163 and 164 show the operation sequence of various portions of the FIG. 162 recording circuit during a normal recording operation and during an insert recording operation.

In the record RF signal (a) of this recording circuit, the first switch control signal inserted before and after R1 record signal (hereinafter, referred to as the R1 switch control signal) has a larger amplitude than that of the second switch control signal inserted before and after R2 record signal (hereinafter, referred to as the R2 switch control signal) as shown in FIGS. 163 and 164. This embodiment provides a recording circuit which senses either R1 switch control signal or R2 switch control signal on the basis of the amplitude difference between them. For example, the recording circuit 713a senses the R1 switch control signal to switch between the active and inactive states, and the recording circuit 713b senses the R2 switch control signal to switch between the active and inactive states.

The record RF signal transferred from the rotary transformer is supplied to input 1 and input 2 of the recording circuits 713a and 713b. The supplied record RF signal is divided into two signals, one of which is supplied to the emitter follower 781 and the other of which is supplied to the signal amplitude sense circuit 783.

The signal amplitude sense circuit 783 of the recording circuit, whose function differs from that of the recording circuits of FIGS. 156 and 159, has the upper and lower limits of comparison reference to sense the amplitude difference between the record signal, R1 switch control signal and R2 switch control signal contained in the record RF signal, produces a H-level signal when the amplitude level of the signal lies within the limit range and a L-level signal when the level exceeds the range. For example, in the case of the record RF signal (a) of FIG. 163, by setting the upper limit larger than the amplitude of R1 switch control signal and by setting the lower limit larger than the amplitude of R2 switch control signal, R1 switch control signal can be sensed. Further, by setting the upper limit larger than the amplitude of R2 switch control signal whose amplitude is smaller than that of R1 switch control signal and by setting the lower limit larger than the amplitude of the record signal, R2 switch control signal can be sensed.

The sensing level setting input is fixed to a suitable potential. By changing the potential, it is determined whether R1 switch control signal or R2 switch control signal is sensed. The recording circuit that senses the former operates as the recording circuit 713*a* and the recording circuit that senses the latter operates as the recording circuit 713*b*. This prevents the recording circuits of the same configuration 180° opposite to each other from operating simultaneously, which eliminates the EX-OR gate 787 used in the previous embodiment.

Since the recording circuit 713*a* of FIG. 162 records only the R1 record signal sandwiched by R1 switch control signals and the recording circuit 713*b* records only the R2 record signal sandwiched by R2 switch control signals, it is not necessary to perform control using the carrier sense circuit in order to supply only the signal to be recorded.

The inverter 784, initial setting circuit 785, and flip-flop 786 have the same construction as those in the recording circuit of FIG. 156, and function in the same manner.

The AND gate 788 differs from those in FIGS. 156 and 159 in that it has two inputs because the carrier sense circuit is removed. The AND gate 788, when both the signals sent from the inverter 784 and flip-flop 786 are at the H level, supplies a H level signal to the output off circuit 789, making the amplifier 790 active.

Referring to FIGS. 163 and 164, the operation sequence of various portions of the FIG. 162 recording circuit during a normal recording operation and during an insert recording operation will be explained.

The record RF signal (a) transferred from the rotary transformer is supplied to input 1 and input 2 of the recording circuits 713*a* and 713*b*. The record RF signal is divided into two signals, one of which is supplied to the emitter follower 781 and the other of which is supplied to the signal amplitude sense circuit 783.

In the case of the recording circuit 713*a*, the output (c1) of the signal amplitude sense circuit 783 goes to the H level when R1 switch control signal is sensed. The output (c1) of the signal amplitude sense circuit 783 is inverted by the inverter 784 to produce a signal amplitude sense circuit inverted signal (e1'). Because of this, while the R1 switch control signal is being sensed, the switching signal (e1), the output of the AND gate 788, is placed at the Lo level. During this period of time, the output off circuit 789 makes the amplifier 790 inactive, preventing the switch control signal in the record RF signal from being supplied as a recording current.

The Q output (d1) of the flip-flop 786 previously reset to the L level goes to the H level when the switch control signal at the head of R1 record signal is sensed. The Q output goes to the L level when the switch control signal at the end of R1 record signal is sensed. Because no R2 switch control signal is sensed, there is no change in the Q output. Similarly, from this time on, the Q output of the flip-flop 786 is inverted each time R1 switch control signal is sensed.

The switching signal (e1) goes to the H level when all the inputs to the AND gate 788 are at the H level, or when the signal amplitude sense circuit inverted output (e1') and the output (d1) of the flip-flop 786 are all at the Hi level. Since the output off circuit 789, when the switch signal (e1) is at the H level, makes the amplifier 790 active, the recording current corresponding to R1 record signal is supplied as shown by the R1 recording current (f1), while the recording current corresponding to R2 record signal is not supplied.

In the case of the recording circuit 713*b*, the output (c2) of the signal amplitude sense circuit 783 goes to the H level when R2 switch control signal is sensed. The output (c2) of the signal amplitude sense circuit 783 is inverted by the inverter 784 to produce a signal amplitude sense circuit inverted signal (e2'). Because of this, while the R2 switch control signal is being sensed, the switching signal (e2), the output of the AND gate 788, is placed at the L level. During this period of time, the output off circuit 789 makes the amplifier 790 inactive, preventing the switch control signal in the record RF signal from being supplied as a recording current.

The Q output (d2) of the flip-flop 786 previously reset to the L level goes to the H level when the switch control signal at the head of R2 record signal is sensed. The Q output goes to the L level when the switch control signal at the end of the R2 record signal is sensed. Because no R1 switch control signal is sensed, there is no change in the Q output. Similarly, from this time on, the Q output of the flip-flop 786 is inverted each time R2 switch control signal is sensed.

The switching signal (e2) goes to the H level when all the inputs to the AND gate 788 are at the H level, or when the signal amplitude sense circuit inverted output (e2') and the output (d2) of the flip-flop 786 are all at the H level. Since the output off circuit 789, when the switch signal (e2) is at the H level, makes the amplifier 790 active, the recording current corresponding to R1 record signal is not supplied as shown by the R2 recording current (f2), while the recording current corresponding to R2 record signal is supplied.

Similarly, during an insert recording operation, partial rewriting can be done by using the switch control signal added to before and after the record signal to by insert recorded by the recording circuits 713*a* and 713*b* to control the switching so as to record only the signals sandwiched by switch control signals.

Next explained will be a concrete construction of the signal amplitude sense circuit 783 of the FIG. 162 recording circuit, referring to the schematic diagram of FIG. 165 and the operation sequence of FIG. 166.

After the record RF signal (a) is supplied to the signal amplitude sense circuit 783, the amplitude level of the record RF signal is sensed as passing through the rectifier circuit 792 and low-pass filter 793, and the amplitude level sense signal (x) is sent to two comparators 794 and 795.

The comparator 794 produces a H-level signal when the input signal is lower than threshold voltage V1, and produce a L level signal when the input signal is higher than V1. The comparator 795 produces a L-level signal when the input signal is lower than threshold voltage V2, and produce a H-level signal when the input signal is higher than V2.

The AND gate 796, when both outputs of the comparators 794 and 795 are at the H level, produces a H-level signal, which is R1 switch control signal or R2 switch control signal.

The threshold voltages VT1 and VT2 of the comparators 794 and 795 are divided by three resistors Z1, Z2, and Z3 to set a specified potential. By controlling the threshold voltages VT1 and VT2 by the potential supplied to the sensing level setting input, it is possible to select and sense either R1 switch control signal or R2 switch control signal.

As shown by the amplitude level sense signal (x) of FIG. 166, to sense R1 switch control signal, threshold voltage VT1 is set at V1 larger than the amplitude of R1 switch control signal and threshold voltage VT2 is set at V2 larger than the amplitude of the record signal whose amplitude is smaller than that of R1 switch control signal. At this time, the recording circuit operates as the recording circuit 713a.

To sense R2 switch control signal, threshold voltage VT1 is set at V1' smaller than the amplitude of R1 switch control signal and larger than the amplitude of R2 switch control signal, and threshold voltage VT2 is set at V2' smaller than the amplitude of R2 switch control signal and larger than the amplitude of the record signal. At this time, the recording circuit operates as the recording circuit 713b.

In the case of the recording circuit 713a, since threshold voltage VT1 is set at V1, the comparator output (y1) is always at the H level. Because threshold voltage VT2 is set at V2, the comparator output (z1) is at the H level only during the time when R1 switch control signal is being supplied.

The signal amplitude sense circuit output (e1) of AND gate 796 goes to the H level when both of the comparator output (y1) and comparator output (z1) are at the H level.

In the case of the recording circuit 713b, since threshold voltage VT1 is set at VT1', the comparator output (y2) is at the L level only during the time when R1 switch control signal is being supplied. Because threshold voltage VT2 is set at V2', the comparator output (z2) is at the H level only during the time when R1 switch control signal and R2 switch control signal are being supplied.

Since the signal amplitude sense circuit output (e2) of AND gate 796 goes to the H level when both of the comparator output (y2) and comparator output (z2) are at the H level, it is at the L level according to the comparator output (y2) during the time when R1 switch control signal is being supplied, and is at the H level during the time when R2 switch control signal is being supplied.

The signal amplitude circuit, to which the RF detector shown in FIG. 145 is applied, uses two comparators 794 and 795 to sense only signals whose amplitude is within a certain range. This signal amplitude circuit has the same effect as explained in the embodiments of the RF detector.

In the recording circuits in the embodiments shown in FIGS. 156, 159, and 162, a switch control signal whose amplitude is sufficiently larger than that of the record signal. However, adding a switch control signal whose amplitude is smaller than that of the record signal enables similar control, since what is required is the ability to sense the amplitude difference between the record signal and the switch control signal.

Other types of logic circuits may be used instead of the logic circuits used in those embodiments including inverters, AND gates, EX-OR gates, and flip-flops, as long as those new logic circuits allow basically the same control.

While the recording circuits in FIGS. 156 and 159 incorporate an initial setting circuit, the recording circuit may be provided with input terminals for initial setting and the initial setting be done via slip rings. In this case, since what is required is to have a plurality of recording circuits undergo initial setting simultaneously, it is sufficient to increase the slip rings by one channel. Because the recording circuits in those embodiments are available in IC chips, it is easy to install them within the rotary drum.

The above recording circuit may be applied to a magnetic recording and reproduction apparatus described hereinafter.

The recording and reproduction apparatus comprises a rotary drum having a circumferential surface, a plurality of recording magnetic heads and reproduction magnetic heads mounted on the rotary drum which record and reproduction information signals, making contact with a magnetic tape running so as to wrap around the circumferential surface of the rotary drum, a plurality of recording circuits mounted in the rotary drum and connected to the recording heads, respectively, a first control circuit provided in each of the recording circuits, for sensing an amplitude-modulated signal which is added to at least one of front and end parts of an information signal to be recorded which is transferred to one of the recording circuits from outside the rotary drum to obtain information indicating an effective recording area angle with respect to a rotational direction of the rotary drum, the amplitude-modulated signal being modulated into different amplitude from that of the information signal and being transferred to one of the recording circuits, a second control circuit provided in each of the plurality of recording circuits which senses an information signal to be recorded which is transferred to the recording circuit from outside the rotary drum, a third control circuit provided in each of the plurality of recording circuits, which brings the output stage of the recording circuit into an active state during the time when the first control circuit senses that the recording head corresponding to the recording circuit including the first control circuit is within the effective record area angle and the second control circuit senses the information signal, and at least one rotary transformer connected directly to the recording circuit.

At least one of the first and second control circuit comprises the full-wave rectifying RF detector 720 as shown in FIGS. 145 and 147. That is, the full-wave rectifying RF detector 720 contains at least one stage of a full-wave rectifier circuit 728 (or full-wave rectifier circuits 728a and 728b) for full-wave rectifying said information signal, a low-pass filter 729 for removing the high-frequency components from the output signal of the full-wave rectifier circuit, and a binarizing circuit, i.e., comparator 724 for converting the output signal of the low-pass filter into a binary signal.

As shown in FIG. 133, the third control circuit 730 includes a plurality of photodetectors 271a and 271b installed respectively at the positions corresponding to the magnetic heads P1 and P2 on the rotary drum, and the recording and reproduction apparatus includes an array 272 of a plurality of light emitting elements densely arranged in an arcuated pattern on the stationary drum, each of the light emitting diodes being within a range corresponding to a reproducible area, and corresponding in position to the photodetectors, and wherein the reproduction circuit are connected directly to the photodetectors to receive a control signal generated from each of the photodetectors of the third control circuit during when the photodetectors detect light from the light emitting elements.

Next explained will be an embodiment according to a manufacturing method of a rotary transformer apparatus used in the present invention, referring to FIGS. 169A through 169C.

One known rotary transformer is a coaxial rotary transformer, in which the magnetic cores are magnetically separated for each channel in order to reduce channel variations and crosstalk, which raise problems especially in wideband, high transfer rate VTRs such as HDTV VTRs. The coaxial rotary transformer is constructed in such a manner that a rotating element and a stationary element are coaxially arranged and composed of multiple channels of magnetic cores magnetically separated for each channel and winding coils provided for each channel of magnetic cores. Of the magnetic cores of the rotating element and the stationary element, those whose inner circumference side is wound with winding coils have first cores with a winding slot and second cores without a winding slot placed alternately along the axis.

The present invention is characterized by comprising the steps of, in manufacturing a coaxial rotary transformer apparatus described above, preparing as the first cores first core materials with a ring-like square groove serving as the winding slot in the face perpendicular to the axis, and as the second cores second core materials of a flat ring shape, inserting the winding coils in the ring-like square groove (circular channel-shaped groove), then alternately laminating those first and second core materials together with short rings if used, and grinding the inner circumference surface of the first and second core materials laminated until the winding coils are exposed.

The embodiments shown in FIGS. 144 to 166 are applied to a recording circuit, but this may be applied to an erasing circuit.

FIG. 167 is a sectional view showing magnetic cores whose inner circumference side is provided with winding coils among the magnetic cores of the rotating element and the stationary element in the present embodiment, before the grinding is done. FIG. 168 is a sectional view of the rotary transformer after the grinding.

In FIGS. 167 and 168, numeral 800 indicates a hollow magnetic core made of soft magnetic material such as ferrite, which is constructed in such a manner that first cores 801 with a winding slot 802 and second cores 803 without a winding slot are laid one on top of another alternately via short rings along the axis. The reason why the first cores 801 are separated from the second cores 803 in the magnetic core 800 is to facilitate the placement of winding coils from the inside, which is generally difficult. The short rings 804 are used to magnetically separate magnetic cores for each channel. In the winding slots 802, winding coils such as enameled wire are placed. The entire magnetic core 800 is housed in a cylindrical housing 806 made of nonmagnetic metal such as aluminum.

In practice, the winding coils are provided with lead wires, which are passed through lead wire grooves or the like in the magnetic core 800 and housing 806 and drawn outside, although not shown in the figure.

FIGS. 169A through 169C are perspective views of a core in connection with the manufacturing processes of rotary transformers according to the present embodiment. As shown in FIGS. 167 and 169A, for the first cores 801, first core materials are prepared which have a ring-like square groove 807 serving as a winding slot 802 formed in the face perpendicular to the axis by forming a thicker portion 808 along the innermost circumference. Then, as shown in FIGS. 167 and 169B, a winding coil 805 is inserted in the ring-like square groove 807. In this case, the winding coil 805 is limited by the thicker portion 808, this assures that the winding coil is located in place, preventing any portion to protrude toward the inside and fall off the core 801.

On the other hand, for the second cores 803, second core materials of a flat ring shape are prepared whose inside diameter is almost the same as that of the first core material serving as the first core shown in FIGS. 169A and 169B. Short rings whose inside diameter is almost the same as that of the second core material are also prepared. The first core materials with the winding coils 805 inserted in the ring-like square grooves 807, the second core materials, and the short rings are laid one on top of another as shown in FIG. 167. Then, the resulting assembly is all housed in the cylindrical housing 806. In this state, the opening of the ring-like groove 807 of the first core is closed with the second core material, which forms a ring-like closed space between the first core material and the second core material, allowing the winding coil 805 to rest in place stably in the ring-like closed space.

Then, the inner circumference surface of the first and second core materials and short rings are ground with a lathe or the like until the broken lines in FIG. 167 are reached. After the grinding of the inner circumference surface of the first and second core materials and short rings is completed, as for the shape of the first core material, the thicker portion 808 in FIGS. 169A and 169B are removed as shown in FIG. 169C to make the inner circumference of the closed space open, permitting the winding coil 805 to be exposed. As a result, the entire shape of the magnetic core 800 is as shown in FIG. 168, and a coaxial rotary transformer apparatus can be obtained.

With the manufacturing method of a rotary transformer apparatus according to the present invention, the placement of winding coils is easier, and an improvement in the yield and a reduction in the manufacturing cost are possible.

Although in the above embodiment, a 4-channel rotary transformer apparatus is used, the number of channels is not restricted to 4. While in the embodiment, two circuits of winding coils are placed in a single winding slot, the present invention may be applied to a rotary transformer apparatus with more circuits of winding coils in a winding slot.

Figure 170A:
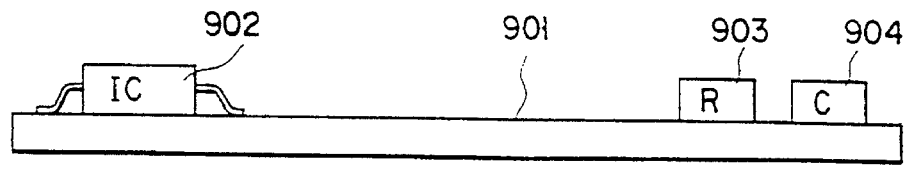
Figure 170B:
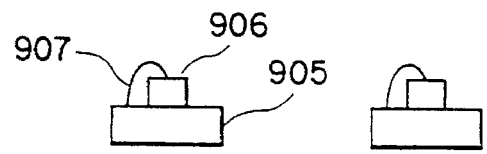
Figure 170C:
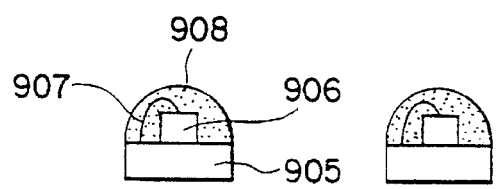
Figure 170D:
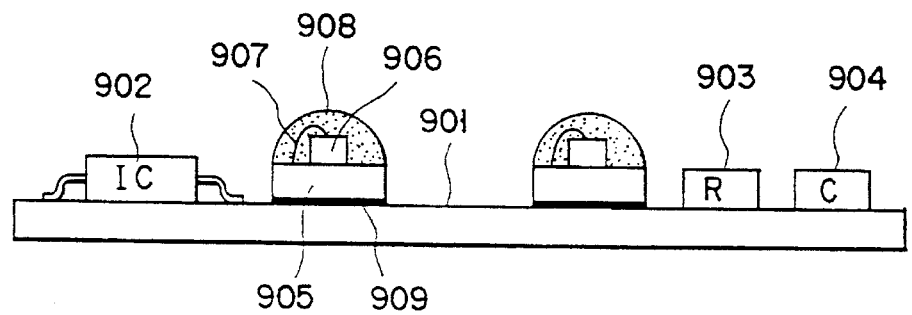

Next, an embodiment of a mounting method of a scanner section in the present invention will be explained, refer ring to FIGS. 170A through 170D, and FIGS. 171 and 172. FIGS. 170A through 170D are views used for explaining the construction of a reproduction circuit board unit in the scanner section and its manufacturing processes. As shown in FIG. 170A, a reproduction circuit IC 902, and a passive element chip parts including a resistor 903 and a capacitor 904 are mounted automatically on a reproduction circuit board 901. In parallel with this, as shown in FIG. 170B, a photodetector bare chip 906 is mounted on a photodetector board 905 and wired onto the board 905 with bonding wires 907. After operation check, the resulting assembly is sealed with a transparent resin as shown in FIG. 170C. Then, by securing the photodetector board 905 of FIG. 170C on the reproduction circuit board 901 of FIG. 170A with an adhesive 909, a reproduction circuit board unit where the reproduction circuit and the photodetector are integrated into a hybrid IC can be obtained.

The sealing of the photodetector bare chip 906 with the transparent resin 908 may be done after the photodetector board 905 has been secured onto the reproduction circuit board 901.

FIG. 171 is another embodiment of the reproduction circuit board unit, which has the photodetector bare chip 906 mounted directly on the reproduction circuit board 901 without using a photodetector board as shown in FIGS. 170A through 170D.

In FIG. 172, a reproduction circuit board 1001 is mounted on the bottom of the rotary drum 1003, and a recording circuit board 2001 is mounted on its top, with an IC chip containing recording circuits 713a and 713b mounted on the bottom face of the recording circuit board 2001, and an IC chip containing reproduction circuits 714a and 714b mounted on the bottom face of the reproduction circuit board 1001. Record photodetectors 1005a and 1005b are mounted on the top face of the recording circuit board 2001, and reproduction photodetectors 1006a and 1006b are mounted on the bottom face of the reproduction circuit board 1001. The photodetectors 1005a, 1005b, 1006a, and 1006b are photodetector bare chips sealed with a transparent resin.

An upper stationary drum 1004a and a lower stationary drum 1004b are placed above and under the rotary drum, respectively. A recording LED array 1007 and a reproduction LED array 1008 are placed on LED boards 2010 and 1010 provided on the stationary drums 1004a and 1004b, so as to face the recording photodetectors 1005a and 1005b and the reproduction photodetectors 1006a and 1006b. Grooves or through holes are formed in the LED boards 2010 and 1010 as formed in the board 400 shown in FIG. 135. Within those grooves or through holes, the LED arrays 1007 and 1008 are provided.

Conventionally, as shown in broken lines in FIG. 172, the reproduction photodetectors (1006a, 1006b) are mounted together with the recording photodetectors (1005a, 1005b) on the recording circuit board 2001. In addition, the reproduction LED array (1008) is mounted on the upper stationary drum 1004a so as to face the reproduction photodetectors (1006a, 1006b). As a result, to connect the reproduction photodetectors on the recording circuit board 2001 to the reproduction circuit board 1001, as many lead wires for transmitting the control signal from the photodetectors as the reproduction heads are required, which is one of causes of increasing the labor and time required to manufacture scanners and the production cost as the number of heads increases.

However, by placing the reproduction photodetectors on the reproduction circuit board 1001 as shown in FIG. 172, and consequently shifting the reproduction LED array to the lower stationary drum 1004b, the drawing of lead wires for connecting the reproduction photodetectors to the reproduction circuit board 1001 becomes unnecessary, which is very helpful in the manufacture.

While in the above embodiments, rotary transformer-type VTRs have been explained, this invention may be applied to VTRs employing other magnetic head-mounted systems such as the disk type or the middle drum type.

Although in the above embodiments, the switching is done between the 1-channel rotary transformer and the 2-channel recording circuit or reproduction circuit, the invention may be applied to a recording circuit or reproduction circuit with more channel or a combination recording and reproduction circuit with more channels. For instance, if there are eight channels of recording heads and recording circuits and eight channels of reproduction heads and reproduction circuits, and the effective recording area angle is 180°, the rotary transformer may have eight channels.

While in the above embodiments, a LED array-based system is used as a control system of drum-mounted circuits, the recording circuits, reproduction circuits, and erase circuits on the rotary drum may be controlled by different control systems, such as three different types of control systems for drum-mounted circuits disclosed in Published Unexamined Japanese Patent Application No. 1-127911. For instance, the recording circuits and erase circuits may use the LED array-based control system, and the reproduction circuits use the photoreflector-based system.

Further, the erase circuits may employ the active/inactive control system as do the recording circuits. Since in insert editing, the erase circuits operates whenever the recording circuits operate, if the tape format permits, for example, the recording LED array may be used as the erase LED array for the erase circuit control. In this case, there is no possibility that the erase circuits become active, since the aforementioned RF detector does not operated unless the erase RF signal is transferred to the erase circuits within the rotary drum.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A magnetic recording/reproduction apparatus comprising:

a rotary drum having a circumferential surface;

tape running means for rotating said rotary drum to run a magnetic tape with the magnetic tape being in contact with, at least, part of the circumferential surface of said rotary drum;

a plurality of magnetic heads installed on said rotary drum so that said magnetic heads are rotated together with said rotary drum, with said magnetic heads being in contact with the magnetic tape;

a plurality of amplifying circuit means respectively connected to said magnetic heads and installed on said rotary drum so that they rotate together with said rotary drum, said amplifying circuit means being selectively active and inactive;

at least one rotary transformer having a core in which a slot having a circular shape is formed, a winding formed of at least one metal plate coil received in said slot and having both coil ends, said metal plate coil having a shape corresponding to the circular shape of said slot, and lead-in metal plate wires formed integral with said metal plate coil by-etching or die-cutting so that they extend from the both coil ends of said metal plate coil, said lead-in-metal plate wires having terminal ends connected to said amplifying circuit means; and control means for making said magnetic heads perform at least one of data-recording and data-reproduction through said amplifying circuit means, and said rotary transformer.

2. A magnetic recording/reproduction apparatus according to claim 1, wherein said rotary transformer has leading holes for leading electric lead-in wires, and said lead-in wires are folded along said leading holes.

3. A magnetic recording/reproduction apparatus according to claim 2, wherein said lead wires are covered with insulating sheath respectively.

4. A magnetic recording and reproduction apparatus comprising:

a rotary drum having a circumferential surface;

a stationary drum disposed opposite to said rotary drum;

tape running means for rotating said rotary drum to run a magnetic tape with the magnetic tape being in contact with at least part of the circumferential surface of said rotary drum;

magnetic head means having at least first and second erasing magnetic heads used for erasing a record signal and a plurality of recording magnetic heads used for recording an information signal, said first and second erasing magnetic heads and said recording magnetic heads being installed on said rotary drum so that they rotate together therewith, and are in contact with the magnetic tape;

at least first and second erasing circuit means installed on said rotary drum so that they rotate together therewith, and connected directly to said first and second erasing magnetic heads, respectively, to output at least first and second erasing signals to said first and second erasing magnetic heads, respectively;

detection means for detecting the rotational positions of said rotary drum which correspond to an area of the range of said magnetic tape to be erased;

erasing control means installed on said rotary drum, for selectively activating said first and second erasing circuit means in accordance with a detection signal from said detection means;

a plurality of recording circuit means connected directly to said recording magnetic heads, respectively, and installed on said rotary drum so that they rotate together therewith, said recording circuit means being selectively active and inactive; and a rotary transformer which has at least one core with a slot, and at least first and second coils inserted in said slot of said core, and connected directly to said first and second erasing circuit means, respectively, said first and second coils being wound around an axis of rotation of said rotary drum.

5. A magnetic recording and reproduction apparatus comprising:

rotary drum having a circumferential surface;

a stationary drum disposed opposite to said rotary drum;

tape running means for rotating said rotary drum and running a magnetic tape with said tape being in contact with at least part of the circumferential surface of said rotary drum;

magnetic head means having a plurality of erasing magnetic heads used for erasing a record signal, and a plurality of recording magnetic heads used for recording information signals in said magnetic tape, said erasing magnetic heads and said recording magnetic heads being installed on said rotary drum so that they rotate together therewith and are in contact with said magnetic tape;

a plurality of erasing circuit means installed on said rotary drum so that said erasing circuit means rotate together therewith, and connected directly to said erasing magnetic heads, respectively, to output an erasing signal to each of said erasing heads;

a plurality of recording circuit means connected directly to said recording magnetic heads, respectively, to output an information signal to each of said magnetic heads, and installed on said rotary drum;

at least one rotary transformer connected to said recording circuit means and said erasing circuit means, said rotary transformer having at least one core with a slot, and at least first and second coils inserted in said slot, and said first coil being connected directly to at least one of said erasing circuit means, and said second coil being connected directly to at least one of said recording circuit means, said first and second coils being wound around an axis of rotation of said rotary drum; and detection means for detecting those rotational positions of said rotary drum which correspond to an area of the range of said magnetic tape to be erased or recorded; and erasing and recording control means installed on said rotary drum, for selectively activating said erasing circuit means and said recording circuit means which are connected to said first and second coils, respectively, in accordance with an output from said detection means.

6. A magnetic recording and reproduction apparatus comprising;

a rotary drum having a circumferential surface;

a stationary drum disposed opposite to said rotary drum;

tape running means for rotating said rotary drum and running a magnetic tape with the magnetic tape being in contact with at least part of the circumferential surface of said rotary drum;

magnetic head means having a plurality of erasing magnetic heads used for erasing a record signal, a plurality of recording magnetic heads used for recording an information signal, and a plurality of reproduction magnetic heads used for reproducing the record signal from said magnetic tape, said erasing, recording and reproduction magnetic heads being installed on said rotary drum so that they rotate together therewith and are in contact with said magnetic tape;

a plurality of erasing circuit means installed on said rotary drum so that said erasing circuit means rotate together therewith, and connected directly to said erasing magnetic heads, respectively, to output an erasing signal to each of said erasing heads;

a plurality of recording circuit means connected directly to said recording magnetic heads, respectively, and installed on said rotary drum so that they rotate together therewith;

a plurality of reproduction circuit means connected directly to said reproduction magnetic heads, respectively, and installed on said rotary drum so that they rotate together therewith;

at least one rotary transformer connected to said reproduction circuit means and said erasing circuit means, said rotary transformer having at least one core with a slot, and at least first and second coils inserted in said slot, and said first coil beinq connected directly to at least one of said reproduction circuit means and said second coil being connected directly to at least one of said erasing circuit means, said first and second coils being wound around an axis of rotation of said rotary drum;

detection means for detecting the rotational positions of said rotary drum which correspond to an area of the range of said magnetic tape to be erased or reproduced; and erasing and reproduction control means installed on said rotary drum, for selectively activating said erasing circuit means and said reproduction circuit means which are connected to said first and second coils, respectively, in accordance with an output from said detection means.

7. A magnetic recording and reproduction apparatus comprising:

a scanner including a rotary drum having a circumferential surface, and a stationary drum opposing said rotary drum;

mechanical driving means for driving said rotary drum to rotate and causing a magnetic tape to travel in contact with at least a part of the circumferential surface of said rotary drum;

magnetic head means having a plurality of recording magnetic heads used for recording an information signal on the magnetic tape, and a plurality of erasing magnetic heads used for erasing a record signal, said recording and erasing magnetic heads being mounted on said rotary drum so as to be brought into contact with said magnetic tape and rotate together therewith;

a plurality of recording circuits mounted within said rotary drum so as to rotate together therewith, said recording circuits each having input and output terminal means, said output terminal means of each of said recording circuits being coupled directly to a corresponding one of said plurality of magnetic heads, and said recording circuits being controlled between active and inactive states;

a plurality of erasing circuits mounted within said rotary drum so as to rotate together therewith, said erasing circuits each having input and output terminal means, said output terminal means of each of said erasing circuits being coupled directly to a corresponding one of said plurality of magnetic heads, and said erasing circuits being controlled between active and inactive states;

a rotary transformer unit having a rotary member mounted on said rotary drum and a stationary member, said rotary and stationary members having primary and secondary coil means, at least one of said primary and secondary coil means being constituted by a plurality of coils inserted in a slot, and said coils of each of said secondary coil means being coupled directly to said input terminal means of said recording circuits, respectively, said coils being wound around an axis of rotation of said rotary drum;

another rotary transformer unit having a rotary member mounted on said rotary drum and a stationary member, said rotary and stationary members having primary and secondary coil means, at least one of said primary and secondary coil means being constituted by a plurality of coils inserted in a slot, and said coils of each of said secondary coil means being coupled directly to said input terminal means of said erasing circuits, respectively;

first control means mounted on said stationary drum, said first control means containing an arcuated-pattern light-emitting element array constructed by a plurality of light-emitting elements arranged in an arcuated shape in the direction of rotation of said rotary drum, and a plurality of photodetectors placed in the positions of said rotary drum which correspond to at least one of said recording and erasing heads, respectively, for outputting a signal indicating the period of time during which at least one of said recording and erasing heads is within a range of said light-emitting element array;

one second control means provided in each of said plurality of recording circuits for sensing an information signal to be recorded which is transferred to said recording circuit from outside said rotary drum;

another second control means provided in each of said plurality of erasing circuits for sensing an erasing signal to be erased which is transferred to said erasing circuit from outside said rotary drum;

one third control means provided in each of said plurality of recording circuits which brings at least the output stage of the recording circuit into an active state during the time when said first control means senses that one of recording magnetic heads is within the range of said light-emitting element array and said one second control means senses an information signal; and another third control means provided in each of said plurality of erasing circuits which brings at least the output stage of the erasing circuit into an active state during the time when said first control means senses that one of said erasing heads is within the range of said light-emitting element array and said another second control means senses an erasing signal.

8. A magnetic recording and reproduction apparatus comprising:

a rotary drum having a circumferential surface;

a plurality of recording magnetic heads and reproduction magnetic heads mounted on said rotary drum which record and reproduction information signals, making contact with a magnetic tape running so as to wrap around the circumferential surface of the rotary drum;

a plurality of recording circuits mounted in said rotary drum and connected to said recording heads, respectively;

first control means provided in each of said recording circuits, for sensing an amplitude-modulated signal which is added to at least one of front and end parts of an information signal to be recorded which is transferred to one of said recording circuits from outside said rotary drum to obtain information indicating an effective recording area angle with respect to a rotational direction of said rotary drum, the amplitude-modulated signal being modulated into different amplitude from that of the information signal and is transferred to one of said recording circuits;

second control means provided in each of said plurality of recording circuits which senses an information signal to be recorded which is transferred to the recording circuit from outside said rotary drum;

third control means provided in each of said plurality of recording circuits, which brings the output stage of the recording circuit into an active state during the time when said first control means senses that the recording head corresponding to the recording circuit including said first control means is within the effective record area angle and said second control means senses said information signal; and at least one rotary transformer connected directly to said recording circuit means.

9. A magnetic recording and reproduction apparatus according to claim 6, wherein said detection means includes a plurality of photodetectors for erasing and reproduction which are mounted on said rotary drum at positions corresponding to said erasing and reproduction magnetic heads, respectively, and wherein said apparatus includes a plurality of erasing light emitting diodes which are densely arranged in an arcuated pattern, each of said erasing light emitting diodes being within a range corresponding to an erasing area, said erasing light emitting diodes corresponding in position to said photodetectors for erasing, and a plurality of reproduction light emitting diodes which are densely arranged in an arcuated pattern, each of said reproduction light emitting diodes being within a range corresponding to an effective reproduction area, said reproduction light emitting diodes corresponding in position to said photodetector for reproduction, and wherein said erasing circuit means is controlled by a control signal generated from said photodetector of said detection means when said photodetector detects light of the erasing light emitting diodes, and said reproduction circuit means is controlled by a control signal generated from said photodetector of said detection means when said photodetectors detect light of the reproduction light emitting diodes.

10. A magnetic recording and reproduction apparatus according to claim 5, wherein said detection means includes a plurality of photodetectors for recording and erasing which are mounted on said rotary drum at positions corresponding to said erasing and recording magnetic heads, respectively, and wherein said apparatus includes a plurality of recording light emitting diodes which are densely arranged in an arcuated pattern and mounted on said stationary drum, each of said recording light emitting diodes being within a range corresponding to an effective recording area, said recording light emitting diodes corresponding in position to said photodetectors for recording, and a plurality of erasing light emitting diodes which are densely arranged in an arcuated pattern, each of said erasing light emitting diodes being within a range corresponding to an erasing area, said erasing light emitting diodes corresponding in position to said photodetectors for erasing, and wherein said recording circuit means is controlled by a control signal generated from said photodetector of said detection means when said photodetector detects light of the recording light emitting diodes, and said erasing circuit means is controlled by a control signal generated from said photodetector of said detection means when said photodetector detects light of the erasing light emitting diodes.

11. A magnetic recording and reproduction apparatus according to claim 4, wherein said erasing control means includes a plurality of photodetectors installed respectively at the positions corresponding to said magnetic heads on said rotary drum, and said apparatus includes a plurality of light emitting elements densely arranged in an arcuated pattern on said stationary drum, each of said light emitting diodes being within a range corresponding to an erasing area in correspondence with said photodetectors, and wherein said first and second erasing circuit means are connected directly to said photodetectors of said erasing control means, for supplying the erasing signal to each of said first and second erasing magnetic heads in response to a control signal generated from each of said photodetectors of said erasing control means during when said photodetectors detect light from said light emitting elements.

12. A magnetic recording and reproduction apparatus according to any one of claims 7, 10, or 11, wherein said photodetectors are mounted together said circuits in the same hybrid integrated circuit.

13. An apparatus according to any one of claims 4–8, which includes means for winding said magnetic tape on the circumferential surface of said rotary drum so that an effective wrap angle which is smaller than a total wrap angle becomes not more than 180°, said effective wrap angle being an angle which covers an effective area of the magnetic tape on which an information signal can be recorded or reproduced and said total wrap angle being an angle at which the magnetic tape is wound around said rotary drum; and each of said recording circuits is activated in the effective wrap angle, for amplifying an information signal to be recorded, and each of said reproduction circuits is activated in the effective wrap angle, for amplifying an information signal to be reproduced.

14. An apparatus according to claim 13, wherein when two magnetic heads to be sequentially activated are mounted on said rotary drum, said total wrap angle is set at more than 180°.

15. An apparatus according to claim 13, wherein when three magnetic heads to be sequentially activated are mounted on said rotary drum, said total wrap angle is set at more than 120°.

16. An apparatus according to claim 13, wherein when four magnetic heads to be sequentially activated are mounted on said rotary drum, said total wrap angle is set at more than 90°.

17. A magnetic recording and reproduction apparatus according to any one of claims 4–8, wherein said rotary drum has a rotary transformer of more than 8 channels.

18. A magnetic recording and reproduction apparatus according to any one of claims 7, 9, 10 or 11, wherein said arcuated pattern light-emitting element array has light-emitting elements series-connected at intervals of a specified number of elements in the arrangement direction, each series circuit being connected to a power supply.

19. A magnetic recording and reproduction apparatus according to any one of claims 4–8, wherein each of said erasing circuit means and said recording circuit means includes an amplifier having two input terminals connected to two terminals of one of said coils of said rotary transformer, respectively, and a resistor connected between said two input terminals.

20. A magnetic recording and reproduction apparatus according to claim 19, wherein said resistor has a resistance of 50 Ω to 1,000 Ω.

21. An apparatus according to any one of claims 4–8, wherein said rotary transformer has at least first and second leading holes each formed at a position at which a wiring length between one of said first and second circuits and one of said first and second leading holes is shortest, and each of said first and second circuits is connected to one of said first and second coils of said rotary transformer through said first and second leading holes by first and second lead-in wires, respectively.

22. A magnetic recording/reproduction apparatus according to claim 5, wherein said erasing heads and said recording heads are installed on said rotary drum at different heights.

23. A magnetic recording and reproduction apparatus according to claim 5, which includes means for controlling a timing at which at least one of said recording circuit means is active to be different from a timing at which at least one of said erasing circuit means is active.

24. A magnetic recording/reproduction apparatus according to claim 6, wherein said erasing heads and said reproduction heads are installed on said rotary drum at different heights.

25. A magnetic recording and reproduction apparatus according to claim 6, which includes means for controlling a timing at which at least one of said reproduction circuit means is active to be different from a timing at which at least one of said erasing circuit means is active.

26. An apparatus according to claim 6, wherein when one of said reproduction circuits is active, the remaining ones thereof have a higher output impedance than said one reproduction circuit.

27. A magnetic recording and reproduction apparatus according to claim 7 or 8, wherein at least one of said first and second control means contains at least one stage of a full-wave rectifier circuit for full-wave rectifying said information signal, a low-pass filter for removing the high-frequency components from the output signal of the full-wave rectifier circuit, and binarizing means for converting the output signal of the low-pass filter into a binary signal.

28. A magnetic recording and reproduction apparatus according to claim 7 or 8, wherein at least one of said first and second control means contains at least one stage of a full-wave rectifier circuit for full-wave rectifying one of said information signal and said amplitude-modulated signal, binarizing means for converting the output signal of the full-wave rectifier circuit into a binary signal, delay means for delaying the binary signal supplied from the binarizing means, and an OR circuit for ORing the signal delayed by the delay means and the binary signal from said binarizing means.

29. A magnetic recording and reproduction apparatus according to claim 7 or 8, wherein said rotary transformer comprises:

a stator;

a rotor;

an upper transformer section for transferring the record signal; and a lower transformer section for transferring the erase signal, a single winding being set in a slot formed in an upper portion of said stator in said upper transformer section, and a plurality of windings being set in a slot formed in an upper portion of said rotor, a single winding being set in a slot formed in a lower portion of said stator in said lower transformer section, and a single winding being set in a slot formed in a lower portion said rotor.

30. A magnetic recording and reproduction apparatus according to claim 7, wherein said rotary member of at least one of said rotary transformer unit and said another rotary transformer unit has a rotor, and said stationary member has an outer stator and an inner stator which are placed coaxially with said rotor, one of said rotor and said stators having inner slots each having a predetermined depth larger than that of outer slots.

31. A magnetic recording and reproduction apparatus according to claim 7, wherein said rotary member of at least one of said rotary transformer unit and said another rotary transformer unit has a rotor, and said stationary member has an outer stator and an inner stator which are placed coaxially with said rotor, wherein core facing widths between the inside of said rotor and said inner stator are larger than core facing widths between the outside of said rotor and said outer stator.

32. A magnetic recording and reproduction apparatus according to claim 7, wherein said rotary member and said stationary member of at least one of said rotary transformer unit and said another rotary transformer unit comprise multiple channels of magnetic cores separated for each channel and windings provided for each channel, said magnetic cores being provided with winding coils on their inner circumference side and including first cores with a winding slot and second cores without a winding slot, each of said first cores being laid on a corresponding one of said second cores, and wherein said first cores are made of first core materials with a ring-like square groove serving as said winding slot in a face perpendicular to the axis of said rotary member and said stationary member, and said second cores are made of second core materials of a flat ring shape, said windings being inserted in the ring-like square grooves and said first and second cores being formed by grinding the inner circumference surfaces of said first and second core materials which are superimposed one another until said windings are exposed.

33. A magnetic recording and reproduction apparatus according to claim 8, wherein said rotary transformer includes at least one core with a slot, and a plurality of coils inserted in said slot, and connected directly to said recording circuits, respectively, said coils being wound around an axis of rotation of said rotary drum.

34. A magnetic recording and reproduction apparatus according to claim 8, wherein said rotary transformer has a rotor, and an outer stator and an inner stator which are placed coaxially with said rotor, one of said rotor and said stators having inner slots each having a predetermined depth larger than that of outer slots.

35. A magnetic recording and reproduction apparatus according to claim 8, wherein said rotary transformer has a rotor, and an outer stator and an inner stator which are placed coaxially with said rotor, core facing widths between the inside of said rotor and said inner stator being larger than core facing widths between the outside of said rotor and said outer stator.

36. A magnetic recording and reproduction apparatus according to claim 8, wherein said rotary transformer comprises multiple channels of magnetic cores separated for each channel and windings provided for each channel, said magnetic cores being provided with winding coils on their inner circumference side and including first cores with a winding slot and second cores without a winding slot, each of said first cores being laid on a corresponding one of said second cores, and wherein said first cores are made of first core materials with a ring-like square groove serving as said winding slot in a face perpendicular to the axis of said rotary member and said stationary member, and said second cores are made of second core materials of a flat ring shape, said windings being inserted in the ring-like square grooves and said first and second cores being formed by grinding the inner circumference surfaces of said first and second core materials which are superimposed one another until said windings are exposed.

\* \* \* \* \*

UNITED STATES PATENT AND TRADEMARK OFFICE
CERTIFICATE OF CORRECTION

PATENT NO. : 5,532,887
DATED      : July 2, 1996
INVENTOR(S): Yasushi HAGASHIYAMA, et al.

It is certified that error appears in the above-indentified patent and that said Letters Patent is hereby corrected as shown below:

On the title page, Item [*], the Terminal disclaimer information should read:

-- [*] The term of this patent shall not extend beyond the expiration date of Pat. # 5,276,565 --

Signed and Sealed this

Fifteenth Day of April, 1997

*Attest:*

BRUCE LEHMAN

*Attesting Officer*    *Commissioner of Patents and Trademarks*